*INVENTORS*
WILLIAM J. DEERHAKE
BYRON L. HAVENS

BY Dwight D. Mooney
ATTORNEY

INVENTORS
WILLIAM J. DEERHAKE
BYRON L. HAVENS
BY Dwight D. Mooney
ATTORNEY

May 31, 1960 W. J. DEERHAKE ET AL 2,939,001

REGENERATIVE DATA STORAGE SYSTEM

Filed July 19, 1954 67 Sheets-Sheet 3

INVENTORS
WILLIAM J. DEERHAKE
BYRON L. HAVENS

BY Dwight D. Mooney
ATTORNEY

INVENTORS
WILLIAM J. DEERHAKE
BYRON L. HAVENS

BY Dwight D. Mooney
ATTORNEY

INVENTORS
WILLIAM J. DEERHAKE
BYRON L. HAVENS

BY Dwight D. Mooney
ATTORNEY

INVENTORS
WILLIAM J. DEERHAKE
BYRON L. HAVENS

BY Dwight D. Mooney
ATTORNEY

May 31, 1960 W. J. DEERHAKE ET AL 2,939,001

REGENERATIVE DATA STORAGE SYSTEM

Filed July 19, 1954 67 Sheets-Sheet 7

*INVENTORS*
WILLIAM J. DEERHAKE
BYRON L. HAVENS

BY Dwight D. Mooney
ATTORNEY

May 31, 1960 W. J. DEERHAKE ET AL 2,939,001

REGENERATIVE DATA STORAGE SYSTEM

Filed July 19, 1954 67 Sheets-Sheet 8

INVENTORS
WILLIAM J. DEERHAKE
BYRON L. HAVENS

BY Dwight D. Mooney
ATTORNEY

INVENTORS
WILLIAM J. DEERHAKE
BYRON L. HAVENS

BY Dwight D. Mooney
ATTORNEY

*INVENTORS*
WILLIAM J. DEERHAKE
BYRON L. HAVENS

BY Dwight D. Mooney
ATTORNEY

INVENTORS
WILLIAM J. DEERHAKE
BYRON L. HAVENS

BY Dwight D. Mooney
ATTORNEY

INVENTORS
WILLIAM J. DEERHAKE
BYRON L. HAVENS
BY Dwight D. Mooney
ATTORNEY

INVENTORS
WILLIAM J. DEERHAKE
BYRON L. HAVENS
BY Dwight D. Mooney
ATTORNEY

| TIME | OPERATION | CIRCUIT POINT (FIGS. 5A, 6A, 6B) UNITS ORDER | | | | | | | | | |
|---|---|---|---|---|---|---|---|---|---|---|---|
| | | 196 (INPUT) | 195 | 194 | 197-1 | 198-1 | D4 | D2 | D1 | D8 | C10 |
| 0.00 | | 0 | 0 | 0 | 0 | 0 | 0 | 0 | 0 | 0 | 0 |
| 0.10 | | 1 | 0 | 0 | 0 | 1 | 0 | 0 | 0 | 0 | 0 |
| 0.20 | | 0 | 0 | 0 | 0 | 0 | 1 | 0 | 0 | 0 | 0 |
| 0.30 | | 0 | 0 | 0 | 0 | 0 | 0 | 1 | 0 | 0 | 0 |
| 0.40 | | 0 | 0 | 0 | 0 | 0 | 0 | 0 | 1 | 0 | 0 |
| 0.50 | | 0 | 1 | 0 | 0 | 1 | 0 | 0 | 0 | 1 | 0 |
| 0.60 | | 0 | 0 | 0 | 0 | 0 | 1 | 0 | 0 | 0 | 0 |
| 0.70 | | 0 | 0 | 0 | 0 | 0 | 0 | 1 | 0 | 0 | 0 |
| 1.00 | READOUT 1 | 0 | 0 | 0 | 0 | 0 | 0 | 0 | 1 | 0 | 0 |
| 1.10 | | 1 | 1 | 0 | 1 | 0 | 0 | 0 | 0 | 1 | 0 |
| 1.20 | | 0 | 0 | 1 | 0 | 1 | 0 | 0 | 0 | 0 | 0 |
| 1.30 | | 0 | 0 | 0 | 0 | 0 | 1 | 0 | 0 | 0 | 0 |
| 1.40 | | 0 | 0 | 0 | 0 | 0 | 0 | 1 | 0 | 0 | 0 |
| 1.50 | | 0 | 0 | 0 | 0 | 0 | 0 | 0 | 1 | 0 | 0 |
| 1.60 | | 0 | 1 | 0 | 0 | 1 | 0 | 0 | 0 | 1 | 0 |
| 1.70 | | 0 | 0 | 0 | 0 | 0 | 1 | 0 | 0 | 0 | 0 |
| 2.00 | READOUT 2 | 0 | 0 | 0 | 0 | 0 | 0 | 1 | 0 | 0 | 0 |
| 2.10 | | 1 | 0 | 0 | 0 | 1 | 0 | 0 | 1 | 0 | 0 |
| 2.20 | | 0 | 1 | 0 | 0 | 1 | 1 | 0 | 0 | 1 | 0 |
| 2.30 | | 0 | 0 | 0 | 0 | 0 | 1 | 1 | 0 | 0 | 0 |
| 2.40 | | 0 | 0 | 0 | 0 | 0 | 0 | 1 | 1 | 0 | 0 |
| 2.50 | | 0 | 1 | 0 | 0 | 1 | 0 | 0 | 1 | 1 | 0 |
| 2.60 | | 0 | 1 | 0 | 0 | 1 | 1 | 0 | 0 | 1 | 0 |
| 2.70 | | 0 | 0 | 0 | 0 | 0 | 1 | 1 | 0 | 0 | 0 |
| 3.00 | READOUT 3 | 0 | 0 | 0 | 0 | 0 | 0 | 1 | 1 | 0 | 0 |
| 3.10 | | 1 | 1 | 0 | 1 | 0 | 0 | 0 | 1 | 1 | 0 |
| 3.20 | | 0 | 1 | 1 | 1 | 0 | 0 | 0 | 0 | 1 | 0 |
| 3.30 | | 0 | 0 | 1 | 0 | 1 | 0 | 0 | 0 | 0 | 0 |
| 3.40 | | 0 | 0 | 0 | 0 | 0 | 1 | 0 | 0 | 0 | 0 |
| 3.50 | | 0 | 0 | 0 | 0 | 0 | 0 | 1 | 0 | 0 | 0 |
| 3.60 | | 0 | 0 | 0 | 0 | 0 | 0 | 0 | 1 | 0 | 0 |
| 3.70 | | 0 | 1 | 0 | 0 | 1 | 0 | 0 | 0 | 1 | 0 |
| 4.00 | READOUT 4 | 0 | 0 | 0 | 0 | 0 | 1 | 0 | 0 | 0 | 0 |
| 4.10 | | 1 | 0 | 0 | 0 | 1 | 0 | 1 | 0 | 0 | 0 |
| 4.20 | | 0 | 0 | 0 | 0 | 0 | 1 | 0 | 1 | 0 | 0 |
| 4.30 | | 0 | 1 | 0 | 0 | 1 | 0 | 1 | 0 | 1 | 0 |
| 4.40 | | 0 | 0 | 0 | 0 | 0 | 1 | 0 | 1 | 0 | 0 |
| 4.50 | | 0 | 1 | 0 | 0 | 1 | 0 | 1 | 0 | 1 | 0 |
| 4.60 | | 0 | 0 | 0 | 0 | 0 | 1 | 0 | 1 | 0 | 0 |
| 4.70 | | 0 | 1 | 0 | 0 | 1 | 0 | 1 | 0 | 1 | 0 |

FIG. 5C

*INVENTORS*
WILLIAM J. DEERHAKE
BYRON L. HAVENS

BY Dwight D. Mooney
ATTORNEY

| TIME | OPERATION | 196 (INPUT) | 195 | 194 | 197-1 | 198-1 | D4 | D2 | D1 | D8 | C10 |
|---|---|---|---|---|---|---|---|---|---|---|---|
| 5.00 | READOUT 5 | 0 | 0 | 0 | 0 | 0 | 1 | 0 | 1 | 0 | 0 |
| 5.10 | | 1 | 1 | 0 | 1 | 0 | 0 | 1 | 0 | 1 | 0 |
| 5.20 | | 0 | 0 | 1 | 0 | 1 | 0 | 0 | 1 | 0 | 0 |
| 5.30 | | 0 | 1 | 0 | 0 | 1 | 1 | 0 | 0 | 1 | 0 |
| 5.40 | | 0 | 0 | 0 | 0 | 0 | 1 | 1 | 0 | 0 | 0 |
| 5.50 | | 0 | 0 | 0 | 0 | 0 | 0 | 1 | 1 | 0 | 0 |
| 5.60 | | 0 | 1 | 0 | 0 | 1 | 0 | 0 | 1 | 1 | 0 |
| 5.70 | | 0 | 1 | 0 | 0 | 1 | 1 | 0 | 0 | 1 | 0 |
| 6.00 | READOUT 6 | 0 | 0 | 0 | 0 | 0 | 1 | 1 | 0 | 0 | 0 |
| 6.10 | | 1 | 0 | 0 | 0 | 1 | 0 | 1 | 1 | 0 | 0 |
| 6.20 | | 0 | 1 | 0 | 0 | 1 | 1 | 0 | 1 | 1 | 0 |
| 6.30 | | 0 | 1 | 0 | 0 | 1 | 1 | 1 | 0 | 1 | 0 |
| 6.40 | | 0 | 0 | 0 | 0 | 0 | 1 | 1 | 1 | 0 | 0 |
| 6.50 | | 0 | 1 | 0 | 0 | 1 | 0 | 1 | 1 | 1 | 0 |
| 6.60 | | 0 | 1 | 0 | 0 | 1 | 1 | 0 | 1 | 1 | 0 |
| 6.70 | | 0 | 1 | 0 | 0 | 1 | 1 | 1 | 0 | 1 | 0 |
| 7.00 | READOUT 7 | 0 | 0 | 0 | 0 | 0 | 1 | 1 | 1 | 0 | 0 |
| 7.10 | | 1 | 1 | 0 | 1 | 0 | 0 | 1 | 1 | 1 | 0 |
| 7.20 | | 0 | 1 | 1 | 1 | 0 | 0 | 0 | 1 | 1 | 0 |
| 7.30 | | 0 | 1 | 1 | 1 | 0 | 0 | 0 | 0 | 1 | 0 |
| 7.40 | | 0 | 0 | 1 | 0 | 1 | 0 | 0 | 0 | 0 | 0 |
| 7.50 | | 0 | 0 | 0 | 0 | 0 | 1 | 0 | 0 | 0 | 0 |
| 7.60 | | 0 | 0 | 0 | 0 | 0 | 0 | 1 | 0 | 0 | 0 |
| 7.70 | | 0 | 0 | 0 | 0 | 0 | 0 | 0 | 1 | 0 | 0 |
| 8.00 | READOUT 8 | 0 | 1 | 0 | 0 | 1 | 0 | 0 | 0 | 1 | 0 |
| 8.10 | | 1 | 0 | 0 | 0 | 1 | 1 | 0 | 0 | 0 | 0 |
| 8.20 | | 0 | 0 | 0 | 0 | 0 | 1 | 1 | 0 | 0 | 0 |
| 8.30 | | 0 | 0 | 0 | 0 | 0 | 0 | 1 | 1 | 0 | 0 |
| 8.40 | | 0 | 1 | 0 | 0 | 1 | 0 | 0 | 1 | 1 | 0 |
| 8.50 | | 0 | 1 | 0 | 0 | 1 | 1 | 0 | 0 | 1 | 0 |
| 8.60 | | 0 | 0 | 0 | 0 | 0 | 1 | 1 | 0 | 0 | 0 |
| 8.70 | | 0 | 0 | 0 | 0 | 0 | 0 | 1 | 1 | 0 | 0 |
| 9.00 | READOUT 9 | 0 | 1 | 0 | 0 | 1 | 0 | 0 | 1 | 1 | 0 |
| 9.10 | | 1 | 1 | 0 | 1 | 0 | 1 | 0 | 0 | 1 | 0 |
| 9.20 | CARRY AND CLEAR | 0 | 0 | 1 | 0 | 1 | 0 | 1 | 0 | 0 | 1 |
| 9.30 | | 0 | 0 | 0 | 0 | 0 | 0 | 0 | 0 | 0 | 0 |
| 9.40 | | 0 | 0 | 0 | 0 | 0 | 0 | 0 | 0 | 0 | 0 |
| 9.50 | | 0 | 0 | 0 | 0 | 0 | 0 | 0 | 0 | 0 | 0 |
| 9.60 | | 0 | 0 | 0 | 0 | 0 | 0 | 0 | 0 | 0 | 0 |
| 9.70 | | 0 | 0 | 0 | 0 | 0 | 0 | 0 | 0 | 0 | 0 |
| 0.00 | | 0 | 0 | 0 | 0 | 0 | 0 | 0 | 0 | 0 | 0 |

FIG. 5D

FIG. 5E

| |
|---|
| FIG. 5C |
| FIG. 5D |

INVENTORS
WILLIAM J. DEERHAKE
BYRON L. HAVENS

BY Dwight D. Mooney
ATTORNEY

INVENTORS
WILLIAM J. DEERHAKE
BYRON L. HAVENS
BY Dwight D. Mooney
ATTORNEY

May 31, 1960 W. J. DEERHAKE ET AL 2,939,001

REGENERATIVE DATA STORAGE SYSTEM

Filed July 19, 1954 67 Sheets-Sheet 17

INVENTORS
WILLIAM J. DEERHAKE
BYRON L. HAVENS

BY Dwight D. Mooney
ATTORNEY

REGENERATIVE DATA STORAGE SYSTEM

INVENTORS
WILLIAM J. DEERHAKE
BYRON L. HAVENS

BY Dwight D. Mooney
ATTORNEY

INVENTORS
WILLIAM J. DEERHAKE
BYRON L. HAVENS

BY Dwight D. Mooney
ATTORNEY

REGENERATIVE DATA STORAGE SYSTEM

Filed July 19, 1954 67 Sheets-Sheet 20

| TIME | OPERATION | CIRCUIT POINTS (FIGS. 5A, 6A, 6B) TENS ORDER | | | | | | | | | |
|---|---|---|---|---|---|---|---|---|---|---|---|
| | | 196 (INPUT) | 195 | 194 | 197-10 | 198-10 | D20 | D10 | D80 | D40 | C 100 |
| 9.20 | | 1 | 0 | 0 | 0 | 1 | 0 | 0 | 0 | 0 | 0 |
| 9.30 | | 0 | 0 | 0 | 0 | 0 | 1 | 0 | 0 | 0 | 0 |
| 9.40 | | 0 | 0 | 0 | 0 | 0 | 0 | 1 | 0 | 0 | 0 |
| 9.50 | | 0 | 0 | 0 | 0 | 0 | 0 | 0 | 1 | 0 | 0 |
| 9.60 | | 0 | 1 | 0 | 0 | 1 | 0 | 0 | 0 | 1 0 | 0 |
| 9.70 | | 0 | 0 | 0 | 0 | 0 | 1 | 0 | 0 | 0 | 0 |
| 10.00 | READOUT 10 | 0 | 0 | 0 | 0 | 0 | 0 | 1 | 0 | 0 | 0 |
| 10.10 | | 0 | 0 | 0 | 0 | 0 | 0 | 0 | 1 | 0 | 0 |
| 10.20 | | 0 | 1 | 0 | 0 | 1 | 0 | 0 | 0 | 1 | 0 |
| 10.30 | | 0 | 0 | 0 | 0 | 0 | 1 0 | 0 | 0 | 0 | 0 |
| 10.40 | | 0 | 0 | 0 | 0 | 0 | 0 | 1 | 0 | 0 | 0 |
| 10.50 | | 0 | 0 | 0 | 0 | 0 | 0 | 0 | 1 | 0 | 0 |
| 10.60 | | 0 | 1 | 0 | 0 | 1 | 0 | 0 | 0 | 1 | 0 |
| 10.70 | | 0 | 0 | 0 | 0 | 0 | 1 | 0 | 0 | 0 | 0 |
| 11.00 | READOUT 11 (10 IN TENS, 1 IN UNITS) | 0 | 0 | 0 | 0 | 0 | 0 | 1 | 0 | 0 | 0 |
| 98.00 | READOUT 98 | 0 | 0 | 0 | 0 | 0 | 0 | 1 | 1 | 0 | 0 |
| 98.10 | (90 IN TENS 8 IN UNITS) | 0 | 1 | 0 | 0 | 1 | 0 | 0 | 1 | 1 | 0 |
| 98.20 | | 0 | 1 | 0 | 0 | 1 | 1 | 0 | 0 | 1 | 0 |
| 98.30 | | 0 | 0 | 0 | 0 | 0 | 1 | 1 | 0 | 0 | 0 |
| 98.40 | | 0 | 0 | 0 | 0 | 0 | 0 | 1 | 1 | 0 | 0 |
| 98.50 | | 0 | 1 | 0 | 0 | 1 | 0 | 0 | 1 | 1 | 0 |
| 98.60 | | 0 | 1 | 0 | 0 | 1 | 1 | 0 | 0 | 1 | 0 |
| 98.70 | | 0 | 0 | 0 | 0 | 0 | 1 | 1 | 0 | 0 | 0 |
| 99.00 | READOUT 99 | 0 | 0 | 0 | 0 | 0 | 0 | 1 | 1 | 0 | 0 |
| 99.10 | (90 IN TENS 9 IN UNITS) | 0 | 1 | 0 | 0 | 1 | 0 | 0 | 1 | 1 | 0 |
| 99.20 | | 1 | 1 | 0 | 1 | 0 | 1 | 0 | 0 | 1 | 0 |
| 99.30 | CARRY AND CLEAR | 0 | 0 | 1 | 0 | 1 | 0 | 1 | 0 | 0 | 1 |

FIG. 7A

INVENTORS
WILLIAM J. DEERHAKE
BYRON L. HAVENS

BY Dwight D. Mooney
ATTORNEY

| TIME | OPERATION | CIRCUIT POINTS (FIGS. 6C, 6D) HUNDREDS ORDER | | | | | | | | | |
|---|---|---|---|---|---|---|---|---|---|---|---|
| | | 196 (INPUT) | 195 | 194 | 197-100 | 198-100 | D100 | D800 | D400 | D200 | C1000 |
| 99.30 | | 1 | 0 | 0 | 0 | 1 | 0 | 0 | 0 | 0 | 0 |
| 99.40 | | 0 | 0 | 0 | 0 | 0 | 1 | 0 | 0 | 0 | 0 |
| 99.50 | | 0 | 0 | 0 | 0 | 0 | 0 | 1 | 0 | 0 | 0 |
| 99.60 | | 0 | 0 | 0 | 0 | 0 | 0 | 0 | 1 | 0 | 0 |
| 99.70 | | 0 | 1 | 0 | 0 | 1 | 0 | 0 | 0 | 1 | 0 |
| 100.00 | READOUT 100 (100 IN HUNDREDS ORDER) | 0 | 0 | 0 | 0 | 0 | 1 | 0 | 0 | 0 | 0 |
| 998.00 | READOUT 998 | 0 | 0 | 0 | 0 | 0 | 1 | 1 | 0 | 0 | 0 |
| 998.10 | (900 IN HUNDREDS | 0 | 0 | 0 | 0 | 0 | 0 | 1 | 1 | 0 | 0 |
| 998.20 | 90 IN TENS 8 IN UNITS) | 0 | 1 | 0 | 0 | 1 | 0 | 0 | 1 | 1 | 0 |
| 998.30 | | 0 | 1 | 0 | 0 | 1 | 1 | 0 | 0 | 1 | 0 |
| 998.40 | | 0 | 0 | 0 | 0 | 0 | 1 | 1 | 0 | 0 | 0 |
| 998.50 | | 0 | 0 | 0 | 0 | 0 | 0 | 1 | 1 | 0 | 0 |
| 998.60 | | 0 | 1 | 0 | 0 | 1 | 0 | 0 | 1 | 1 | 0 |
| 998.70 | | 0 | 1 | 0 | 0 | 1 | 1 | 0 | 0 | 1 | 0 |
| 999.00 | READOUT 999 | 0 | 0 | 0 | 0 | 0 | 1 | 1 | 0 | 0 | 0 |
| 999.10 | (900 IN HUNDREDS | 0 | 0 | 0 | 0 | 0 | 0 | 1 | 1 | 0 | 0 |
| 999.20 | 90 IN TENS 9 IN UNITS) | 0 | 1 | 0 | 0 | 1 | 0 | 0 | 1 | 1 | 0 |
| 999.30 | | 1 | 1 | 0 | 1 | 0 | 1 | 0 | 0 | 1 | 0 |
| 999.40 | CARRY AND CLEAR | 0 | 0 | 1 | 0 | 1 | 0 | 1 | 0 | 0 | 1 |

INVENTORS
WILLIAM J. DEERHAKE
BYRON L. HAVENS

BY Dwight D. Mooney
ATTORNEY

| TIME | OPERATION | CIRCUIT POINTS (FIGS. 6C, 6D) THOUSANDS ORDER | | | | | | | | | |
|---|---|---|---|---|---|---|---|---|---|---|---|
| | | 196 | 195 | 194 | 197-1000 | 198-1000 | D 8000 | D 4000 | D 2000 | D 1000 | C 2000 |
| 999.40 | | 1 | 0 | 0 | 0 | 1 | 0 | 0 | 0 | 0 | 0 |
| 999.50 | | 0 | 0 | 0 | 0 | 0 | 1 | 0 | 0 | 0 | 0 |
| 999.60 | | 0 | 0 | 0 | 0 | 0 | 0 | 1 | 0 | 0 | 0 |
| 999.70 | | 0 | 0 | 0 | 0 | 0 | 0 | 0 | 1 | 0 | 0 |
| 1000.00 | READOUT 1000 | 0 | 1 | 0 | 0 | 1 | 0 | 0 | 0 | 1 | 0 |
| | | | | | | | | | | | |
| 1998.00 | READOUT 1998 | 0 | 1 | 0 | 0 | 1 | 0 | 0 | 0 | 1 | 0 |
| 1998.10 | | 0 | 0 | 0 | 0 | 0 | 1 | 0 | 0 | 0 | 0 |
| 1998.20 | | 0 | 0 | 0 | 0 | 0 | 0 | 1 | 0 | 0 | 0 |
| 1998.30 | | 0 | 0 | 0 | 0 | 0 | 0 | 0 | 1 | 0 | 0 |
| 1998.40 | | 0 | 1 | 0 | 0 | 1 | 0 | 0 | 0 | 1 | 0 |
| 1998.50 | | 0 | 0 | 0 | 0 | 0 | 1 | 0 | 0 | 0 | 0 |
| 1998.60 | | 0 | 0 | 0 | 0 | 0 | 0 | 1 | 0 | 0 | 0 |
| 1998.70 | | 0 | 0 | 0 | 0 | 0 | 0 | 0 | 1 | 0 | 0 |
| 1999.00 | READOUT 1999 | 0 | 1 | 0 | 0 | 1 | 0 | 0 | 0 | 1 | 0 |
| 1999.10 | | 0 | 0 | 0 | 0 | 0 | 1 | 0 | 0 | 0 | 0 |
| 1999.20 | | 0 | 0 | 0 | 0 | 0 | 0 | 1 | 0 | 0 | 0 |
| 1999.30 | | 0 | 0 | 0 | 0 | 0 | 0 | 0 | 1 | 0 | 0 |
| 1999.40 | | 1 | 1 | 0 | 1 | 0 | 0 | 0 | 0 | 1 | 0 |
| 1999.50 | CARRY AND CLEAR | 0 | 0 | 1 | 0 | 1 | 0 | 0 | 0 | 0 | 1 |
| 1999.60 | | 0 | 0 | 0 | 0 | 0 | 0 | 0 | 0 | 0 | 0 |
| 1999.70 | | 0 | 0 | 0 | 0 | 0 | 0 | 0 | 0 | 0 | 0 |
| 0000.00 | READOUT 0000 | 0 | 0 | 0 | 0 | 0 | 0 | 0 | 0 | 0 | 0 |

INVENTORS
WILLIAM J. DEERHAKE
BYRON L. HAVENS

BY Dwight D. Mooney
ATTORNEY

INVENTORS
WILLIAM J. DEERHAKE
BYRON L. HAVENS
BY Dwight D. Mooney
ATTORNEY

INVENTORS
WILLIAM J. DEERHAKE
BYRON L. HAVENS

BY Dwight D. Mooney
ATTORNEY

INVENTORS
WILLIAM J. DEERHAKE
BYRON L. HAVENS
BY Dwight D. Mooney
ATTORNEY

INVENTORS
WILLIAM J. DEERHAKE
BYRON L. HAVENS
BY Dwight D. Mooney
ATTORNEY

CRT B

INVENTORS
WILLIAM J. DEERHAKE
BYRON L. HAVENS

BY Dwight D. Mooney
ATTORNEY

INVENTORS
WILLIAM J. DEERHAKE
BYRON L. HAVENS
BY Dwight D. Mooney
ATTORNEY

CRT D

INVENTORS
WILLIAM J. DEERHAKE
BYRON L. HAVENS
BY Dwight D. Mooney
ATTORNEY

| BINARY-DECIMAL ADDRESSES FOR HORIZONTAL & VERTICAL DEFLECTION CIRCUITS | | | | DECIMAL NO. CORRESPONDING TO ADDRESSES |
|---|---|---|---|---|
| THOUSAND'S ORDER | HUNDRED'S ORDER | TEN'S ORDER | UNIT'S ORDER | |
| 0000 | 0000 | 0000 | 0000 | 0 |
| | | | 0001 | 1 |
| | | | 0010 | 2 |
| | | TEN'S ORDER | 0011 | 3 |
| | | INACTIVE | 0100 | 4 |
| | | | 0101 | 5 |
| | | | 0110 | 6 |
| | | | 0111 | 7 |
| | | | 1000 | 8 |
| | | 0000 | 1001 | 9 |
| | | 0001 | | 10 |
| | | | INITIAL CYCLE | 11 |
| | | | | 12 |
| | HUNDRED'S ORDER | 0001 REMAINS | OF UNITS ORDER | 13 |
| | IS INACTIVE | FOR EACH NEW | | 14 |
| | | ADDRESS | REPEATED | 15 |
| | | | | 16 |
| | | | | 17 |
| THOUSAND'S ORDER | | 0001 | | 18 |
| IS INACTIVE | | 0001 | | 19 |
| | | 0010 | 0000 | 20 |
| | | 0011 | | 30 |
| | | 0100 | | 40 |
| | | 0101 | INITIAL CYCLE OF | 50 |
| | | 0110 | UNIT'S ORDER RE- | 60 |
| | | 0111 | PEATED EACH TIME | 70 |
| | | 1000 | TEN'S ORDER ADVANCES | 80 |
| | 0000 | 1001 | | 90 |
| | 0001 | 0000 | 0000 | 100 |
| | 0010 | | | 200 |
| | 0011 | INITIAL CYCLE OF | | 300 |
| | 0100 | TEN'S ORDER RE- | INITIAL CYCLE OF | 400 |
| | 0101 | PEATED EACH | UNIT'S ORDER RE- | 500 |
| | 0110 | TIME HUNDRED'S | PEATED EACH TIME | 600 |
| | 0111 | ORDER ADVANCES | TEN'S ORDER ADVANCES | 700 |
| | 1000 | | | 800 |
| 0000 | 1001 | | | 900 |
| 0001 | 0000 | 0000 | 0000 | 1000 |
| | 0001 | | | 1100 |
| | 0010 | | | 1200 |
| | 0011 | | | 1300 |
| 0001 REMAINS | 0100 | SAME | | 1400 |
| FOR EACH NEW | 0101 | | SAME | 1500 |
| ADDRESS | 0110 | | | 1600 |
| | 0111 | | | 1700 |
| | 1000 | | | 1800 |
| | 1001 | 0000 | | 1900 |
| 0001 | 1001 | 1001 | | 1999 |
| 0010 | 0000 | 0000 | 0000 | 2000 (0) |

FIG. 13

INVENTORS
WILLIAM J. DEERHAKE
BYRON L. HAVENS
BY Dwight D. Mooney
ATTORNEY

INVENTORS
WILLIAM J. DEERHAKE
BYRON L. HAVENS

BY Dwight D. Mooney
ATTORNEY

INVENTORS
WILLIAM J. DEERHAKE
BYRON L. HAVENS
BY Dwight D. Mooney
ATTORNEY

INVENTORS
WILLIAM J. DEERHAKE
BYRON L. HAVENS
BY Dwight D. Mooney
ATTORNEY

INVENTORS
WILLIAM J. DEERHAKE
BYRON L. HAVENS
BY Dwight D. Mooney
ATTORNEY

May 31, 1960 W. J. DEERHAKE ET AL 2,939,001
REGENERATIVE DATA STORAGE SYSTEM
Filed July 19, 1954 67 Sheets-Sheet 35

INVENTORS
WILLIAM J. DEERHAKE
BYRON L. HAVENS
BY Dwight D. Mooney
ATTORNEY

INVENTORS
WILLIAM J. DEERHAKE
BYRON L. HAVENS
BY Dwight D. Mooney
ATTORNEY

*INVENTORS*
WILLIAM J. DEERHAKE
BYRON L. HAVENS
BY Dwight D. Mooney
*ATTORNEY*

INVENTORS
WILLIAM J. DEERHAKE
BYRON L. HAVENS
BY Dwight D. Mooney
ATTORNEY

REGENERATIVE DATA STORAGE SYSTEM

Filed July 19, 1954

INVENTORS
WILLIAM J. DEERHAKE
BYRON L. HAVENS

BY Dwight D. Mooney
ATTORNEY

REGENERATIVE DATA STORAGE SYSTEM

Filed July 19, 1954 67 Sheets-Sheet 40

INVENTORS
WILLIAM J. DEERHAKE
BYRON L. HAVENS
BY Dwight D. Mooney
ATTORNEY

INVENTORS
WILLIAM J. DEERHAKE
BYRON L. HAVENS

BY Dwight D. Mooney
ATTORNEY

REGENERATIVE DATA STORAGE SYSTEM

Filed July 19, 1954

INVENTORS
WILLIAM J. DEERHAKE
BYRON L. HAVENS
BY Dwight D. Mooney
ATTORNEY

May 31, 1960 W. J. DEERHAKE ET AL 2,939,001

REGENERATIVE DATA STORAGE SYSTEM

Filed July 19, 1954 67 Sheets-Sheet 43

INVENTORS
WILLIAM J. DEERHAKE
BYRON L. HAVENS
BY Dwight D. Mooney
ATTORNEY

INVENTORS
WILLIAM J. DEERHAKE
BYRON L. HAVENS
BY Dwight D. Mooney
ATTORNEY

REGENERATIVE DATA STORAGE SYSTEM

INVENTORS
WILLIAM J. DEERHAKE
BYRON L. HAVENS
BY Dwight D. Mooney
ATTORNEY

REGENERATIVE DATA STORAGE SYSTEM

Filed July 19, 1954 67 Sheets-Sheet 46

INVENTORS
WILLIAM J. DEERHAKE
BYRON L. HAVENS
BY Dwight D. Mooney
ATTORNEY

INVENTORS
WILLIAM J. DEERHAKE
BYRON L. HAVENS
BY Dwight D. Mooney
ATTORNEY

INVENTORS
WILLIAM J. DEERHAKE
BYRON L. HAVENS
BY Dwight D. Mooney
ATTORNEY

REGENERATIVE DATA STORAGE SYSTEM

INVENTORS
WILLIAM J. DEERHAKE
BYRON L. HAVENS
BY Dwight D. Mooney
ATTORNEY

INVENTORS
WILLIAM J. DEERHAKE
BYRON L. HAVENS
BY Dwight D. Mooney
ATTORNEY

REGENERATIVE DATA STORAGE SYSTEM

INVENTORS
WILLIAM J. DEERHAKE
BYRON L. HAVENS
BY Dwight D. Mooney
ATTORNEY

INVENTORS
WILLIAM J. DEERHAKE
BYRON L. HAVENS
BY Dwight D. Mooney
ATTORNEY

INVENTORS
WILLIAM J. DEERHAKE
BYRON L. HAVENS

BY Dwight D. Mooney
ATTORNEY

May 31, 1960 W. J. DEERHAKE ET AL 2,939,001

REGENERATIVE DATA STORAGE SYSTEM

Filed July 19, 1954 67 Sheets-Sheet 54

INVENTORS
WILLIAM J. DEERHAKE
BYRON L. HAVENS

BY Dwight D. Mooney
ATTORNEY

INVENTORS
WILLIAM J. DEERHAKE
BYRON L. HAVENS
BY Dwight D. Mooney
ATTORNEY

REGENERATIVE DATA STORAGE SYSTEM

Filed July 19, 1954 67 Sheets-Sheet 56

INVENTORS
WILLIAM J. DEERHAKE
BYRON L. HAVENS
BY Dwight D. Mooney
ATTORNEY

REGENERATIVE DATA STORAGE SYSTEM

Filed July 19, 1954 67 Sheets-Sheet 57

INVENTORS
WILLIAM J. DEERHAKE
BYRON L. HAVENS

BY Dwight D. Mooney
ATTORNEY

INVENTORS
WILLIAM J. DEERHAKE
BYRON L. HAVENS
BY Dwight D. Mooney
ATTORNEY

INVENTORS
WILLIAM J. DEERHAKE
BYRON L. HAVENS

BY Dwight D. Mooney
ATTORNEY

INVENTORS
WILLIAM J. DEERHAKE
BYRON L. HAVENS

BY Dwight D. Mooney
ATTORNEY

INVENTORS
WILLIAM J. DEERHAKE
BYRON L. HAVENS

BY Dwight D. Mooney
ATTORNEY

REGENERATIVE DATA STORAGE SYSTEM

INVENTORS
WILLIAM J. DEERHAKE
BYRON L. HAVENS

BY Dwight D. Mooney
ATTORNEY

INVENTORS
WILLIAM J. DEERHAKE
BYRON L. HAVENS

BY Dwight D. Mooney
ATTORNEY

INVENTORS
WILLIAM J. DEERHAKE
BYRON L. HAVENS
BY Dwight D. Mooney
ATTORNEY

INVENTORS
WILLIAM J. DEERHAKE
BYRON L. HAVENS

BY Dwight D. Mooney
ATTORNEY

REGENERATIVE DATA STORAGE SYSTEM

Filed July 19, 1954

67 Sheets-Sheet 66

INVENTORS
WILLIAM J. DEERHAKE
BYRON L. HAVENS

BY Dwight D. Mooney
ATTORNEY

May 31, 1960 W. J. DEERHAKE ET AL 2,939,001

REGENERATIVE DATA STORAGE SYSTEM

Filed July 19, 1954 67 Sheets-Sheet 67

INVENTORS
WILLIAM J. DEERHAKE
BYRON L. HAVENS

BY Dwight D. Mooney
ATTORNEY

United States Patent Office 2,939,001

Patented May 31, 1960

2,939,001

REGENERATIVE DATA STORAGE SYSTEM

William J. Deerhake, Dumont, and Byron L. Havens, Closter, N.J., assignors to International Business Machines Corporation, New York, N.Y., a corporation of New York Filed July 19, 1954, Ser. No. 444,253

28 Claims. (Cl. 250—27)

Figures 1A, 1B, 1C, 1D:
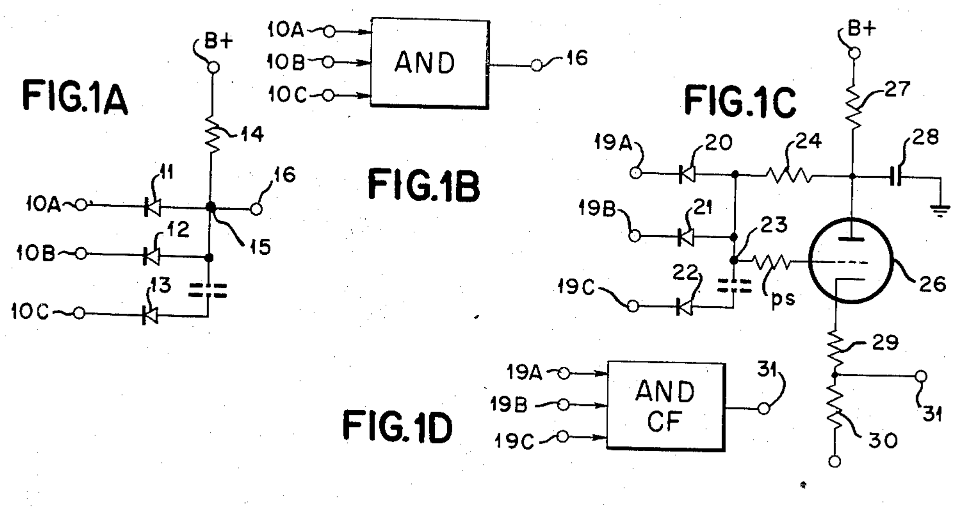

This invention relates to electrostatic storage systems and more particularly to a novel electrostatic storage system of the binary-decimal type and of the binary type.

In the binary-decimal type system disclosed, information applied thereto, handled therein, and read out therefrom, is represented in the binary-decimal system. In the binary type system disclosed such information is represented in the pure binary code.

In the binary notation only two digits are employed i.e., 0 and 1. The decimal digit 0 is represented by binary digit 0 and the decimal digit 1 is represented by binary digit 1. These binary digits are referred to as bits. The digital positions or orders in a binary number, reading from right to left, correspond in value to $2^0$, $2^1$, $2^2$, $2^3$, $2^4$, etc. or decimal digits 1, 2, 4, 8, 16 etc. respectively. For example, binary number 1001 represents decimal digit 9 which is detemined by the addition of decimal digits 1 and 8 indicated by a binary 1 in the extreme right and the left binary positions respectively. Hence, by using binary bits or pulses in groups of four wherein a pulse represents a binary 1 and the absence of a pulse represents a binary 0, any decimal digit from 0–9 inclusive may be written in the pure binary-notation.

The system of representing decimal numbers, digit for digit, in the pure binary notation is referred to herein as the binary-decimal system. The four consecutive binary orders, reading from right to left, represent the decimal digits 1, 2, 4, and 8 for the units decimal order or position and are accordingly referred to as the 1 bit, 2 bit, 4 bit, and 8 bit respectively. It follows that the four binary orders of the tens decimal order or position represent the decimal numbers 10, 20, 40, and 80, respectively. Likewise, in subsequent decimal orders, for example, the four respective binary orders of the hundreds decimal order or position represent the decimal numbers 100, 200, 400, and 800, respectively.

As an example, 459 will be represented in the binary-decimal system by 010001011001. The four binary bits at the right represent the decimal digit 9 of the units order, the next four bits to the left represent the decimal digit 5 of the tens order, and the remaining four bits represent the decimal digit 4 of the hundreds order.

Any decimal number from 0–15 inclusive can be represented by a group of four binary bits. If the decimal number is 16, then a binary carry occurs to the next group of binary bits to be added or to the next decimal order. However, in the binary-decimal system, only the decimal digits (0–9 inclusive) are represented by each group of four binary bits.

Various circuits used herein or particular points within the circuits are frequently referred to as Up or Down. Up means that the voltage present at the particular point or at the output of the circuit designated is positive with respect to ground or higher than that provided when the circuit is Down. Down means that the voltage present at the particular point or at the output of the circuit designated is negative with respect to ground or below that provided when the circuit is Up. If the control grid of a vacuum tube is referred to as Down, it means that the voltage at that control grid is below the cutoff value for the vacuum tube.

Information is stored on the target or face of a cathode ray tube by creating an electric charge gradient at a selected spot or address thereon, each address being assigned or designated by a decimal number. Binary information is stored by writing a dot or a first charge gradient to represent a binary 0 and a dash or a second charge gradient to represent a binary 1. A dot is written by rendering the cathode ray tube conductive while the electron beam is stationary. A dash is written at a designated address by first writing a dot followed by a slight deflection of the beam while the cathode ray tube is conductive.

In order to read or write information at a particular address, say address 1, for example, the beam of the cathode ray tube is first positioned to the spot location corresponding thereto.

Information stored on a cathode ray tube must be systematically refreshed so as to prevent loss thereof due to time decay. The time during which the refreshing of a single address is effected is referred to herein as a regeneration cycle. During a regeneration cycle the information stored at a selected address is sampled, amplified and caused to be restored at the address from which it was obtained.

Information is also read in or read out of a cathode ray tube during a preselected operational cycle. This cycle is referred to herein as an action cycle. An action cycle may be either of two types; i.e., an action read cycle or an action write cycle. The operations performed during an action read cycle are similar to those effected during a regeneration cycle. An action write cycle is performed when new information is written at a selected address.

Each regeneration cycle and each action cycle have a duration of eight microseconds or eight time intervals.

A word is represented by seventeen decimal digits to be stored. The term CRT unit refers to four cathode ray tubes operated in parallel (as if one large tube) to accommodate the storage of a single binary bit of each of the words to be stored.

The system of time designation used herein comprises a combination of octal and decimal representations. For example, in time designation 1.15 the 1 to the left of the decimal point represents the number of the cycles already performed, the 1 to the right of the decimal point represents the particular microsecond interval of the cycle, and the second digit 5 to the right of the decimal point indicates that the time referred to is 5/10 of a microsecond in addition to the one microsecond represented by the 1 to the right of the decimal point. Hence, the time indicated is 1 and 5/10 microseconds after the beginning of the second cycle.

As a further example, the time designation 4.30 represents the beginning of the fourth microsecond interval of the fifth cycle, four eight microsecond cycles having already elapsed.

As a still further example a pulse may be said to be present from N.10 to N.20 or from N.10–N.20. This means that a pulse having a duration of one microsecond occurs during the second microsecond interval of each cycle.

Frequently, description of the circuit operation herein is undertaken in connection with specific voltages or electrical component values. Such is done by way of example and merely to simplify that description and assist in an understanding of that operation and in no way constitutes or implies a restriction of the utility of the circuits or a necessity of such values.

A principal object of the invention is to provide novel circuitry for effecting electrostatic storage in the binary-decimal system.

Another object is to provide novel circuitry for effecting electrostatic storage in the binary system.

Another object is to provide a novel electrostatic storage system of the binary type wherein regeneration and action cycles are performed alternately and an action cycle may be blank.

A further object is to provide a novel electrostatic storage system of the binary type wherein regeneration cycles are normally performed for re-storing or refreshing information previously stored and action cycles are selectively performed for effecting read in and read out of information.

A further object is to provide novel circuitry for reading stored information from a particular address on a cathode ray tube, making the information available for external use, and re-storing the information at the same address on the cathode ray tube.

Another object is to provide novel circuitry for reading the information stored at a particular address on a cathode ray tube and effecting storage of new information at the same address.

Another object is to provide deflection circuit means wherein a constant voltage line corresponds to each cathode ray tube deflection plate, voltage stabilizing means are connected between each deflection plate and the constant voltage line so that a voltage change is provided at the deflection plate in accordance with a current change at the constant voltage line.

Another object is to provide deflection circuit means wherein a constant current flows in constant voltage lines corresponding to the cathode ray tube deflection plates of each pair and means are provided to selectively effect complementary change in the amount of current flow in the constant voltage lines corresponding to the plates of each pair to effect a preselected positioning of the electron beam of the cathode ray tube.

Still another object is to provide a deflection circuit for providing current of constant value and having a plurality of dual position switches connected to supply current flow to either of two lines, said switches being operable in response to a predetermined pattern of selective voltage changes to initiate a predetermined sequential current transfer between said lines.

Still another object is to provide novel circuit means for receiving a pulse input and providing an output extending throughout a predetermined longer period.

A further object is to provide a novel pulse stretcher comprising, pull up and pull down diodes, and a storage capacitor wherein input pulses control the charging and discharging of the capacitor to provide an output pulse of predetermined duration in response to receipt of a single input pulse.

A further object is to provide a novel tube selector for rendering a predetermined one of a plurality of cathode ray tubes responsive in accordance with a predetermined address pattern.

A still further object is to provide novel selecting circuits to energize a single cathode ray tube in response to selective voltage values determined by the values of the voltages used to correspond to the cathode ray tube address and the choice of address positions to permit storage at the addresses of each tube, one at a time.

Other objects of the invention will be pointed out in the following description and claims and illustrated in the accompanying drawings, which disclose, by way of examples, the principle of the invention and the best mode, which has been contemplated, of applying that principle.

Figures 1E, 1F:
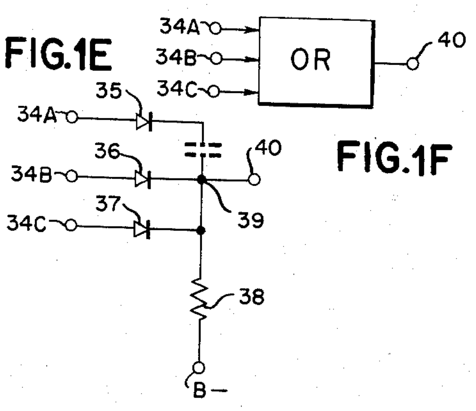
Figures 1G, 1H:
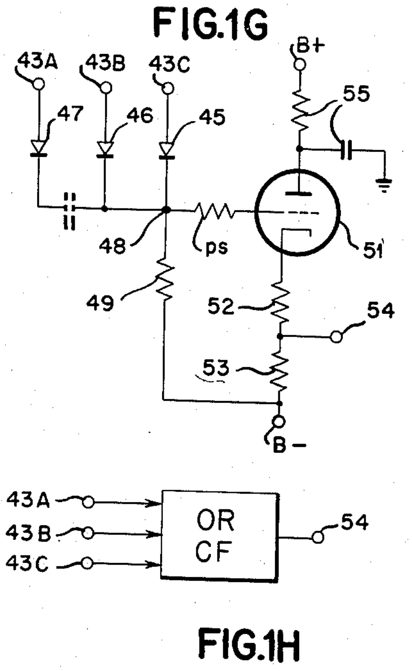
Figures 1I, 1J:
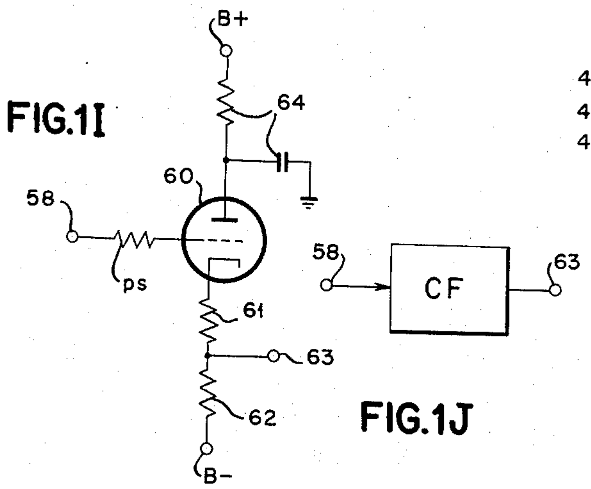
Figure 1K:
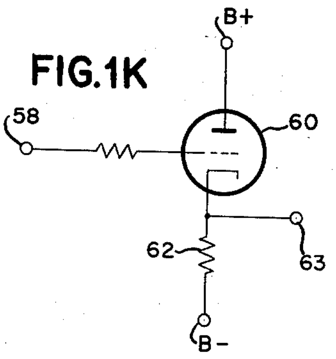
Figure 1L:
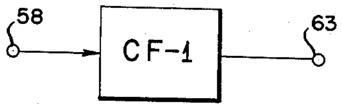
Figure 1M:
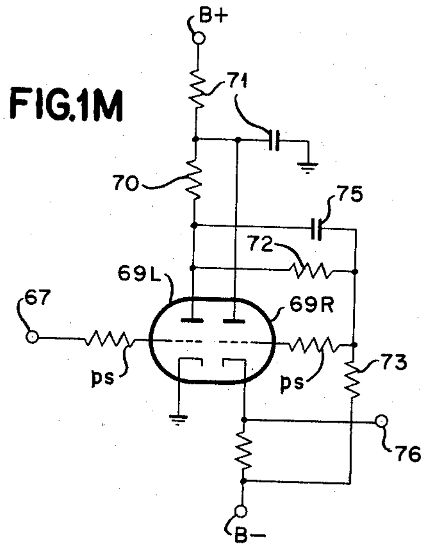
Figure 1P:
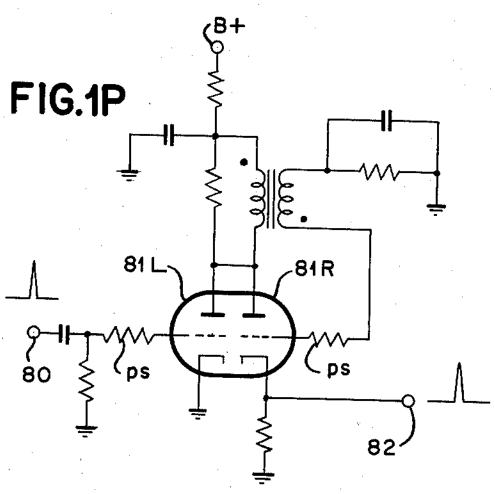
Figure 1N:
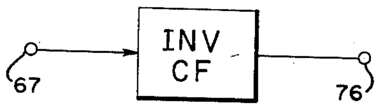
Figure 1Q:
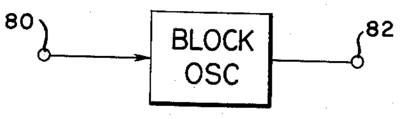
Figures 1R, 1S, 1T:
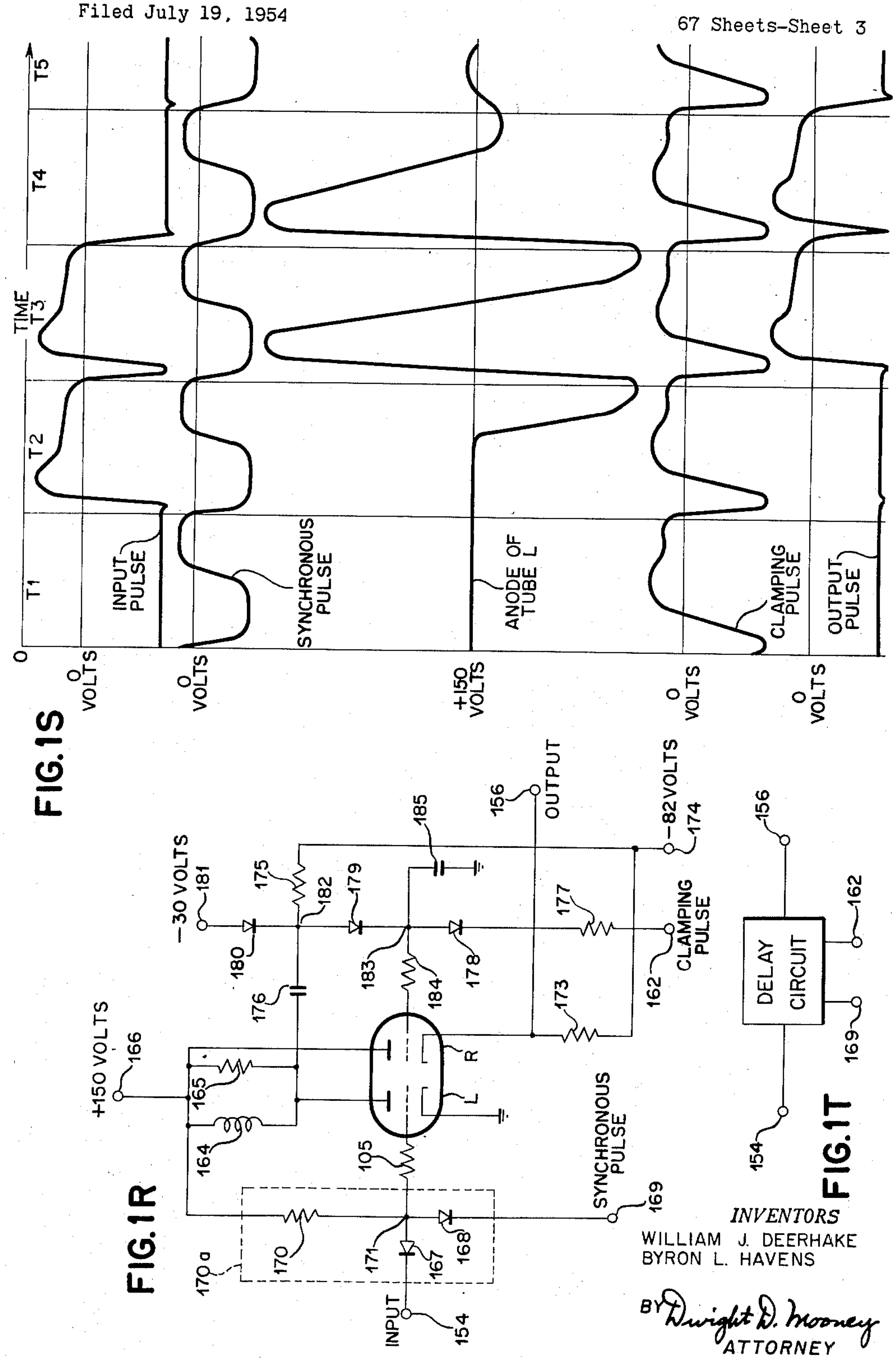
Figures 2A, 2F:
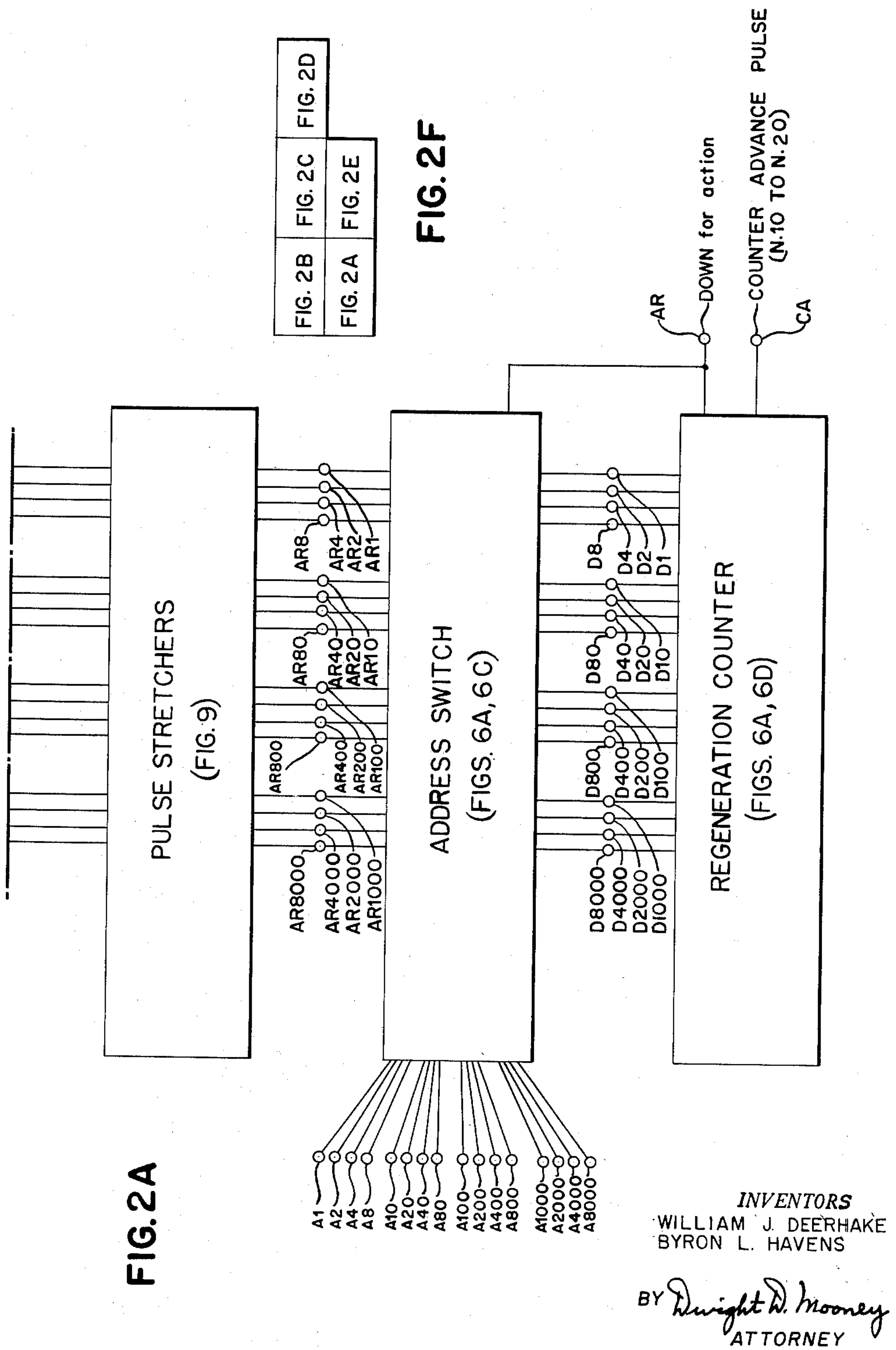
Figure 2B:
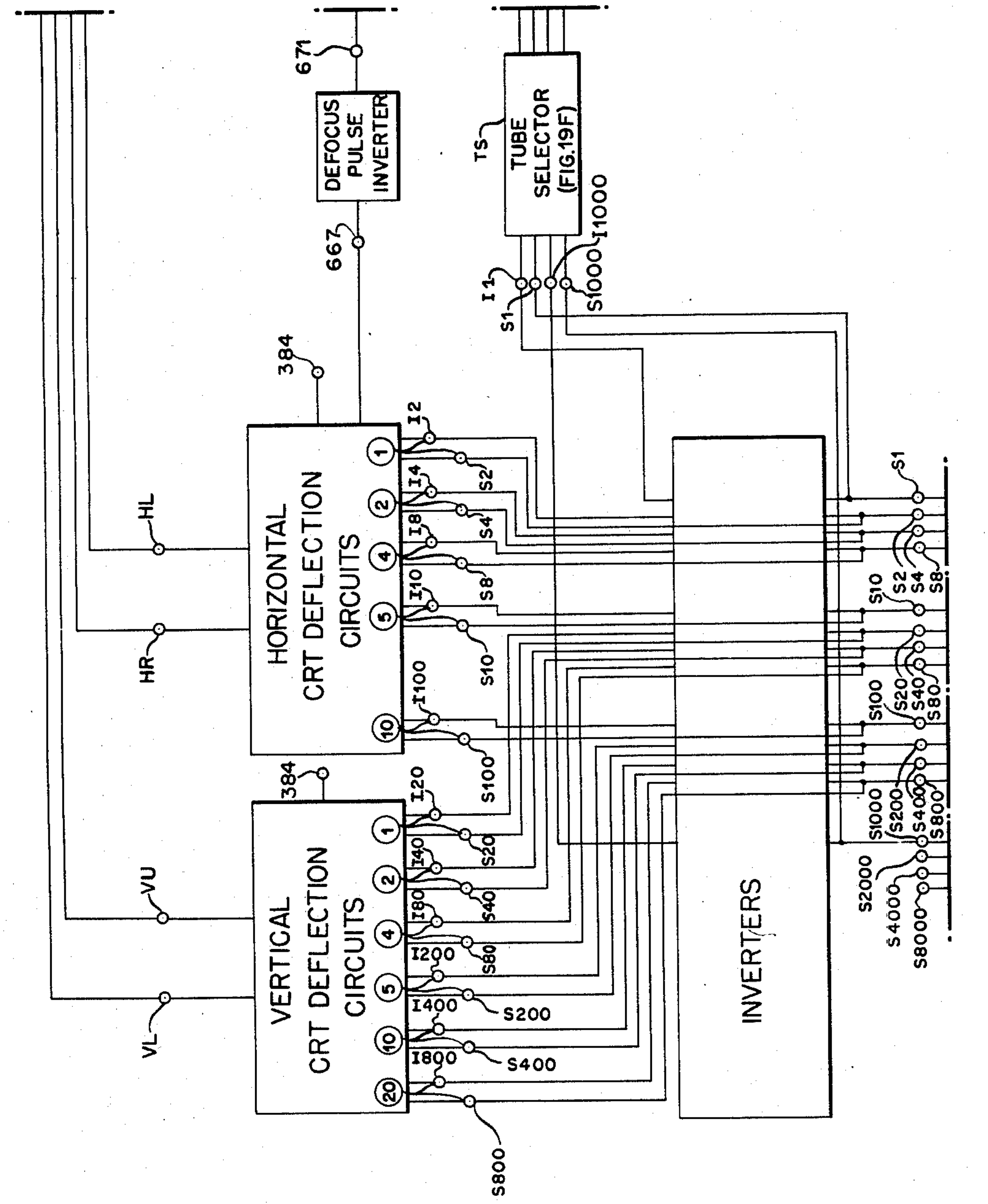
Figure 2C:
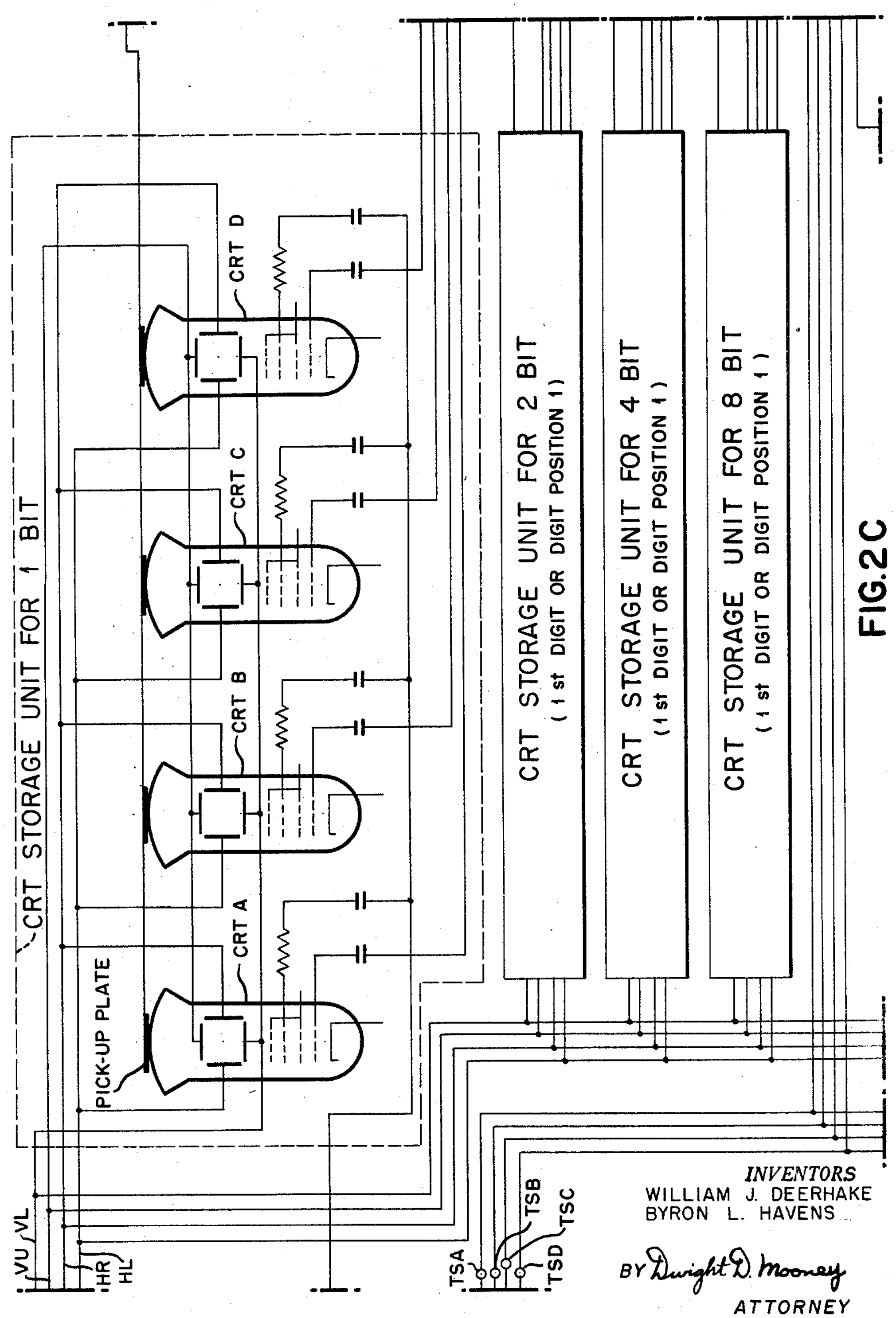
Figure 2D:
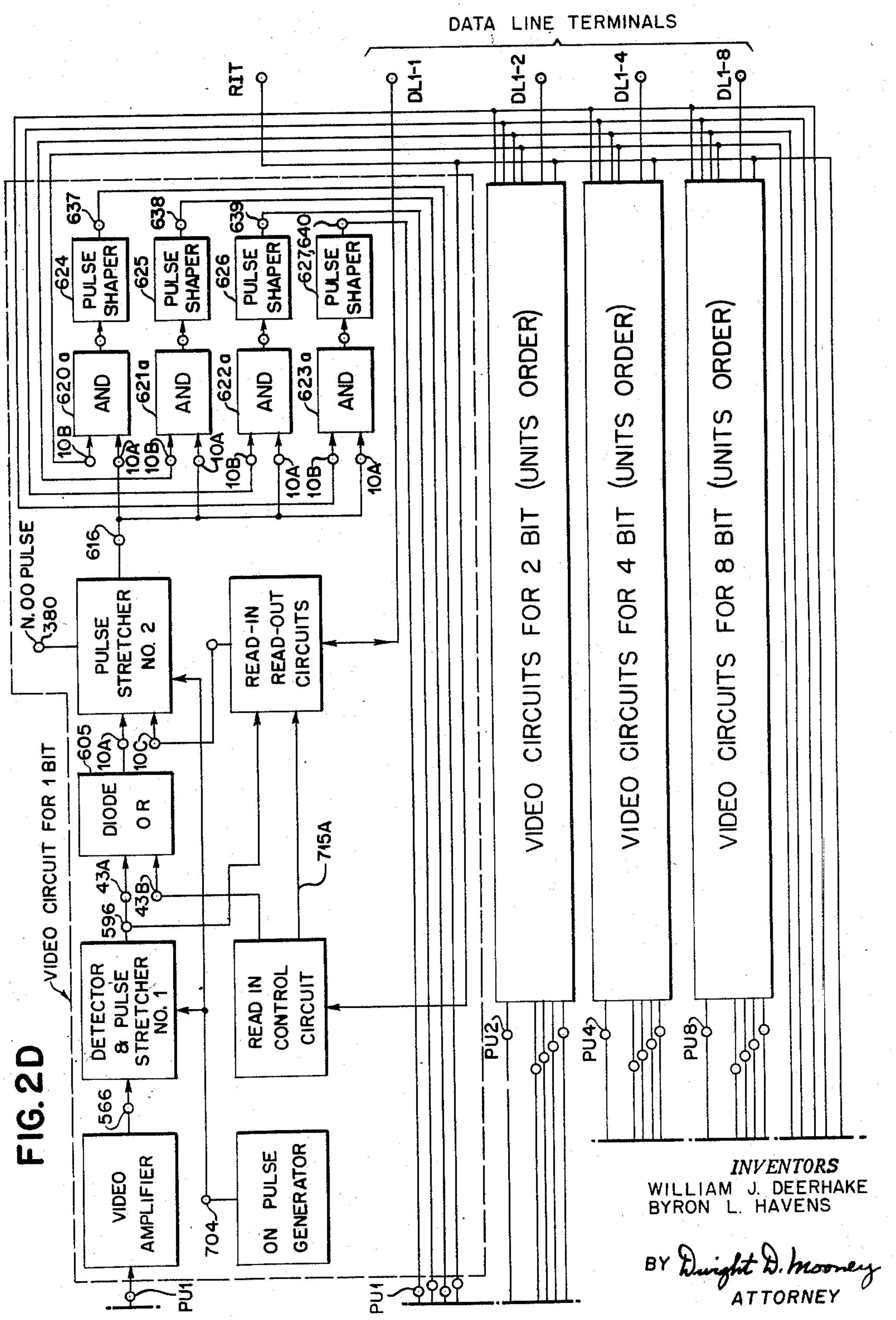
Figure 2E:
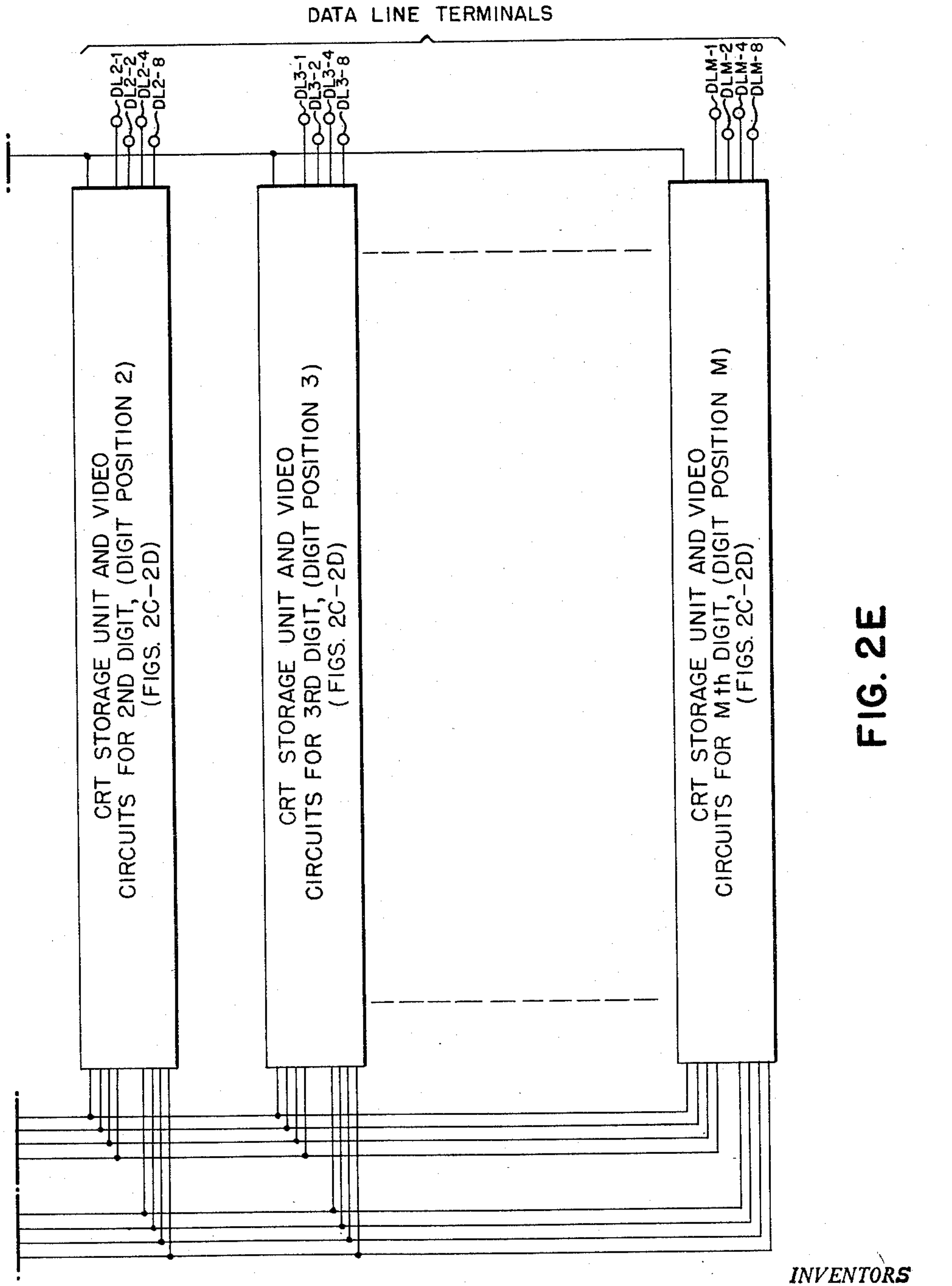
Figure 3:
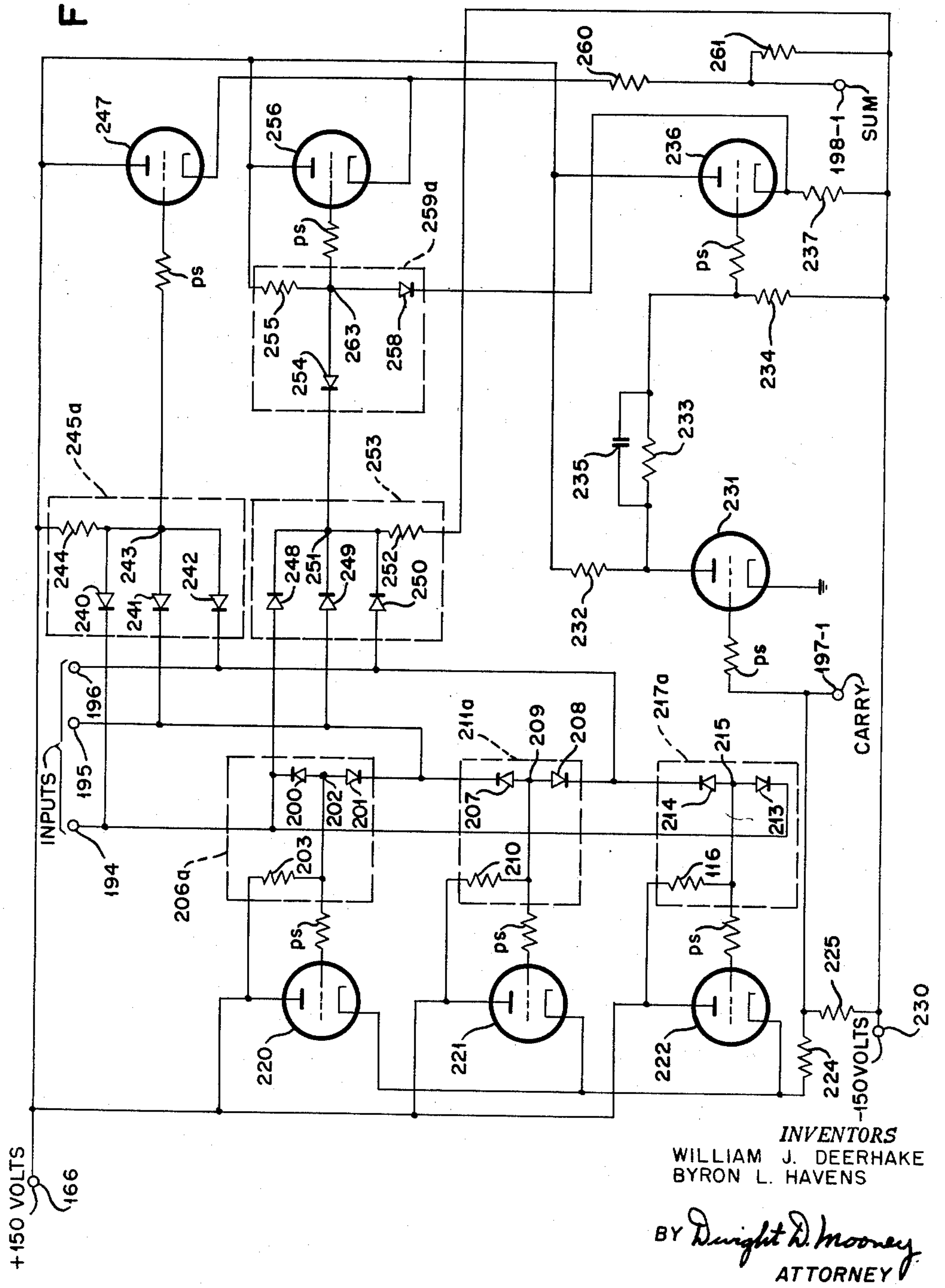
Figure 4A:
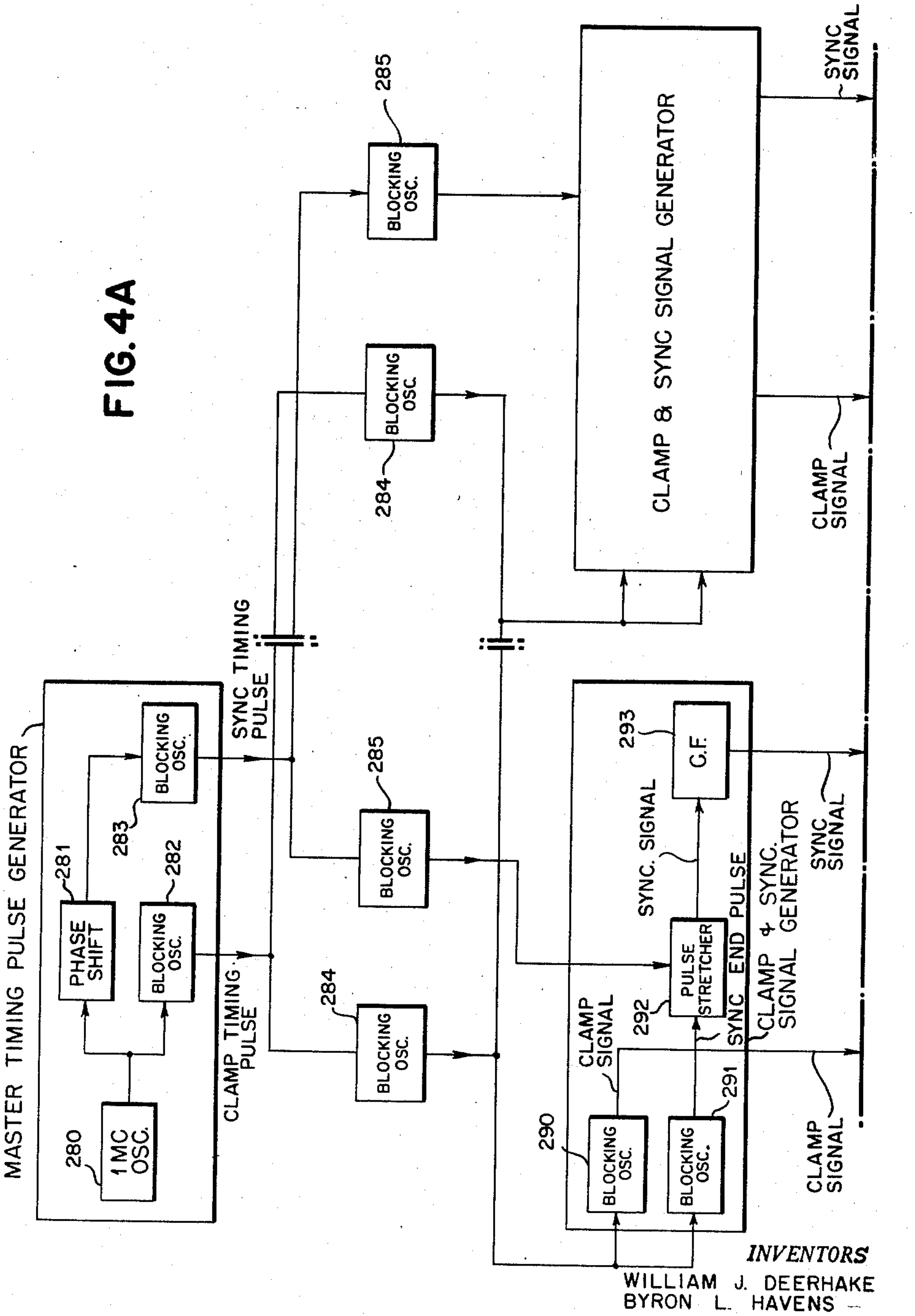
Figure 4B:
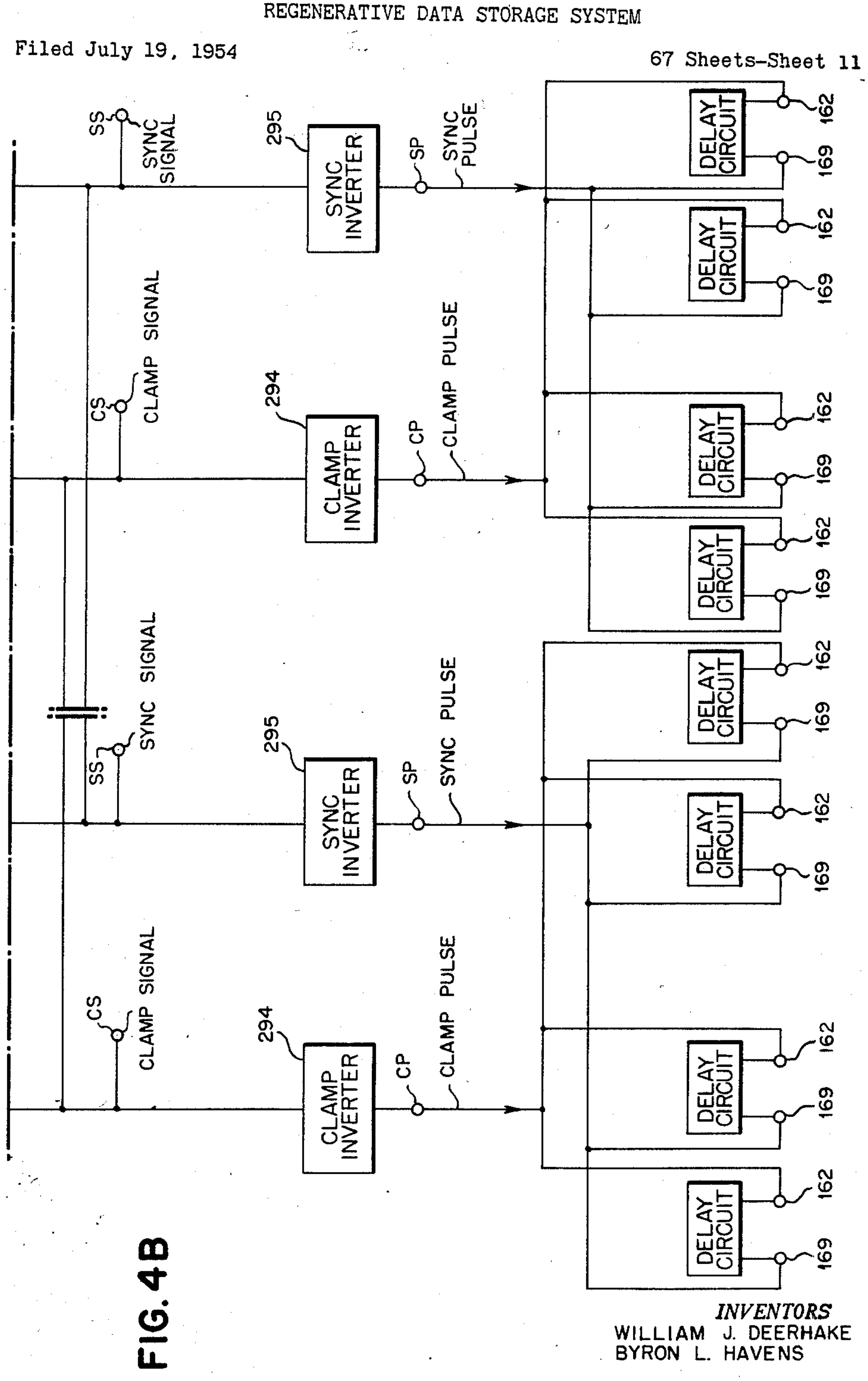
Figure 4C:
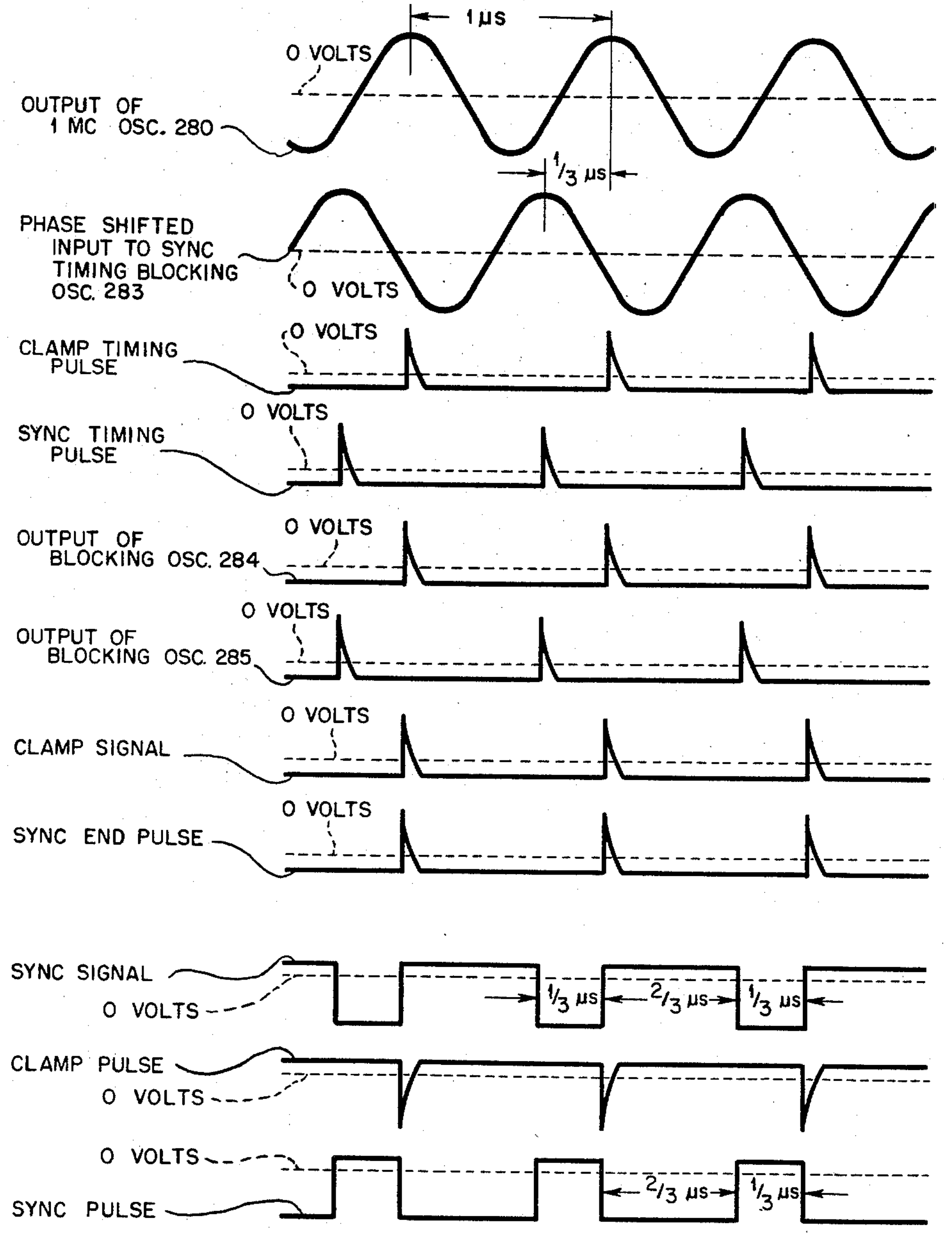
Figures 5A, 5B:
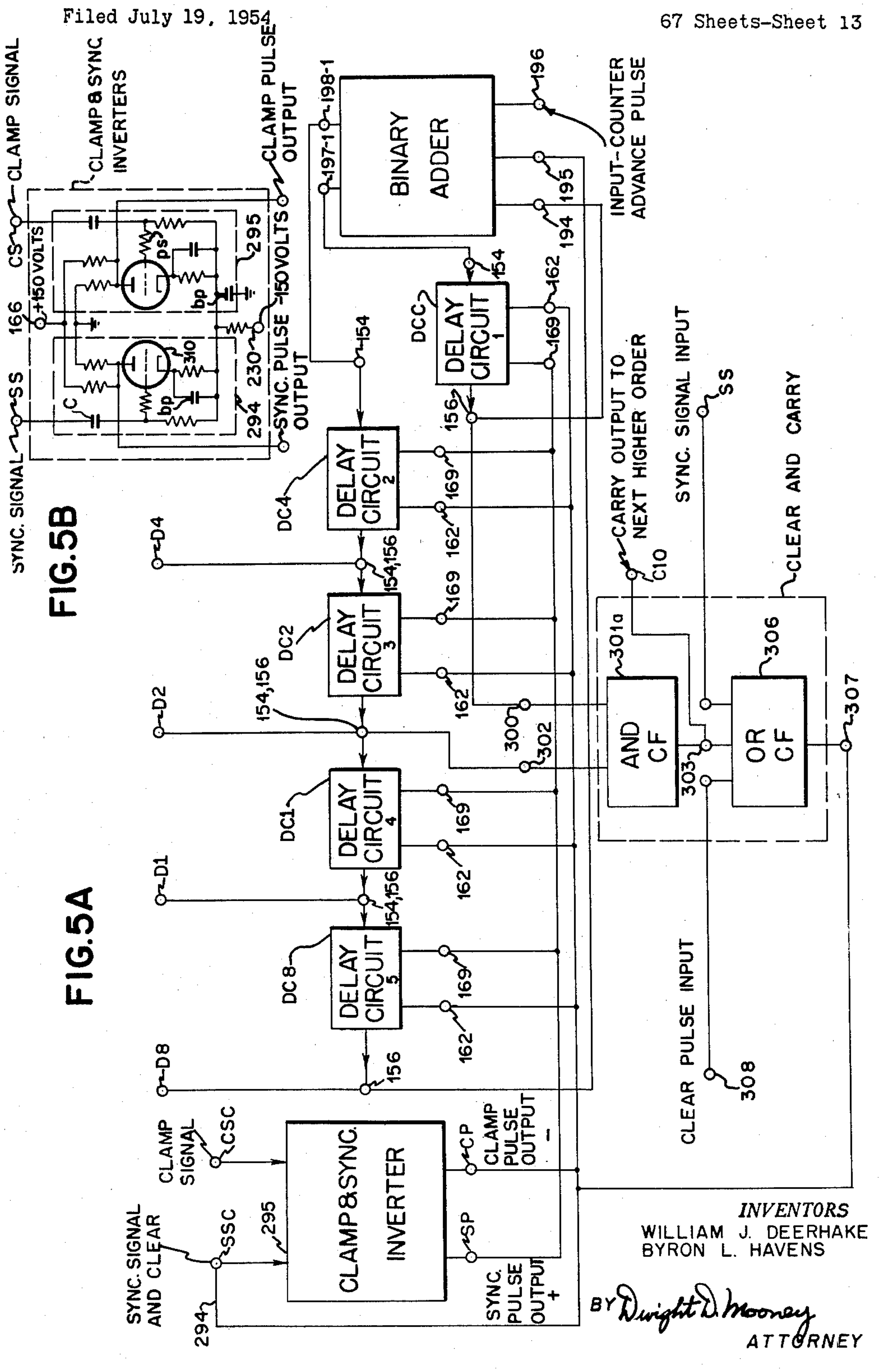
Figures 6, 6A:
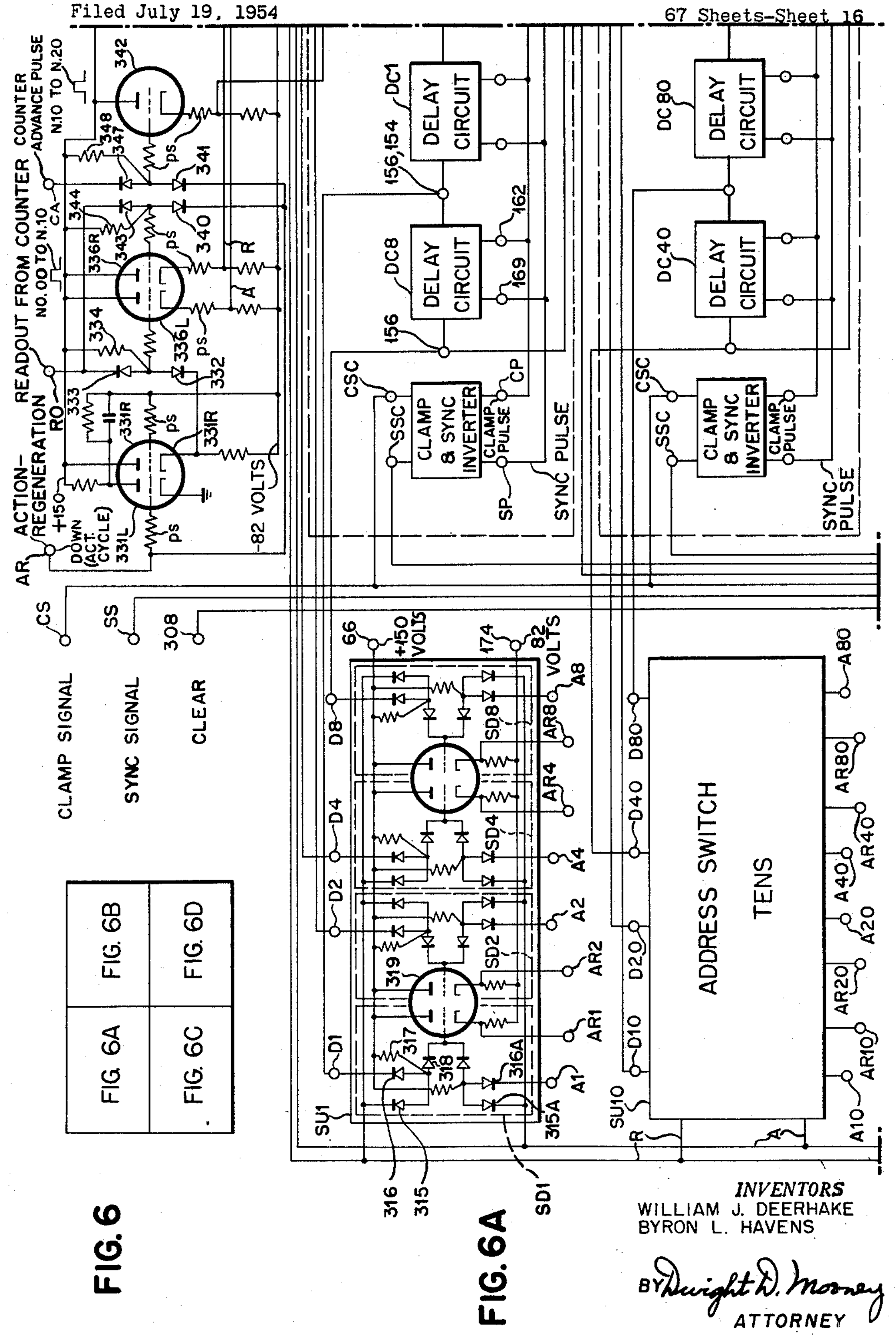
Figure 6B:
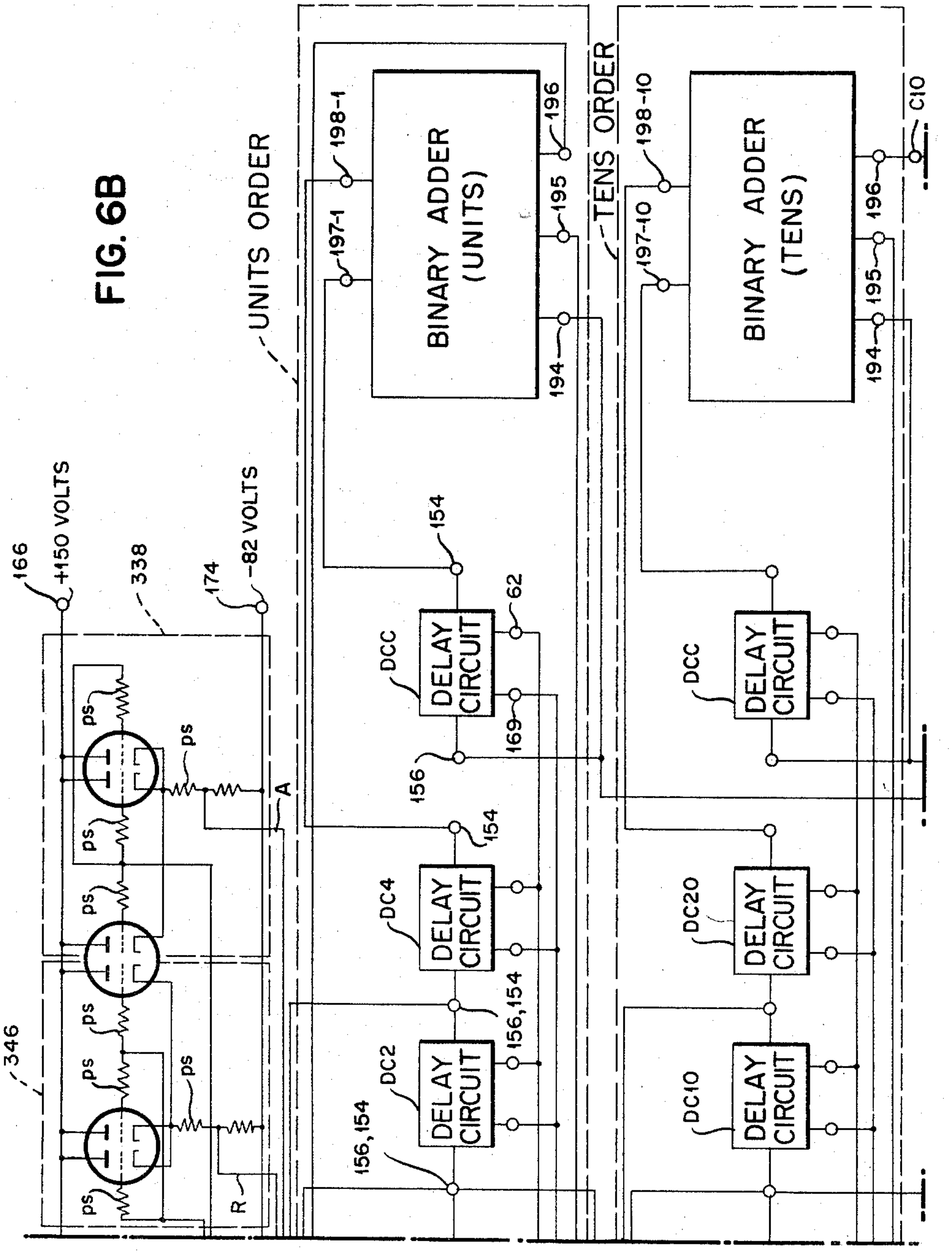
Figure 6C:
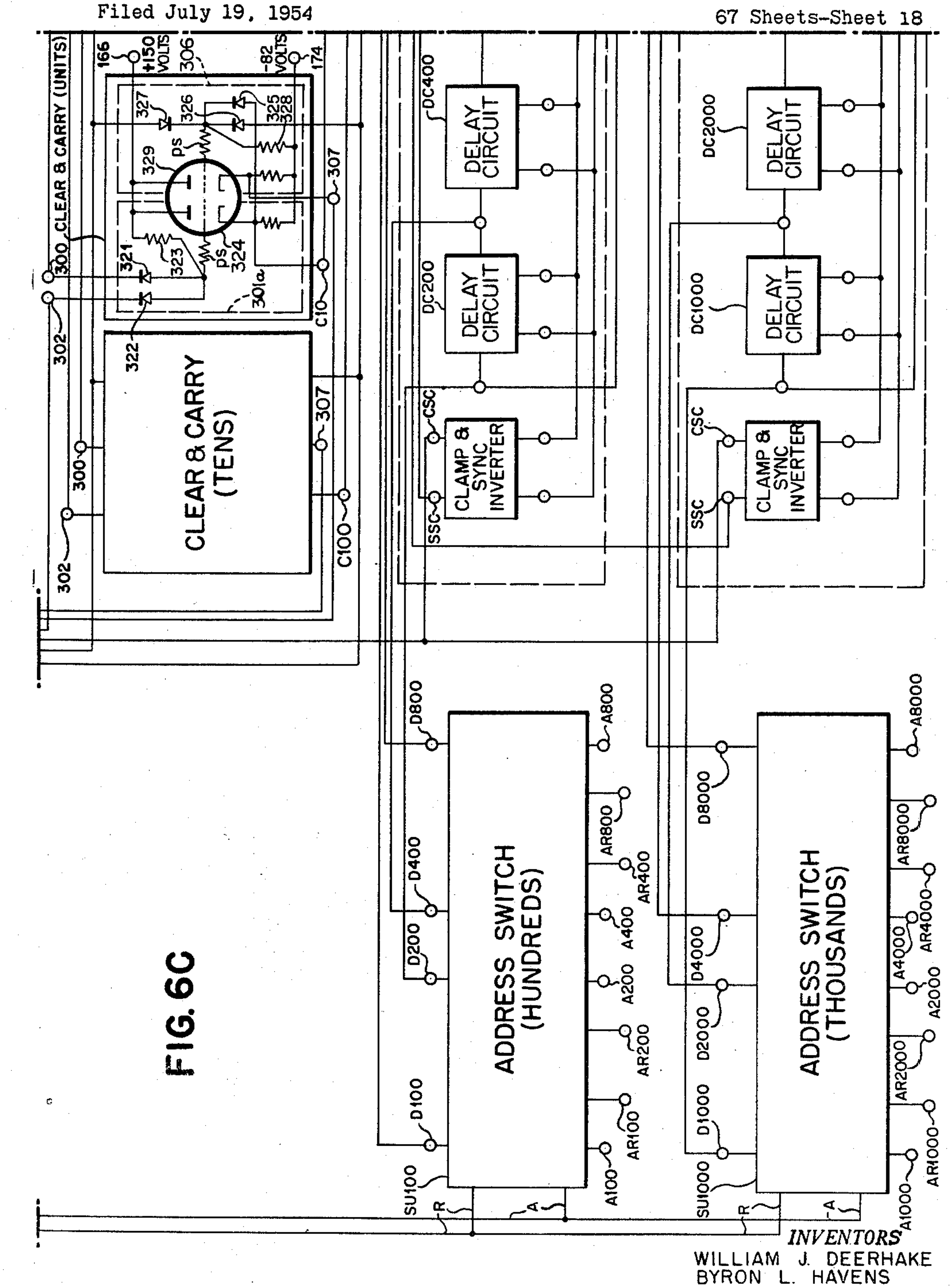
Figure 6D:
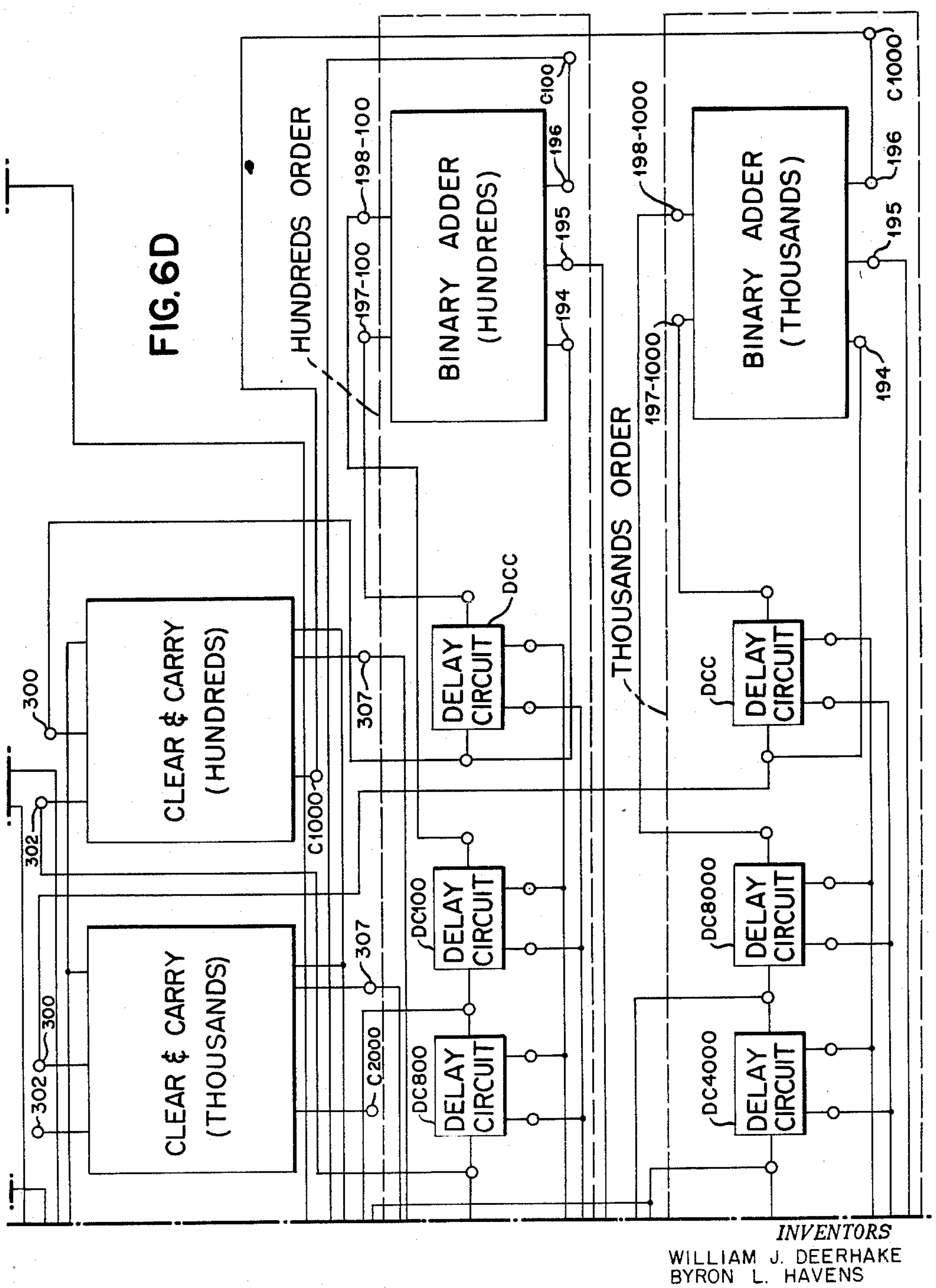
Figures 7B, 11:
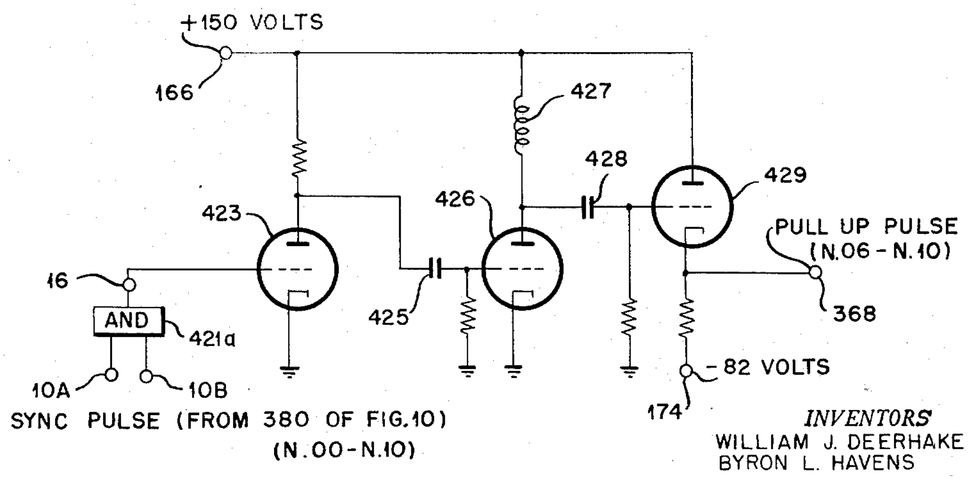
Figures 7C, 8:
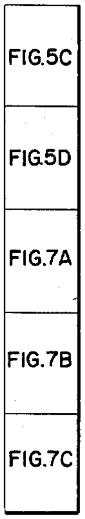
Figure 9:
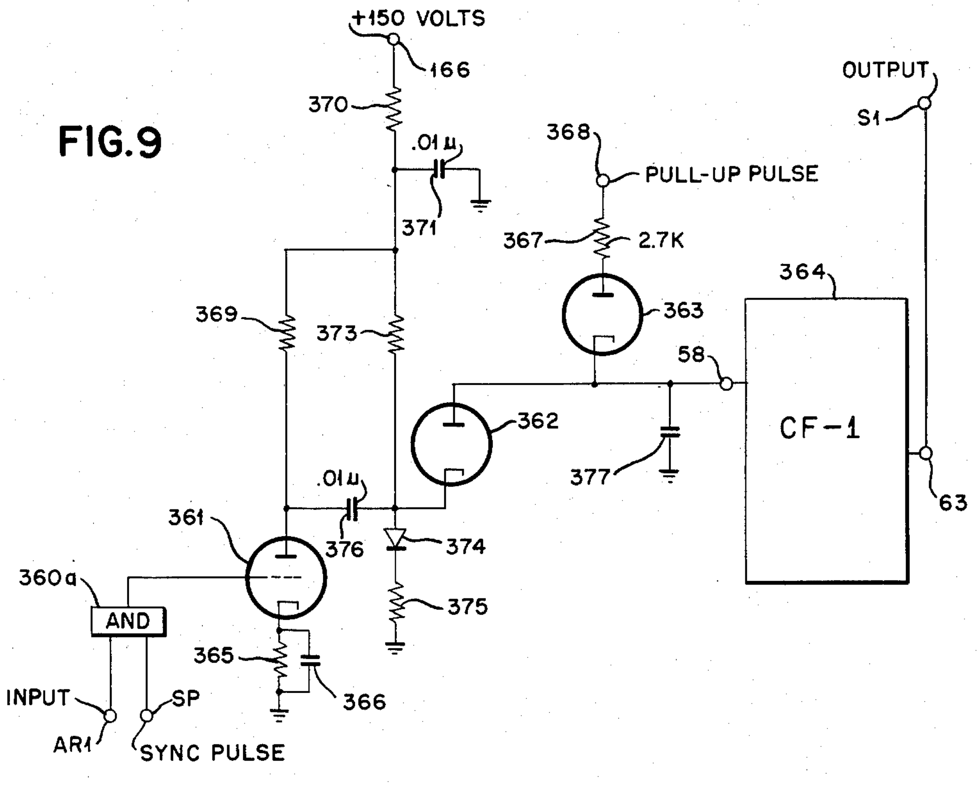
Figure 9A:
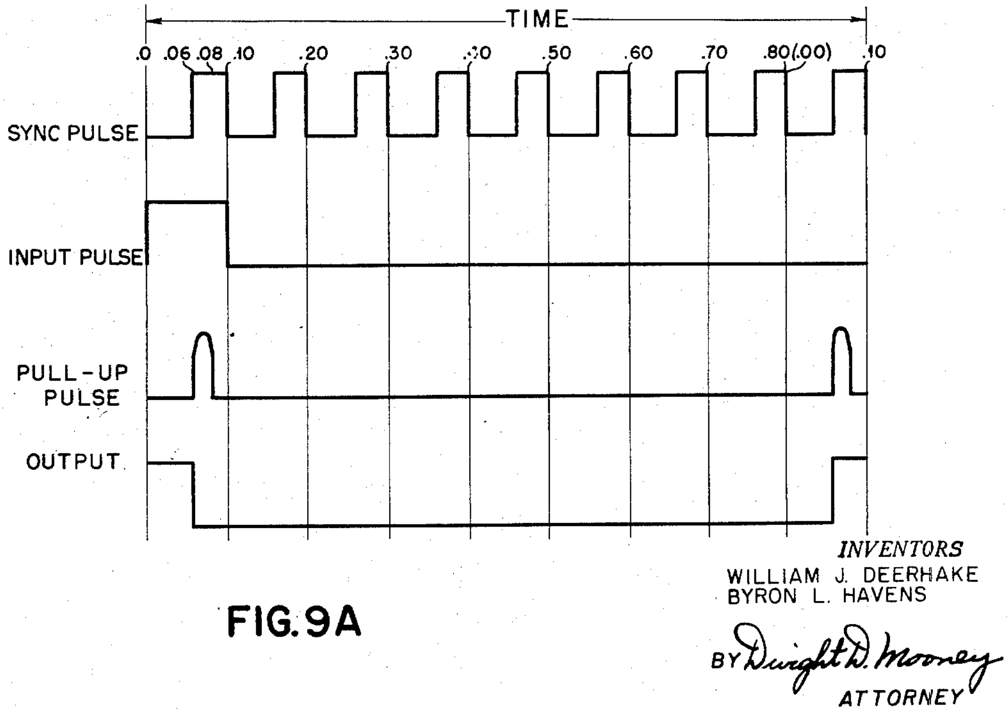
Figure 10:
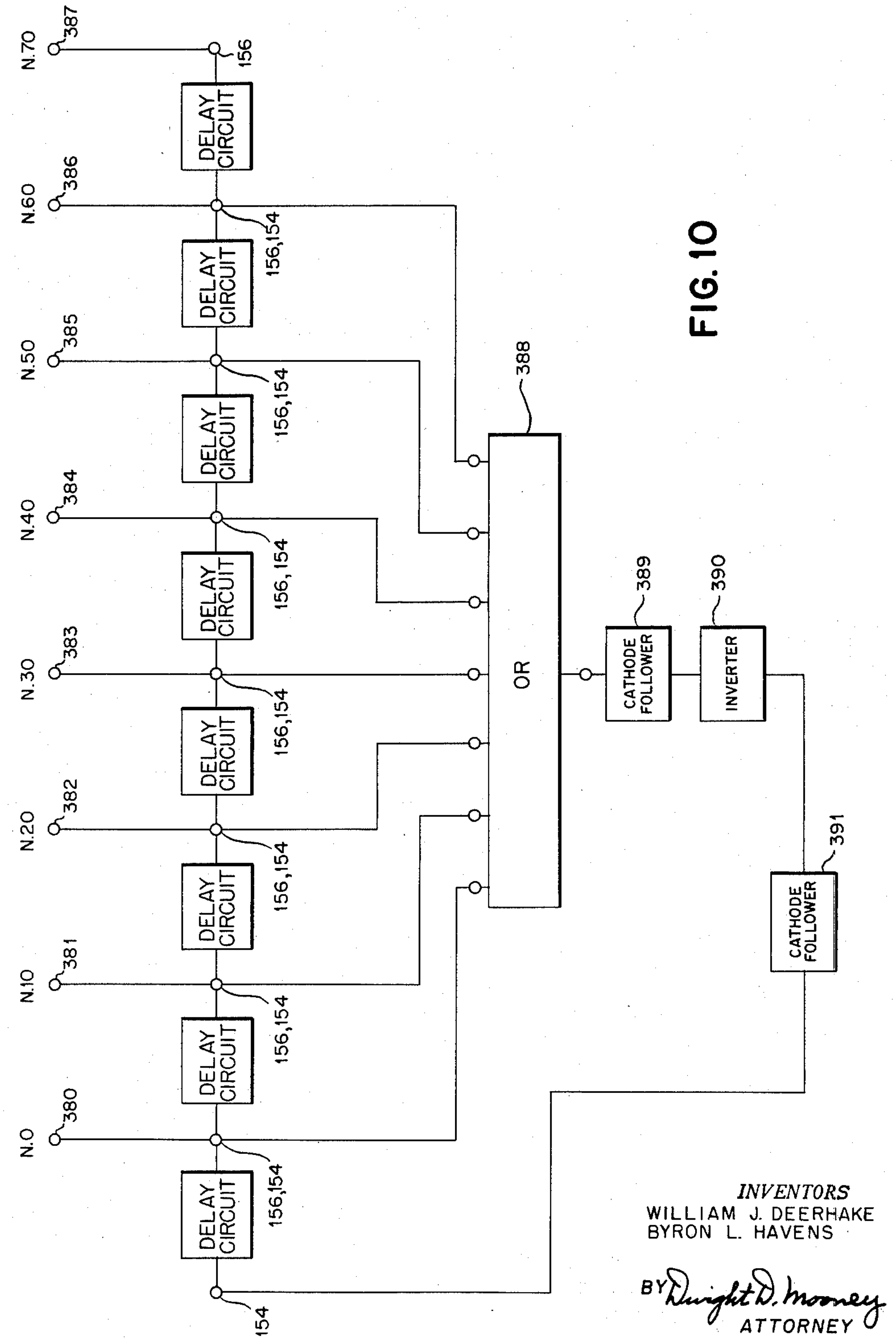
Figure 10A:
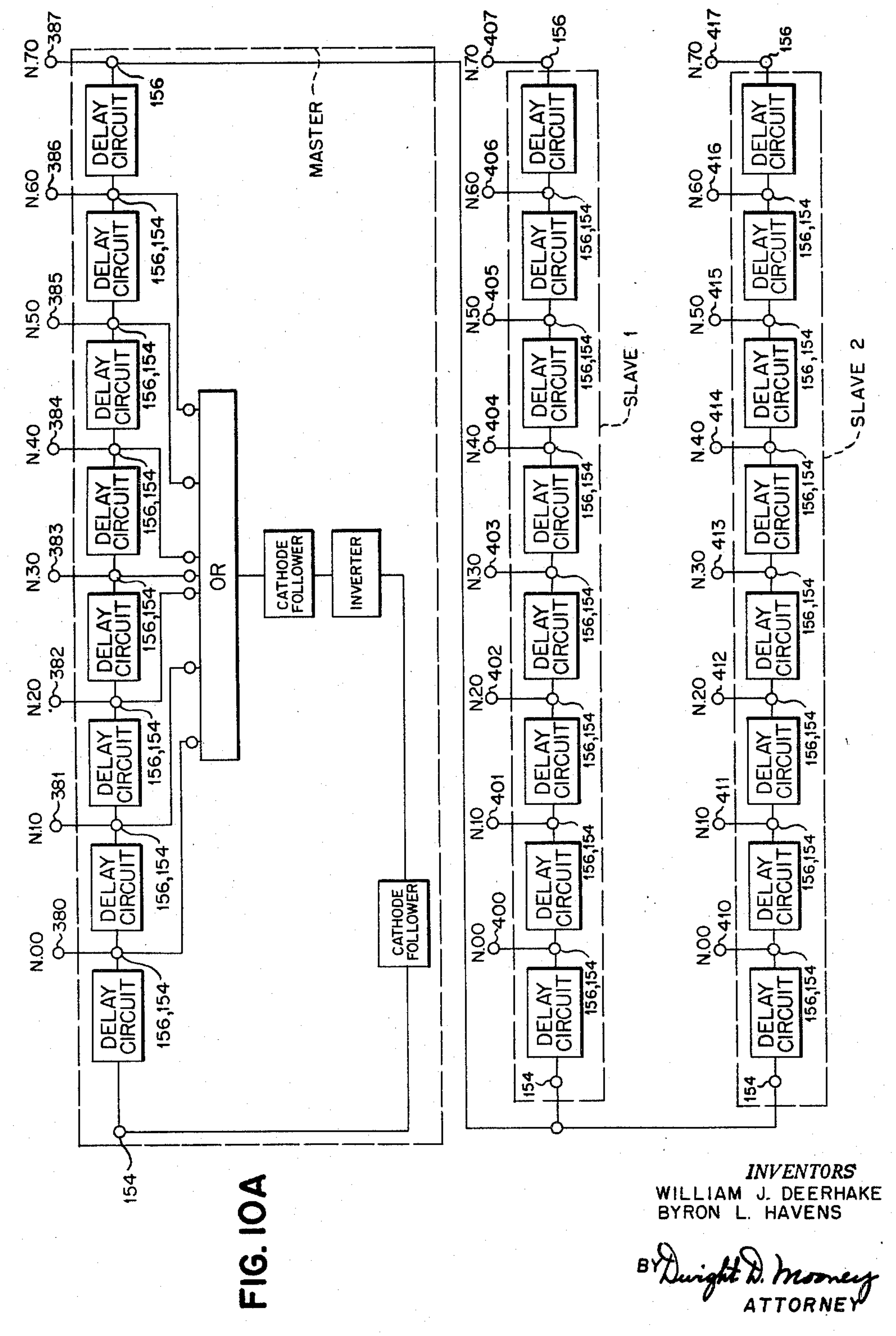
Figure 14:
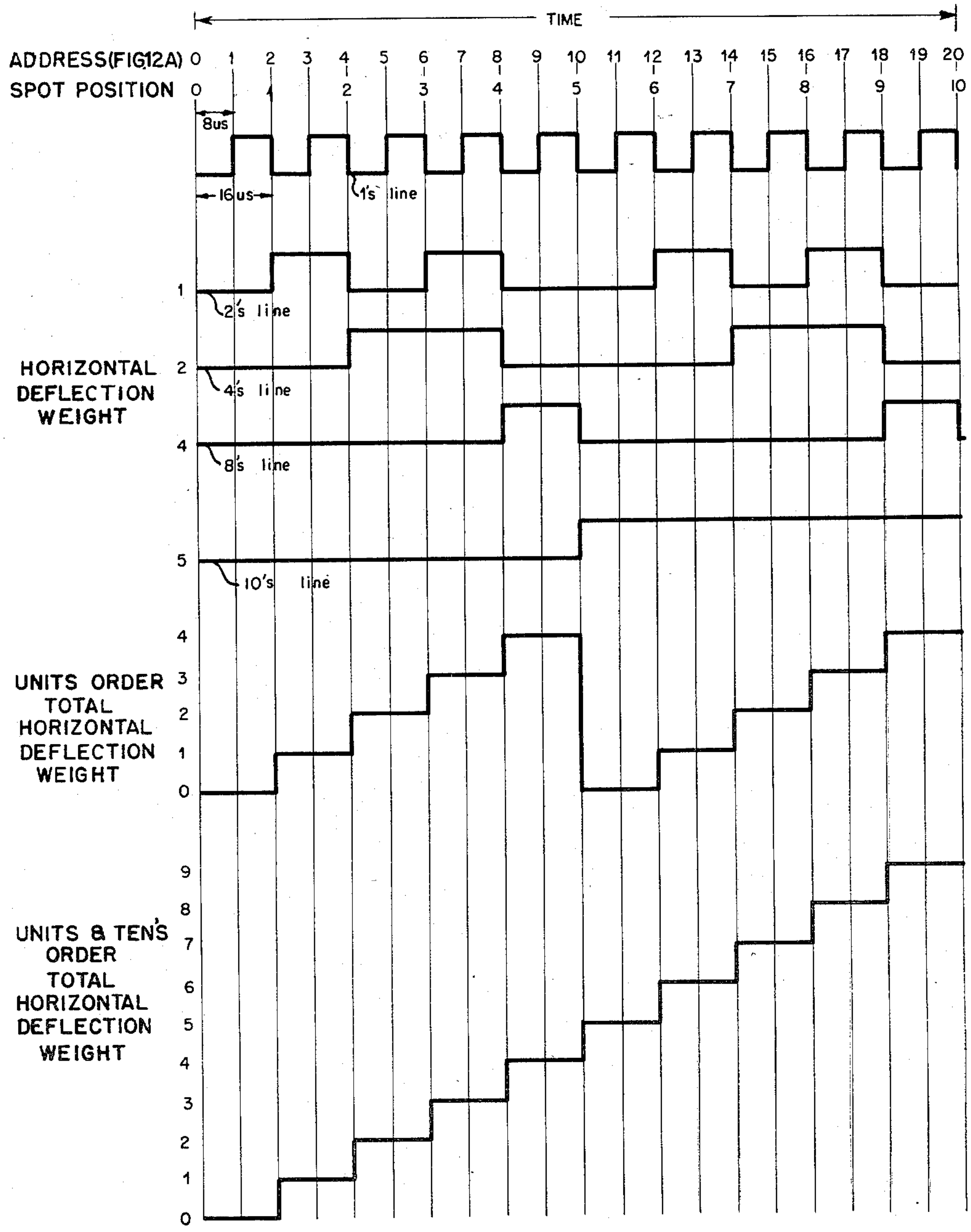
Figure 15:
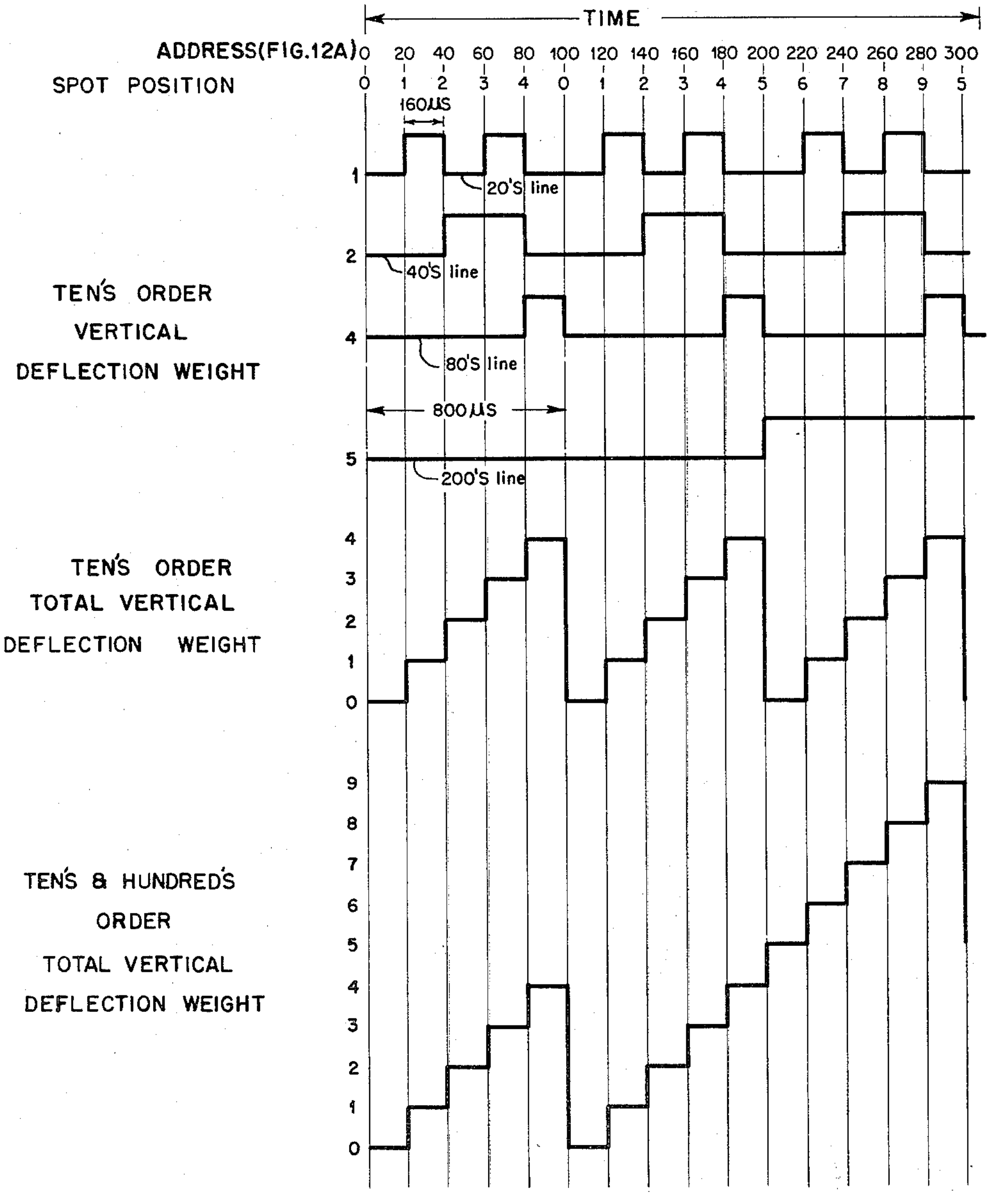
Figure 16A:
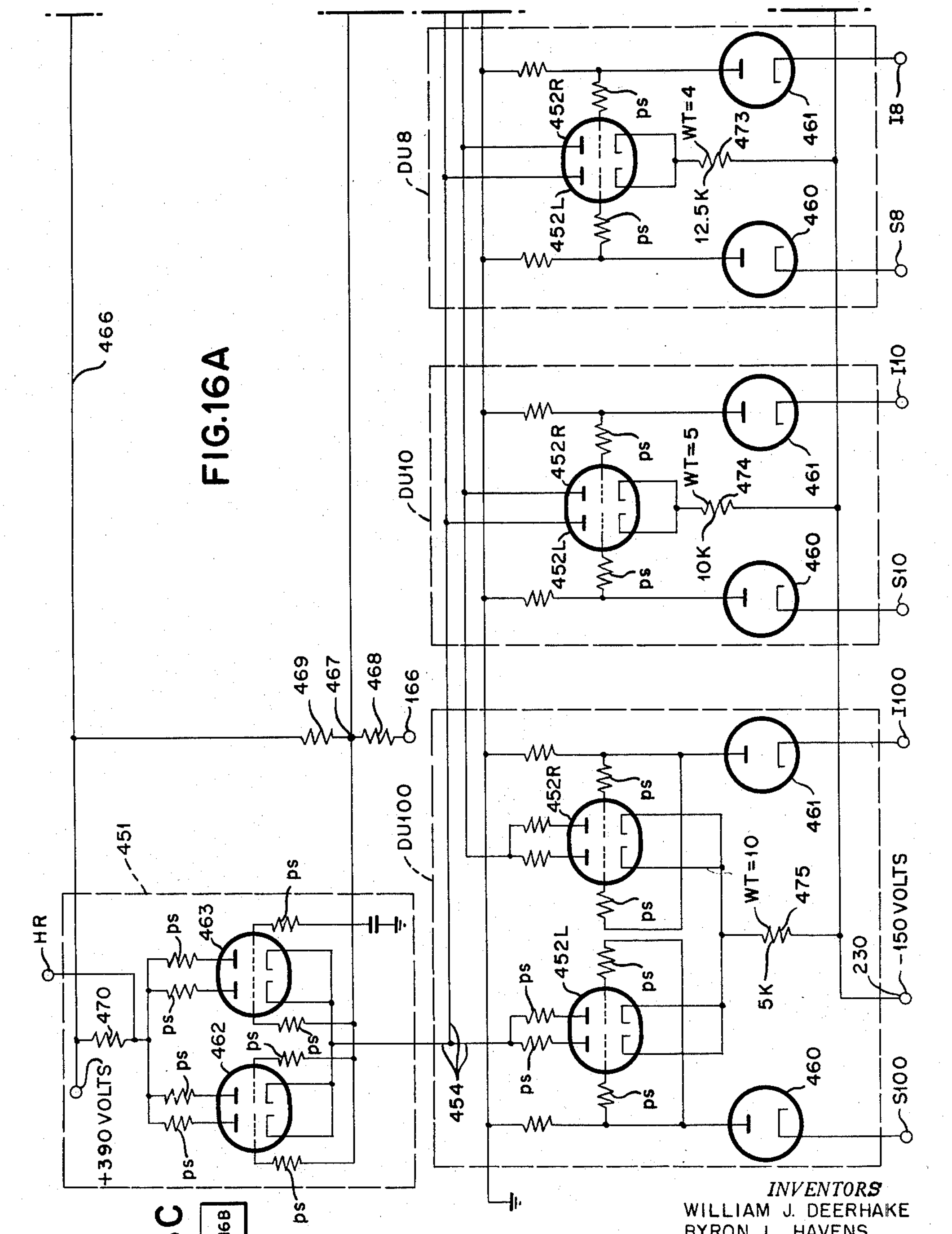
Figure 16C:
Figure 16B:
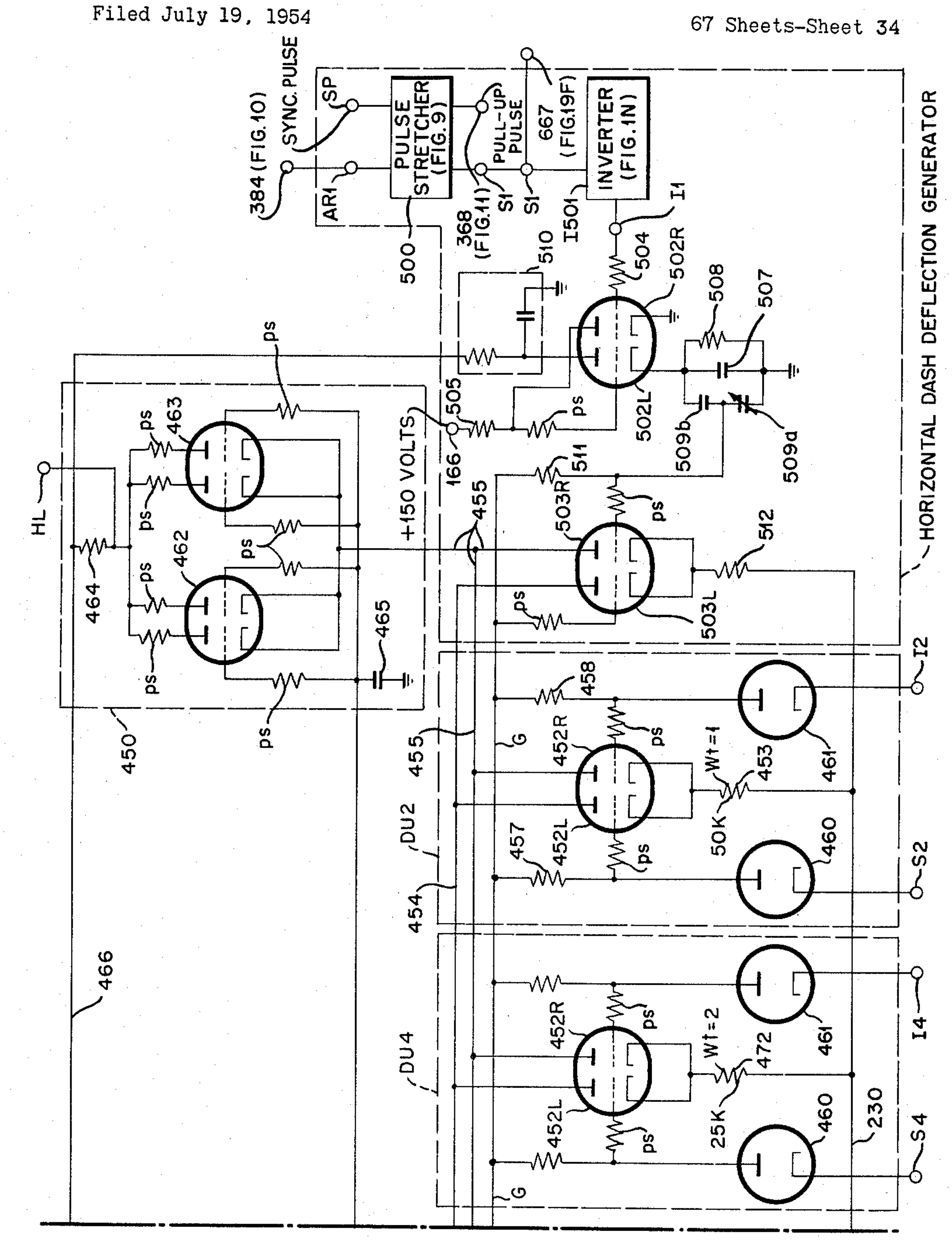
Figures 17A, 17C:
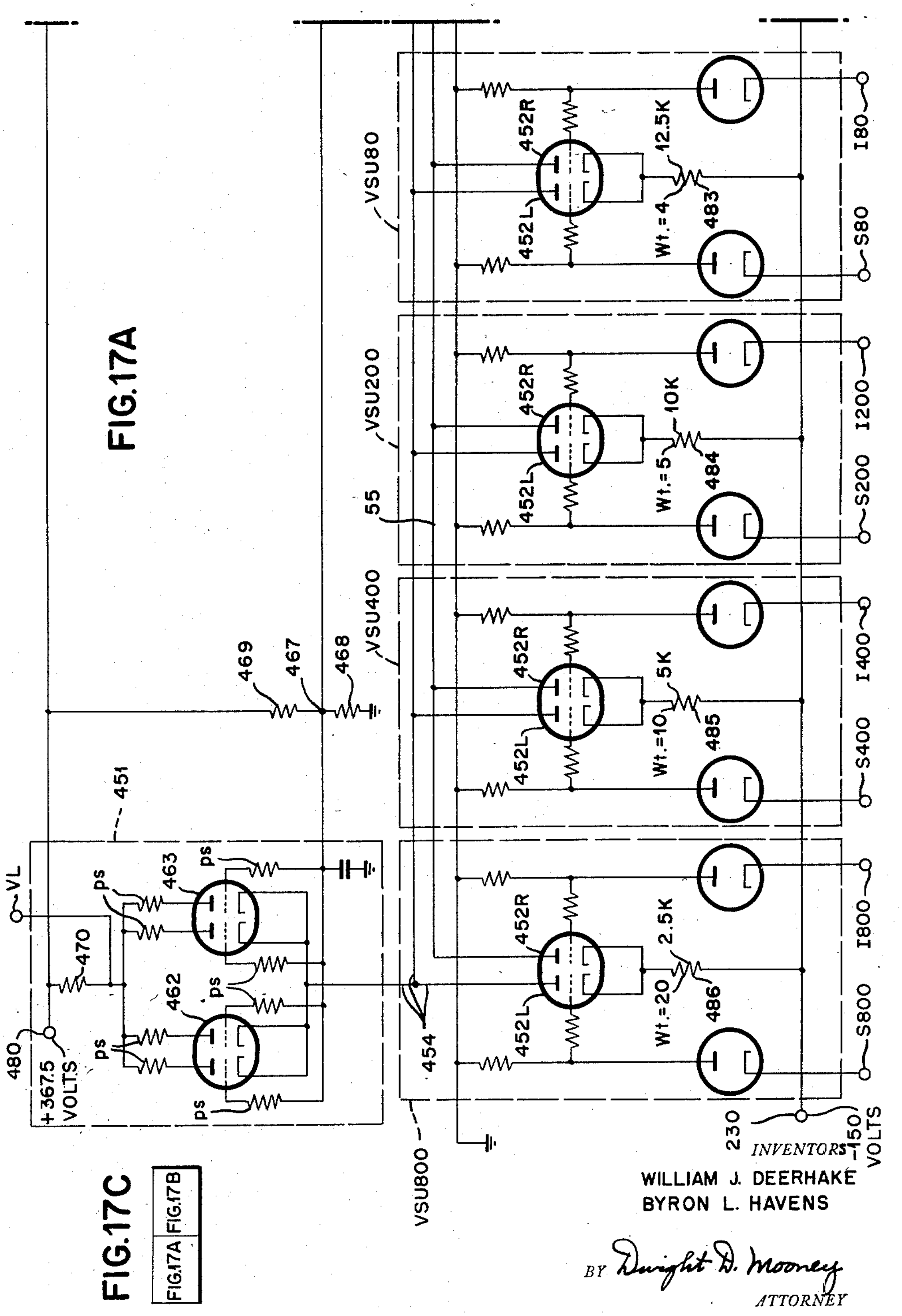
Figure 17B:
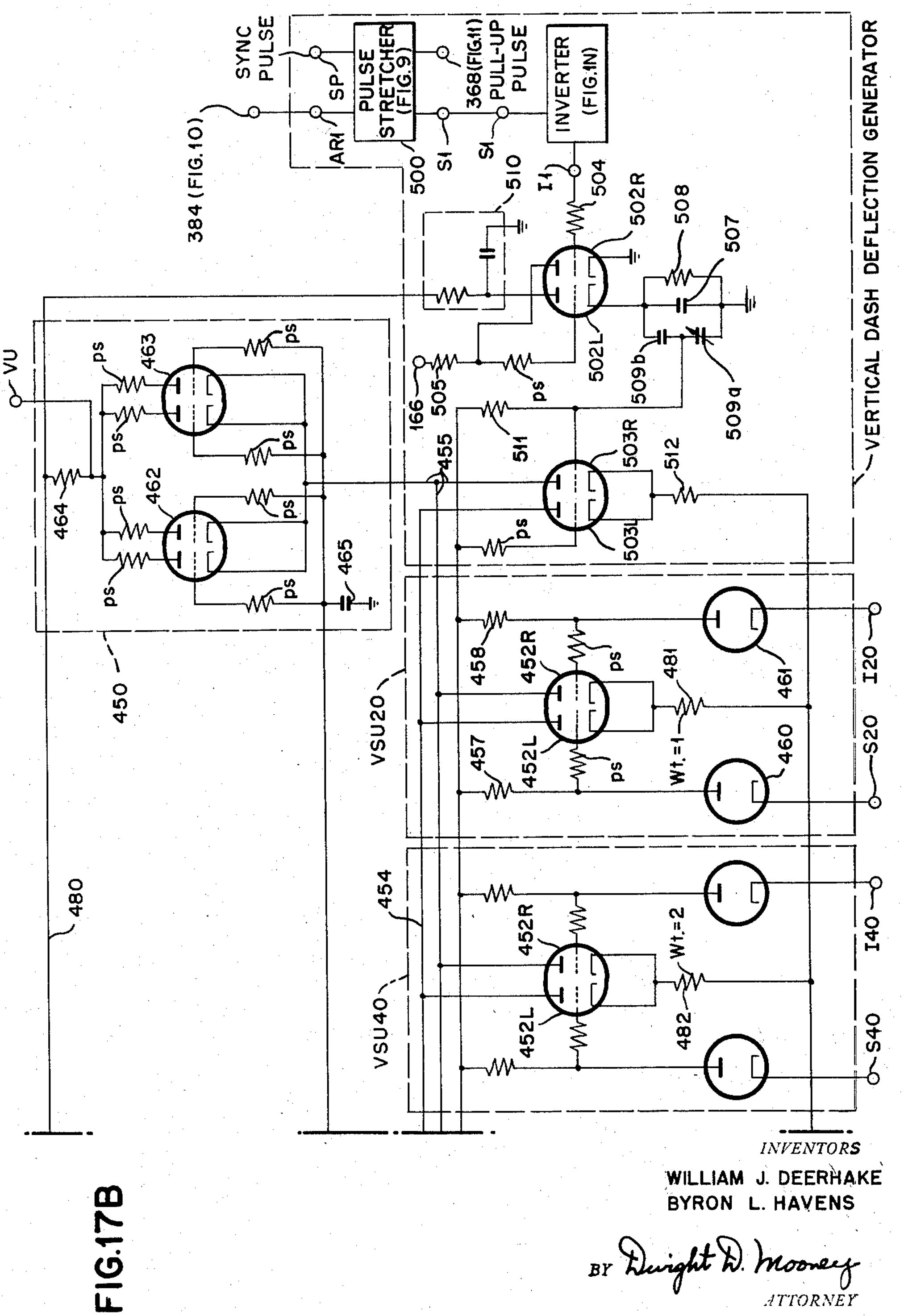
Figure 18A:
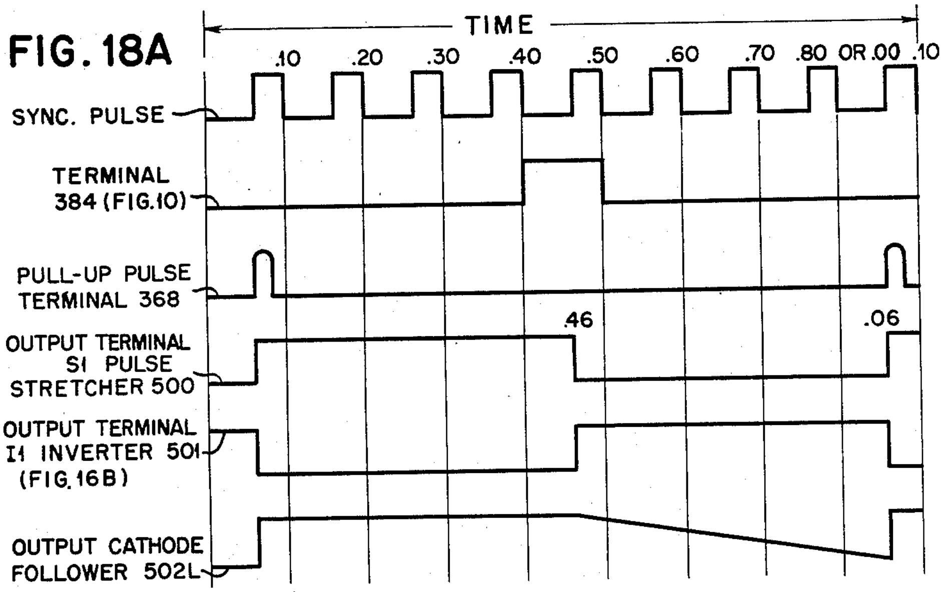
Figure 18B:
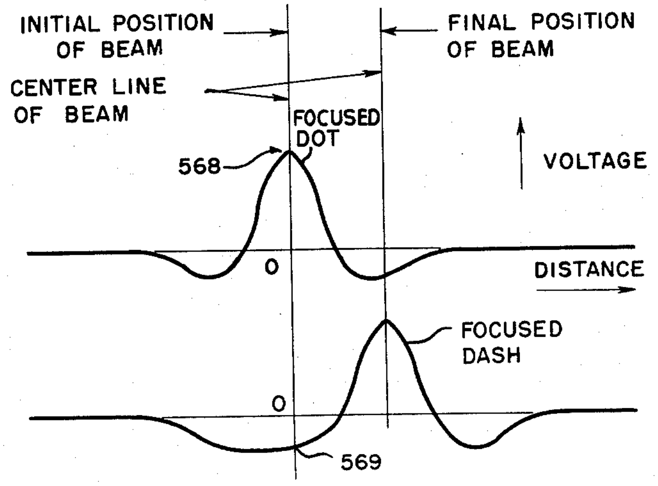
Figure 18C:
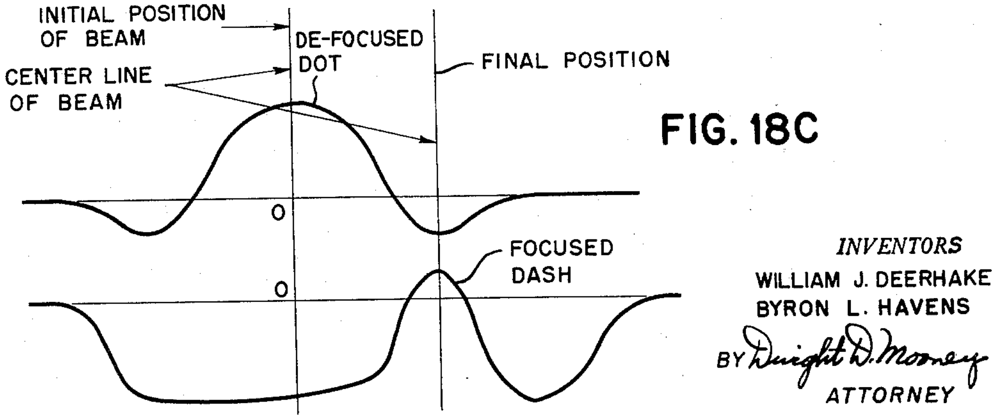
Figures 19A, 19C:
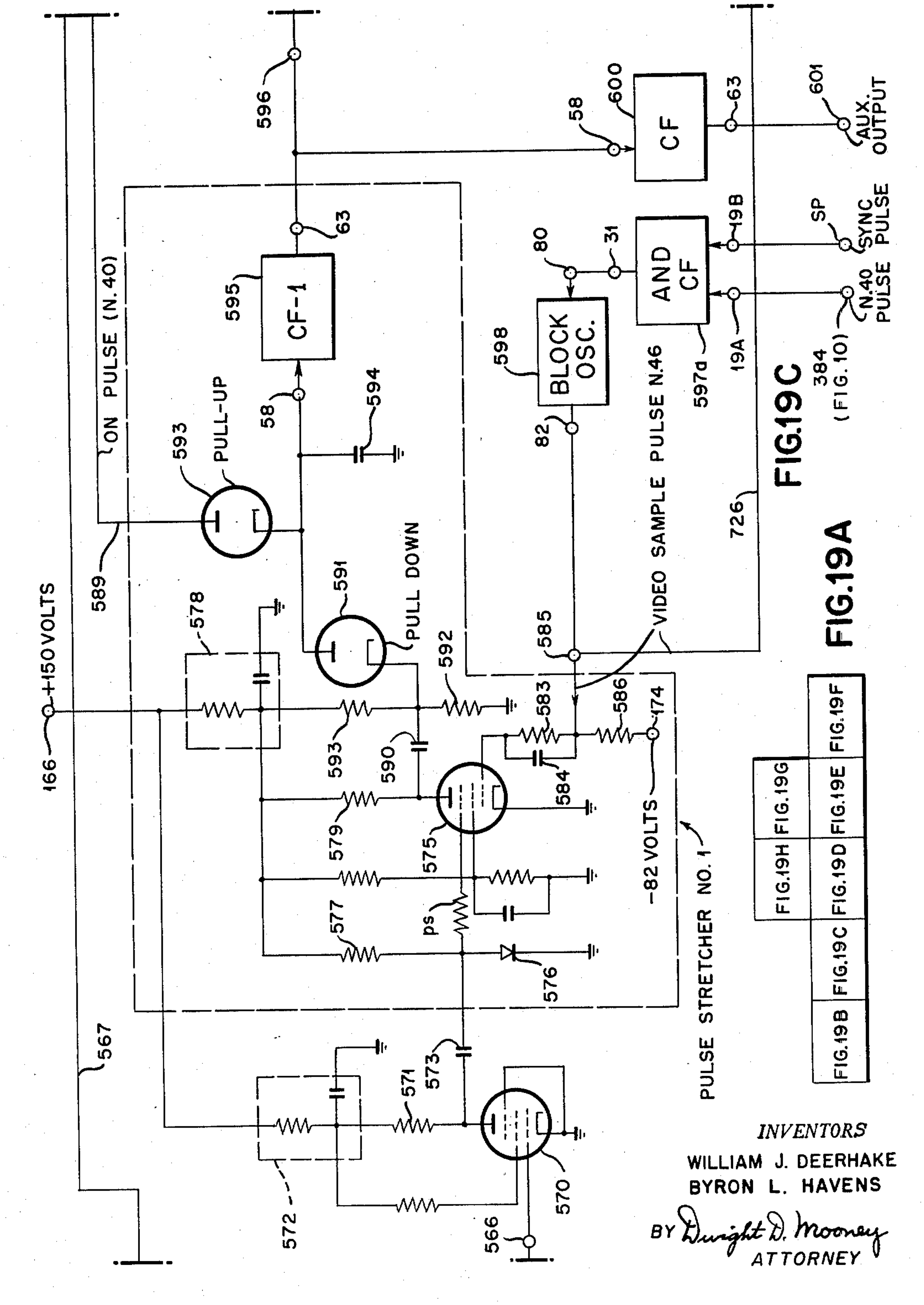
Figure 19B:
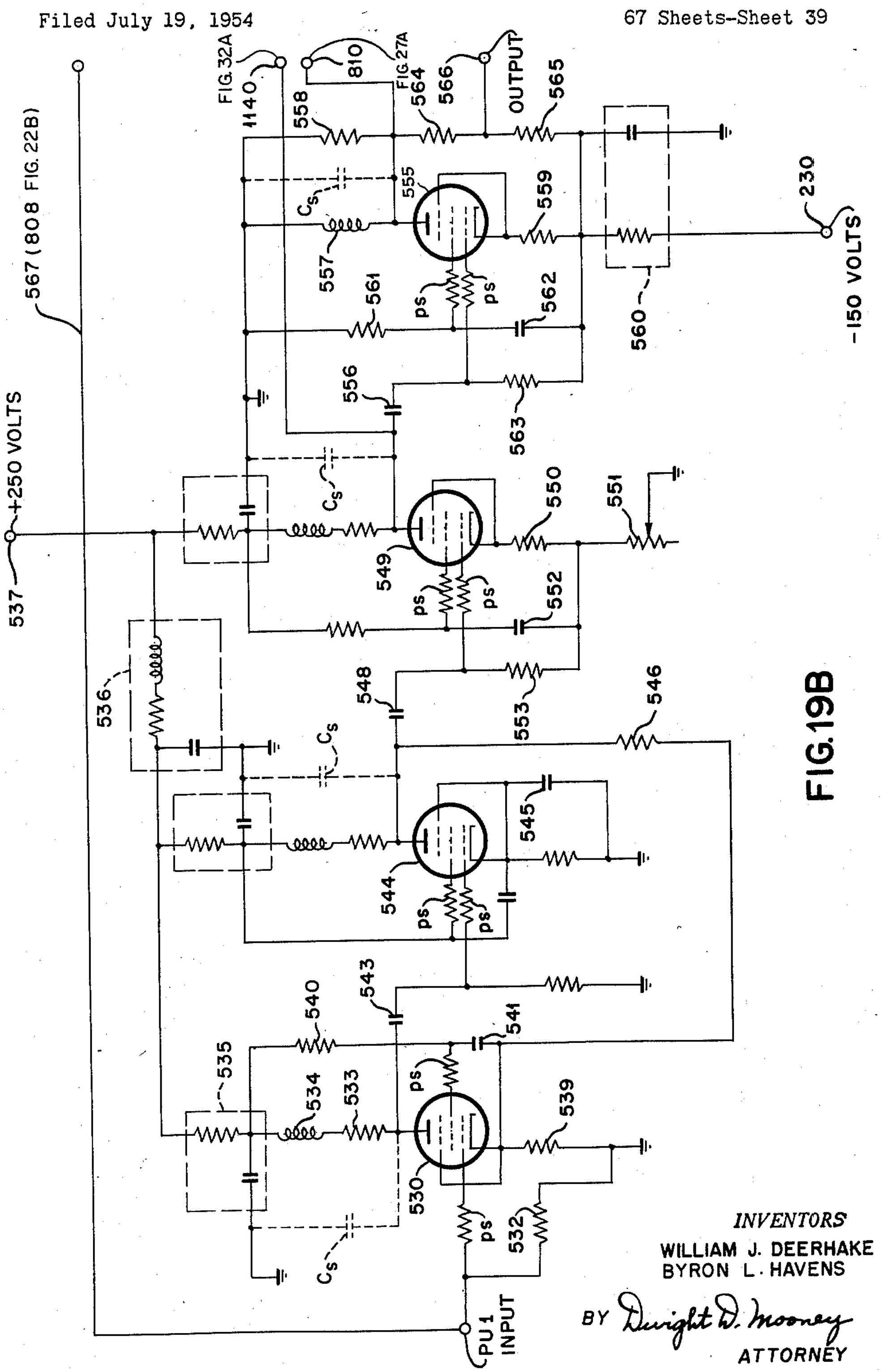
Figure 19D:
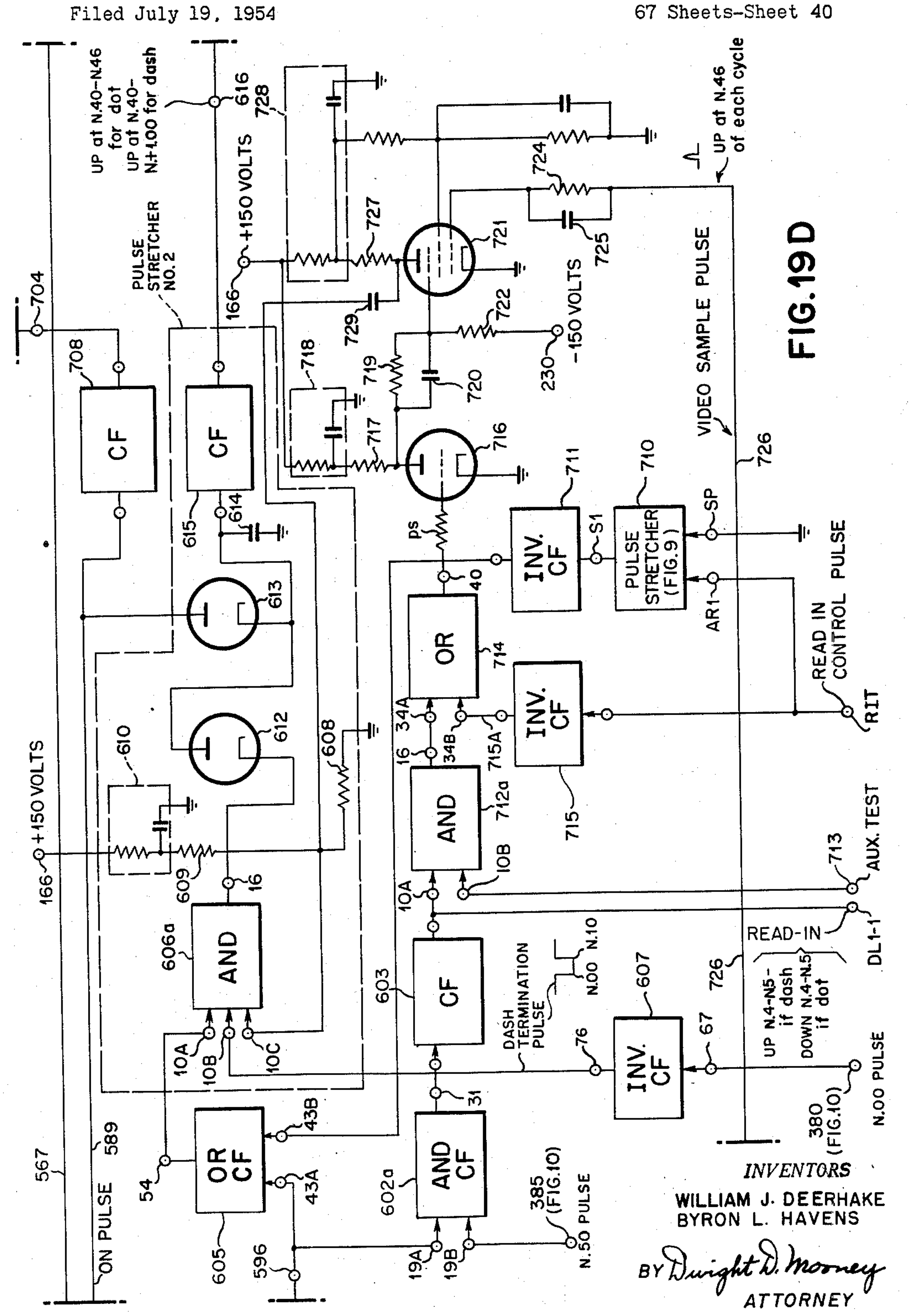
Figure 19E:
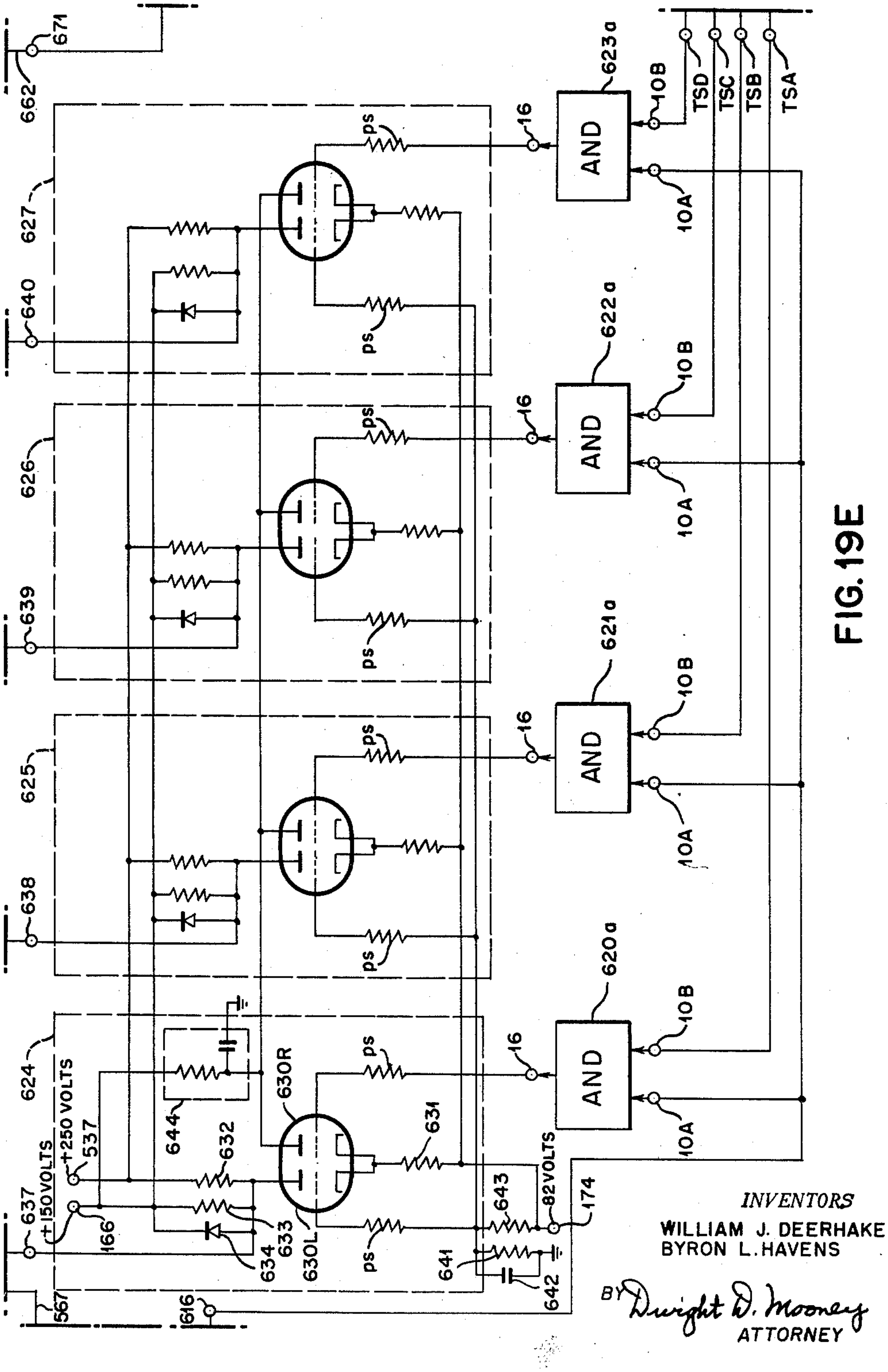
Figure 19F:
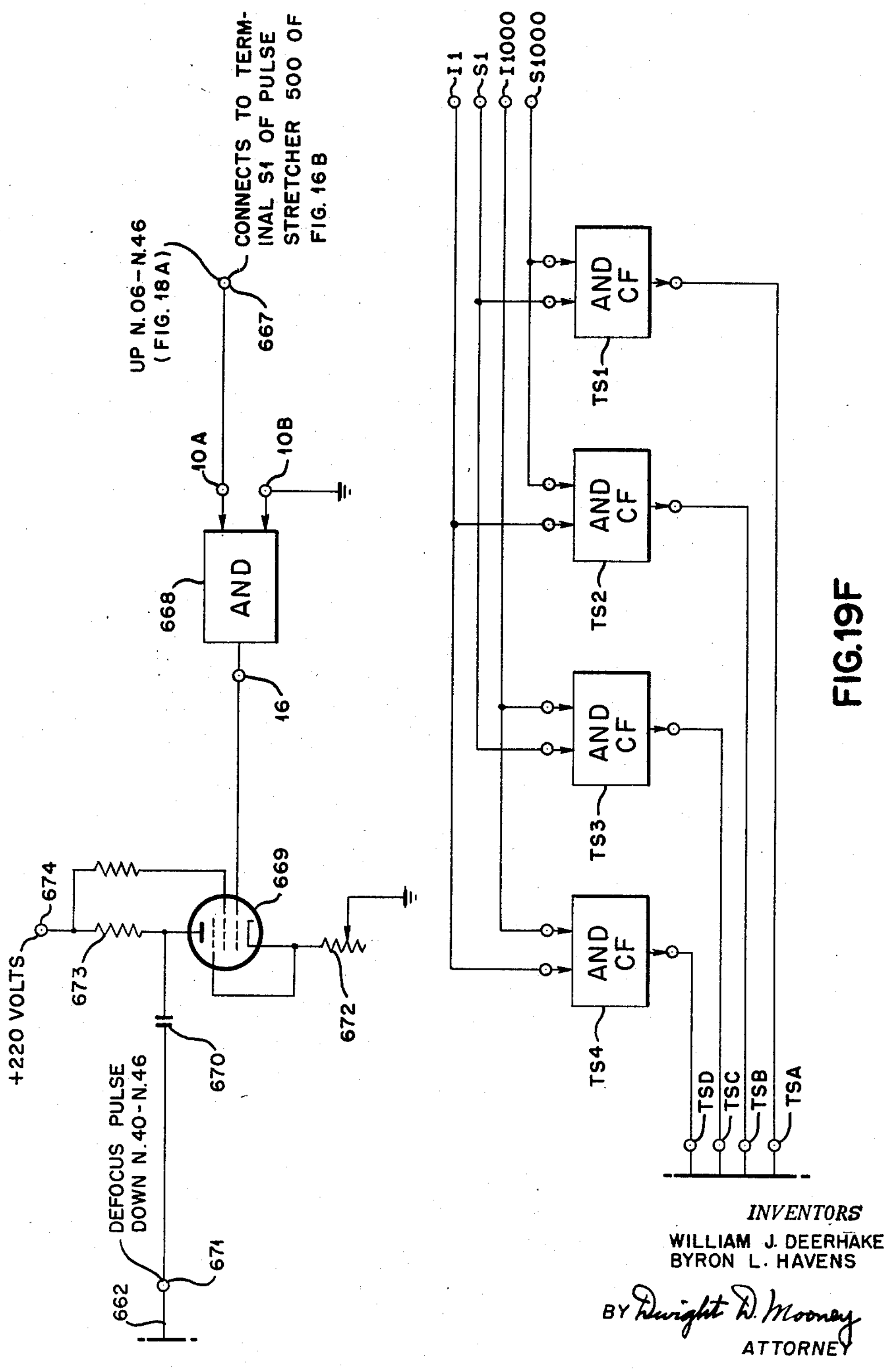
Figure 19G:
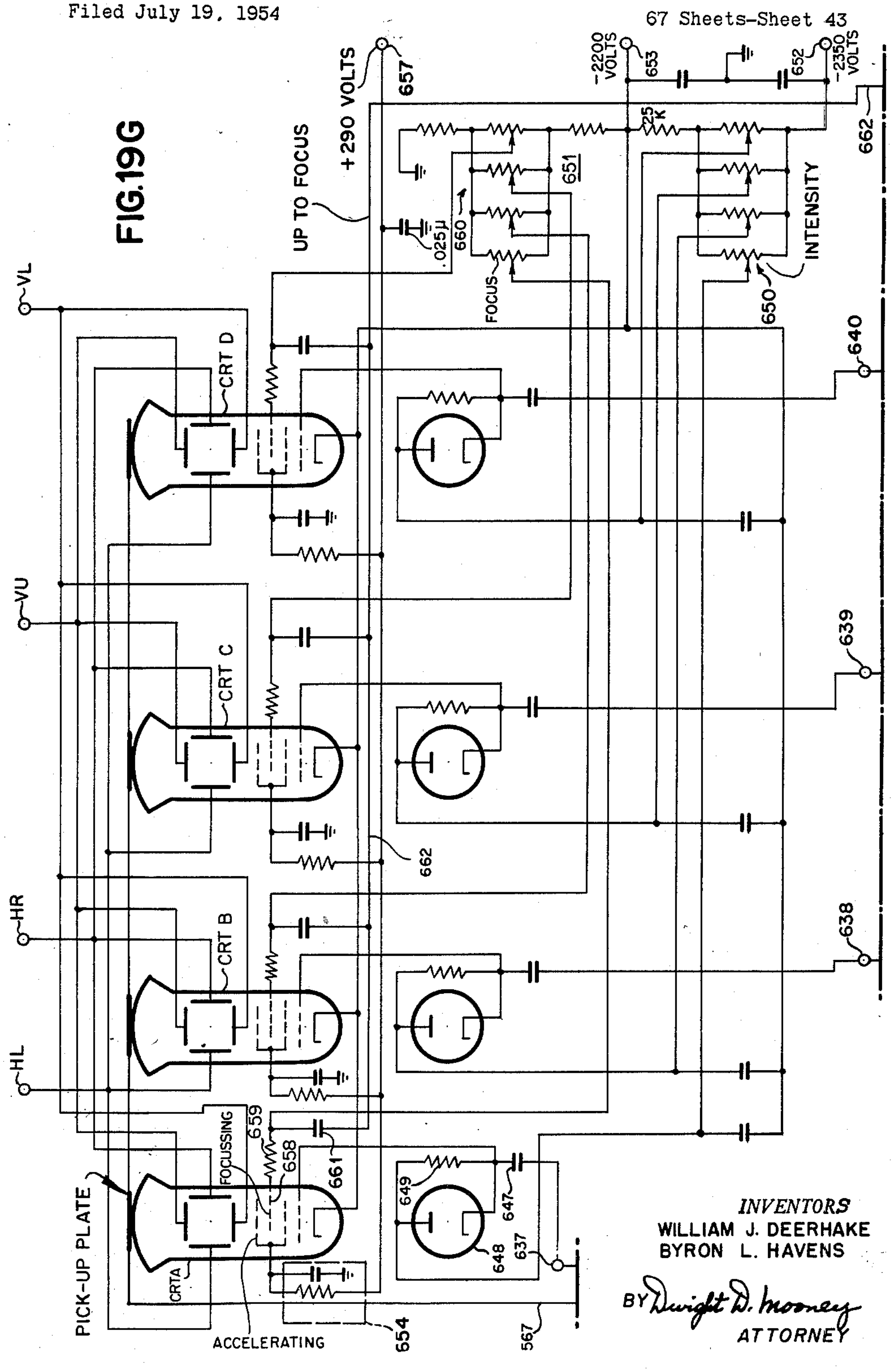
Figure 19H:
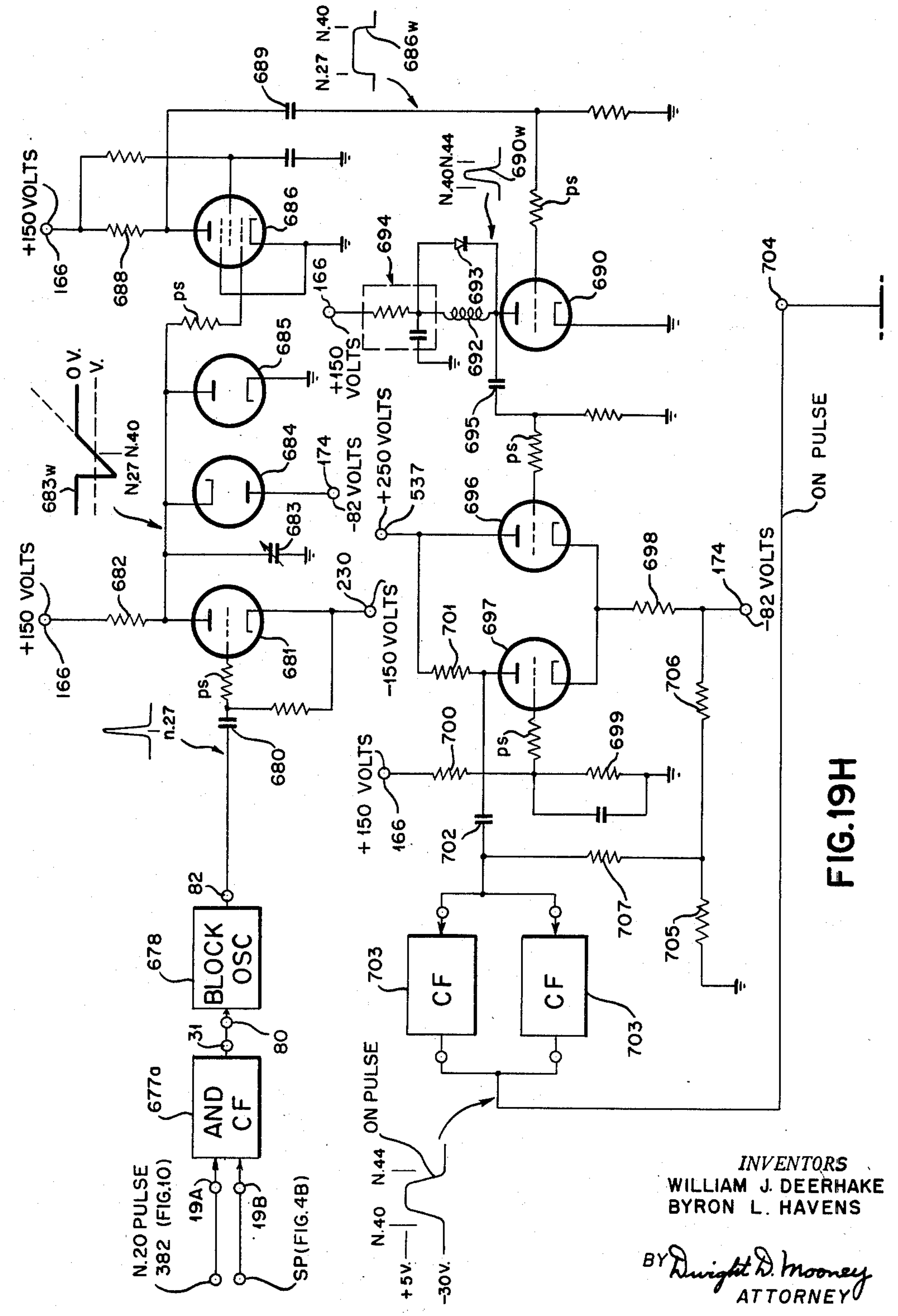
Figure 20:
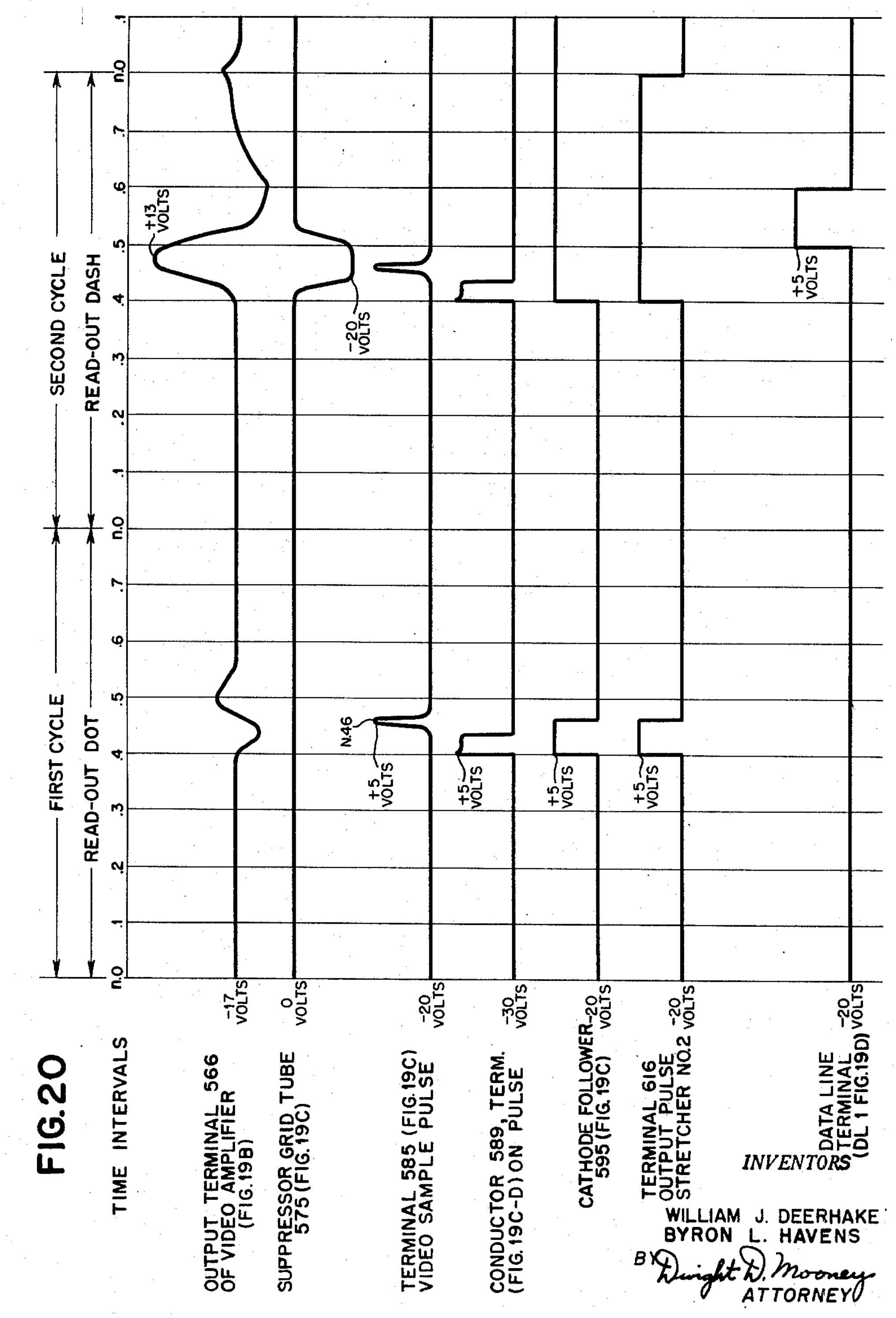
Figure 21:
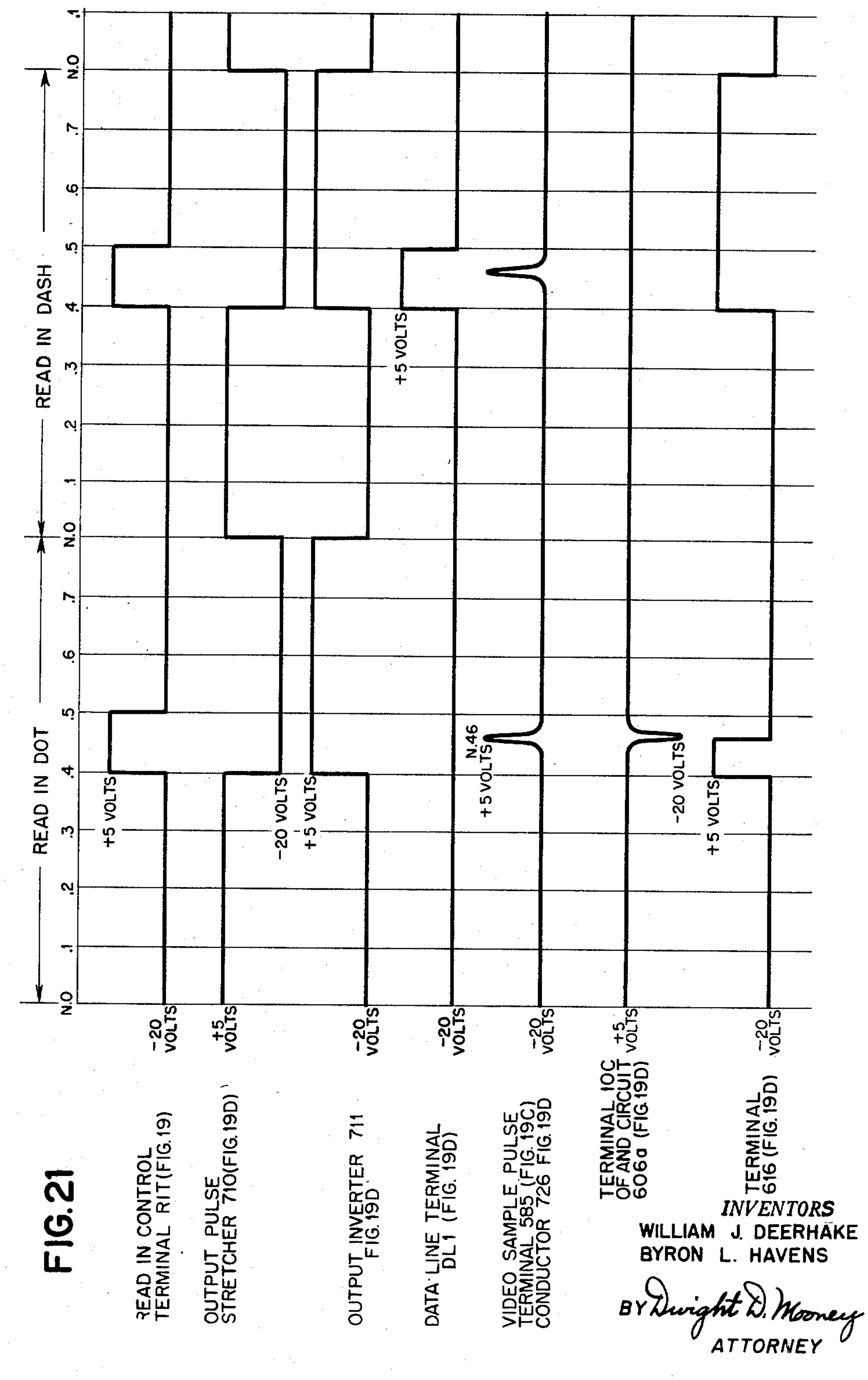
Figures 22A, 22C:
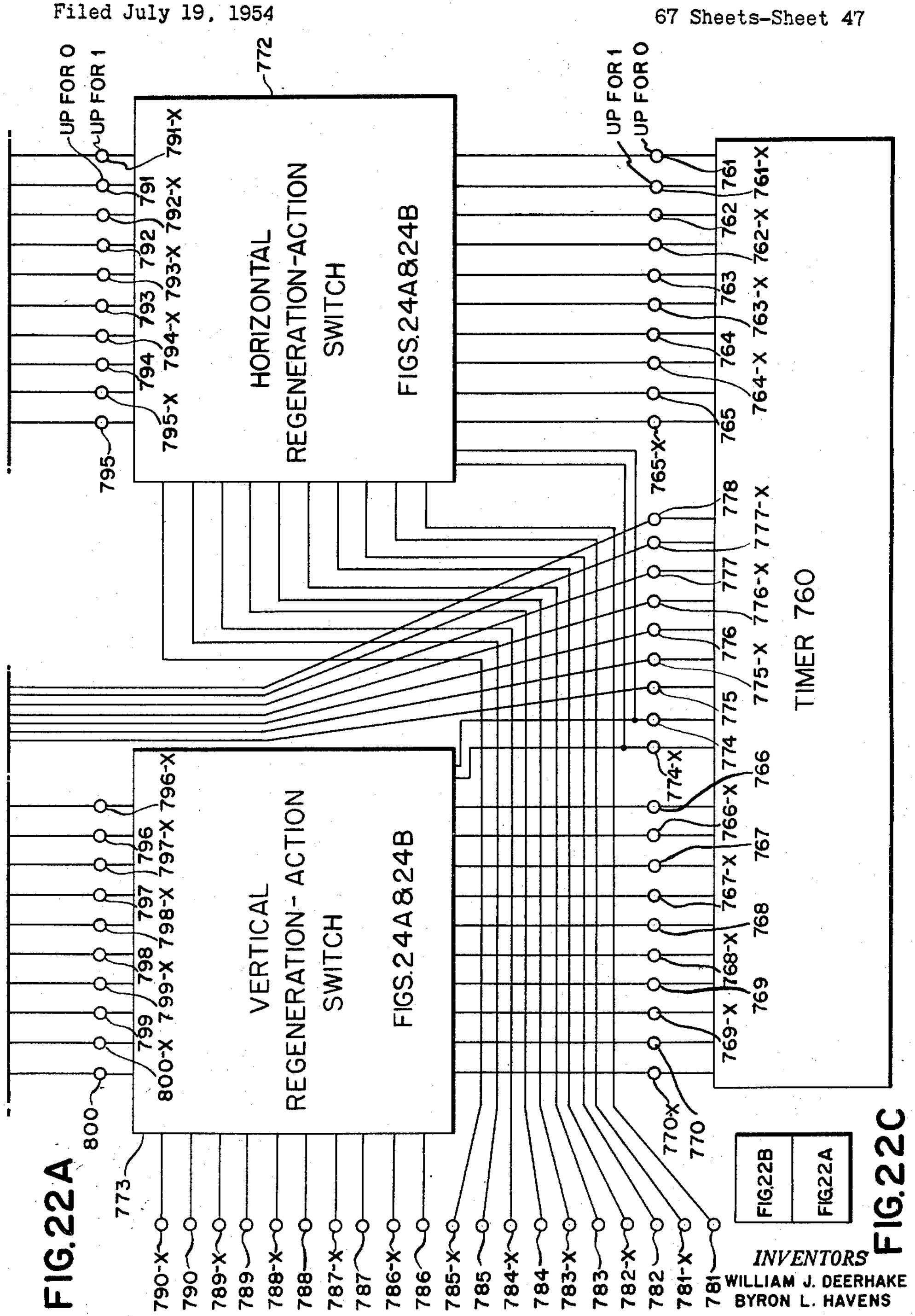
Figure 22B:
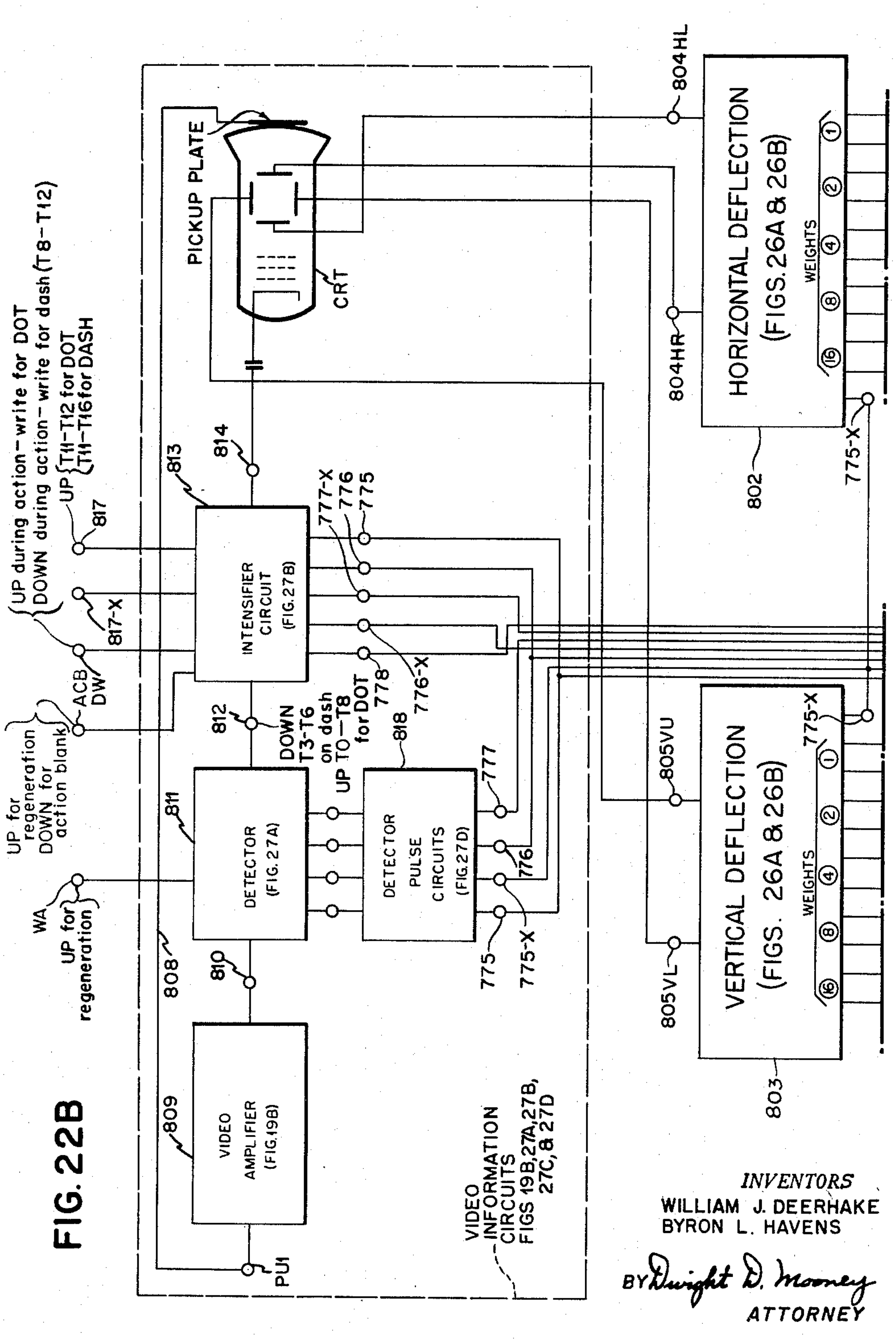
Figure 23:
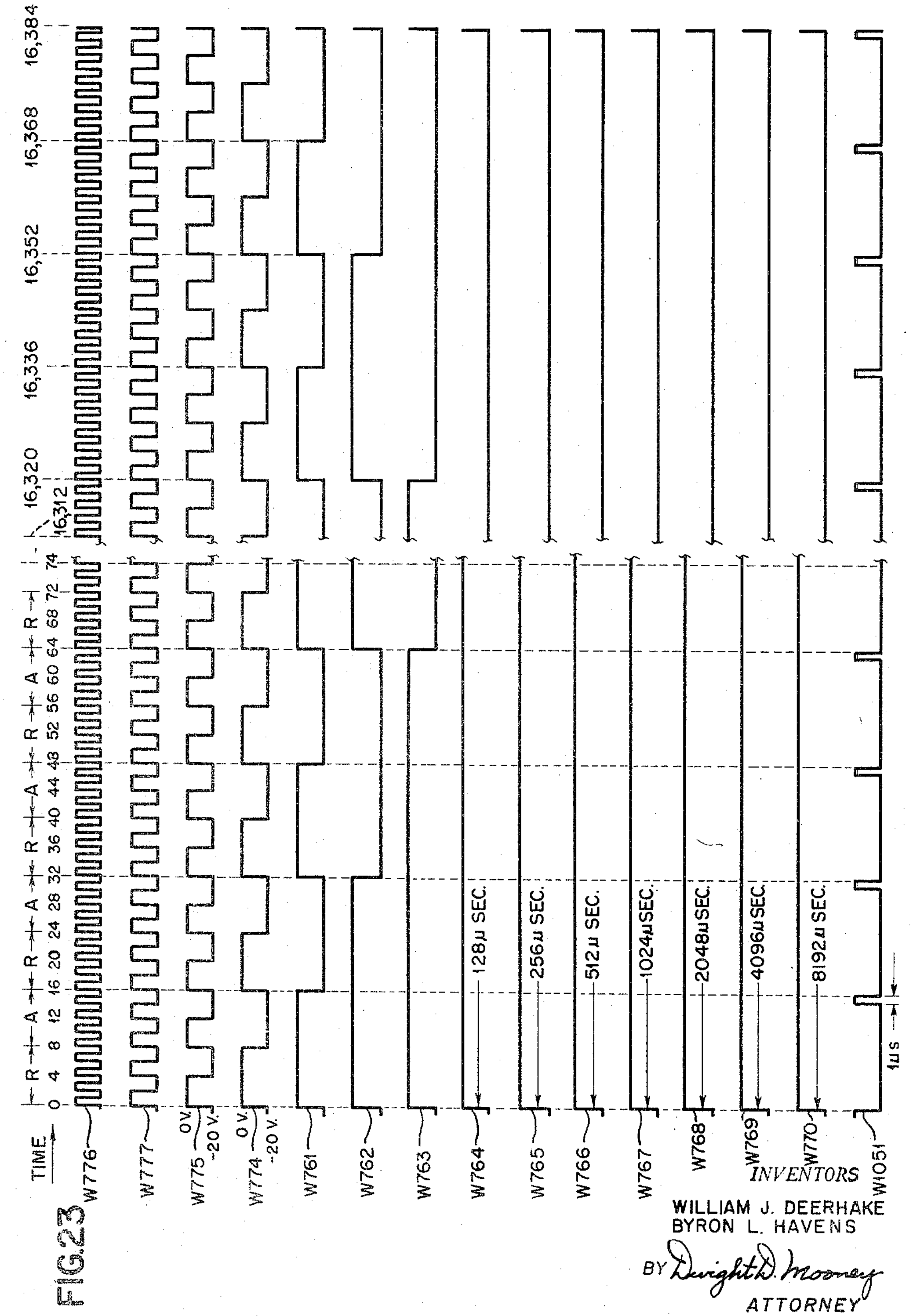
Figures 24A, 24C:
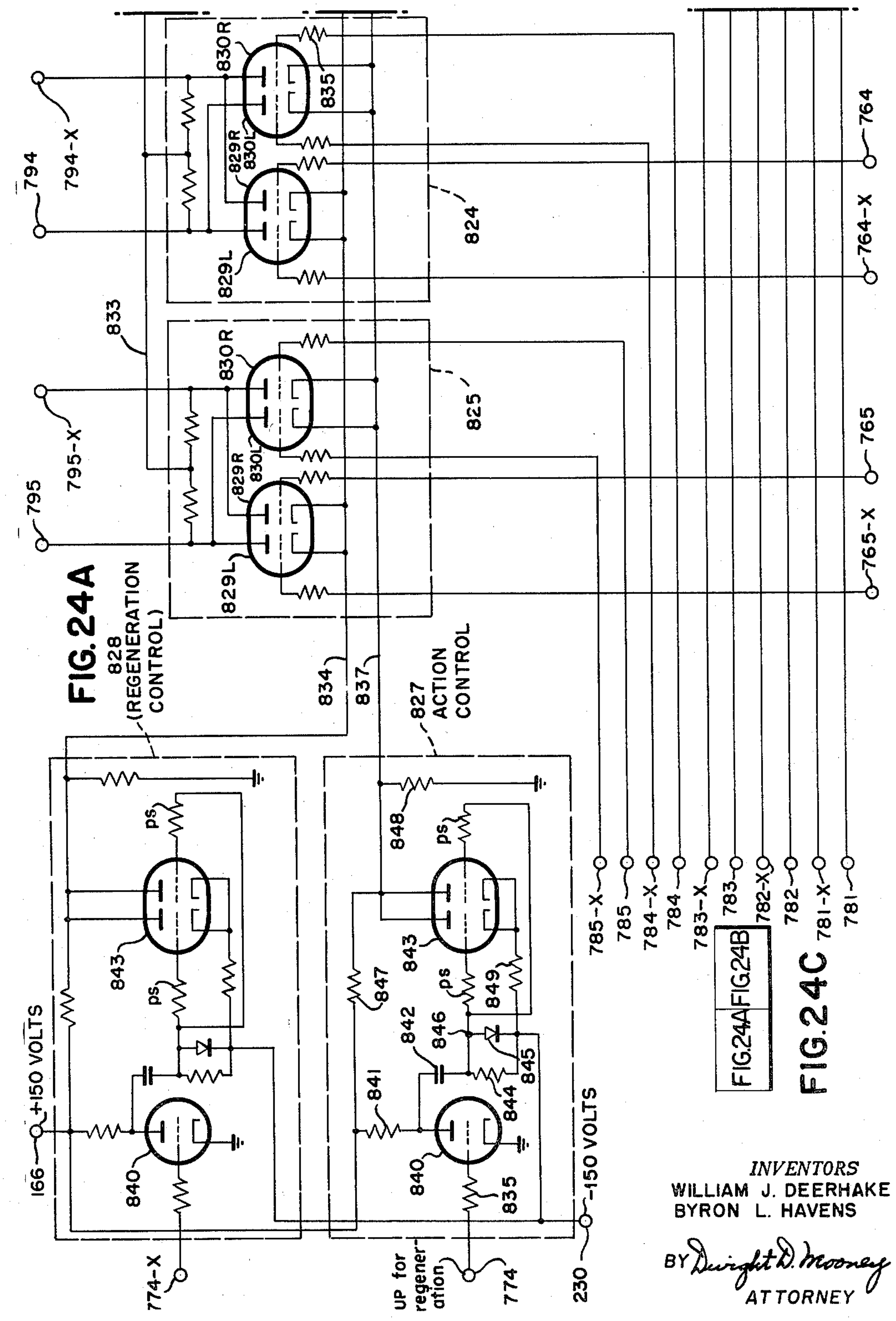
Figure 24B:
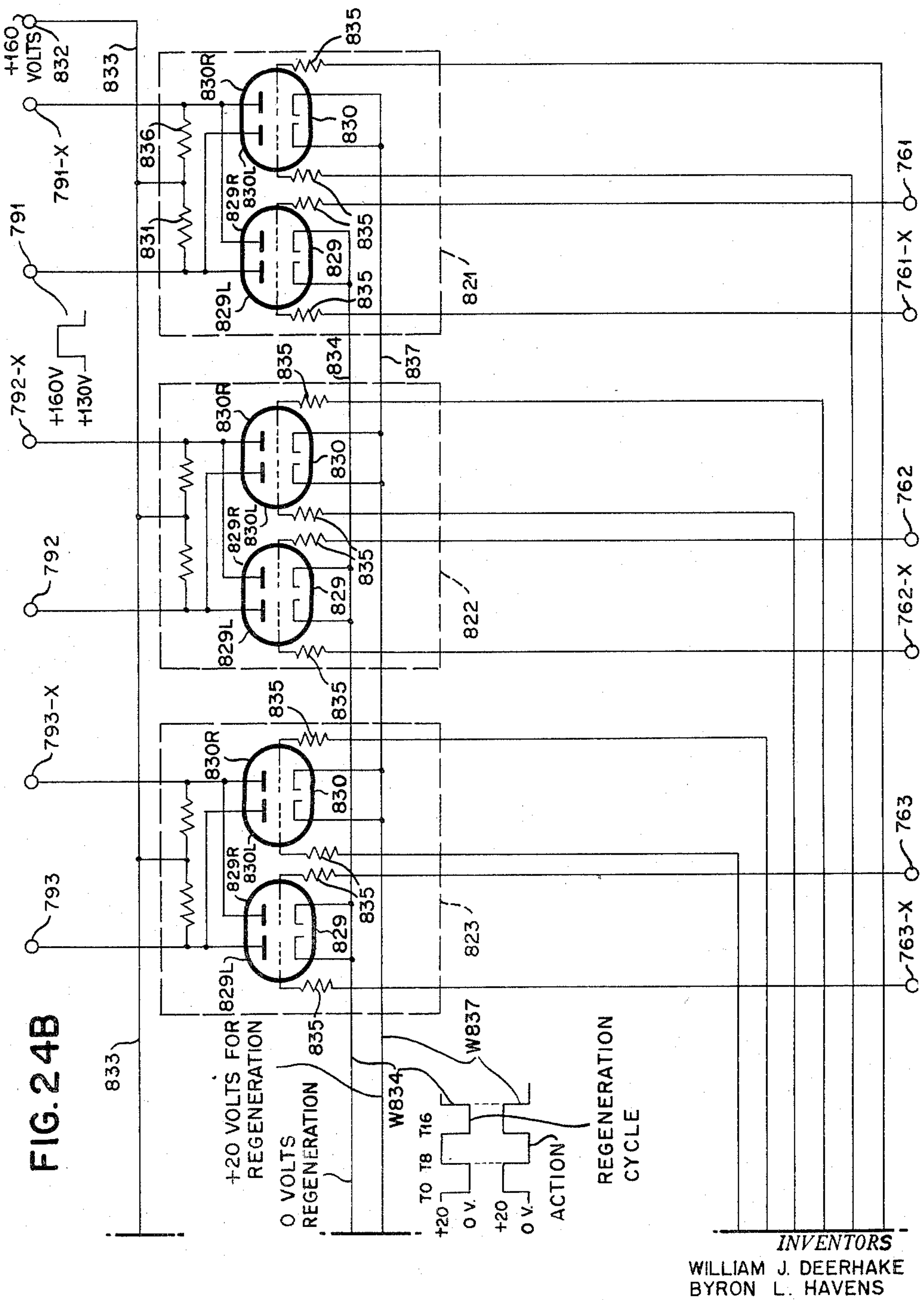
Figure 25:
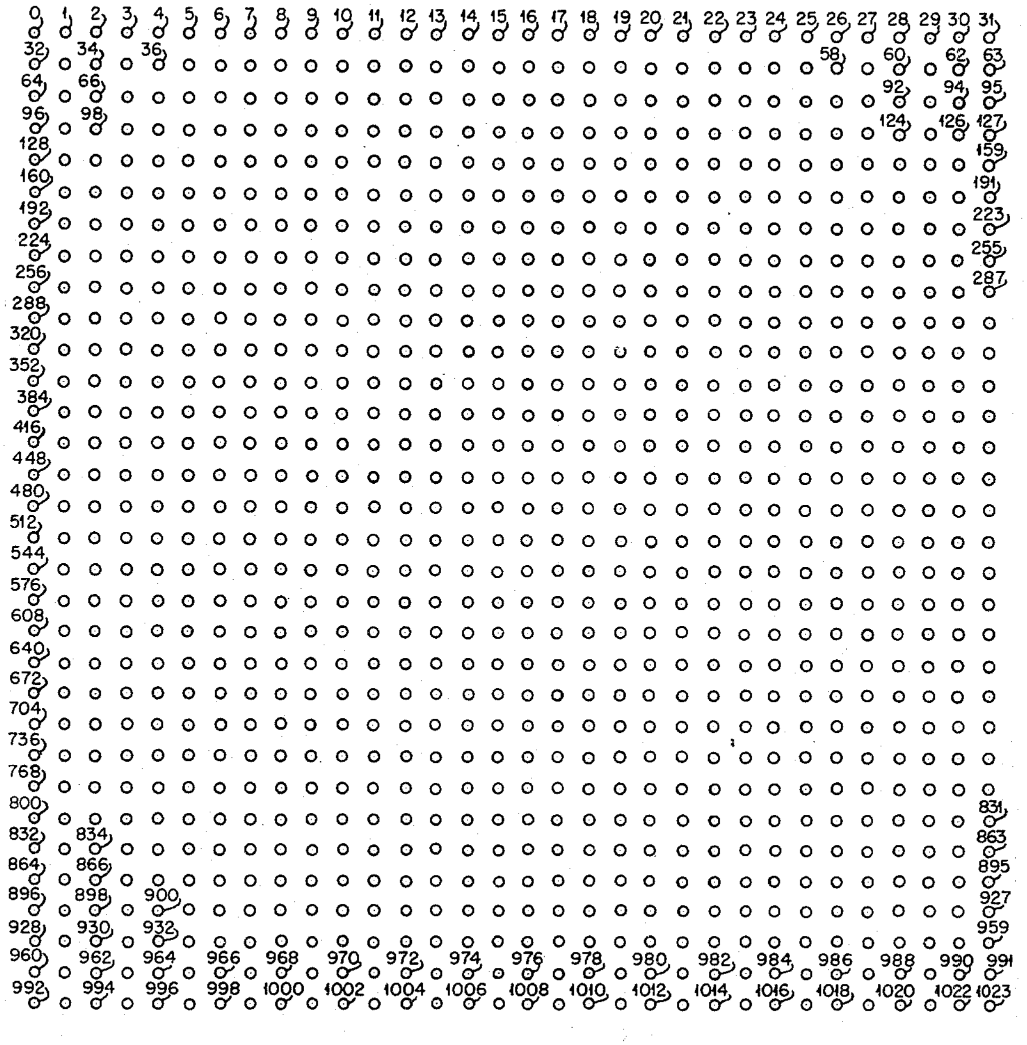
Figure 26A:
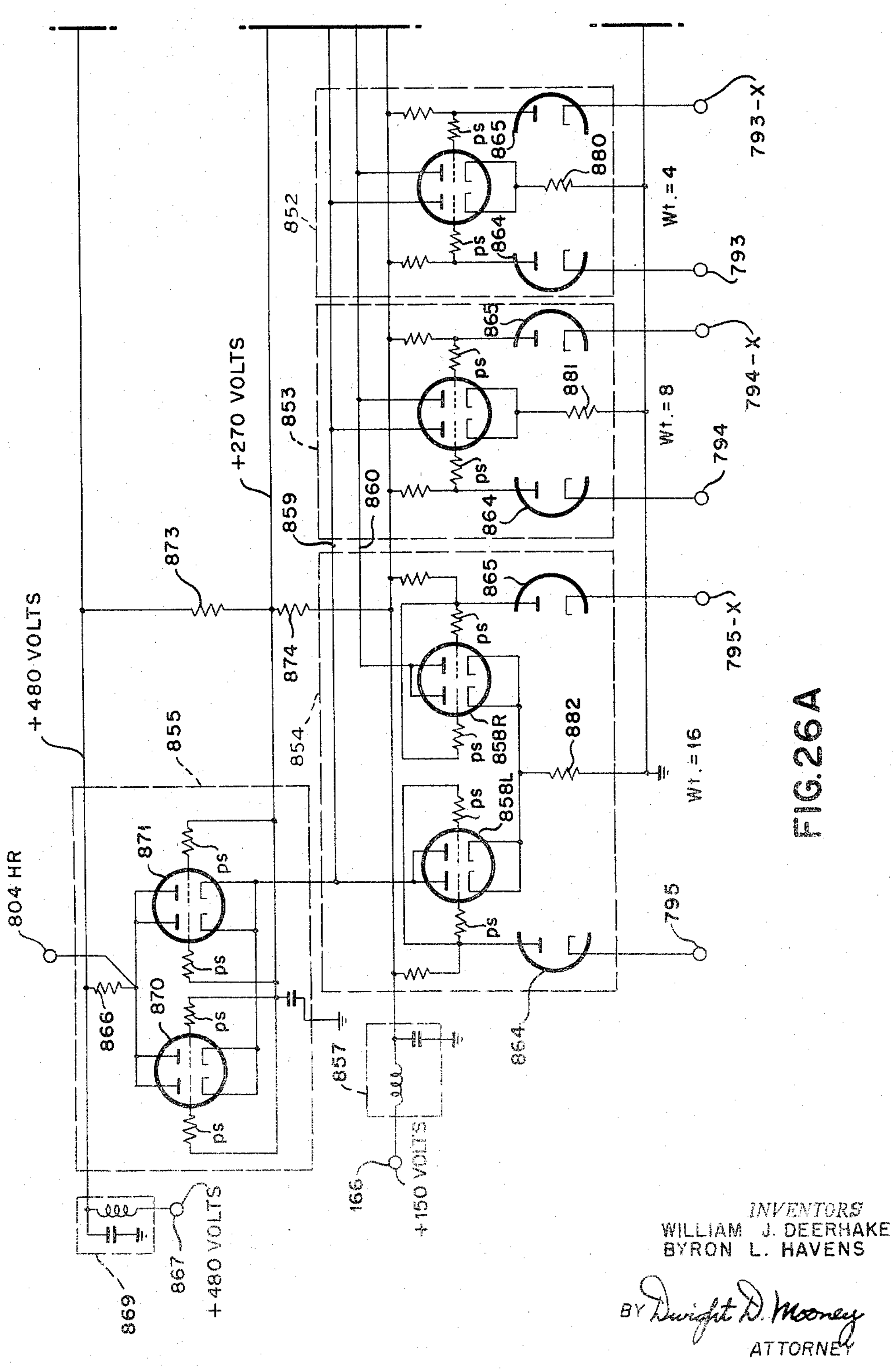
Figures 26B, 26C:
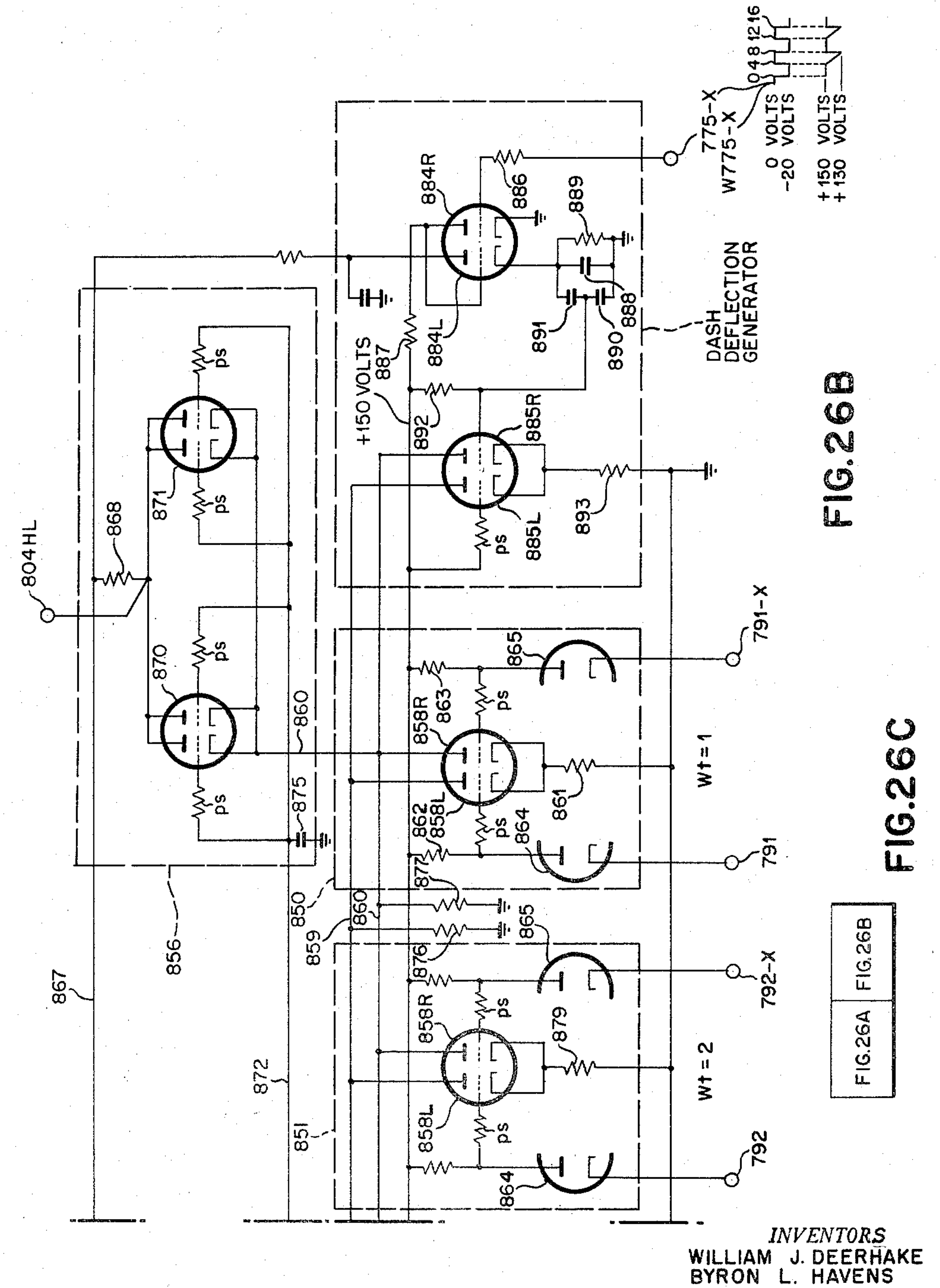
Figures 27A, 27E:
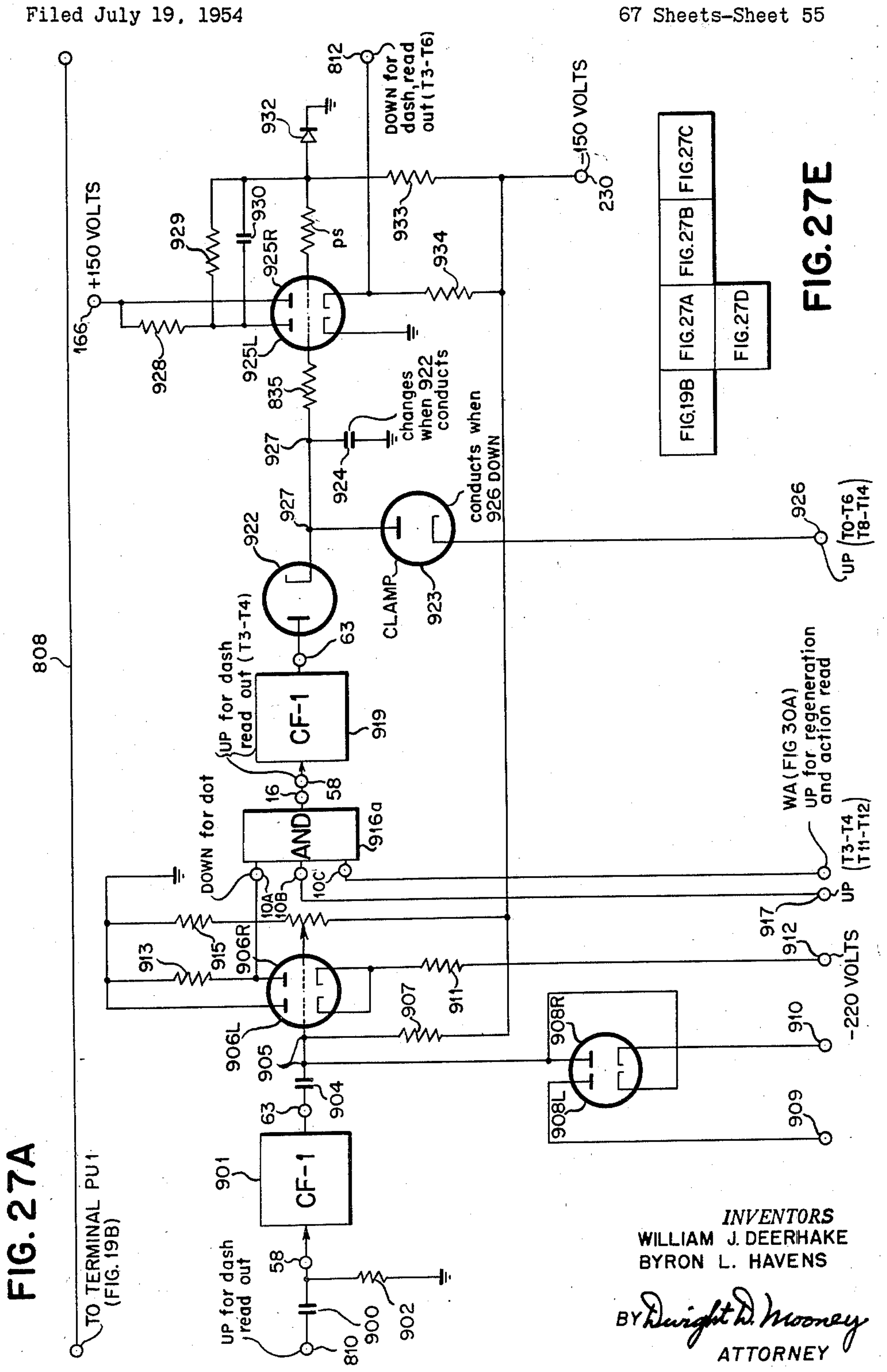
Figure 27B:
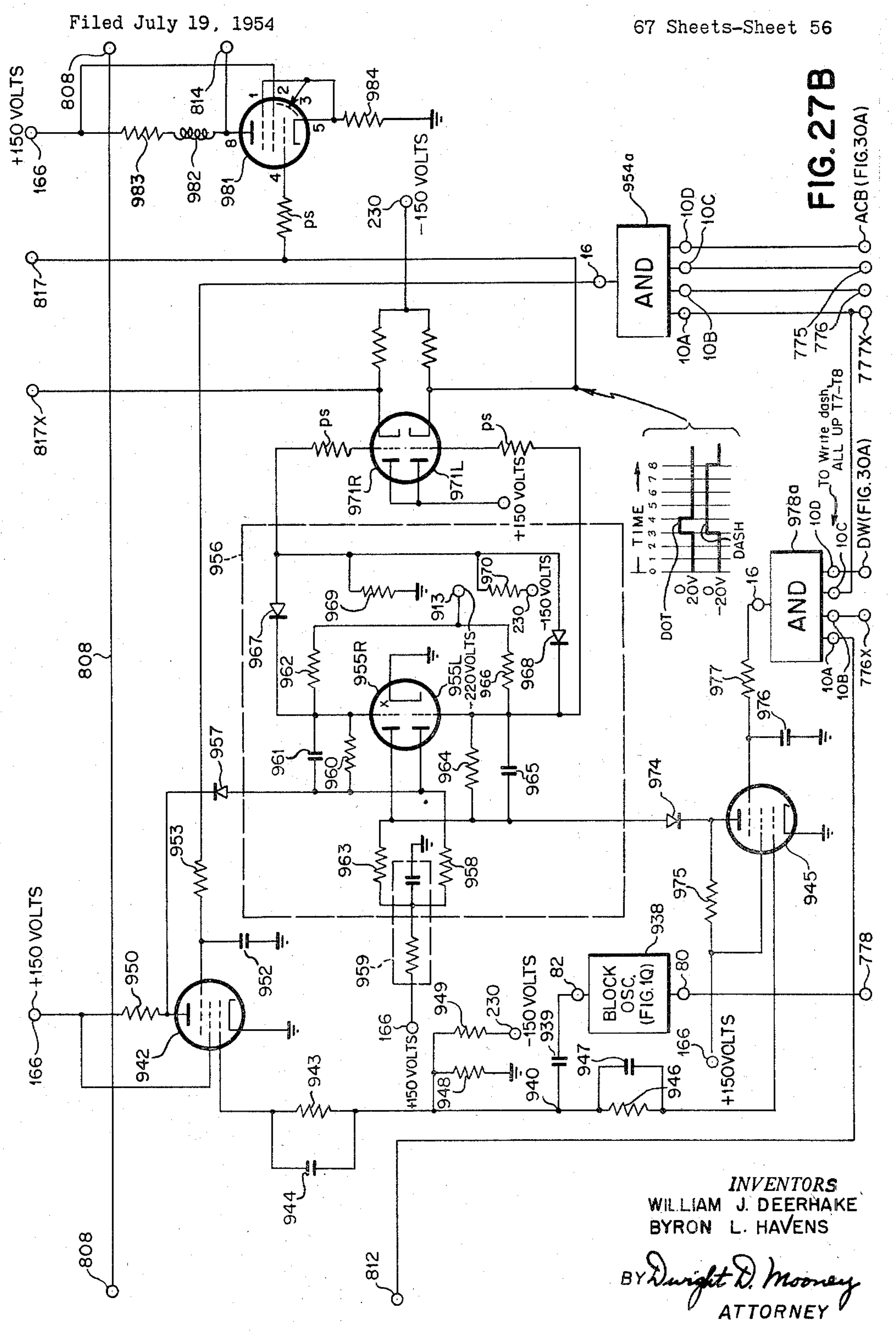
Figure 27C:
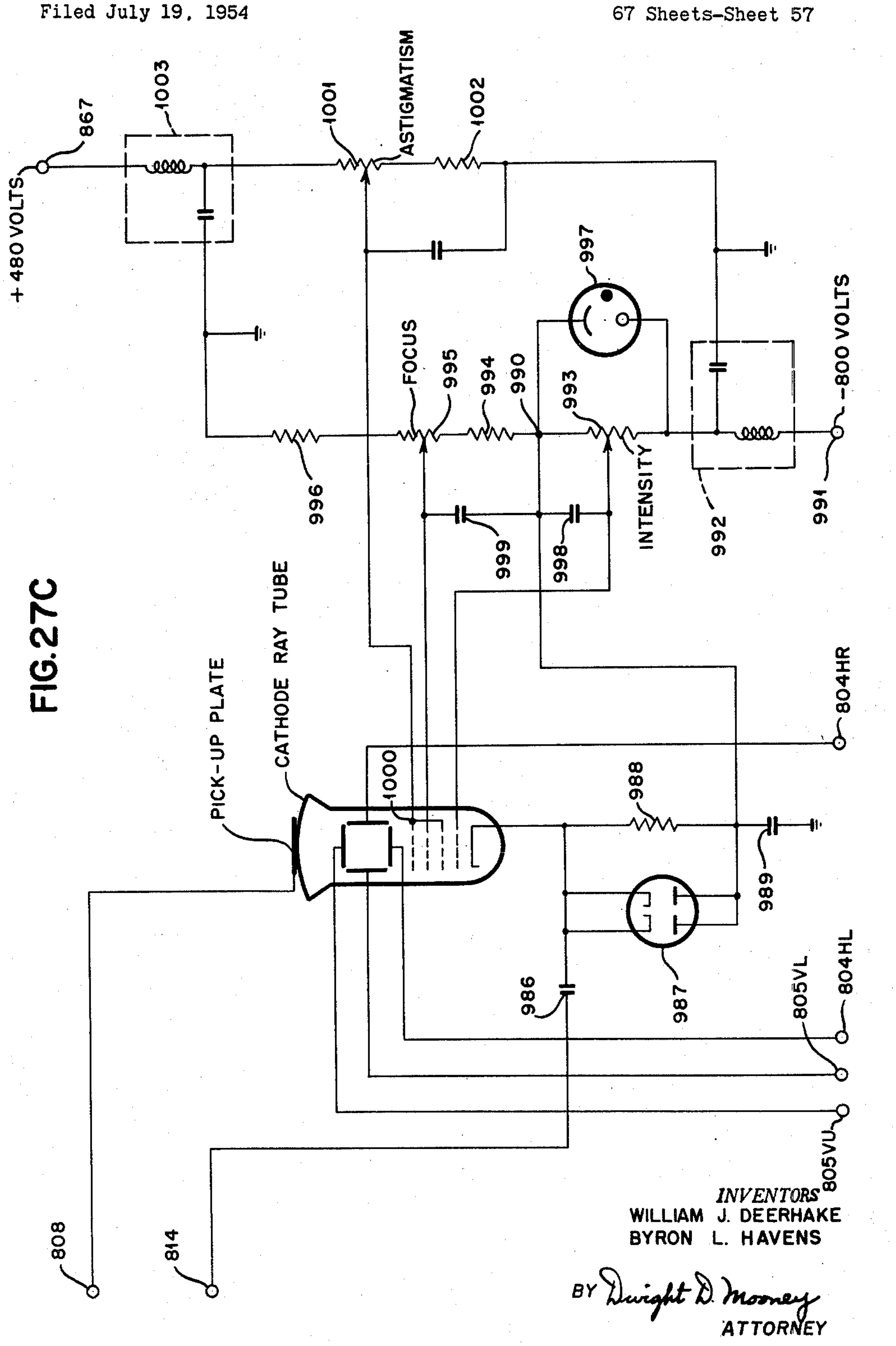
Figure 27D:
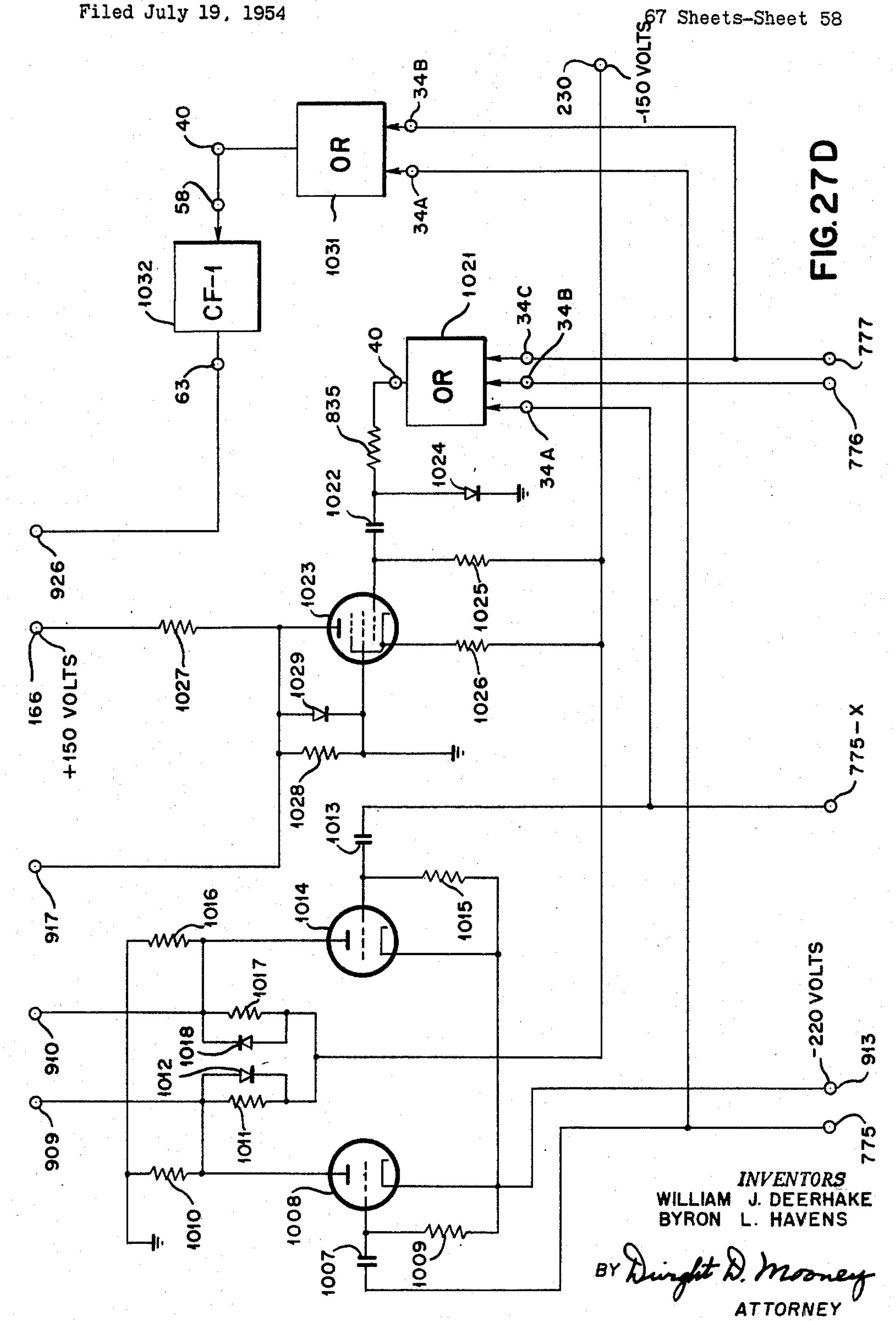
Figure 28A:
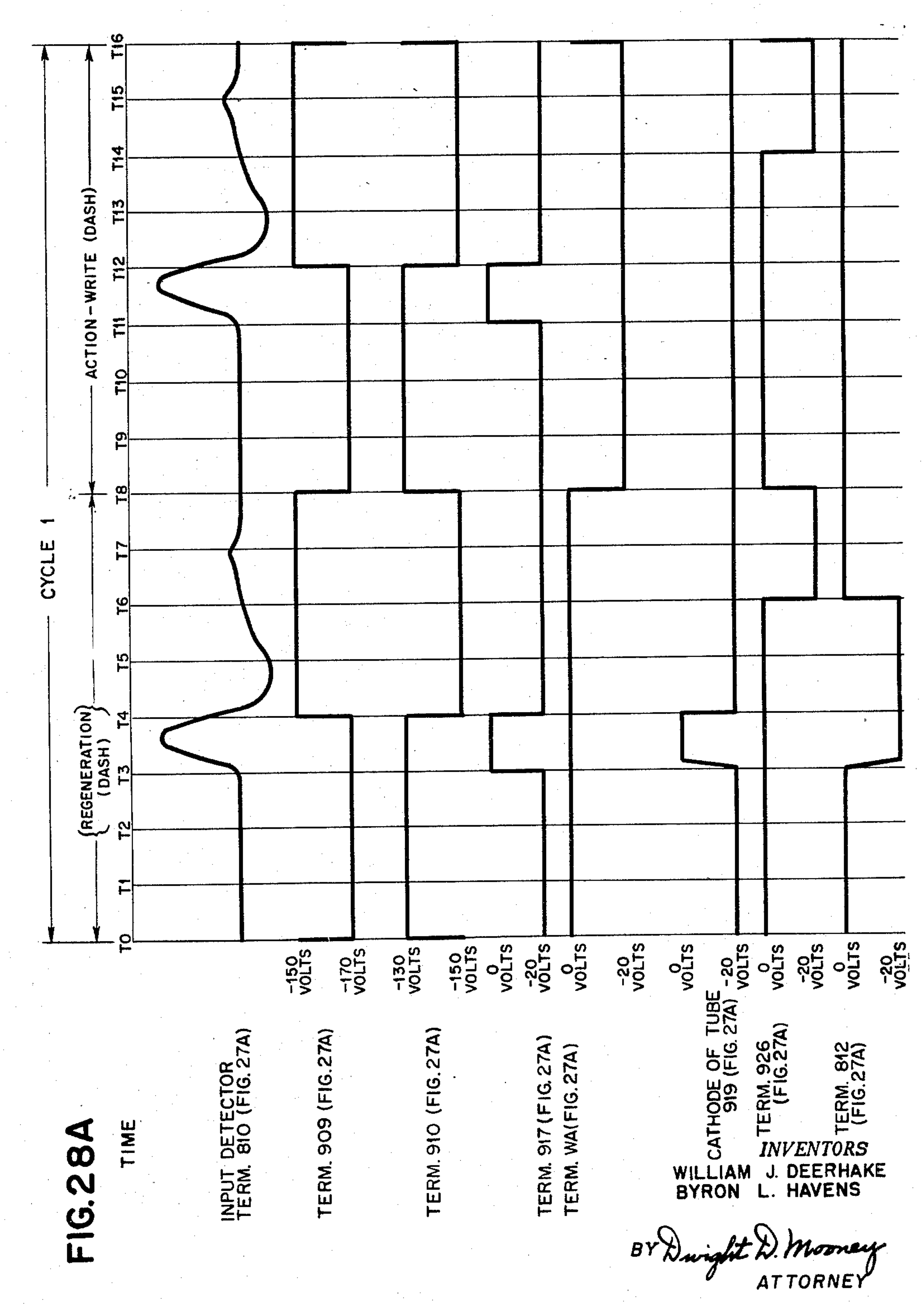
Figure 28B:
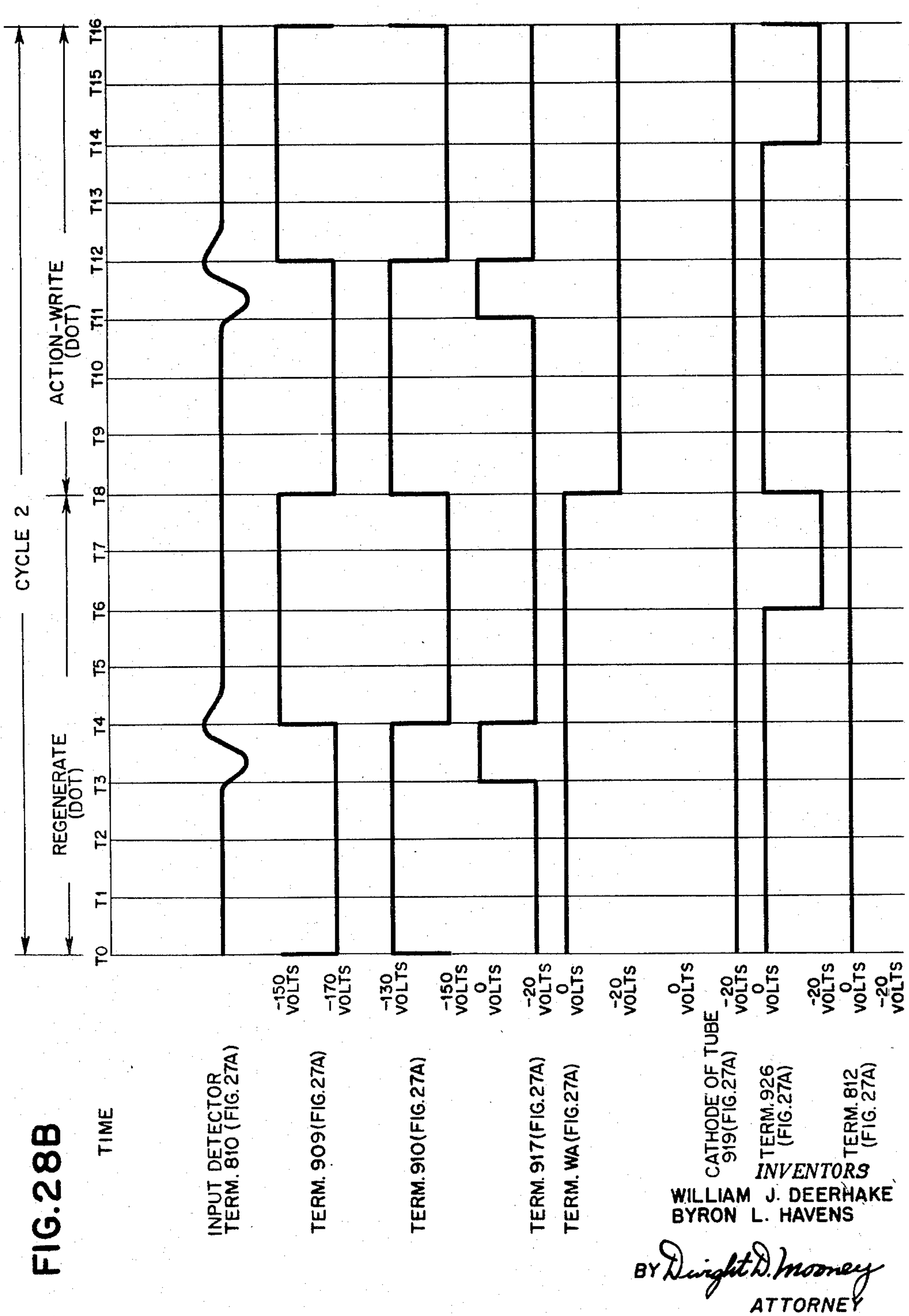
Figure 28C:
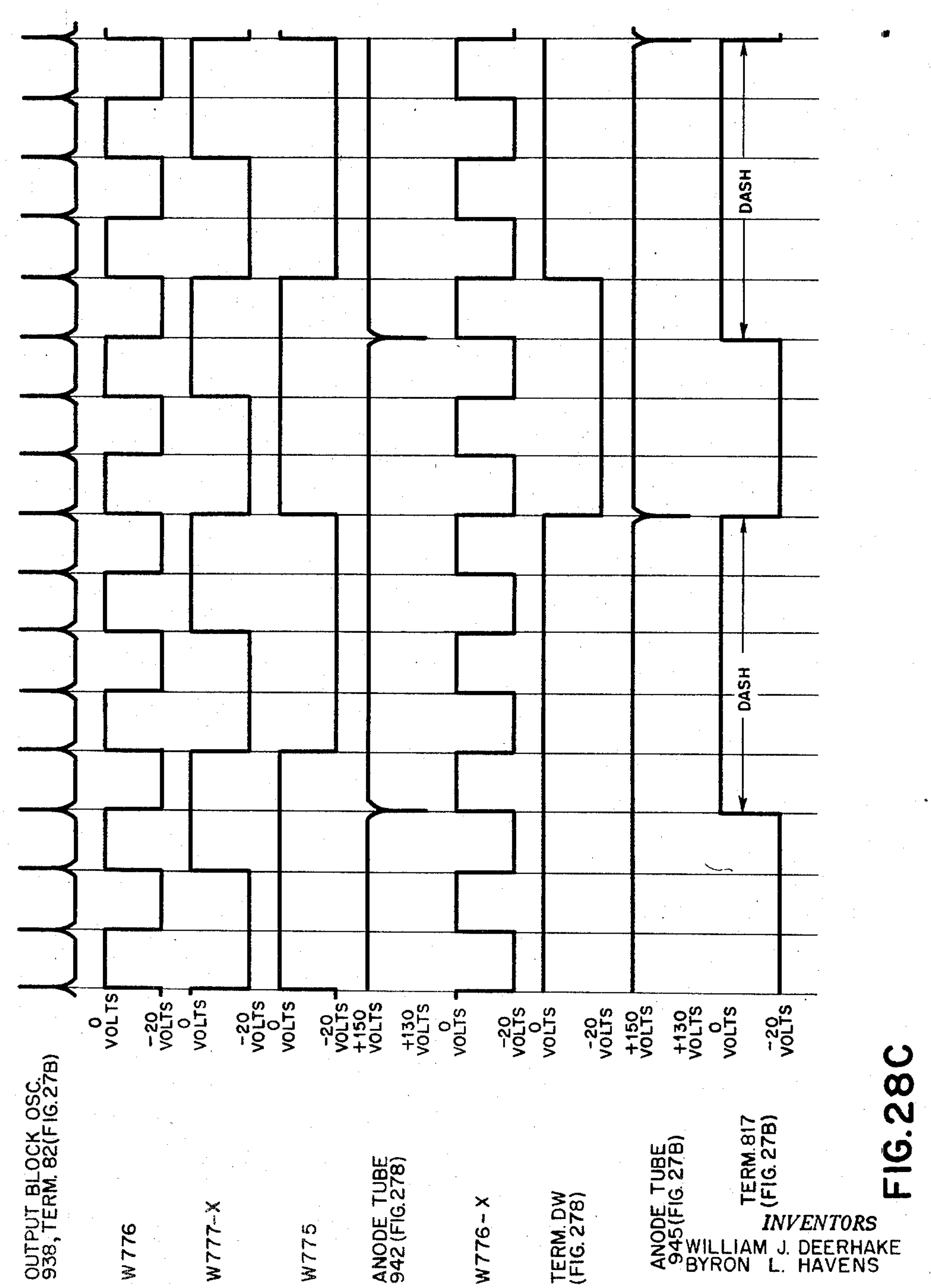
Figures 28D, 28E:
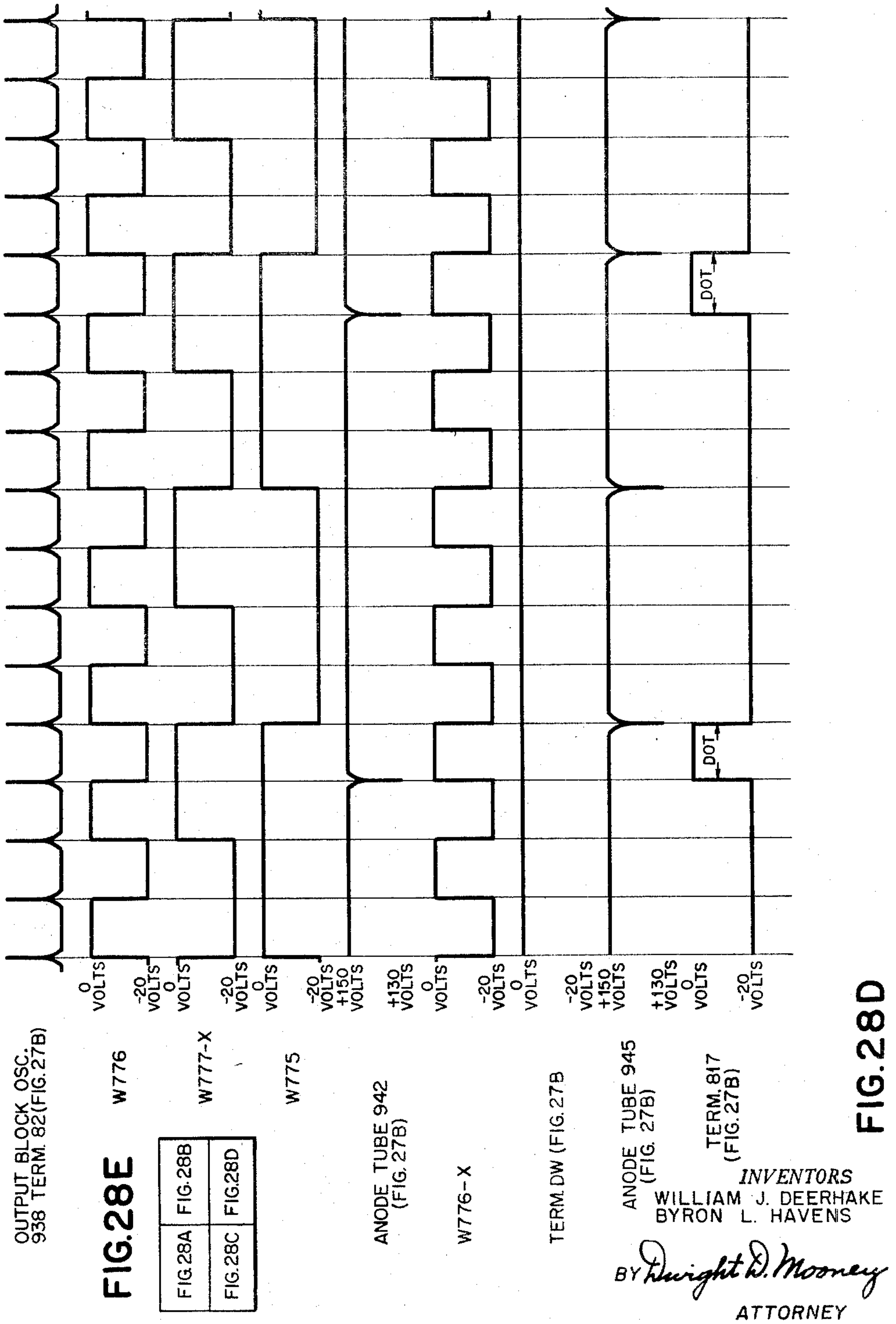
Figure 29:
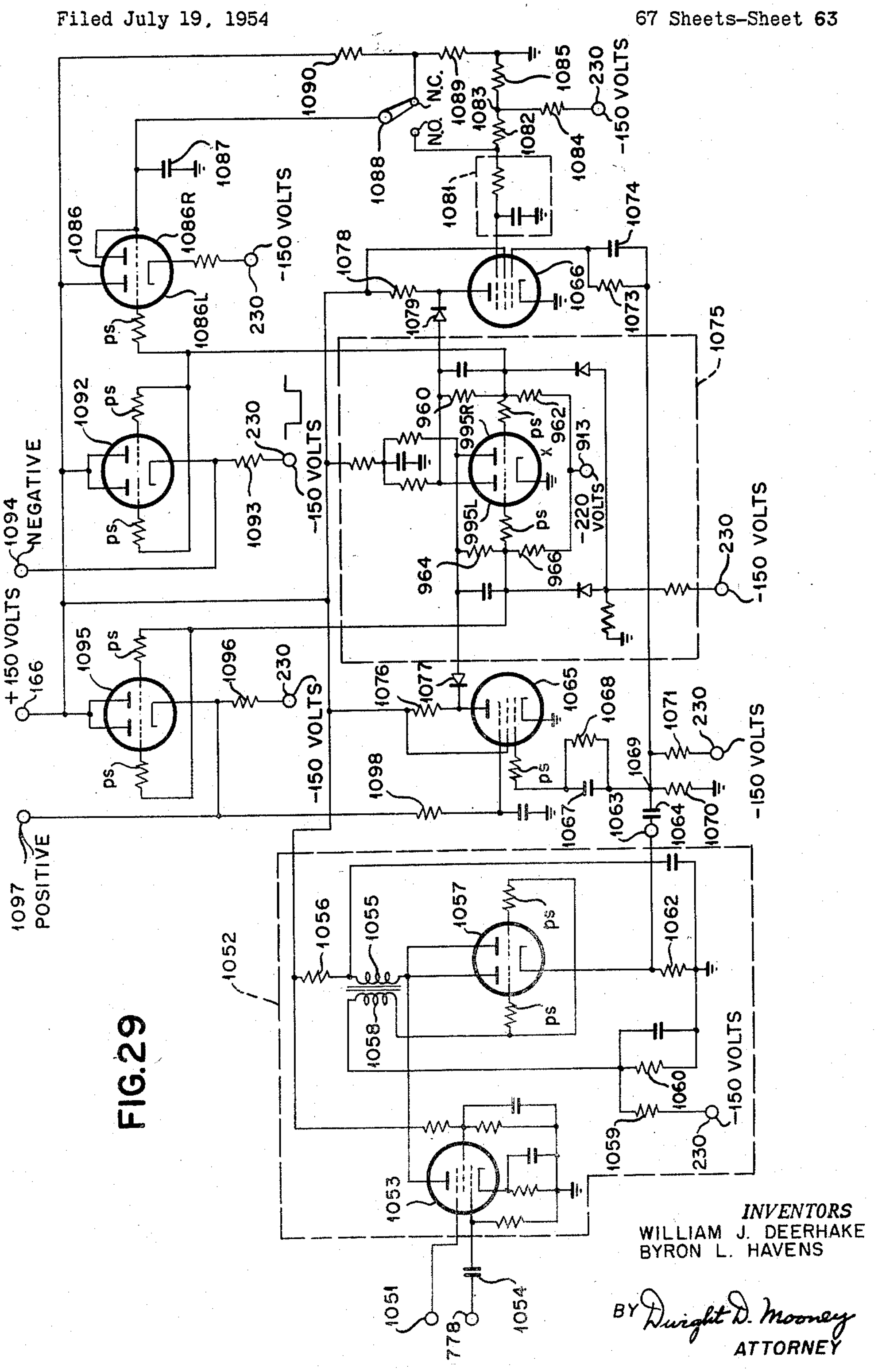
Figure 30A:
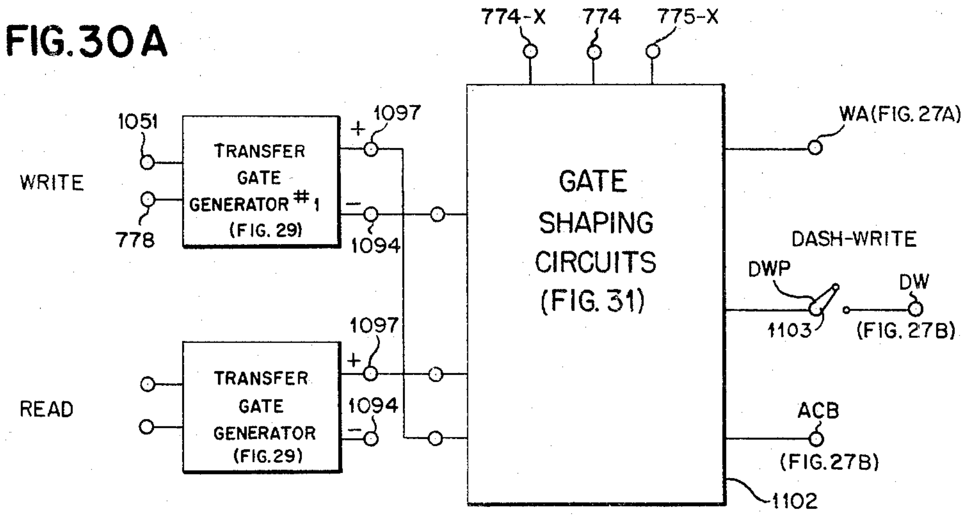
Figure 30B:
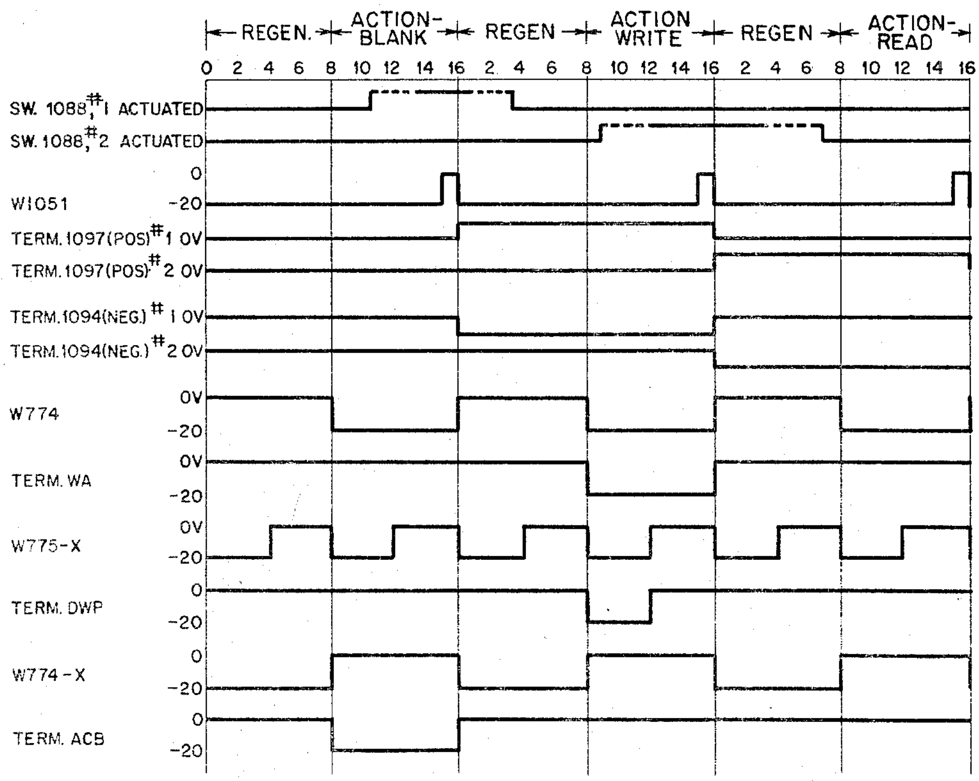
Figure 31:
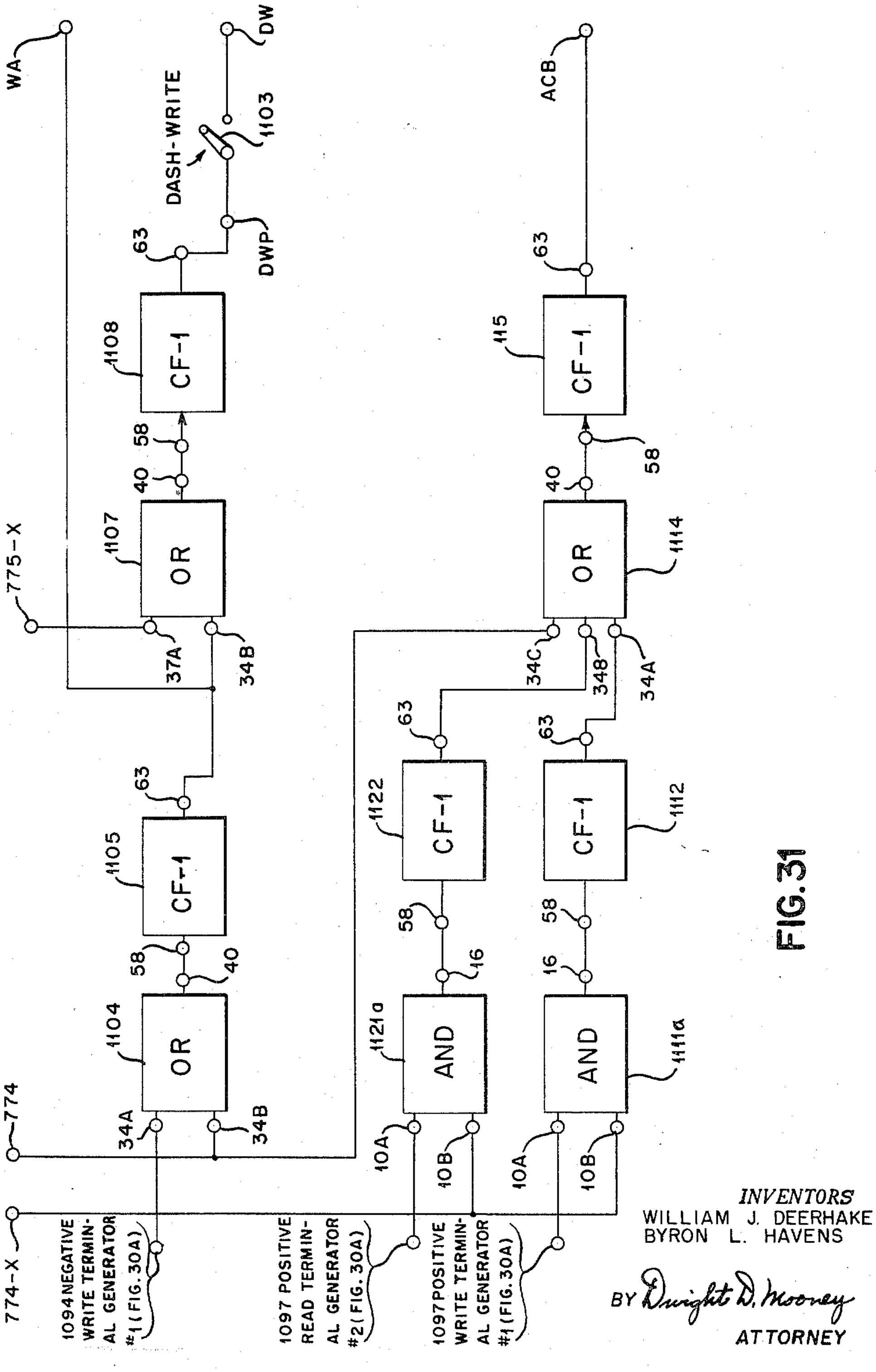
Figures 32A, 32B:
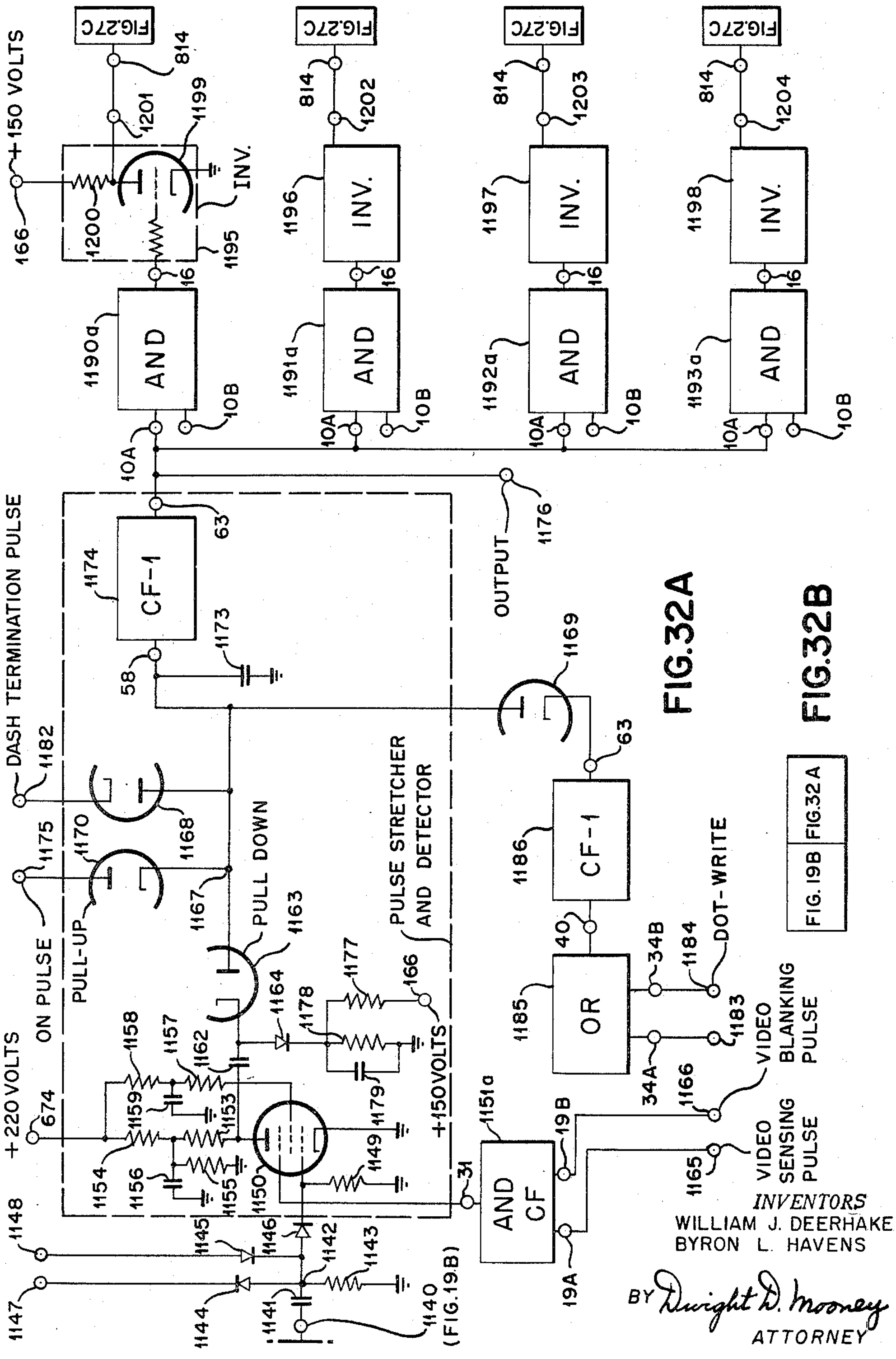
Figure 33:
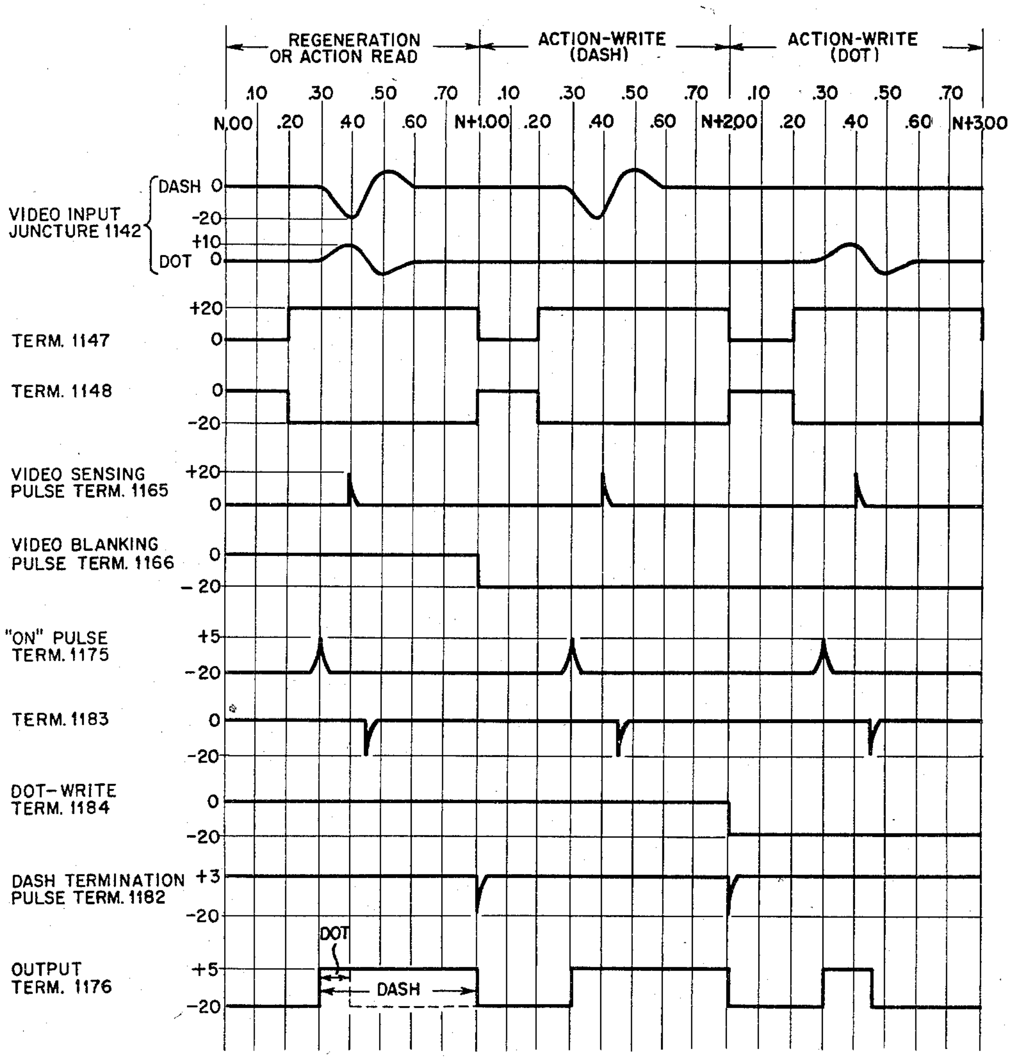

In the drawings:

Fig. 1A is a circuit diagram of a diode AND circuit typical of the type employed by the invention, Fig. 1B is a block diagram of the AND circuit shown in Fig. 1A, Fig. 1C is a circuit diagram of an improved AND circuit typical of those employed by the invention, Fig. 1D is a block diagram of the AND circuit shown in Fig. 1C, Fig. 1E illustrates the circuit diagram of an OR circuit typical of the type employed by the invention, Fig. 1F is a block diagram of the circuit shown in Fig. 1E, Fig. 1G is a circuit diagram of an OR circuit used by the invention, Fig. 1H is a block diagram of the OR circuit shown in Fig. 1G, Fig. 1I is a circuit diagram of a cathode follower typical of those employed by the invention, Fig. 1J is a block diagram of the cathode follower circuit of Fig. 1I, Fig. 1K illustrates another type of cathode follower circuit employed by the invention, Fig. 1L is a block diagram of the circuit shown in Fig. 1K, Fig. 1M shows an inverting circuit typical of those employed by the invention, Fig. 1N is a block diagram of the circuit shown in Fig. 1M, Fig. 1P is a circuit diagram of a blocking oscillator typical of those employed by the invention, Fig. 1Q is a block diagram of the circuit shown in Fig. 1P, Fig. 1R is a circuit diagram of a delay circuit employed by the invention, Fig. 1S shows waveforms illustrating the operation of the circuit of Fig. 1R, Fig. 1T is the block diagram of the delay circuit shown in Fig. 1R, Figs. 2A, 2B, 2C, 2D, and 2E, when arranged as illustrated in Fig. 2F, comprise a block diagram of the binary-decimal electrostatic storage system of the invention, Fig. 3 is a circuit diagram of a binary adder, Figs. 4A and 4B show in block diagram form, the circuit used to generate the clamp and sync pulses utilized by the delay circuit of Fig. 1R, Fig. 4C shows the waveforms present during operation of the circuit of Figs. 4A and 4B, Fig. 5A shows a single order of the regeneration counter employed by the invention, Fig. 5B is a circuit diagram of the clamp and sync inverters used in the counter of Fig. 5A, Figs. 5C and 5D, when arranged as shown in Fig. 5E, comprise a chart illustrating the operation of the circuit of Fig. 5A, Figs. 6A, 6B, 6C, and 6D, when arranged as shown in Fig. 6, show a four order regeneration counter, Figs. 7A, 7B and 7C, with Figs. 5C and 5D when arranged as shown in Fig. 8 comprise a chart illustrating the operation of the counter of Figs. 6A–6D, Fig. 9 is a circuit diagram of a pulse stretcher employed by the invention, Fig. 9A illustrates the waveforms present in the circuit of Fig. 9, Fig. 10 is a block diagram of a master octal commutator, Fig. 10A illustrates the interconnection of the octal commutator of Fig. 10 and two slave octal commutators, Fig. 11 is a circuit diagram of a pulse generator used in connection with the pulse stretcher of Fig. 9, Figs. 12A, 12B, 12C, and 12D illustrate the arrangement of the address locations on the faces of the cathode ray tubes of Fig. 2C, Fig. 13 is a chart which correlates the operation of the regeneration counter of Fig. 6 to the selection of the addresses illustrated in Figs. 12A–12D, Fig. 14 is a chart which illustrates the weight of the horizontal deflection applied to the cathode ray tubes, Fig. 15 is a chart which illustrates the weight of the vertical deflection applied to the cathode ray tubes, Figs. 16A and 16B, when arranged as shown in Fig. 16C, comprise the horizontal deflection circuit, Figs. 17A and 17B, when arranged as shown in Fig. 17C, illustrate the vertical deflection circuit, Fig. 18A illustrates the waveforms associated with the bit sweep generators included in Figs. 16 and 17, Figs. 18B and 18C illustrate the potential gradients present when information is stored on a cathode ray tube, Figs. 19B, 19C, 19D, 19E, 19F, 19G, and 19H arranged as shown in Fig. 19A comprise the video circuits of Fig. 2D, Fig. 20 illustrates the waveforms present in the video circuit arranged as shown in Fig. 19 during an action-read cycle, Fig. 21 illustrates the waveforms present in the video circuit arranged as shown in Fig. 19 during a read in action cycle, Figs. 22A and 22B, arranged as shown in Fig. 22C, comprise a binary type embodiment of an electrostatic storage system, Fig. 23 shows waveforms present at the output of the timer of Fig. 22A, Figs. 24A and 24B, when arranged as shown in Fig. 24C, comprise the circuit diagram of the regeneration-action switch shown in block diagram form in Fig. 22A, Fig. 25 illustrates the arrangement of the address locations utilized by the embodiment of Fig. 22, Figs. 26A and 26B, arranged as shown in Fig. 26C, form the circuit diagram of the deflection circuits of Fig. 22B, Figs. 27A, 27B, 27C, and 27D, when arranged in conjunction with Fig. 19B, as illustrated in Fig. 27E, comprise the video information circuits shown in Fig. 22B, Figs. 28A, 28B, 28C, and 28D, arranged as shown in Fig. 28E, show waveforms present in the circuit arranged as shown in Fig. 27E, Fig. 29 is the circuit diagram of a transfer gate generator, Fig. 30A is a block diagram of a circuit utilizing the transfer gate generator of Fig. 29 to manually control the circuits arranged as shown in Fig. 27E, Fig. 30B shows waveforms present in the circuit of Fig. 30A, Fig. 31 illustrates the gate shaping circuits of Fig. 30A, Figs. 32A and 19B, arranged as shown in Fig. 32B, comprise another embodiment of the video information circuits of an electrostatic storage system, Fig. 33 illustrates waveforms present in the circuit of Fig. 32A, Briefly, in the binary-decimal storage system shown herein, a regeneration counter is provided for generating sequential voltages representative of each binary-decimal digit from 0–1999 inclusive, corresponding to the 2,000 addresses. Four cathode ray tubes, each of which provides storage facilities for 500 binary bits, are connected in parallel to accommodate the storage of one binary bit at each of the 2,000 addresses. Hence 4 x 4 or 16 cathode ray tubes are required to effect the storage of one binary-decimal digit or position. A tube selector is employed to select one of each four parallel connected cathode ray tubes for operation during each cycle.

The output terminals of the regeneration counter and a similar group of terminals for receiving similar voltage values, from a suitable source such as a computer, are connected to the inputs of a two-position electronic address switch which permits transfer of voltages from the latter group of terminals during an action cycle when information is to be read in or out at preselected addresses and permits transfer of the voltages from the regeneration counter during a regeneration cycle when information stored is to be refreshed or regenerated. Each regeneration and action cycle is performed in eight microseconds. The regeneration cycle is continuously repeated unless an action cycle is called for by the application of a predetermined potential to the address switch.

Each of the one microsecond voltages supplied by the switch is applied to a pulse stretcher to provide a voltage present during the entire eight microsecond cycle and used for effecting the selective positioning of the electron beam and operation of the tube selector.

The outputs of the pulse stretchers are selectively connected through inverters to the horizontal and vertical deflection circuits and the tube selector to effect beam deflection and cathode ray tube selection in accordance with the binary-decimal digits represented by the various voltages. The various voltages are assigned weighted values consistent with the address raster employed and effect a horizontal or vertical beam deflection, as the case may be, in accordance with that weighted value.

These weighted values are transferred into actual beam deflection by similar horizontal and vertical deflection circuits which control the voltage at the horizontal and vertical deflection plates, respectively, of the cathode ray tubes. Each deflection circuit includes a group of switches for individually switching their current flow between two constant voltage lines having a current flow of constant value. Voltage stabilizing means are connected between each constant voltage line and the corresponding pair of deflection plates to provide a voltage change thereat proportional to the current change in that constant current line. Hence, beam deflections are provided in accordance with the voltages presented by the regeneration counter and the computer.

A binary 0 is stored as a dot and a binary 1 is stored as a dash. A dot is written by turning on the beam when it is stationary. A dash is written by first writing a dot followed by turning on the beam when it is selectively moved under the influence of a bit sweep generator.

In the defocus-dash system shown the beam is defocused when a dot is written and focused only during the movement of the beam when a dash is written.

A pickup plate is in abutment with the face of each cathode ray tube to effect read out therefrom. The signal read out is applied to a video amplifier and if positive represents a dash and if negative represents a dot.

The turning on of the beam to effect read out causes a new dot to be written. Hence, if the output of the video amplifier is negative the beam is then turned off and if positive the beam is allowed to remain on to effect destruction of the new dot and the writing of a dash.

Detector means are employed to determine whether the signal is a dot or dash. The resulting manifestation is stored in a pulse stretcher which indicates the presence of a dot or a dash by a signal of a predetermined time duration appearing at a certain terminal. Circuits connect this terminal to a data line terminal which is Up during a certain time to indicate a dash and Down during that time to indicate a dot. If a dash is present a dash termination pulse effects circuits to cause the electron beam to be cut off at the beginning of the next cycle after the storing or regeneration of the dash is completed. Hence, the circuit operation during a regeneration cycle and an action read out cycle is identical.

An action read in cycle is initiated by causing a read in control terminal to be Up. This permits the stored information to be again read out at the data line terminal and prevents that information from being again stored. The new information to be stored is applied to the data line terminal and transferred into storage.

*Circuits frequently employed*

Referring more particularly to Fig. 1A, a schematic circuit diagram of a diode AND circuit is illustrated. The diode AND circuit comprises the input terminals designated as a 10 followed by a letter, the diodes 11–13 inclusive, the pull-up resistor 14, and the output terminal 16. The input terminals 10A, 10B, and 10C are connected respectively to the cathodes of the diodes 11, 12, 13 and the anodes of these diodes are connected together at a juncture 15. It is seen that any desired number of diodes can be used and that this number is equal to the number of input terminals desired. The pull-up resistor 14 is connected between the positive voltage terminal B+ and the juncture 15. If one or more of the input terminals are Down, or at say −30 volts, the juncture 15 and the output terminal 16 are Down. When all of the input terminals 10A–10C are Up simultaneously, the juncture 15 and the output terminal 16 are Up. Fig. 1B is a block diagram representation which will be used hereinafter to represent the diode AND circuit of Fig. 1A. The direction of the arrowheads in Fig. 1B indicates the direction of progress of a given signal pulse.

Fig. 1C represents an improved type AND circuit which comprises the input terminals 19, the diodes 20–22 inclusive, the pull-up resistor 24, and the cathode follower tube 26. The input terminals 19A–19C are connected respectively to the cathodes of the diodes 20–22. The anodes of these diodes are connected together and to the juncture 23 which is connected through the parasitic suppressing resistor *ps* to the grid of the tube 26. The anode of tube 26 is connected through the decoupling resistor 27 to the positive high voltage terminal B+, and to ground through capacitor 28. The resistor 27 and the capacitor 28 serve conjointly as a decoupling circuit between the high voltage supply and the anode of the cathode follower. The cathode of the cathode follower is connected through the resistors 29 and 30 to the terminal B−. The resistors 29 and 30 serve as a voltage dividing network which places the output terminal 31 at the proper potential. If all of the input terminals are Up simultaneously, the juncture 23 and the grid of the cathode follower 26 are Up so as to cause the output terminal 31 to be Up. The cathode follower tube 26 of Fig. 1C is used whenever it is desired to provide isolation between the input terminals and the output terminal 31, or whenever the current requirements of a load connected to terminal 31 are such that they should be supplied by a cathode follower. A block diagram of the circuit of Fig. 1C is shown in Fig. 1D where the input terminals are designated 19A–C and the output terminal is designated 31. The initials CF shown in Fig. 1D indicate the presence of a cathode follower. When one or more of the input terminals 19 are Down or at approximately −30 volts, the output terminal 31 is Down. It should be understood that the diode AND circuit of Fig. 1A and the AND circuit of Fig. 1C are functionally similar in operation and can be used interchangeably unless a circuit requirement indicates necessity of the cathode follower tube 26 of Fig. 1C.

Referring to Fig. 1E the diode OR circuit comprises the input terminals 34, the diodes 35–37 inclusive, and the pull-down resistor 38. A plurality of input terminals are connected respectively to the anodes of the diodes 35–37 and the cathodes of these diodes are connected together at juncture 39. It should be understood that more or less than the number of diodes shown can be used according to the number of input terminals desired. The pulldown resistor is connected between terminal B− and juncture 39. When one or more of the input terminals 34A–C are Up or at approximately 45 volts, the juncture 39 and the output terminal 40 are Up, or at 45 volts. However, if all of the input terminals 34 are Down or at approximately −30 volts, the juncture 39 and the output terminal 40 are Down or at −30 volts. A block diagram of the diode OR circuit of Fig. 1E is shown in Fig. 1F.

The schematic diagram of another OR circuit is illustrated in Fig. 1G and comprises a plurality of input terminals 43, the diodes 45–47 inclusive, the pull-down resistor 49, and the cathode follower tube 51. The cathodes of the diodes 45–47 are connected together and to juncture 48 connected through the parasitic suppressing resistor *ps* to the grid of the tube 51. The cathode of this tube is connected through the voltage dividing resistors 52 and 53 to the terminal B−. The output 54 of the OR circuit is taken from the juncture of resistors 52 and 53. The anode of tube 51 is connected through the decoupling components 55 to the terminal B+. When one or more of the input terminals 43A–C are Up or at approximately +5 volts, the juncture 48 and consequently the grid of the tube 51 are Up and the output terminal 54 is Up or at approximately +5 volts. Conversely, if all the input terminals 43 are Down, the output terminal 54 is Down. It is understood that the operation of the diode OR circuit of Fig. 1E and the OR circuit of Fig. 1G are functionally similar and these circuits may be interchanged unless circuit requirements indicate that the cathode follower tube 51 of Fig. 1G is necessary. The block diagram of the OR circuit of Fig. 1G is shown in Fig. 1H. The initials CF in Fig. 1H indicate the presence of a cathode follower, and thereby distinguish Fig. 1H from Fig. 1F.

Referring to the cathode follower circuit of Fig. 1I, the input terminal 58 is connected through the parasitic suppressing resistor *ps* to the control grid of the tube 60. The cathode of the cathode follower tube 60 is connected through the voltage dividing resistors 61 and 62 to the terminal B−. The output terminal 63 is connected to the juncture between the resistors 61 and 62. The anode of the cathode follower 60 is connected through the decoupling circuit 64 to the terminal B+. If the input terminal 58 is Up or at approximately +5 volts the output terminal 63 is Up or at approximately +5 volts. Conversely, if the input terminal 58 is Down or at approximately −30 volts, the output terminal 63 is Down or at approximately −30 volts. Hence, the cathode follower circuit is a non-inverting circuit operable to produce a positive voltage at its output terminal when the input terminal has a positive voltage applied thereto. The cathode follower circuit of Fig. 1I is normally used for isolation purposes or as a current driving unit where a particular signal source cannot supply the necessary current. Fig. 1J is a block diagram of the cathode follower circuit of Fig. 1I.

Fig. 1K shows a modification of the cathode follower circuit of Fig. 1I wherein the resistor 61 and the decoupling circuit 64 of Fig. 1I have been removed. The operation of the cathode follower of Fig. 1K is similar to that described for Fig. 1I. The block diagram used to represent the circuit of Fig. 1K is shown in Fig. 1L. The initials CF–1 shown in Fig. 1L are used to distinguish the circuit from Fig. 1J in which the initials CF are used.

Fig. 1M illustrates an inverting circuit which produces a negative voltage pulse at its output terminal when a positive voltage pulse is applied to the input terminal thereof. The input terminal 67 is connected through the parasitic suppressing resistor *ps* to the grid of the tube 69L. If the input terminal 67 is Up the grid of tube 69L is Up, thereby rendering this tube fully conducting. The anode of tube 69L is connected through the anode load resistor 70 and the decoupling circuit 71 to the terminal B+. The voltage dividing resistors 72 and 73 are connected between the anode of tube 69L and the terminal B− and direct couple the grid of tube 69R to the anode of tube 69L. A frequency compensating coupling capacitor 75 is connected in parallel with resistor 72. If the tube 69L is fully conducting, its anode is Down and the grid of tube 69R is Down. This causes the tube 69R to become less conductive. Since tube 69R is operating as a cathode follower, the output terminal 76 connected to its cathode is Down. Whenever the input terminal 67 is Down, the inverting tube 69L is cut off causing its anode to be at the B+ potential. The action of the voltage dividing resistors 72 and 73 cause the grid of the cathode follower tube 69R to be Up so that the output terminal 76 is Up. Fig. 1N is a block diagram of the circuit of Fig. 1M.

Referring to Fig. 1P a conventional blocking oscillator of the variety shown and described in the following reference is shown: Fig. 6–1, page 207, vol. 19, Wave Forms, Radiation Laboratory Series, McGraw-Hill, first edition, 1949. In Fig. 1P the tube 81R serves as the blocking oscillator. The tube 81L serves as a triggering tube. Briefly, by applying a positive pulse to the input terminal 80, the tube 81L is caused to become fully conducting, thereby triggering the blocking oscillator circuit so as to produce a positive pulse at the output terminal 82. For all practical purposes it is considered that the positive output signal appearing at terminal 82 occurs at the same time that the positive input pulse is applied to terminal 80. The purpose of the blocking oscillator is to provide a large current pulse in response to an application ofa voltage pulse at the terminal 80. A block diagram of the circuit of Fig. 1P is shown in Fig. 1Q.

Referring to Fig. 1R, the delay circuit is shown in U.S. Patent Reissue 23,699, issued August 18, 1953. The curves of Fig. 1S demonstrate the operation of the circuit shown in Fig. 1R. In order to facilitate the description, the time axis (abscissa) is divided into equal time intervals designated T1, T2, T3, T4, and T5 respectively. The length of each of these time intervals is dependent upon the particular circuit design. As an example, each time interval may be approximately one microsecond duration.

Briefly, an input pulse (Fig. 1S) is applied to the input terminal 154 of the circuit shown in Fig. 1R during one preselected time interval and produces an output pulse (Fig. 1S) at the output terminal 156 during the next subsequent time interval. An input pulse may be applied to the input terminal 154 during the same time interval (T3, for example) that an output pulse is produced at the output terminal 156. The flyback produced by an input pulse is used to set up the output pulse and the circuitry is such that there is complete isolation between the output and input pulses during any given time interval.

A clamping pulse (Fig. 1S) is applied to the terminal 162 to wipe out or remove the information stored after that information has been utilized.

A dual type tube having two triode sections is employed. For convenience, the left-hand tube section is referred to as the tube L and the right-hand tube section is referred to as the tube R. The anode of tube L is connected through inductance 164 and an anode resistor 165 in parallel to a +150 volt terminal 166. The inductance 164 is provided to increase the voltage swing in a positive direction at the anode of the tube L (Fig. 1S during T3 and T4) for a preselected time immediately after that tube is rendered non-conductive.

The diode rectifiers 167 and 168 connected respectively to the input terminal 154 and terminal 169, and the resistor connected between the juncture 171 of the diodes 167 and 168 and the +150 volt terminal 166 comprise a diode AND circuit generally designated as 170*a*. The juncture 171 is connected through a parasitic suppressing resistor 105 to the control grid of the tube L.

The tube R is operated as a cathode follower and is always conductive when a pulse is present at the output of the delay circuit. The cathode load resistor 173 is connected to a −82 volt terminal 174 which is also connected through a resistor 175 and capacitor 176 to the anode of the tube L. The terminal 162 is connected through resistor 177 and diode rectifiers 178, 179, and 180, in series, to the −30 volt terminal 181. The juncture 182 is connected between the rectifiers 179 and 180 and between the resistor 175 and the capacitor 176. The juncture 183 joining the rectifiers 178 and 179 is connected through a parasitic suppressor resistor 184 to the control grid of the tube R and through a capacitor 185 to ground.

During the time interval T1, in accordance with Fig. 1S, an input pulse is not applied to the input terminal 154 and juncture 171 is therefore Down so that a positive voltage is not applied to the control grid of the tube L. During this time interval tube L is non-conductive, tube R is conductive, but the output terminal 156 connected to the cathode thereof is Down. The voltage at the anode of tube L is +150 volts and the capacitor 176 is charged with 180 volts appearing across it (the left plate is at +150 volts and the right plate is at −30 volts). The juncture 182 cannot be appreciably more negative than the −30 volt terminal 181 without causing the rectifier 180 to conduct and return the voltage at juncture 182 to essentially that of the terminal 181. It is the conduction of rectifier 180 during the time interval T1 that keeps juncture 182 at approximately −30 volts. The resistor 175 tends to prevent the voltage at juncture 182 from drifting between the application of successive clamping pulses.

The juncture 183 is also at −30 volts, so that capacitor 185 is charged with −30 volts on its upper plate while the lower plate is at 0 volts (ground). Rectifier 179 conducts when capacitor 185 is being charged by the clamping pulse (Fig. 1S) applied to the terminal 162 which attempts to pull the juncture 183 below the −30 volts of terminal 181. Hence, when the clamping pulse is most negative, the voltage at the control grid of the tube R is pulled Down. Since tube R is a cathode follower, the voltage at the output terminal 156 is also pulled Down.

This action effects the wiping out of the information stored after that information has been used. In other words, the output pulse produced is brought to an end as shown at the beginning of the time intervals T4 and T5 (Fig. 1S). When the clamping pulse thus goes negative, the rectifier 178 is rendered conductive.

During the latter portion of the time interval T2 the input pulse and synchronous pulse are both positive simultaneously. The juncture 171 is therefore Up causing the tube L to become heavily conductive so that the voltage at its anode decreases rapidly (Fig. 1S). The capacitor 176 discharges through the tube L. The resulting tendency of juncture 182 to acquire the same voltage as the anode of the tube L is arrested by the conduction of rectifier 180 and the voltage at this juncture thus remains −30 volts.

Just at the start of time interval T3 both the input pulse and synchronous pulse go negative and the voltage at the juncture 171 and control grid of tube L accordingly go Down causing tube L to be rendered non-conductive. As a result, the voltage at the anode of tube L increases rapidly and actually exceeds +150 volts, because this anode circuit is less than critically damped during the flyback time. It is this increased voltage or flyback which initiates the output pulse. This voltage is transferred through capacitor 176 to cause the voltage at juncture 182 to go Up from −30 volts to approximately +5 volts. The rectifier 179 then conducts to cause the juncture 183 and the control grid of tube R to go Up and the upper plate of capacitor 185 is charged positive relative to its lower or grounded plate. The voltage at the output terminal 156 connected to the cathode of the tube R follows the control grid thereof and goes Up to initiate the output pulse during the time interval T3.

As the voltage at the anode of tube L decreases to +150 volts, the voltage at juncture 182 similarly decreases. During the latter portion of time interval T3 the voltage at the juncture 182 is again approximately −30 volts. Both of the terminals 154 and 169 again go positive as shown by the input and synchronous pulses, respectively, occurring during the latter part of time interval T3 while the output terminal 156 is still Up.

As a result the tube L again becomes heavily conductive and the voltage at its anode decreases, but the juncture 182 again remains at —30 volts because of the conduction through rectifier 180.

When the clamping pulse goes negative at the start of time interval T4, conduction through rectifiers 178, 179, and 180 results and juncture 183, as well as juncture 182, is placed at approximately —30 volts. The control grid of tube R and output terminal 156 therefore go Down and the output pulse (occurring during the time interval T3 and produced in response to the input pulse applied during the time interval T2) is terminated.

When the juncture 171 goes Down at the start of time interval T4, the tube L becomes non-conductive and its anode voltage starts to increase rapidly as described hereinbefore.

This increased voltage causes the juncture 182 to go Up, the juncture 183 to go Up, and the output terminal 156 to go Up as indicated by the output pulse occurring during time interval T4. The voltage at the anode of tube L finally settles during the time interval of T5 at a steady value of +150 volts in accordance with the dampening effect. If an input pulse were applied during the time interval T4, the voltage at the anode of tube L would never reach a steady value of +150 volts. Such is indicated by this anode voltage during the time interval T3.

Just prior to the anode of tube L reaching a steady voltage value, the clamping pulse goes negative (time interval T5). At this time the juncture 182 has again assumed a voltage value of —30 volts, but the juncture 183 is still Up. When the clamping pulse causes the terminal 162 to go negative, the rectifiers 178, 179, and 180 are rendered conductive, and the voltage at the juncture 183 goes Down to terminate the output pulse at the beginning of time interval T5.

Hence, the use of flyback makes possible the production of an output pulse in one preselected time interval in response to an input pulse received during the next prior time interval. Also, the rectifier circuitry and a clamping pulse are employed to effect complete isolation between input and output circuits simultaneously operable.

The block diagram of the circuit of Fig. 1R is shown in Fig. 1T.

*General description of binary-decimal CRT storage system*

Referring more particularly to Figs. 2A–2E, a block diagram of a complete cathode ray tube storage system for use in a digital computer is shown. To realize this diagram Figs. 2A–2E are to be arranged as shown in Fig. 2F.

In operation the storage system performs either a regeneration or action cycle. During a regeneration cycle terminal AR of Fig. 2A must be Up as determined by external circuitry. When terminal AR is Up, the regeneration counter of Fig. 2A is operative to supply address information which sequentially positions the beams of the cathode ray tubes to numerically succeeding addresses during succeeding regeneration cycles.

The regeneration counter counts from 0 through 1999 and is advanced one decimal digit each time a regeneration cycle is executed. The decimal number contained within the counter is manifested on its output terminals D1—D1000 as the summation of the decimal numbers represented by those terminals which are Up. For example, if the counter stands at the decimal number 843, the terminals D800, D40, D2, and D1 are Up. while the remaining terminals are Down. During a first regeneration cycle, for example, all of the output terminals are Down so as to represent address 0. During the second regeneration cycle terminal D1 is Up, thereby indicating address 1. At the onset of the next regeneration cycle only terminal D2 is Up representing address 2. Similarly during the fourth regeneration cycle address 3 is represented by terminals D1 and D2 being Up. This sequential operation of the regeneration counter continues until 2000 regeneration cycles are executed whereupon the complete cycle is repeated.

The output terminals D1—D8000 of the regeneration counter are connected to a first set of input terminals of the address switch of Fig. 2A. The terminals A1—A8000 comprise a second set of input terminals to the address switch. If a regeneration cycle is to be executed, the input terminals D1—D8000 are connected to the output terminals AR1—AR8000, respectively, of the address switch. However, during an action cycle the input terminals A1—A8000 of the address switch are, respectively, connected to the output terminals AR1—AR8000.

The address information applied to either set of input terminals of the address switch is read-out and appears on the output terminals AR1—AR8000 during the time interval N.00–N.10 of any eight microsecond cycle.

Unless an action cycle is to be executed, the system performs successive regeneration cycles. Terminal AR is always Up except when an action cycle is to be performed, during which time it is caused to be Down. As long as terminal AR is Up continuously, the regeneration counter continues to advance with each regeneration cycle. During the time that an action cycle is performed, the regeneration counter will not advance but will retain the valve contained therein. The counter will then be advanced from N.10–N.20 of the next succeeding regeneration cycle.

By causing the storage system to execute successive regeneration cycle at all times except when an action cycle is performed, the information stored on the cathode ray tubes is not permitted to remain for any appreciable time without being regenerated. Furthermore, time is not wasted as would be the case where unused or blank action cycles are executed.

In Fig. 2A the output terminals AR1—AR8000 are each connected to the input of a pulse stretcher. The purpose of the pulse stretchers is to convert the address information appearing on terminals AR1—AR8000, respectively, from N.00–N.10 time as Up signals, to Down signals which exist for a complete cycle (N.00 to N+1.00) on the terminals S1—S8000 of Fig. 2B. Each pulse stretcher "stretches" a 1 microsecond pulse into an eight microsecond pulse.

Thus, if ths address information present on terminals AR1—AR8000 represents address 843, for example, the terminals AR800, AR40, AR2, and AR1 will be operated so that the output terminals S800, S40, S2, and S1 of Fig. 2B will be Down for eight microseconds commencing at approximately N.00 time.

The output terminals S1—S1000 of Fig. 2B are each connected to the input of an inverter tube. The outputs of the inverters are labeled I1—I1000 respectively, corresponding to the input terminals S1—S1000. The address 843, for example, is represented by a Down voltage at terminals S–800, S–40, S–2 and S–1 during an action cycle, this means that terminals I–800, I–40, I2 and I1 are Up during this time.

The terminals S2, S4, S8, S10, S100, and their corresponding terminals I2, I4, I8, I10, and I100 are connected to the horizontal deflection circuit of Fig. 2B. The horizontal deflection circuit comprises five individual switching units, each of which provides a predetermined increment of horizontal deflection of the beams of the cathode ray tubes. These increments of deflection are referred to hereinafter as deflection weights and are enumerated in the lower portion of the rectangle representing the horizontal deflection circuit of Fig. 2B and each is related to the terminals which provide that deflection weight. The horizontal deflection weights provided are 1, 2, 4, 5, and 10. If a total horizontal deflection of zero is required, none of the deflection weight quantities are employed or energized. By energizing the weight 1, a horizontal deflection of one position is secured. In order to provide a total horizontal deflection weight of eight or effecting beam deflection for eight positions the deflection weight quantities 1, 2, and 5 must be energized.

In Fig. 2B the horizontal deflection weights of 1, 2, 4, 5, and 10 are associated respectively with the pairs of input terminals S2, I2; S4, I4; S8, I8; S10, I10; and S100, I100. A horizontal deflection weight of zero is provided when terminals S2, S4, S8, S10, and S100 are Up, and terminals I2, I4, I8, I10, and I100 are Down. As a further example, if terminal S2 is Down and I2 is Up, a total horizontal deflection of 1 is secured. A total deflection weight of eight is provided when terminals S2, S4, and S10 are Down, terminals I2, I4, and I10 are Up, and the remaining terminals are in the positions indicated for a deflection of zero.

The incremental switching units contained within the horizontal deflection circuit control the potentials appearing at the output terminals HR and HL. Terminals HR and HL of Fig. 2B are connected respectively to the right-hand and left-hand horizontal deflection plates of each of the cathode ray tubes CRT A, B, C, and D of Fig. 2C. When the horizontal deflection circuit of Fig. 2B is providing a deflection weight of zero, the potential of terminal HL is most positive while the potential of terminal HR is most negative. This condition places the beams of the cathode ray tubes CRT A, B, C, and D of Fig. 2C at the extreme left-hand edges of their respective rasters or storage patterns. Similarly, if terminals HR and HL are at their most positive and most negative potentials respectively, the beams of the cathode ray tubes of Fig. 2C will be located at the right-hand extremities of their individual rasters. It is evident that if the potentials of terminals HR and HL are between these two extremes, the beams of the cathode ray tubes are positioned to an address location intermediate the left and right-hand edges of the rasters.

Since the horizontal deflection plates of the cathode ray tubes of Fig. 2C are connected in parallel, the horizontal deflection of each tube is identical with that of the others and is controlled by the horizontal deflection circuit of Fig. 2B.

In Fig. 2B the terminals S20, S40, S80, S200, S400, S800 and the terminals I20, I40, I80, I200, I400, and I800 are connected to the inputs of the vertical deflection circuit which operates in a manner similar to that described for the horizontal deflection circuit. The incremental switches of the vertical deflection circuit provide the vertical deflection weights of 1, 2, 4, 5, 10, and 20. A vertical deflection of thirteen positions, for example, is provided by energizing the quantities 1, 2, and 10. Accordingly, if none of the vertical deflection weights is energized, a vertical deflection of zero is provided.

The vertical deflection weight quantities 1, 2, 4, 5, 10, and 20 of Fig. 2B are associated respectively with the pairs of input terminals I20, S20; I40, S40; I80, S80; I200, S200; I400, S400; and I800, S800. As the horizontal deflection circuits, all of the S terminals are Up and the I terminals are Down, a vertical deflection of zero is provided. A vertical deflection of one position is provided, for example, when terminals I20 and S20 are caused respectively to be Up and Down. Thus, by causing a particular I terminal to go Up and its associated S terminal to go Down, the deflection weight associated with that pair of terminals will be energized.

The potentials on terminals VU and VL are respectively at their most positive and most negative values when none of the deflection weight quantities is energized. The reverse is true when all of the deflection weights are energized.

The terminals VL and VU of Fig. 2B are respectively connected to the lower and upper vertical deflection plates of the cathode ray tubes CRT A, B, C, and D of Fig. 2C. Terminal VU is positive with respect to VL, and the maximum potential difference exists therebetween when none of the vertical deflection weights is energized. This situation causes the beams of the cathode ray tubes CRT, A, B, C, and D of Fig. 2C to be located at the extreme upper edge of their respective rasters. When terminals VL and VU are at their most positive and most negative potentials respectively, the beams of the cathode ray tubes are located at the bottom edge of their respective rasters. Accordingly, by causing terminals VL and VU to be at the proper potentials, the beams of the cathode ray tubes can be oriented at any desired vertical position within the rasters.

It is now apparent that the beams of the cathode ray tubes CRT A, B, C, and D of Fig. 2C can be located at any selected position by causing predetermined horizontal and vertical deflection weights to be energized. The deflection weights energized are determined by the address information present at the output terminals AR1—AR1000 of the address switch of Fig. 2A. As stated hereinbefore, this address information is supplied by the regeneration counter during regeneration cycles, and by the terminals A1—A1000 (Fig. 2A) during action cycles. The terminals S2000—S8000 (Fig. 2B) are not used because only the addresses 0–1999 are employed by the embodiment shown.

A dot is written on the face of a cathode ray tube, in order to store a binary zero, by turning on the electron beam for a predetermined time interval while it remains stationary. A dash is written on the face of a cathode ray tube, in order to store a binary one, by first writing a dot then turning on the beam while it is being deflected a small predetermined amount. The horizontal and vertical deflection circuits of Fig. 2B each include a bit sweep generator which causes the beams of the cathode ray tubes (Fig. 2C) to be deflected above the referred to predetermined amount after those beams are positioned to a particular address location.

The beams of the cathode ray tubes are allowed to be stationary from N.40–N.46 time during which a dot can be written. From N.46–N+1.06 time the beams undergo a small linear deflection so that a dash can be written. A voltage pulse existing from N.40–N.50 time of each cycle is applied to terminals 384 (Fig. 2B) of the vertical and horizontal deflection circuits in order to initiate the action of the bit-sweep generators. The bit-sweep generator associated with the horizontal deflection circuit causes an incremental deflection to the left, while the generator associated with the vertical deflection circuit causes an incremental deflection upwards. The combined action of the horizontal and vertical bit-sweep generators is to produce an oblique deflection.

The cathode ray tube storage system described herein utilizes a defocus-dash system wherein the beams of the cathode ray tubes are defocused during the time that a dot may be written and are focused during the time that a dash may be written. The output of a pulse stretcher associated with the horizontal bit-sweep generator appears on terminal 667 of Fig. 2B which is Up from N.06–N.46 time and Down from N.46–N+1.06 time of every cycle. This voltage pulse is applied to the defocus pulse inverter (Fig. 2B) and the inverted pulse appears at the output terminal 671 thereof. Terminal 671 is capacitively coupled to the focusing anodes of each of the cathode ray tubes CRT A–D (Fig. 2C).

The output terminals S1 and S1000 of the pulse stretchers (Fig. 2B) and the output terminals I1 and I1000 of the inverters (Fig. 2B) are connected to the input of the tube selector circuit TS (Fig. 2B).

The purpose of the tube selector circuit TS is to utilize the address information appearing on terminals S1, S1000, I1, and I1000 and determine the cathode ray tube CRT upon which a particular address appears. A raster of each cathode ray tube contains 500 addresses or beam positions. The even-numbered addresses in the range 0–998 are located on cathode ray tube CRT A, the odd-numbered addresses 1–999 are located on CRT B, the even-numbered addresses 1000–1998 are located on CRT C, and the odd-numbered addresses 1001–1999 are located on CRT D.

Due to the fact that the beams of the four cathode ray tubes (Fig. 2C) are controlled by the same horizontal and vertical deflection circuits; i.e., operated in parallel, they will be simultaneously positioned to four different addresses. For example, if the beams of cathode ray tubes CRT A, B, C, and D are located in the upper lefthand corners of their respective rasters, they are located at addresses 0, 1, 1000, and 1001, respectively. The tube selector circuit must utilize the address information applied to its input terminals to select one of these four addresses.

If, for example, terminals I1 and I1000 of the tube selector circuit TS (Fig. 2B) are Up, the address selected is odd and greater than 1000, and thus appears on CRT D. If the terminals I1 and S1000 are Up, the selected address is odd and less than 1000 thereby appearing on CRT B. Depending upon which tube the selected address appears, the appropriate one of the terminals TSA, TSB, TSC, and TSD is Up. That is, if the selected address appears on CRT A, terminal TSA is Up; or if it appears on CRT C, terminal TSC is Up.

The terminals TSA–TSD (Fig. 2C) are connected respectively to the input terminals 10B of the AND circuits **620*a*–623*a* (Fig. 2D). The input terminals 10A of these AND circuits are commonly connected to terminal 616. In operation, terminal 616 is Up from N.40–N.46 when a dot is to be written into storage and is Up from N.40–N+1.00 time when a dash is to be written. In order for the voltage pulse appearing on terminal 616 to be passed by one of the AND circuits 620*a*–623*a*, both of the input terminals 10A and 10B thereof must be Up. The AND circuits 620*a*–623*a* are associated respectively with cathode ray tubes CRT A–D (Fig. 2C). Thus, if terminal TSA (Fig. 2C) is Up, for example, the AND circuit 620*a* (Fig. 2D) is operable in response to the signal appearing on terminal 616. Accordingly, if terminal TSD is Up, AND circuit 623*a*** is similarly operable.

The output terminals of the AND circuits **620*a*–623*a* respectively are connected to the inputs of the pulse shaper circuits 624–627 (Fig. 2D). The output terminals 637–640 of the pulse shaping circuits 624–627 are capacitively coupled to the control grids of the cathode ray tubes CRT A–D (Fig. 2C), respectively. Thus, when one of the terminals 637–640** (Fig. 2D) is Up during a given action or regeneration cycle, the control grid of the corresponding cathode ray tube is Up.

By causing the control grid of a cathode ray tube to be Up, the tube is rendered slightly conductive; i.e., the beam is turned on, and information is thereby written or stored on the face thereof. When terminal 640 (Fig. 2D) is Up, for example, a dot or a dash is stored on CRT D (Fig. 2C) depending upon whether a dot or a dash signal appears on terminal 616 (Fig. 2D).

It is now apparent that the address information supplied to the tube selector circuit TS (Fig. 2B) causes one of the four cathode ray tubes to be selected and a dot or a dash written on the face of the selected cathode ray tube upon which the address appears.

Referring to Fig. 2C, a conductive pick-up plate abuts the face of each of the four cathode ray tubes CRT A–D of the storage unit for accommodating storage of the 1 bit. These pick-up plates are commonly connected to the terminal PU1 (Fig. 2D). The suffix 1 of the designation PU1 indicates that this terminal is associated with the binary 1 bit of the binary-decimal digits stored.

In order to read the information (dot or dash) stored at an address, the beam of the cathode ray tube is turned on during N.40–N.46 time at which time the beam is stationary, i.e., bit-sweep inoperative. This turning on of the beam causes a new dot to be written on the face of the tube, and the information previously stored at this address to be destroyed. The destruction of the old information indicates whether a dot or a dash was previously stored. This destruction causes a video signal to be capacitively coupled to the pick-up plate associated with the tube whereon the destruction and the writing of the new dot occurred. If the video signal appearing on the pick-up plate during N.40–N.46 time is predominantly positive, the information previously stored was a dash; if the signal is predominantly negative during this time, a dot was previously stored. When the new information to be stored is a dot, the beam is turned off for the remainder of the cycle (N.46 to N+1.00 since a dot has already been written. However, if a new dash is to be stored, the beam is allowed to remain on for the remainder of the cycle (N.46 to N+1.06) and the bit-sweep operated to cause the new dot to be destroyed and a new dash to be written.

Whenever a regeneration cycle is executed, the information read from the face of a cathode ray tube is re-stored at the address from which it was read. The video circuits (Fig. 2D) turn off the beam at N.46 time when a dot is being regenerated and permit the beam to remain on until N+1.06 time when a dash is being regenerated.

Referring to Fig. 2D, the video signal appearing on terminal PU1 is amplified by the video amplifier and delivered via terminal 566 to the detector and pulse stretcher No. 1. The detector and pulse stretcher No. 1 determines whether the signal presented to its input represented a dot or a dash.

The ON pulse generator (Fig. 2D) utilizes a sync pulse (Fig. 4C) and a voltage pulse occurring from N.20–N.30 time in order to generate the ON pulse which exists at terminal 704 during N.40–N.44 of every cycle. This ON pulse is applied to the pulse stretchers No. 1 and No. 2.

The application of the ON pulse to pulse stretcher No. 1 causes the output terminal 596 thereof to go Up at N.40 time. Terminal 596 is caused to go Down at N.46 time only if the input terminal 566 is Up at this time (dot signal present); otherwise terminal 596 remains Up (dash signal present). Hence, if the signal at terminal 566 signified a dot, the output terminal 596 is Up from N.40 to N.46 time. But if a dash signal was present, terminal 596 remains Up until it is caused to go Down during a later cycle as the result of the receipt of a dot signal.

The voltage pulse appearing at the output terminal 596 of the pulse stretcher No. 1 is applied to terminal 43A of OR circuit 605 (Fig. 2D), causing this circuit to be operated so as to deliver the pulse to the input of pulse stretcher No. 2. The input terminal 43B of the OR circuit 605 is Down during regeneration cycles and action-read cycles.

The output terminal 616 of pulse stretcher No. 2 is always caused to go Up at N.40 time of every cycle because of the ON pulse from terminal 704. If the voltage pulse applied to the input of pulse stretcher No. 2 goes Down at N.46 time (a dot signal present), the output terminal 616 thereof is caused to go Down at this time. However, if the input of pulse stretcher No. 2 remains Up (dash signal present), terminal 616 will remain Up until N+1.00 time (end of current cycle) when it is caused to go Down by the N.00 pulse present at terminal 380.

Thus, terminal 616 is Up from N.40–N.46 time if a dot is read out from an address on one of the cathode ray tubes, and is Up from N.40 to N+1.00 time if a dash is read out therefrom. The manner in which information present on terminal 616 is stored on a cathode ray tube has been generally described hereinabove.

The output terminal 596 of pulse stretcher No. 1 is connected to one input of the read-in, read-out circuits (Fig. 2D). During a regeneration cycle the read-in, read-out circuits use the voltage pulse present at terminal 596 to cause the data line terminal DL1–1 to be Up from N.50–N.60 if terminal 596 is Up this time; i.e., if a dash was previously stored. In the reference character DL1–1 the first digit refers to the binary-decimal column, and the second or suffix digit refers to the binary bit accommodated.

External circuits which are to utilize the information read out from the CRT storage system can be connected to terminal DL1–1. Also information to be read in to the cathode ray tube storage system is applied to this same data line terminal.

During an action cycle, in which information is read out from the cathode ray tubes, the operation of the circuits of Figs. 2C and 2D is identical to that for a regeneration cycle. That is, video information read from the face of a cathode ray tube is amplified, detected for the presence of a dot or a dash, re-stored at the address from which it was read, and is manifested at the output terminal DL1–1 as the presence or absence, respectively, of an Up voltage condition during N.50–N.60 time depending upon whether a dash or a dot was read from storage.

New information is stored or read in to the cathode ray tubes (Fig. 2C) during an action read in cycle.'

A read in cycle is initiated by causing the read in control terminal RIT (Fig. 2B) to be Up from N.40–N.50. When terminal RIT is Up, the read in control circuit causes terminal 43B of OR circuit 605 to be Up from N.40 to N+1.00.

During a read in cycle, the information previously stored at the selected address on a cathode ray tube is read out, amplified by the video amplifier, and a voltage pulse is caused to appear on the output terminal 596 of pulse stretcher No. 1 and terminal 43A of OR circuit 605 as described hereinbefore. The information read out is again manifested on terminal DL1–1 from N.50–N.60. The fact that terminal 43B of OR circuit 605 is Up from N.40 to N+1.00 time prevents the voltage pulse present on terminal 43A from further affecting the output of this OR circuit. Hence, there is no effect upon the input terminal 10A of pulse stretcher No. 2.

If terminal RIT is Up (N.40–N.50), conductor 715A is Down during this interval. The potential on conductor 715A controls a portion of the read in, read out circuits which permit a voltage pulse on terminal DL1–1 to effect the potential on terminal 10C of pulse stretcher No. 2.

During a read in cycle new information is read into the cathode ray tube storage system by applying it to the data line terminal DL1–1 during the time N.40–N.50. Terminal DL1–1 must be caused by a suitable external means to be up (N.40–N.50) if a dash is to be read in, or to be Down if a dot is to be stored. When terminal DL1–1 is Down (N.40–N.50) or when a dot is to be stored, a negative pulse appears on input terminal 10C of pulse stretcher No. 2. However, if terminal DL1–1 is Up (N.40–N.50) terminal 10C remains Up.

The output terminal 616 of pulse stretcher No. 2 goes Up at N.40 time of every cycle as a result of the presence of the Gn pulse at terminal 704 (Fig. 2D). If a dot is to be stored (terminal DL1–1 Down from N.40–N.50), the negative pulse applied to terminal 10C of pulse stretcher No. 2 causes the output terminal 616 thereof to go Down at N.46 time. If a dash is to be stored (terminal DL1–1 Up from N.40–N.50), terminal 616 will remain Up until the end of the cycle or N+1.00 time. The pulse present on terminal 616 causes a dot or a dash to be written on a cathode ray tube as noted hereinbefore.

In Fig. 2C the cathode ray tubes CRT A–D provide facilities for storing the binary 1 bits of 2000 binary-decimal digits or addresses. The three additional rectangles shown accommodate the 2, 4, and 8 bits of the same 2000 binary-decimal digits, and are similar in circuitry to that described for the binary 1 bit.

In Fig. 2D, the video circuits shown within the dashed enclosure operate in conjunction with the CRT storage unit for the binary 1 bit of Fig. 2C. The video circuits for the 2, 4, and 8 bits shown (Fig. 2D) are identical to the circuit for the 1 bit, and operate conjointly with the CRT storage units for the 2, 4, and 8 bits (Fig. 2C). Accordingly, the circuits of Figs. 2C and 2D accommodate the 1, 2, 4, and 8 bits of the extreme right-hand column (decimal digit position 1) of 2000 binary-decimal digits.

Referring to Fig. 2E, each rectangle represents circuits identical to those shown in Figs. 2C and 2D, each rectangle therefore provides complete storage facilities for an additional digit position. Thus, the rectangles of Fig. 2E reading from top to bottom respectively accommodate digit positions 2, 3, and the Mth position of 2000 multi-digit decimal numbers.

The output terminals HR, HL, VL, and VU of the horizontal and vertical deflection circuits (Fig. 2B) are connected to each of the circuits of Fig. 2E as are the output terminals TSA–TSD of the tube selector circuit TS (Fig. 2B). Hence, the circuits of Fig. 2E are operated in synchronism with the circuits of Figs. 2C and 2D. For example, if the address information supplied to the deflection and tube selector circuits (Fig. 2B) designates address 1, the beams of all of the cathode ray tubes (Figs. 2C and 2E) will be positioned in the upper left-hand corner of their respective rasters, and all of the "B" tubes will be selected. The information read out from these tubes will appear on the data line terminals DL1–1 to DLM–8 (Figs. 2D and 2E) from N.50–N.60 time.

The read in control terminal RIT of Fig. 2D is connected to each of the circuits of Figs. 2D and 2E. Thus by causing terminal RIT to be Up from N.40–N.50 time, new information applied to the data line terminals DL1–1 to DLM–8 can be stored at the address selected. Where storage facilities are provided for a decimal number having M orders or positions the 1, 2, 4, and 8 bits of each position are simultaneously read in or read out of the circuits of Figs. 2C, 2D, and 2E depending upon the operation specified. That is, all of the binary-decimal digits comprising a decimal number are read in or read out of the cathode ray tube storage system simultaneously or in parallel.

Hence, if a storage system accommodates 16 and ½ columns of binary-decimal digits, then 66 binary bits of information stored on 264 cathode ray tubes and the 66 line terminals are the input-output terminals of the storage system and constitute a 66 wire parallel transfer bus.

*Binary adder*

Referring more particularly to Fig. 3, the circuit shown effects addition in true binary fashion and is therefore termed a binary adder. The presence of a pulse at one of the input terminals 194, 195, or 196 indicates the presence of binary 1 and the absence of a pulse thereat indicates a binary 0. Hence, to effect addition in true binary fashion the output terminal 198–1 must exhibit a binary 0 when no impulse is applied to the input terminals 194, 195, and 196, a binary 1 when an input pulse is applied to one input terminal, a binary 0 and a binary 1 carry when pulses are applied to two input terminals, and a binary 1 and a binary 1 carry when pulses are applied to all three input terminals.

Diode rectifiers 200 and 201 have their cathodes connected to the input terminals 194 and 195 respectively, and their plates commonly connected at juncture 202 connected through a pull-up resistor 203 at the +150 volt line 166. The rectifiers 200 and 201 and the resistor 203 comprise an AND circuit 206*a*. When the input terminals 194 and 195 are Up, the juncture 202 is Up. Similarly, the cathodes of diode rectifiers 207 and 208 are connected respectively to the input terminals 195 and 196, and the anodes are connected to common juncture 209 connected through pull-up resistor 210 to the +150 volt line 166. The diode rectifiers 207 and 208 and the pull-up resistor 210 comprise an AND circuit designated as 211*a*.

The diode rectifiers 213 and 214 are connected between the input terminals 194 and 196 and their common juncture 215 connected through pull-up resistor 216 to the +150 volt line 166. The diodes 213 and 214 are connected so as to conduct current away from juncture 215. The rectifiers 213 and 214 and pull-up resistor 216 comprise an AND circuit 217*a*. The respective junctures 202, 209, and 215 are connected through the parasitic suppressing resistors *ps* to the control grids of the tubes 220, 221, and 222, respectively. The anodes of each of these tubes are connected to the +150 volt line 166 and their cathodes are commonly connected through a dropping resistor 224 and a load resistor 225 to the −150 volt line 230. The resistor 225 is a common load resistor for each of the cathode follower tubes 220, 221, and 222, and the dropping resistor 222 is provided to compensate for the cathode follower bias and thereby keep the cathodes of these tubes at approximately the same voltage as the most positive of their control grids. Since the cathodes of the tubes 220, 221, and 222 are commonly connected, the carry output terminal 197–1 is Up when one or more of the grids of the tubes 220, 221, and 222 are Up. These tubes 220, 221, and 222 therefore comprise a common cathode follower type OR circuit. If any two of the input terminals 192, 195, and 196 are Up, the corresponding AND circuit is rendered effective to cause the carry output terminal 197–1 to go Up. For example, if the input terminals 194 and 195 go Up the juncture 202 of AND circuit 206*a* goes Up, the control grid of the tube 220 connected thereto goes Up, the cathode of tube 220 goes Up, and the carry output terminal 197–1 goes Up. Also if all three of the input terminals 194, 195, and 196 go Up, the junctures 202, 209, and 215 of AND circuits 206*s*, 211*a*, and 217*a*, respectively, all go Up. The control grids of cathode follower tubes 220, 221, and 222 all go Up and carry output terminal 197–1 goes Up. Hence, if an input is present at two or three of the input terminals 194, 195, and 196, a carry output pulse is provided in accordance with the rules of binary addition.

The carry output terminal 197–1 is also connected through a parasitic suppressing and grid current limiting resistor *ps* to the control grid of inverter tube 231 having a grounded cathode and its anode connected through load resistor 232 to the +150 volt line 166. The anode of inverter tube 231 is also connected through a voltage divider comprising resistors 233 and 234, to the −150 volt line 230. A frequency compensating capacitor 235 is connected in parallel with the resistor 233. The juncture of resistors 233 and 234 is connected through a parasitic suppressing resistor *ps* to the control grid of the cathode follower tube 236, having its cathode connected through a load resistor 237 to the −150 volt line 230 and its anode connected to the +150 volt line 166. Since the control grid of the inverter tube 231 is connected to the carry output terminal 197–1, it will be Up when two or three of the input terminals 194, 195, and 196 are Up. It follows that the anode of the inverter tube 231 is Up when only one of the input terminals 194, 195, and 196 is Up and when none of these terminals is Up. The cathode of the cathode follower tube 236 follows its grid and is therefore Up when only one input is present or when no input is present.

The cathodes of diode rectifiers 240, 241, and 242 are connected to the input terminals 194, 195, and 196, respectively, and the anodes are connected to a common juncture 243 connected through a pull-up resistor 244 to the +150 volt line 166. Rectifiers 240, 241, and 242 and pull-up resistor 244 comprise an AND circuit 245*a*. The juncture 243 of AND circuit 245*a* is connected through parasitic suppressing resistor *ps* to the control grid of the cathode follower tube 247, having its anode connected to the +150 volt line 166.

The diode rectifiers 248, 249, and 250 have their anodes connected to the input terminals 194, 195, and 196, respectively, and their cathodes connected to a common juncture 251 connected through a pull-down resistor 252 to the −150 volt line 230. The rectifiers 248, 249, and 250 and resistor 252 comprise a diode OR circuit 253. The juncture 251 which is the output of the diode OR circuit 253 is connected to the cathode of diode 254, having its anode connected through pull-up resistor 255 to the −150 volt line 166 and through parasitic suppressor resistor *ps* to the control grid of cathode follower tube 256.

Diode rectifier 258 has its anode connected to the anode of rectifier 254 and its cathode connected to the cathode of cathode follower 236. Diode rectifiers 254 and 258 and pull-up resistor 255 comprise a diode AND circuit 259*a*.

The cathodes of cathode follower tubes 247 and 256 effectively comprise a common cathode follower OR circuit since they are commonly connected through dropping resistor 260 and load resistor 261 to the −150 volt line 230. The juncture of resistors 260 and 261 is connected to the output terminal 198–1.

The juncture 243 of the diode AND circuit 245*a* is Up only when all three of the input terminals 194, 195, 196 are Up, that is, only when the three inputs are applied. As a result the control grid of cathode follower tube 247 goes Up and its cathode follows to cause the output terminal 198–1 to go Up. The juncture 251 of the diode OR circuit 153 goes Up when one or more of input terminals 194, 195, or 196 go Up. The cathode of cathode follower tube 236 goes Up when one input or no input is present. Hence, the juncture 263 of the diode AND circuit 259*a* goes Up only when one of the input terminals 194, 195, and 196 is Up. When the juncture 263 of the diode AND circuit 259*a* goes Up, the grid and cathode of cathode follower 256 goes Up, and the output terminal 198–1 goes Up. Hence, the output terminal 198–1 goes Up when one or three inputs are applied to the input terminals 194, 195, and 196.

Briefly, it is seen from the above that if only one of the input terminals 194, 195, or 196 is Up, the output sum terminal 198–1 will be Up. If only two of said input terminals are Up, the carry terminal 197-1 will be Up and finally, if all three of said input terminals are Up, the carry terminal 197–1 and the output sum terminal 198–1 will both be Up.

*Clamping and synchronous pulse source*

The source for producing the clamping and synchronous pulses referred to hereinbefore will be described in connection with the block diagrams of Figs. 4A and 4B, and the idealized waveforms shown in Fig. 4C. The actual details of the individual circuits are not shown because they are conventional and do not constitute part of this invention.

The master timing pulse generator (Fig. 4A) comprises a 1-megacycle oscillator 280, phase shifting device 281 and blocking oscillators 282 and 283. The phase-shifting circuit 281 causes a phase shift of the output of oscillator 280 so that the positive peak of the output of the phase-shifting circuit 281 is ⅓ of a microsecond removed in time from the corresponding positive peak of the output of oscillator 280 as is indicated in Fig. 4C. The output of the oscillator 280 is applied to the blocking oscillator 282 and the output of the phase-shifting circuit 281 is applied to blocking oscillator 283 to produce the clamp timing pulse and sync timing pulse, respectively (Fig. 4C). These pulses are produced in coincidence with the positive peaks of the corresponding input waveforms. The clamp timing pulse serves as the input of the blocking oscillator 284 to produce a similar pulse of slightly greater amplitude and the sync timing pulse is applied to blocking oscillator 285 to produce a similar pulse of slightly greater amplitude. The output from blocking oscillators 284 and 285 is supplied to the clamp and sync signal generator to produce the clamp and sync signals shown in Fig. 4C.

The output of blocking oscillator 284 serves as the input of the blocking oscillators 290 and 291 to produce the clamp signal and sync end pulse. The sync timing pulse produced by blocking oscillator 285 and the sync end pulse produced by blocking oscillator 291 are supplied to the inputs of a pulse stretcher circuit 292, which is energized by the sync timing pulse and de-energized by the sync end pulse to produce the sync signal (Fig. 4C) applied to a cathode follower 293. The clamp signals and sync signals are present at the terminals CS and SS respectively (Fig. 4B). The clamp signal supplies the input to an inverter 294 and the sync signal provides the input to an inverter 295 to produce the clamp pulse and sync pulse, respectively, at the outputs of those inverters. The clamp pulse is connected to the terminal 162 of a delay circuit such as shown in Fig. 1R, and the sync pulse is connected to the terminal 169 thereof. The clamp and sync inverters are each sufficient to supply four such delay circuits without overloading. It is to prevent overloading that the blocking oscillators are employed as shown.

The broken vertical lines in Figs. 4A and 4B indicate that the circuits shown are repeated. For example, the output of a single master timing pulse generator may be connected to six blocking oscillators 284 and to six blocking oscillators 285. These blocking oscillators may supply forty clamp and sync signal generators, and these forty clamp and sync signal generators may supply a total of one hundred inverters and one hundred sync inverters. Hence, a single master timing pulse generator may be used to supply clamp and sync pulses to four hundred delay circuits.

*Regeneration counter*

The operation of a single order of the regeneration counter shown in Fig. 5A will be described by conjoint reference to Figs. 5A, 5B, 5C, and 5D.

Figs. 5C and 5D are arranged as shown in Fig. 5E to form a single chart illustrating the operation of the counter.

Fig. 5A comprises a binary adder such as described in connection with Fig. 3 whose sum output terminal 198–1 is connected to the input of four series connected delay circuits designated from right to left as DC4, DC2, DC1, and DC8. The output terminals 156 of these respective delay circuits are connected to the terminals D4, D2, D1, and D8. The output terminal 156 of delay circuit DC8 is also connected to the input terminal 195 of the binary adder. The carry output terminal 197–1 of the binary adder is connected to the input terminal 154 of the delay circuit DCC, whose output terminal 156 is connected to the input terminal 194 of the binary adder to apply the carry output of the adder to the input thereof during the next time interval.

The clamp pulses and sync pulses (Fig. 4C) are applied to the terminals 162 and 169, respectively, of the delay circuits to effect the operation thereof as described in connection with Figs. 1R and 1S. These clamp and sync pulses appear at the terminals CP and SP, respectively, of the clamp and sync inverters having input terminals CS and SS corresponding to the similarly designated terminals of Fig. 4B. This clamp and sync inverter may be of any conventional type such as shown in Fig. 5B and briefly described hereinafter.

At time 0.00 (Figs. 5C and 5D), the counter is in the initial or starting condition as indicated by the 0 (absence of a pulse at the circuit points shown). At time 0.10 an input or counter advance pulse is applied to the input terminal 196 of the binary adder as indicated by the presence of a 1 in Fig. 5C. Since no other input is applied to the binary adder at time 0.10, a single output pulse appears at output terminal 198–1 substantially simultaneous with the application of the input to input terminal 196. The pulse at the output terminal 198–1 of the binary adder effects operation of the delay circuit DC4 as described in connection with Figs. 1R and 1S during the next following time interval (0.20), so that a pulse appears at the terminal D4 connected to the output terminal 156 of delay circuit DC4 and the input terminal 154 of delay circuit DC2. Hence, at time 0.20 the only pulse present in the regeneration counter is that present at terminal D4. At time 0.30 this pulse effects operation of delay circuit DC2 and appears at the output terminal D2. During time 0.40 this pulse effects operation of delay circuit DC1 and appears at the terminal D1.

During time 0.50 this pulse effects operation of delay circuit DC8 and a pulse appears at terminal D8. This same pulse is transferred from the terminal D8 to the input terminal 195 of the binary adder and again causes a pulse to appear at the output terminal 198–1 thereof. During time 0.60 delay circuit DC4 is again rendered operable and a pulse appears at terminal D4. Similarly, at time 0.70 a pulse appears at terminal D2 and at time 1.00 a pulse appears at terminal D1.

It is seen that if no further input is applied to the input terminal 196 of the binary adder that a continuous and repetitious operation of the counter will be effected in the manner described above. This continuous and repetitious operation is utilized to effect counting. At one preselected time interval during each cyclic operation of the counter, the terminals D1, D2, and D4 are examined for the presence or the absence of pulses. The first time during which such an examination is made is time 1.00. Since a pulse is present during this time at the terminal D1, this pulse is assigned the decimal value 1.

During the next following time interval or the time 1.10 an input pulse to be counted is applied to the input terminal 196. Also, during the time interval 1.10 a pulse appears at the terminal D8 as a result of the pulse present at the terminal D1 during the time 1.00. The pulse at the terminal D8 is applied to the input terminal 195 of the binary adder. Hence, inputs are applied to the terminals 195 and 196 of the binary adder. As a result the output terminal 198–1 of the binary adder does not exhibit a pulse, but a pulse does appear at carry terminal 197–1 of the binary adder.

During time 1.20 the pulse previously at the carry terminal 197–1 of the binary adder causes operation of the carry delay circuit DCC to apply a pulse to the input terminal 194 of the binary adder. This pulse at the input terminal 194 causes a pulse to appear at the output terminal 198–1 of the adder during the same time interval. At the times 1.30, 1.40, and 1.50 a pulse appears at the respective terminals D4, D2, and D1. At time 1.60 the pulse appears at terminal D8 and is transferred therefrom to the input terminal 195 of the binary adder to cause a pulse to appear at the output terminal 198–1 of the adder.

At time 1.70 a pulse is caused to appear at terminal D4 and at time 2.00 a pulse appears at the terminal D2. Also, at time 2.00 the terminals D4, D2, D1, and D8 are again examined. Hence, the pulse read out from the terminal D2 represents a decimal value of 2.

At time 2.10 a pulse is present at the terminal D1 and an input pulse is applied to the terminal 196 of the binary adder. The pulse applied to the terminal 196 causes a pulse to be produced at the output terminal 198–1 of the adder. At time 2.20 a pulse appears at the terminal D8 and input terminal 195 of the binary adder. The pulse applied to the input terminal 195 of the binary adder causes a pulse to appear at its output terminal 198–1. Also, the pulse present at the terminal 198–1 during time 2.10 causes a pulse to appear at terminal D4 during this time 2.20.

Similar operation of the counter is continued until the time 3.00. At this time terminals D4, D2, D1, and D8 are again examined and pulses found to appear at terminals D1 and D2. The read out of pulses from these terminals corresponds to a decimal value of 3.

At time 3.10 an input pulse is again applied to the input terminal 196 of the binary adder. Pulse transfer operation is continued in the manner set forth above and read out is effected from the terminal D4 at time 4.00. The read out of a pulse from the terminal D4 corresponds to read out of a decimal value of 4.

A similar operation is continued with read out being effected during each successive eighth time interval, an input being applied to the input terminal 196 of the binary adder during the next time interval following read out until an input is applied to the terminal 196 at time 9.10.

It is seen that a decimal 5 is read out at time 5.00, a decimal 6 is read out at time 6.00, a decimal 7 is read out at time 7.00, a decimal 8 is read out at time 8.00, and a decimal 9 is read out at time 9.00. An examination of the pulses present at the terminals D4, D2, D1, and D8 of Fig. 5A indicates that the numerical suffix of the terminal designation corresponds to the decimal value read out therefrom. For example, at time 6.00 a decimal 6 is read out as a result of the pulses present at the terminals D2 and D4 and at time 9.00 a decimal 9 is read out as a result of the pulses present at terminals D1 and D8.

At time 9.20 a pulse appears at the input terminal 194 of the binary adder as a result of the pulse present at the carry output terminal 197–1 at time 9.10. This same pulse also appears at the input 300 of the two input AND circuit 301*a*. A pulse appears at the terminal D2 as a result of the pulse present at the terminal D4 at time 9.10. The pulse present at the terminal D2 is also present at the input terminal 302 of AND circuit 301*a*. Since pulses are present at the input terminals 300 and 302 of AND circuit 301*a*, both these inputs are Up and the output terminal 303 thereof is also Up. This terminal is connected to the terminal designated C10 and provides a pulse which may be used as a carry output pulse to the next higher order which, in this particular example, would necessarily be the tens order. It is seen from an examination of Figs. 5C and 5D that the terminals D2 and 194 have a pulse present thereat simultaneously at no time prior to time 9.20. Hence, the input terminals 300 and 302 of AND circuit 301*a* are simultaneously in the Up condition for the first time during the counters operation and a carry output is therefore provided only at time 9.20.

*Clearing a counter order.*—The counter is cleared or reset to the zero or starting position only prior to starting or when testing and not during any normal operation. To effect clearing, a positive sync pulse (Figs. 1S and 4C) is prevented from arriving at the delay circuits DC1–DC8 and DCC. In accordance with the description of the delay circuit of Fig. 1R such prevents operation of the delay circuits shown in Fig. 5A and the amounts or pulses stored in the counter are therefore lost.

In addition to the carry output being made available at terminal C10 to be used as in input to the next higher order of the counter, it is also used to effect automatic resetting of the order from which it is derived. The output terminal 303 of AND circuit 301*a* also serves as an input terminal of the three input OR circuit 306. The AND circuit 301*a* and OR circuit 306 are referred to herein as the clear and carry circuit. The output terminal 307 of OR circuit 306 is connected to input terminal SSC of the clamp and sync inverter 294, 295. This inverter corresponds to the inverters 294 and 295 shown in Fig. 4B. The two input terminals SSC and CSC receive the sync and clamp signals respectively and invert them to provide positive sync pulses and negative clamp pulses at the respective output terminals SP and CP of the inverter. The terminals SP and CP are connected to the terminals 169 and 162 respectively, of the delay circuits.

The OR circuit 306 is provided as a means for preventing the arrival of a positive sync pulse at the delay circuits and thereby effect clearing from the counter of the amount or pulses stored therein. This sync pulse is effectively prevented from arriving at the delay circuits or is deleted by preventing it from going positive during a particular time interval. The output terminal 307 of OR circuit 306 is as positive as the most positive voltage applied to its input terminals. Hence, if the output terminal of AND circuit 301*a* is Down and the clear pulse input terminal 308 is Down, the sync signal applied to the remaining input terminal of OR circuit 306 causes a negative sync signal to be transferred to the input terminal SS of the clamp and sync inverter. A positive sync pulse is therefore normally transferred from the output terminal SP of the inverter to the terminal 169 of the delay circuits DC1–DC8 and DCC. At time 9.20 the carry output pulse present at termial 303 is more positive than the sync signal applied to the input of OR circuit 306. Hence, as a result of this carry pulse, the output terminal 307 of OR circuit 306 is Up, the input terminal SSC of the clamp and sync inverter is Up, and the output terminal SP of the clamp and sync inverter is Down. The fact that terminal SP is Down for one time interval prevents operation of the delay circuits and effects a clearing of the pulses present in the counter.

When it is desired to insure that the counter will be set at the 0 position prior to the starting of operation, a positive clear pulse is applied from any appropriate source (not shown) to the clear pulse input terminal 308. As in the case of the positive carry pulse applied to an input OR circuit 306, this positive clear pulse produces a negative pulse at the output terminal SP of the clamp and sync inverter and causes any pulses which may be present in the counter to be lost. Hence, it is seen that when either a positive clear or carry pulse is applied to an input of OR circuit 306 the negative sync signal applied thereto is rendered ineffective so as to delete the sync pulse which would otherwise be present at the output terminal SP of the clamp and sync inverter.

Referring more particularly to Fig. 5B, a particular circuit arrangement suitable for use as the sync inverter is designated as 294 and a similar circuit arrangement suitable for use as the clamp inverter is designated as 295. Since each of these circuit arrangements is similar to the other, description will be confined to the circuit 294. The input terminal SS is connected through a capacitor C and a parasitic suppressing resistor *ps* in series to the control grid of the tube 310. This control grid and the cathode of the tube 310 are connected through appropriate bias resistors to the −150 volt terminal 230. Conventional by-pass capacitors *bp* are provided as shown. The plate of the tube 310 is connected through load resistors to ground to the +150 volt line 166, and to the output terminal SP. Hence, the input pulse applied to the input terminal SS connected to the control grid is 180° out of phase with the pulse produced at the output terminal SP connected to the plate of that tube.

*Counter operation.*—The four counter orders as used herein will now be described with reference to the circuit diagram formed by Figs. 6A, 6B, 6C, and 6D when placed as indicated in Fig. 6 and the chart formed by Figs. 5C, 5D, 7A, 7B, and 7C when placed as indicated by Fig. 8. Briefly, the counter comprises the units, the tens, the hundreds, and thousands orders or positions connected to the corresponding address switch units SU1, SU10, SU100, and SU1000 respectively. The clear and carry units (Figs. 6C and 6D) correspond to the respective orders of the counter.

A positive input or counter advance pulse is always applied to terminal CA (Fig. 6A) at time N.10 to N.20. A positive pulse is always applied to the terminal RO (Fig. 6A) at time N.00 to N.10. The action-regeneration terminal AR (Fig. 6A) is continuously Up during a regeneration cycle and is continuously Down during an action cycle. The potential applied to terminal AR is determined by any suitable external circuitry as pointed out hereinbefore.

The switch units SU1, SU10, SU100, SU1000 are similar and detailed description will be undertaken with reference to switch unit SU1 (Fig. 6A). The switch unit SU1 comprises four separate switches designated SD1, SD2, SD4, and SD8, respectively, where the numeral indicates the binary digit or bit to which each switch corresponds. The actual structure of each switch is similar to every other. The diodes 315 and 316 and the pull up resistor 317 connected between the juncture of the plates of the diodes and the +150 volt line 166 comprise a diode AND circuit. The cathode of diode 316 is connected to the terminal D1 of the units order of the counter and the cathode of diode 315 is connected to the regeneration control line R. Hence, when the line R and the terminal D1 are both Up the juncture of the diodes and the plate of diode 318 connected to that juncture are also Up. This causes the control grid and cathode of the cathode follower tube 319L and the action-regeneration output terminal AR1 connected to that cathode to go Up. Similarly, when the terminal D1 and the regeneration line R are both Down, the juncture of diodes 315, 316, and the plate of diode 318 are Down. As a result the action-regeneration output terminal AR1 is Down. Diodes 315A, 316A, 318A, and pull up resistor 317A similarly connected between the control grid of cathode follower tube 319L, the action control line A and the action cycle address terminal A1 so that when the action line A and the terminal A1 are both Up, the action-regeneration output terminal AR1 is also Up. The action cycle address terminal A1 is Up when the action cycle address includes a value corresponding to the decimal digit 1.

The clear and carry circuits for each order of the counter (Figs. 6C and 6D) are similar. Referring to the clear and carry circuit of the units order (Fig. 6C), the circuit detail of AND circuit 301*a* comprises two diodes 321 and 322, having their cathodes, connected, respectively, to terminals 300 and 302 and the common juncture of their plates connected through pull up resistor 323 to the +150 volt line 166 and through a parasitic suppressing resistor *ps* to the control grid of cathode follower tube 324. The ouput terminal C10 connected to the cathode of tube 324 is also connected to the input terminal 196 of the binary adder of the tens order. Hence, when terminals 300 and 302 are both Up, a carry is effected from the units order to cause the terminal C10 and the terminal 196 of the binary adder of the tens order to go Up, thereby applying an input to the tens order in response to the carry from the units order.

The three input OR circuit 306 comprises diodes 325, 326, and 327, having their cathodes commonly connected through pull down resistor 328 to the −82 volt line 174 and through parasitic suppressor resistor *ps* to the grid of the cathode follower tube 329. The plate of diode 327 is connected to the terminal SS (Fig. 6A) to which a sync signal is applied during each time interval. This causes the control grid of the cathode follower tube 329 and the terminal 307 connected to the cathode of that tube to go Up and thereby apply a sync signal to the terminal SSC of the clamp and sync inverter of the units order. When the presence of a carry from the units order causes the cathode of cathode follower tube 324 to go Up the plate of diode 325 connected thereto also goes Up. This causes the control grid and cathode of cathode follower tube 329 to go Up. The terminal 307 connected to the cathode of tube 329 also goes Up and causes the terminal SSC of the clamp and sync inverter of the units order to go Up. This effects clearing of the units order in a manner described in connection with Fig. 5A. The plate of diode 326 is connected to clear terminal 308 (Fig. 6A). When the clear terminal is Up terminal 307 is Up and the terminal SSC is Up to effect a clearing of the units order of the counter.

It will be noted that the plate of each of the diodes 326 of the OR circuit 306 of the clear and carry circuits for each order of the counter are commonly connected and that the plates of the diodes 327 are also commonly connected. This means that a sync clear pulse may effect a clearing of all orders of the counter and that a sync signal is applied from the terminal SS (Fig. 6A) simultaneously to the clear and carry circuit for each order.

As stated the action-regeneration terminal AR is Up during every regeneration cycle and Down during every action cycle. Circuit operation of the regeneration counter during a regeneration cycle will now be described. When the control terminal AR goes Up the control grid of inverter tube 331L goes Up and its plate goes Down. A decreased voltage is therefore transferred from the plate of the tube 331L through the resistor and capacitor in parallel and the parasitic suppressing resistor to the control grid of the cathode follower tube 331R. This causes the cathode of tube 331R to go Down and the cathode of diode 332 connected thereto go Down. The diodes 332 and 333 and the pull-up resistor 334 connected between the juncture of the plates of the diodes and the +150 volt line 166 comprise a diode AND circuit.

It is seen that when the terminal RO is Up from time N.00 to N.10 during a regeneration cycle that the control grid and cathode of cathode follower tube 336L is Down since the cathode of diode 332 is Down. The action line A connecting from the cathode of tube 336L to the control grids of the tubes of the heavy duty cathode follower 338 is Down and the action line A connected from cathode follower 338 to the address switch units SU1, SU10, SU100, and SU1000 is Down. Hence, an input applied to the terminals A1—A8000 will not produce an output at the action-regeneration output terminals AR1—AR8000 of the switch.

The action-regeneration terminal AR (Fig. 6A) is also connected to the cathodes of the diodes 340 and 341 having their plates connected respectively to the control grids of the cathode follower tubes 336R and 342. The plate of diode 340 is also connected to the plate of diode 343 and through pull up resistor 344 to the +150 volt line 166. The cathode of diode 343 is connected to the read out terminal RO. Hence, diodes 340 and 343 and resistor 344 comprise a diode AND circuit. Since the cathode of diode 340 is Up during an entire regeneration cycle the control grid and cathode of tube 336R is Up when a read out pulse is applied to terminal RO from the time N.00 to time N.10. Since the cathode of tube 336R is Up, the regeneration line R connected thereto and to the control grids of the tubes of the heavy duty cathode follower tube 346 is Up. Likewise, the cathodes of the tubes of the cathode follower 346 and the regeneration line R connected thereto are Up. Since this regeneration line connects to the cathode of the rectifier 315 of each of the switches in the switch units SU1, SU10, SU100, and SU1000 (Figs. 6A and 6C), the action-regeneration output terminals AR1—AR8000 will exhibit the information present on terminals C1—C8000 from N.00 to N.10 of each regeneration cycle.

During an action cycle the action-regeneration terminal AR (Fig. 6A) is Down. The negative voltage applied to the control grid of the tube 331L from the terminal AR causes that tube to become non-conductive and the negative voltage applied to the cathodes of rectifiers 340 and 341 prevents conduction of tubes 336R and 342 in response to positive voltages applied to the readout terminal RO and the counter advance terminal CA, respectively. The cathode of tube 336R is therefore Down and the regeneration control line R is Down.

When tube 331L is rendered non-conductive, the resulting increased plate voltage is transferred through the resistor and capacitor in parallel to the control grid of tube 331R. This causes the voltage at the cathode of tube 331R to go Up and the cathode of rectifier 332 connected thereto to go Up. When a positive readout pulse is applied to terminal RO from time N.00 to N.10 the control grid and cathode of tube 336L go Up. Accordingly, the action line A goes Up and the cathode of each rectifier 315A of the switch units SU1, SU10, SU100, and SU1000 (Figs. 6A and 6C) go Up. It is seen, therefore, that if during the time N.00 to N.10 of an action cycle any one of the terminals A1—A8000 is Up, the corresponding action-regeneration output terminal AR1—AR8000 is Up.

Counter advance pulses are applied to the counter advance terminal CA from time N.10 to N.20 of every cycle. The potential present on the action-regeneration terminal AR is used to determine whether a particular counter advance pulse reaches the input of the binary adder of the units order. It is desired that the counter advance will effect additional storage in response to a counter advance pulse only during a regeneration cycle. During an action cycle the counter must retain the amount already stored therein.

The voltages applied to the action-regeneration terminal AR, the read out terminal RO, the counter advance terminal CA, and terminals A1—A8000 may be derived from any suitable source. When the circuits described are used in conjunction with a digital computer, the action-regeneration control terminal AR would be Down whenever it is desired that the address information presented to the input terminals A1—A8000 become available at the output terminals AR1—AR8000. Thus, the potential presented to terminal AR would be controlled by the computer.

The pulses applied to the terminals RO and CA can be derived from terminals 380 and 381, respectively, of the octal commutator of Fig. 10 to be described hereinafter.

When a counter advance pulse is applied to terminal CA the cathode of rectifier 347 goes Up. The plate of this rectifier is connected to the plate of rectifier 341, through pull up resistor 348 to the +150 volt line 166 and through the parasitic suppressing resistor *ps* to the control grid of cathode follower tube 342. Rectifiers 341 and 347 and pull up resistor 348 comprise an AND circuit. The control grid of tube 342 is therefore Up when a counter advance pulse is applied to the terminal CA providing the cathode of rectifier 341 is also Up by virtue of the terminal AR being Up. The cathode of tube 342 is therefore Up and the input terminal 196 of the binary adder for the units order connected thereto is also Up. Hence, an input is applied to the units order of the counter each time a counter advance pulse is present at the cathode of cathode follower 342.

A complete operating cycle of the counter is readily understood by considering Figs. 5C, 5D, 7A, 7B, and 7C, arranged as indicated in Fig. 8 in conjunction with the circuit diagram of the counter arranged as indicated in Figs. 6A–6D.

From time 0.00 to 9.20 the units order effects storage as described in connection with Fig. 5A. At time 1.00 of a regeneration cycle, for example, the terminal D1 (Fig. 6A) is Up, the regeneration line R is Up and the action-regeneration output terminal AR1 is Up. This indicates that a decimal value of 1 is read out from the counter, and all other action-regeneration terminals AR2—AR8000 remain Down. Finally, at time 9.00 the terminals D1 and D8 are Up and action regeneration output terminals AR1 and AR8 are Up, thereby indicating that a decimal 9 has been read out of the counter.

At time 9.20 input terminal 194 of the binary adder of the units order and terminal D2 (Fig. 6A) are Up. These terminals are connected to the input terminals 300 and 302, respectively (Fig. 6C), of the clear and carry circuit for the units order. When terminals 300 and 302 are Up the cathode of cathode follower tube 324 is Up, and the terminal C10 connected thereto is Up. Terminal C10 (Figs. 6C and 6D) is connected to the input terminal 196 of the binary adder of the tens order. When the cathode of tube 324 goes Up, the control grid and cathode of tube 329 goes Up and the terminal 307 connected thereto and to the terminal SSC of the clamp and sync inverter of the units order (Fig. 6A) also goes Up. In the manner previously described, this effects a clearing of the units order of the counter.

Inputs to the tens, hundreds, and thousands orders of the counter are supplied by the next lower order of the counter only when that lower order effects clear and carry. At time 9.20 (Fig. 7A) the carry from the units order causes the input terminal 196 and thus the output terminal 198–10 of the binary adder of the tens unit to go Up. During the next time interval, 9.30, delay circuit DC20 is rendered operative and terminal D20 (Fig. 6A) goes Up. This has no effect, however, upon switch unit SU10 because both the action line A and the regeneration line R are Down. Similarly, at time 9.40 the terminal D10 goes Up, at 9.50 terminal D80 goes Up and at time 9.60 terminal D40 goes Up. As terminal D40 goes Up input terminal 195 of the binary adder of the tens order goes Up and its output 198–10 also goes Up. Accordingly, terminal D20 is Up at 9.7 time. At time 10.00 the terminal D10 is Up, a readout pulse is applied to terminal RO and the action-regeneration output terminal AR10 is Up to indicate a reading out of the decimal value of 10.

This operation is conditinued with an input pulse being applied to the tens order of the counter each time the units order effects carry and clear. At time 98.00 (Fig. 7A) the terminals D10 and D80 of the tens order are Up and the terminal D8 of the units order (time 8.00, Fig. 5B) is Up. Circulatory operation of the tens order is continued and at time 99.00 the terminals D10 and D80 are again Up. At time 98.10 a counter advance pulse is applied to terminal CA (time 8.10, Fig. 5D) and normal or circulatory operation of the units order is continued until time 99.00 (time 9.00, Fig. 5D) at which time the terminals D1 and D8 are Up and 9 is read out of the units order. At time 99.10 (time 9.10, Fig. 5D) a counter advance pulse is again applied to the terminal CA and at time 99.20 carry and clear is effected by the units order (time 9.20, Fig. 5D). Thus, an input is applied to the terminal 196 of the binary adder of the tens order. It is seen at this time that the terminals 195 and 197–10 of the binary adder for the tens order are Up and that terminals D20 and D40 are Up.

During time 99.30 the pulse just previously present at the terminal D20 renders delay circuit DC10 operative and appears at its output which is connected to the terminal D10 and to the terminal 302 of the clear and carry circuit (Fig. 6C) of the tens order. Also, the pulse present during time 99.20 at the carry terminal 197–10 of the binary adder for the tens order energized delay circuit DCC of the tens order and causes the input terminal 194 of the binary adder and the input terminal 300 of the clear and carry circuit for the tens order to go Up at time 99.30. As a result, the tens order is cleared when the terminal C100 (Figs. 6C and 6D) goes Up to apply an input to the input terminal 196 of the binary adder of the hundreds order (Fig. 7B).

Normal operation of the counter continues and at time 100.00 the terminal D100 (Fig. 6C) is Up, regeneration line R is Up and action-regeneration output terminal AR100 is Up, thereby reading out a decimal value of 100 from the counter. The action-regeneration output terminals associated with the units and tens orders are all Down.

At time 998.00 the output terminals D100 and D800 are Up thereby effecting readout of the decimal value of 900 from the hundreds order. The terminals D80 and D10 are Up, thereby indicating a readout of the decimal value of 90 from the tens order and the terminal D8 is Up thereby indicating readout of the decimal value of 8 from the units order.

Similarly, at time 999.00 a decimal value of 999 is read out of the counter. Thus, the terminals D100, D800, D80, D10, D8, and D1 are Up.

At time 999.40 the input terminals 300 and 302 of the clear and carry circuit for the hundreds order are Up. This causes the output terminals 307 and C1000 (Fig. 6D) thereof to go Up. When terminal 307 goes Up, the hundreds order is cleared and the output present at terminal C1000 is applied to the input terminal 196 of the binary adder of the thousands order. Normal counter operation is continued and at time 1000.00 the terminal D1000 is Up and the decimal value of 1000 is read out.

Counter operation continues as illustrated in Figs. 5C, 5D, 7A, 7B, and 7C. In Fig. 6D it should be noted that there is no connection made to the terminal 302 of the clear and carry circuit for the thousands order. However, terminal 300 of this circuit is connected to the output of the delay circuit DCC of the thousands order and to the input terminal 194 of the binary adder of the thousands order. Since the terminal 302 of the clear and carry circuit for the thousands order is not connected to anything, it is evident that the output of the delay circuit DCC of the thousands order will cause the clear and carry circuit of this order to operate and thus render and output at its terminals C2000 and terminal 307. At time 1999.50 (Fig. 7C) the input terminal 194 of the binary adder of the thousands order is Up so that the input terminal 300 of the clear and carry circuit of the thousands order is also Up. The output terminal 307 of this circuit is Up which effects a clearing of the thousands order of the counter. The terminal C2000 is also Up and thereby indicates that the entire regeneration counter has counted through 2000 positions. The entire counter is now cleared and a cycle of operation has been completed. No further storage is effected until time 0.10 of the next cycle of operation when the entire operation described above is repeated.

It should be noted that clear and carry is effected in each order in the time interval immediately following receipt of an input at terminal 196 of the adder of that order. Since the carry or output from an order occurs during the time interval next following an input thereto it is seen that the carry and clear operation between successive orders of the counter will be advanced by one time interval. For example, carry and clear occurs in the units order at time 9.20 and carry and clear occurs in the tens order at time 99.30. Obviously, therefore, the last carry and clear operation in the units order will occur at time 1999.20, the tens order at time 1999.30, in the hundreds order at time 1999.40 and in the thousands order at time 1999.50.

Considering the units order the delay circuits DC8, DC1, DC2, and DC4, reading from left to right, represent the decimal digits 8, 1, 2, and 4, respectively. In the tens order, reading from left to right, the delay circuits DC40, DC80, DC10, and DC20 represent the decimal values 40, 80, 10, and 20, respectively. To correspond to the units order these delay circuits should represent the decimal values 80, 10, 20, and 40 respectively. This difference or shift of the delay circuit from the extreme right to the extreme left is caused by the single time interval delay between successive orders; for example, the delay in applying the input to the tens order as compared to the input applied to the units order. Since a similar delay is encountered between the tens and hundreds orders and between the hundreds and thousands orders a similar shift in the designated values of the delay circuits is required.

*Pulse stretcher*

Referring more particularly to Fig. 9, input terminal AR1 of the pulse stretcher corresponds to the output terminal AR1 of the regeneration counter (Fig. 6A). It has been explained that the address information present at the output terminals AR1—AR8000 of the switching units SU1—SU1000 is present only during the time interval N.00 to N.10 of an action or a regeneration cycle. In order to successfully operate the deflection circuits which control the positioning of the beams of the cathode ray storage tube, it is necessary that address information be present during the entire action or regeneration cycles, as the case may be. The pulse stretcher provides such an address at output terminals S1 by stretching or extending the pulse received from the terminal AR1 of the regeneration counter over the entire action or regeneration cycle. Hence, when input terminal AR1 is Up from N.00 to N.10, the output terminal S1 is Up for that entire eight microsecond cycle. The pulse stretcher of Fig. 9 will be described by conjoint reference to Figs. 9 and 9A and includes a two-input AND circuit 360*a*, an inverter tube 361, pull down diode 362, pull up diode 363 and cathode follower 364. The cathode of inverter tube 361 is connected through the self-bias resistor 365 and bypass capacitor 366 to ground. The anode of inverter 361 is connected through load resistor 369 to the decoupling resistor 370 and decoupling capacitor 371, which are also connected to the +150 volt terminal 166 and to ground respectively. The resistor 370, resistor 373, diode 374 and resistor 375 comprise a voltage divider connected between +150 volt terminal 166 and ground. The germanium diode 374, having its anode connected directly to the cathode of pull-down diode 362 and through coupling capacitor 376 to the anode of inverter 361, provides a higher impedance when the anode of inverter 361 is Down than when that anode is Up. The anode of pull-down diode 362 is connected to the cathode of pull-up diode 363, and this common connection is connected to ground through a storage capacitor 377, and to input terminal 58 of cathode follower 364. It is seen that the charge on the storage capacitor 377 will determine the conductive condition of the cathode follower 364 and that the charge on the capacitor is determined by the voltage at the commonly connected anode and cathode of the diodes 362 and 363, respectively.

If an input pulse (Fig. 9A) is applied to the input terminal AR1 of the AND circuit 360*a*, it will have no effect upon the control grid of tube 361 connected to the output of the AND circuit 360*a* until a positive sync pulse is applied to the input terminal SP thereof. This sync pulse occurs at approximately .06 time during each time interval of a cycle. The sync pulse may be obtained from the terminal SP of Fig. 4A. Hence, eight such pulses are supplied during an action or a regeneration cycle (Fig. 9A). However, the only sync pulse which can cause operation of the AND circuit 360*a* is the one which occurs at time .06 of each cycle since an input pulse to terminal AR1 may be applied only during the time .00 to .10 of each cycle.

At time .06 both an input pulse and a sync pulse are applied to the AND circuit 360*a*, and the control grid of inverter 361 goes Up. Tube 361 is rendered conductive and its anode goes Down. A negative pulse is therefore applied to the cathode of pull-down diode 362, and tends to pull the anode of that diode Down to the voltage of its cathode, for example, −40 volts.

As the anode of pull-down diode 362 tends to assume the negative value of its cathode, a positive going pull-up pulse occurring only at .06 to .08 time is applied to the terminal 368. As a result, the voltage at the anode of pull-up diode 363 is increased and tends to pull its cathode up to a similar voltage, for example, +50 volts. However, the voltage at the anode of pull-down diode 362 overrides the positive voltage at the cathode of pull-up diode 363 and the storage capacitor 377 discharges and its upper plate is placed at approximately −25 volts. The input and output of cathode follower 364 therefore go Down, and the output (Fig. 9A) terminal S1 goes Down and stays Down until the next pull-up pulse is applied to terminal 368. This occurs at time .06 to .08 of the next cycle. If an input pulse is applied to terminal AR1 during this next cycle, the pull-up pulse will again be overridden, and the output terminal S1 will remain Down. However, if no input pulse is applied to terminal AR1 the pull-up pulse causes the upper plate of storage capacitor 377 to be placed at a positive voltage equal to the most positive voltage attained by the pull-up pulse, for example, +5 volts. When the upper plate of storage capacitor 377 goes positive, cathode follower 364 is rendered conductive and the output terminal S1 goes Up. The larger the value of pull-up resistor 367, the less current will be drawn through the load resistor 369 to override the pull-up pulse applied to terminal 368. However, the upper value of the resistor 367 is limited in that the time constant of resistor 367 and the storage capacitor 377 must be sufficiently small to permit the storage capacitor 377 to be charged by the relatively narrow positive pull-up pulse.

A similar pulse stretcher is provided to receive outputs from each of the output terminals AR2 through AR8000 of the address switch of Fig. 2A.

*Octal commutator*

Referring more particularly to Fig. 10, the octal commutator includes eight delay circuits connected in series. The seven junctures connected to successive delay circuits in the series chain, and the output terminal 156 of the last delay circuit in the series chain (extreme right of Fig. 10) are connected to output terminals 380 to 387 inclusive. The seven junctures of the delay circuits are also connected to a seven-input OR circuit 388 having its output terminal connected to a cathode follower 389. The output of cathode follower 389 is supplied to an inverter 390 having its output connected to a cathode follower 391. The output of cathode follower 391 is connected to the input terminal 154 of the first delay circuit in the series chain (extreme left of Fig. 10).

When any one of the seven junctures of the delay circuits is Up, the output of OR circuit 388 is Up, the output of cathode follower 389 is Up, the output of inverter 390 is Down, the output of cathode follower 391 is Down, and the input terminal 154 of the first delay circuit is Down. Hence, no input is applied to the first delay circuit.

However, if all of the junctures of the delay circuits are Down, the output of OR circuit 388 is Down, the output of cathode follower 389 is Down, the output of inverter 390 is Up, the output of cathode follower 391 is Up, and the input terminal 154 of the first delay circuit is Up. This causes operation of the first delay circuit as described in connection with Figs. 1R and 1S.

Initially, therefore, when the power is turned on to energize the commutator, the input terminal 154 of the first delay circuit is Up. This causes operation of the first delay circuit and causes its output terminal 156 and input terminal 154 of the second delay circuit to go Up. The output terminal 380 connected to this juncture goes Up and provides a positive output pulse. This pulse is arbitrarily designated an N.00 pulse since it occurs at N.00 time. The input to OR circuit 388 connected to the juncture of the first and second delay circuits therefore goes Up. The output of OR circuit 388 goes Up, and the operation of cathode follower 389 and 391 and inverter 390, as described above, causes the input terminal 154 of the first delay circuit to go Down.

During the next time interval the second delay circuit is rendered operative to cause the juncture of the second and third delay circuits to go Up, the OR circuit 388 to again be rendered operative and output terminal 381 to go Up. At this time, N.10, the output terminal 380, which was Up at time N.00 is Down and the terminal 381 is Up. In a similar manner output terminal 382 goes up at time N.20 and the output terminal 381 goes Down. Output terminal 383 goes Up at N.30 and output terminal 382 goes Down.

Finally at time N.70 the output terminal 387 goes Up. All inputs to the OR circuit 388 go Down to cause the input terminal 154 of the first delay circuit to go Up. At this time, N.70, an output is derived from the output terminal 387.

During the next time interval the first delay circuit is rendered operative and causes the output terminal 380 and the associated input to the OR circuit 388 to go Up, thereby causing the input to the first delay circuit to go Down.

During successive time intervals an output pulse appears at the next higher output terminal until the output terminal 387 goes Up and the cycle of commutator operation is again automatically repeated.

It is seen that this commutator is free running and requires no external sources of pulses. During each time interval of an action or regeneration cycle a single output pulse is provided. If, for example, a pulse is desired from time N.00 to time N.10, it may be obtained by connecting to the output terminal 380. Output terminal 380 provides an output pulse from time N.00 to time N.10 and at no other time. Similarly, output terminal 386 provides an output pulse from time N.60 to time N.70.

If it is desired to provide a plurality of output pulses at each time N.00 to N.70, such may be accomplished by using the commutator of Fig. 10 as a master commutator.

Referring more particularly to Fig. 10A, the master commutator is as shown in Fig. 10. The output terminal 156 of the last delay circuit in the series chain of the master commutator is connected to the input terminal 154 of the first delay circuit (extreme left) of two series chains of eight delay circuits each, termed slave 1 and slave 2, respectively. The output terminals of slave 1 are designated 400 to 407 and produce outputs at times N.00 to N.70, respectively. Similarly, the output terminals of slave 2 are designated 410 through 417 and produce outputs at times N.00 to N.70, respectively. The junctures of the delay circuits of slaves 1 and 2 are used to supply pulses to other circuitries. These slaves of the commutator are under the complete control of the master commutator.

It is seen that an input will not be applied to the first delay circuit of slaves 1 and 2 until the master commutator has completed one cycle of operation. When the master commutator completes one cycle of operation, the input terminals 154 of the first delay circuits of slaves 1 and 2 go Up as does the input terminal 154 of the first delay circuit of the master commutator. During the next time interval the first delay circuit of the master and slave commutators is operative.

At N.00 time of the next cycle the output terminals 380, 400, and 410 go Up simultaneously to provide three separate pulses between the time N.00 and N.10, one pulse at each of these output terminals. The slave commutators are now in synchronism with the master and produce an output corresponding to the output of the master commutator.

It is understood that additional slave commutators may be connected as are slaves 1 and 2, and that slave commutators may also be connected to the output terminals 407 and 417 of slaves 1 and 2, respectively.

If slave commutators are connected in parallel with the output terminal 407, two cycles of operation of the master commutator will be required to synchronize the slaves so connected with the master commutator.

*Pull-up pulse*

Referring more particularly to Fig. 11 a circuit is shown which will produce the pull-up pulse (Fig. 9A) necessary for the operation of the pulse stretcher of Fig. 9. A synchronous or sync pulse (terminal SP, Fig. 4B) is applied to the input terminal 10A of the two-input AND circuit 421$a$ and the input terminal 10B of the AND circuit 421$a$ is connected to the output terminal 380 of Fig. 10. The amplifier tube 423 is conductive only when the output terminal 16 of the AND circuit 421$a$ is Up. The output terminal 16 is Up only when pulses are applied simultaneously to the inputs 10A and 10B. A single pulse is applied to the input terminal 10A during each time interval of an action or regeneration cycle. However, a pulse is applied to the input terminal 10B only when the output terminal 380 of Fig. 10 is Up or from time N.00 to N.10 of each cycle. Hence, there is pulse coincidence at the input terminals of the AND circuit 420$a$ from N.06 to N.10 and the output terminal 16 of AND circuit 421$a$ is Up from N.06 to N.10 of each and every action and regeneration cycle. The pull-up pulse in Fig. 9A is present from N.06–N.08 whereas the pull-up pulse at terminal 368 (Fig. 11) is present from N.06–N.10. This showing in Fig. 9A is merely to illustrate that such a pull-up pulse can be produced by the circuit of Fig. 11 and used to operate the pulse stretcher of Fig. 9.

When output terminal 16 is Up, the control grid of amplifier 423 is Up and its plate is Down. This causes transfer of a negative pulse through the coupling capacitor 425 to the control grid of tube 426. This negative pulse causes the normally conductive tube 426 to be cut off at time N.06 and its plate to rise toward +150 volts, to which it is connected through the peaking coil 427. The peaking action of this coil is similar to that obtained by the use of inductance 164 (Fig. 1R), and causes a positive pulse to be transferred through the coupling capacitor 428 to the control grid of cathode follower tube 429. This pulse causes the cathode of tube 429 and the output terminal 368 connected thereto to go Up.

At time N.10 the control grid of tube 423 goes Down, the anode of this tube and the control grid of tube 426 go Up, the plate of tube 426 and the grid of tube 429 go Down, and the cathode of tube 429 follows its control grid and goes down to cause the output terminal 368 to go Down. Hence, a positive pull-up pulse is provided at terminal 368 from time N.06 to N.10 of each and every action and regeneration cycle.

*Connection of deflection circuits*

The actual connection of the deflection circuits is shown in Figs. 2A and 2B. However, a complete understanding of these connections is dependent upon the understanding of the actual physical arrangement or display of information stored upon the face of the cathode ray tubes.

This arrangement or raster is explained in connection with Figs. 12A, 12B, 12C and 12D. From these figures it is seen that the storage areas or positions on the face of each cathode ray tube are grouped into ten areas. Each of these areas include ten vertical columns of storage area and five horizontal rows of storage area; each therefore includes 50 discrete beam positions or storage areas, Since there are ten such rectangular areas, the face of each cathode ray tube provides a total of 500 discrete beam positions and the cathode ray tubes CRT A–D provide a total of 2000 discrete beam positions. Such represents a storage capacity of 2000 bits and provides for a storage of one predetermined binary bit or order of one decimal digit or position of each word; for example, the lowest binary bit of the units order decimal digit or position of each of the 2000 words capable of being stored.

Figure 12A:
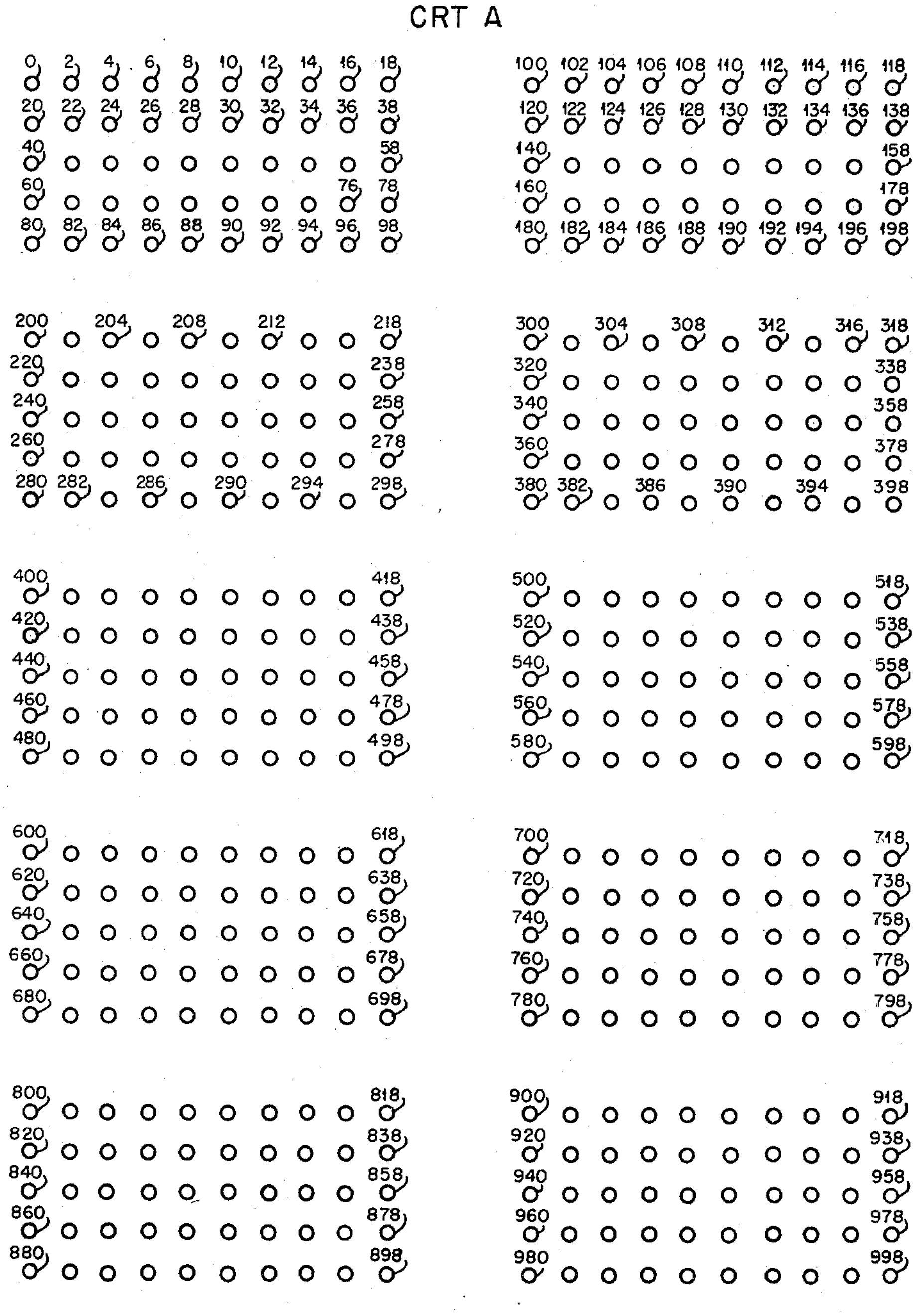

The various beam positions are designated on the drawings by circles and are assigned a decimal number corresponding thereto. The upper left position of the upper left rectangular area of Fig. 12A is designated the zero beam position. The next beam position to the immediate right is the two position, next, the four position, and so on until the eighteenth position is found at the extreme right. The extreme left position of the next lower or second row is the twenty position, next the twenty-two position, and so forth. Finally, the last or the extreme right position on the fifth row is the ninety-eight position. Hence, this rectangular area includes all even-numbered beam positions from zero to ninety-eight inclusive.

The beam positions within the upper right rectangular area are similarly arranged and include all even-numbered positions from 100 to 198 inclusive. The next lower rectangular area on the left includes all even-numbered positions from 200 to 298 inclusive, and the area to its right all even-numbered positions from 300 to 398 inclusive.

This system of designations is continued and the lowest beam position at the extreme right is 998. Hence, CRT A provides for all even-numbered positions from zero to 998 inclusive.

Figure 12B:
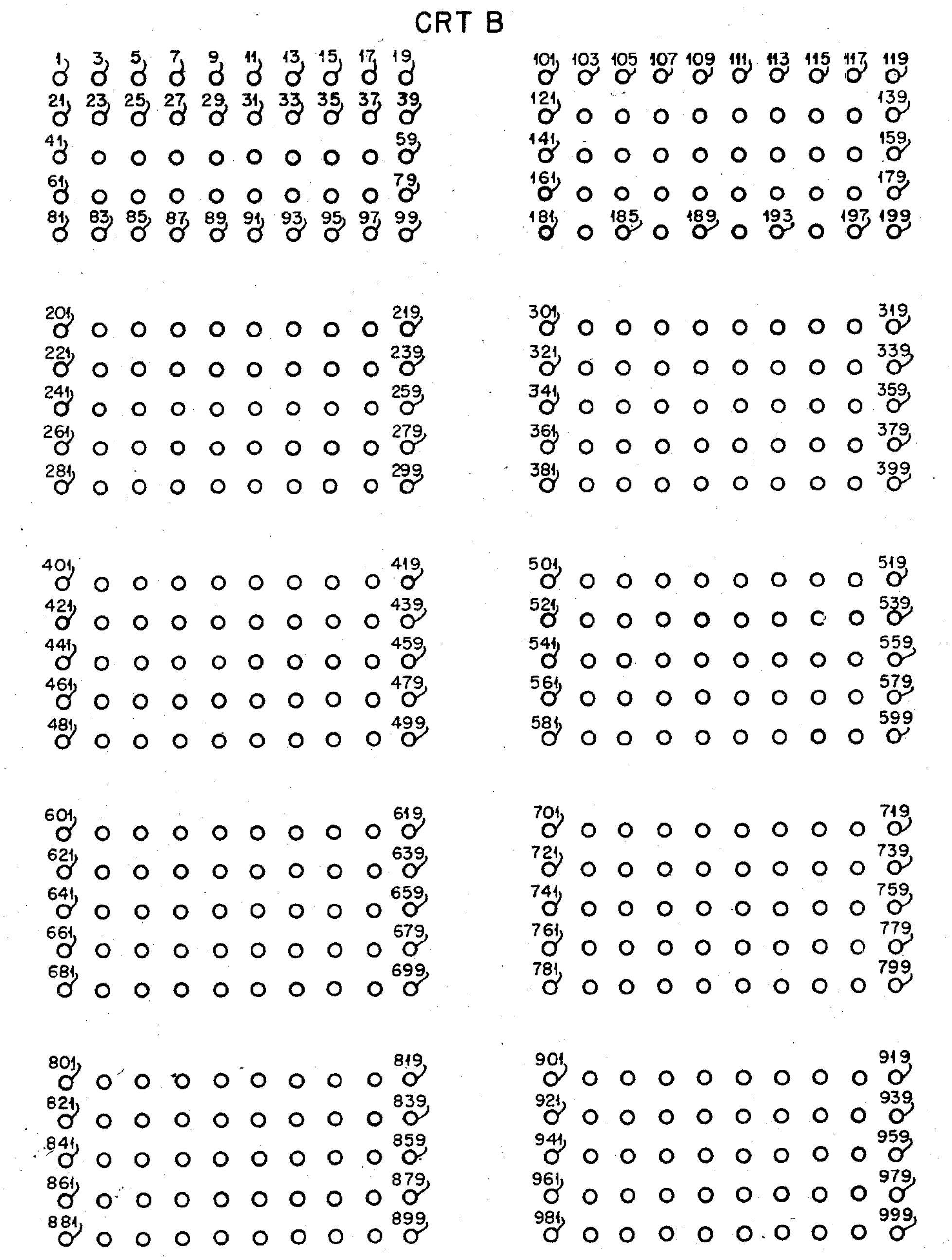

Fig. 12B shows the numbered beam positions for CRT B where position 1 corresponds to position 0 in Fig. 12A and position 3 to position 2 in Fig. 12A. This same scheme of designation is applied throughout so that CRT B provides for all odd-numbered positions from 1 to 999 inclusive.

Figure 12C:
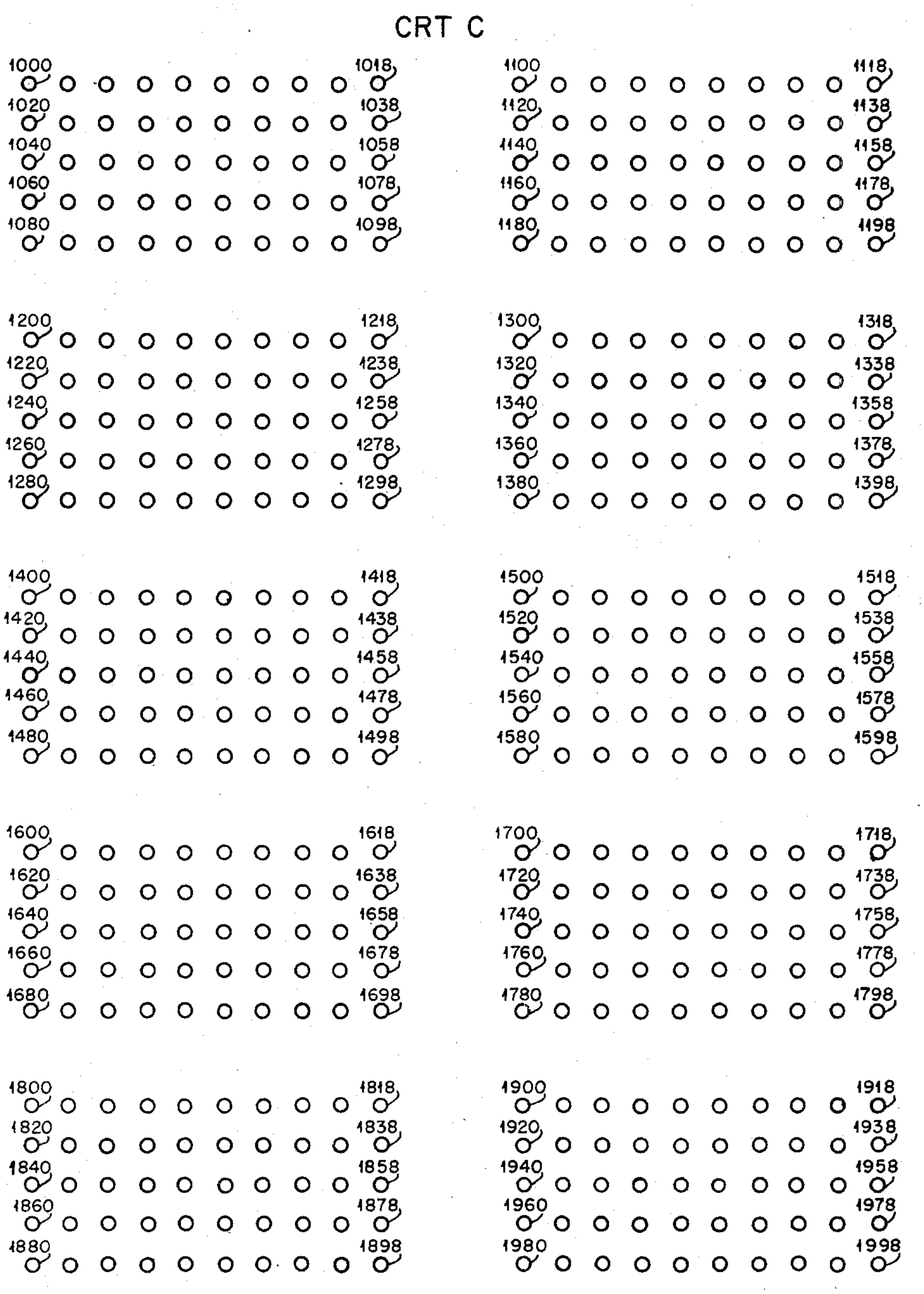
Figure 12D:
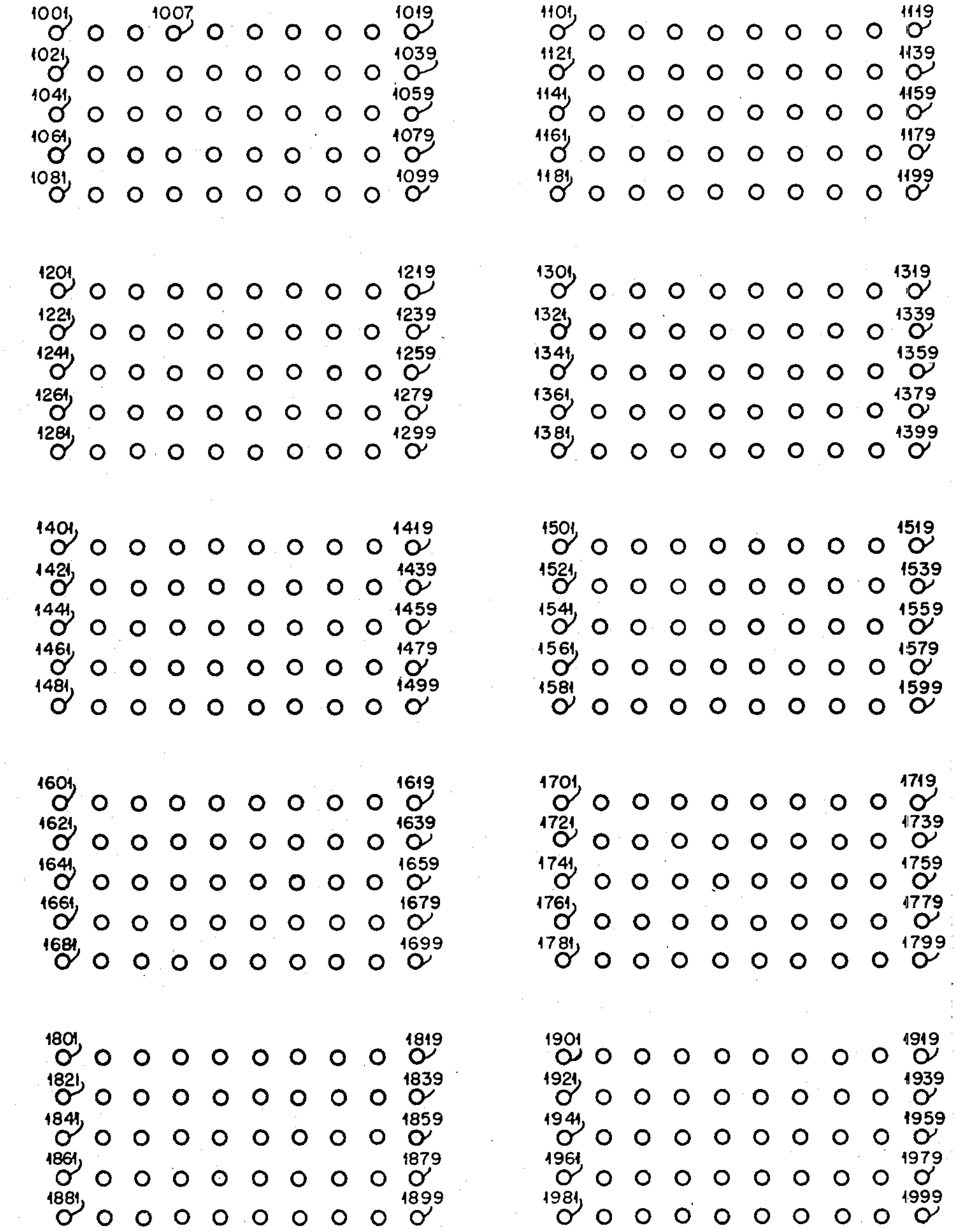

Similarly, Fig. 12C includes the even-numbered positions from 1000 to 1998 inclusive, and Fig. 12D includes the odd-numbered positions from 1001 to 1999 inclusive.

If it is desired to refresh or regenerate all the information stored at the 2000 positions or addresses, the electron beam will have to be moved in step-by-step fashion with the proper tube selection to regenerate all the information stored in proper position sequence. The regeneration of the information at a single position is accomplished during a single eight microsecond regeneration cycle. The sequential regeneration of the information at all of the 2000 addresses is accomplished during 2000 sequential regeneration cycles referred to herein as a complete regeneration cycle.

The actual voltages applied to the deflection circuits to produce electron beam deflections to the addresses indicated in Figs. 12A, 12B, 12C, and 12D are represented by the chart of Fig. 13 and shown graphically in Figs. 14 and 15.

In Fig. 13 the units, tens, hundreds, and thousands orders represent the corresponding decimal orders or positions and the binary representations when reading from right to left in the column represent the binary orders from the lowest to the highest. For example, the zero in the upper right position of the units order column represents the lowest binary order and the zero in the upper left of the thousands order represents the highest binary order. The decimal numbers in the extreme right-hand column represent the addresses or beam positions on the face of CRT A–D (Fig. 2C). The electron beams of the cathode ray tubes are placed at these various positions or addresses in response to voltages represented by the binary representations corresponding thereto. In Figs. 14 and 15 the horizontal and vertical deflection weights, respectively, of certain specified connections to the horizontal and vertical deflection circuits is graphically represented. A deflection weight of one is equivalent to a deflection of one position in a given direction. The individual deflection weights are represented by the digits 0 through 9 inclusive.

In Fig. 14 the horizontal deflection weight of the 4's line is 2. This means that the digit 2 represents the relative contribution of the voltage provided by the 4's line in effecting horizontal deflection of the electron beams. In each case the deflection weight indicates the voltage contribution of the designated line in effecting deflection of the electron beam.

The 2's line of Fig. 14 corresponds to the terminal 12 (Fig. 2B) and is Up when it provides a beam deflection voltage. Similarly, the 4's line corresponds to terminal 14, the 40's line to terminal 140 and so forth.

Addresses shown in Figs. 13, 14, and 15 correspond to those for cathode ray tubes CRT A–D (Fig. 2C) as illustrated in Figs. 12A–12D, respectively. The spot positions shown in Figs. 14 and 15 are numbered to correspond to the number of times the electron beams have actually been shifted or repositioned to be on the address corresponding thereto. In other words, the spot position indication ignores tube selection. For example, when the electron beams are at spot position 3 the address sought may be either 6 (Fig. 12A), 7 (Fig. 12B), 1006 (Fig. 12C), or 1007 (Fig. 12D), the actual address being determined by the tube selector TS (Fig. 2B).

The step-by-step sequential positioning of the electron beams as shown by Figs. 13, 14, and 15 is accomplished during a complete regeneration cycle. Initially, the electron beams are in the upper left positions and the tube selector has selected tube A to be operable. At the end of the first regeneration cycle (8 microseconds, Fig. 14) the 1's line goes Up. This is indicated by the presence of a pulse at address 1 (Fig. 14) in the lowest binary order of the units order or position corresponding to address 1 (Fig. 13). This causes the tube selector circuit to select tube B. At the end of the second regeneration cycle, that is, 16 microseconds elapsed time as designated in Fig. 14, the 2's line goes Up and the 1's line goes Down. This causes the electron beam to be shifted to address 2 and CRT A to be selected. At this time regeneration of addresses 0 and 1 have been completed, and the electron beams have been shifted one spot position and regeneration of address 2 is begun. Eight microseconds later the 1's line again goes Up and tube B is selected so that regeneration of address 3 is begun. Eight microseconds later at spot position 2 the 1's line and the 2's line go Down and the 4's line goes Up. At this time tube A is selected and regeneration of address 4 is begun. It is seen from the units order, total horizontal deflection weight curve, that the total weight of the deflection voltage is twice that provided when the 2's line alone is Up. It follows therefore that the 2's line going Up causes the deflection of one spot position and the 4's line going up causes the deflection of two spot positions. At address 6 the 2's line again goes up, and its deflection weight voltage of 1 is added to that of the 4's line to provide a total deflection weight of 3. When the 2's line and the 4's line are Up, the regeneration of addresses 6 and 7 is effected. Next the 2's line and the 4's line go Down and the 8's line goes Up. The electron beams are now at spot position 4 and address 8 is selected. The 8's line, therefore, must provide a total deflection weight voltage of 4. When the 1's line next goes Up, regeneration of address 9 is effected.

When the regeneration of address 9 is completed, the 8's line goes Down. All lines of the units order are now Down and the units order is in its starting position. At this time the 10's line or the lowest binary order of the tens order (Fig. 13) goes Up. When the 10's line goes Up the total horizontal deflection weight voltage (which is the units and tens orders total horizontal deflection weight voltage, Fig. 14) causes the electron beams to be shifted to spot position 5, and CRT A is selected so that regeneration of address 10 is begun. The 10's line remains Up while the units order repeats its cycle of operation. Hence, the deflection weight voltages provided by the 2's, 4's, and 8's lines are added to that of the 10's line line to provide the total horizontal deflection weight curve shown in Fig. 14. These voltages effect deflection of the beam through the remaining spot positions up to and including 9 and effects regeneration of the addresses through address 19.

When regeneration of address 19 is completed the units order returns to its initial zero position, and the 10's line goes Down. The horizontal deflection of the electron beam is therefore 0 and the addresses 0 through 19 shown in Figs. 12A and 12B have been regenerated.

Next, the 20's line (Fig. 15) goes Up. This is shown by pulse output at the second binary order of the tens order in Fig. 13. The 20's line of the tens order is assigned a vertical deflection weight voltage of 1, and is therefore connected to the vertical cathode ray tube deflection circuits (120, Fig. 2B). When the 20's line goes Up, the beams are deflected one spot position downward so that they are now positioned at addresses 20, 21, 1020, and 1021. As stated above the 1's line is now Down and tube A is selected. Hence, regeneration of address 20 is begun. As previously pointed out the 1's line goes Up at the end of the first eight microsecond period and selects CRT B so that regeneration of address 21 is begun. The electron beams remain in this same vertical position until addresses 20 through 39 inclusive are regenerated. Hence, while the beams are in this vertical position, the operation described in connection with Fig. 14 is repeated. At the end of 160 microseconds the 20's line goes Down and the 40's line goes Up. The total vertical deflection weight voltage now applied which is the tens order vertical deflection weight voltage, is now twice that previously applied so that the 40's line is assigned a total deflection weight of 2. Regeneration of addresses 40 through 59 is now effected in the manner above described.

Subsequently, at the end of another 160 microseconds the 20's line goes Up to position the beam at spot position 9 (Fig. 15) where it remains in its vertical position until addresses 60 through 79 are regenerated. During this time both the 20's and the 40's lines are Up (Figs. 13 and 15). The 20's line and the 40's lines then go Down and the 80's line goes Up to position the beam at spot position 4 to effect regeneration of addresses 80–99 inclusive. The total regeneration time of 800 microseconds has elapsed and the 20's, 40's, and 80's line are Down.

Next, the 100's line connected to the horizontal deflection circuits (Fig. 2B) goes Up. The horizontal deflection voltage supplied by the 100's line is assigned a deflection weight value of 10. This causes the electron beams to be positioned on addresses 100, 101, 1100, and 1101. The above described operation is now repeated to effect regeneration of addresses 100–199, inclusive. At this time the 100's line goes Down and the 200's line (Fig. 15) connected to the vertical deflection circuits goes Up. The voltage supplied by the 200's line is assigned a deflection weight value of 5 and causes the electron beams to be positioned at addresses 200, 201, 1200, and 1201. The units and tens orders cycles described above are again repeated to effect a regeneration of addresses 200–299, inclusive. The deflection weights of the 20's, 40's, and 100's lines of the 10's order are, for the first time, added to the deflection weight of the 200's line to produce the tens and hundreds order total deflection weight voltages shown in Fig. 15. The units order and tens order deflection weights return to zero. The 200's line remains Up and the 100's line goes Up. The vertical deflection voltage applied to the electron beams has a weight of 5 because the 200's line is Up, and the horizontal deflection weight is 10 because the 100's line is Up. Hence, the electron beams are positioned to addresses 300, 301, 1300, and 1301. Addresses 300–399 inclusive, are now regenerated as described hereinbefore.

Next, the 100's line and the 200's line go Down, the 400's line (Fig. 2B) connected to the vertical deflection circuits and supplying a voltage having a vertical deflection weight of 10 goes Up. This causes the electron beams to be positioned at addresses 400, 401, 1400, and 1401. The addresses 400–499 inclusive, are now regenerated as described hereinbefore.

Next, the 100's line goes Up to cause the electron beams to be positioned to addresses 500, 501, 1500, and 1501. Regeneration of addresses 500–599 inclusive, is now effected. Then the 100's line goes Down and the 200's line goes Up. The 200's line and the 400's line are now Up so that the weight of the total vertical deflection voltage is 15. This causes the electron beams to be positioned at addresses 600, 601, 1600 and 1601. Addresses 600–699 inclusive, are now regenerated. The 100's line again goes Up so that the electron beams are positioned to addresses 700, 701, 1700, and 1701. Addresses 700–799 inclusive, are now regenerated.

Next, the 100's line, 200's line, 400's line go Down. The 800's line (Fig. 2B) connected to the vertical deflection circuits and assigned a vertical deflection weight of 20 goes Up. This causes the electron beams to be positioned at addresses 800, 801, 1800, and 1801. Addresses 800–899 inclusive, are now regenerated.

Next, the 100's line again goes Up causing the electron beams to be positioned to addresses 900, 901, 1900, and 1901. Addresses 900–999 inclusive, are regenerated.

All lines of the units, tens, and hundreds orders now go Down and the 1000's line connected to the tube selector goes Up. This means that cathode ray tubes CRT A and B will no longer be selected and that cathode ray tubes CRT C and D will be alternately selected in response to the voltage supplied by the 1's line in the same manner that cathode ray tubes CRT A and B were selected when addresses 0–999 inclusive, were regenerated.

The electron beams are now at addresses 0, 1, 1000, and 1001. The cycle of operation described above is now repeated to effect the generation of addresses 1000–1999 inclusive. A complete regeneration cycle is now accomplished. The electron beams are returned to their initial positions, and are ready to execute a second complete regeneration cycle. It should be understood that an action cycle may be executed following the completion of any eight microsecond regeneration cycle.

*Deflection circuits*

Referring more particularly to Figs. 16A and 16B, the horizontal deflection circuit comprises five current adding deflection units designated DU2, DU4, DU8, DU10, and DU100, and cathode follower stabilizing circuits 450 and 451.

The current increment switching unit DU2 is typical of those employed herein. These switching units comprise twin triode tubes 452L and 452R connected to operate as a switching unit to cause a given increment of current to be added to that flowing through the voltage stabilizing circuits 450 or 451. The commonly connected cathodes are connected through a load resistor 453 to the −150 volt line 230. The anode of tube 452L is connected directly to the line 454 and the anode of tube 452R is connected directly to line 455. The control grids of tubes 452L and 452R are connected through parasitic suppressing resistors *ps* and the resistors 457 and 458, respectively, to the ground line G. These grids are also connected through the parasitic suppressing resistors to the anodes of diodes 460 and 461, respectively. The cathode of diode 460 is connected to the terminal S2 (Fig. 2B) and the cathode of diode 461 is connected to terminal I2 (Fig. 2B).

Similarly, the cathodes of the diodes 460 and 461 of the deflection units DU4, DU8, DU10, and DU100 are connected to the terminals S4, I4; S8, I8; S10, I10; and S100, I100 of Fig. 2B.

Again, consider the switching unit DU2 as exemplary. When a decimal 2 is included in the address, the terminal S2 is Down and the terminal I2 is Up. Conversely, when No. 2 is included in the address the terminal I2 is Down and the terminal S2 is Up. The condition of the remaining S and I terminals is similarly determined by the presence or absence of the corresponding decimal number.

When No. 2 is included in the address the terminal I2 is Down and the terminal S2 is Up. Since terminal I2 is Down, the cathode of diode 461 is Down and the potential difference between the cathode and anode of this diode is sufficient to cause conduction therethrough. The control grid of tube 452R which is connected to the anode of diode 461 then goes Down. As a result, the control grid of tube 452R is placed below the cutout potential and tube 452R is rendered non-conductive. At this same time the diode 460 is rendered non-conductive because the terminal S2 is Up and thus the cathode of diode 460 is more positive than its anode. The control grid of tube 452L is therefore placed at the same potential as the ground line G and tube 452L is rendered conductive.

If a decimal 2 is included in the address, the conductive condition of diodes 460 and 461 is reversed, that is, the terminal S2 is Down so that the diode 460 is rendered conductive, thereby causing tube 452L to be rendered non-conductive. The terminal I2 being Up causes diode 461 to be rendered non-conductive and thus tube 452R is rendered conductive.

Hence, when a decimal 2 is not present in the address, all of the current through load resistor 453 passes through tube 452L and when a 2 is included in the address, all of the current through load resistor 453 passes through tube 452R.

The tubes 462 and 463 designated as unit 450 (Fig. 16B) are connected in parallel and serve as the load impedance of the various tubes 452R. Considering the tube 452R of current increment switch DU2, this tube is in series with the tubes 462 and 463 and the load resistor 464 between +390 volts and −150 volts. This arrangement is termed a "cascode" amplifier and is more fully described in connection with Fig. 11.23 on page 440 of Vacuum Tube Amplifiers, volume 18, Radiation Laboratory Series, McGraw-Hill, 1948.

The purpose of the tubes 462 and 463 is to stabilize the anode potential of the tube 452R so that the current flowing through this latter tube will be independent of the total current flowing through the tubes 462 and 463. That is with a given anode potential and a given cathode resistor, the tube 452R will conduct a particular value of current when in a conductive state. If then the anode potential changes by 30 volts, for example, the tube 452R will no longer conduct the same amount of current. Therefore, the anode potential must be stabilized within a certain voltage range, say 10 volts. The effect of the cascode amplifier is to cause the wide changes in potential which would normally appear at the anode of tube 452R (due to the changes in current therethrough) to appear at the anode of the tube 462 and 463, that is, terminal HL. Although the tubes 462 and 463 are not cathode followers due to the presence of the load resistor 464, they can be likened to them since their cathode potentials will always be within approximately 10 volts or less of their grid potentials.

The stabilizing circuits 450 (Fig. 16B) includes two twin triode tubes 462 and 463. The cathodes of these tubes are commonly connected to the line 455 and their anodes are commonly connected through parasitic suppressing resistors and a load resistor 464 to the +390 volt line 466. The control grids of tubes 462 and 463 are connected through parasitic resistors to a potential point 467 intermediate resistors 468 and 469 (Fig. 16A) which are respectively connected to the +150 volt terminal 166 and the +390 volt line 466. The control grids of these tubes are also connected to ground through a decoupling capacitor 465.

The anodes of tubes 452R of the switching units DU2, DU4, DU8, DU10, and DU100 are commonly connected to the cathodes of tubes 462 and 463 of the stabilizing circuit 450 (Fig. 16B). When all of the tubes 452R are non-conductive, the series current path from the +390 volt terminal 466 through resistor 464, tubes 462 and 463, and tubes 452R to the −150 volt terminal 230 is interrupted so that the tubes 462 and 463 are rendered non-conductive. However, when one or more of the tubes 452R is conductive, the tubes 462 and 463 are rendered conductive and a voltage drop occurs across resistor 464. A signal is therefore exhibited at the terminal HL which is connected to the left horizontal deflection plate of the cathode ray tubes CRT A–D (Fig. 2C).

The stabilizing circuit 451 (Fig. 16C) is similar to 450 and the resistor 470 is identical with resistor 464

(Fig. 16B). The commonly connected cathodes of tubes 462 and 463 of circuit 451 are connected to the line 454, which joins the anodes of the tubes 452L of the switching units DU2, DU4, DU8, DU10, and DU100.

As previously explained, to obtain the address representations or deflection patterns shown in Figs. 12A–D, it is necessary that the signal applied to the horizontal deflection plates have an assigned deflection weight of 1 when a decimal 2 is included in the address. Similarly, the signal to the horizontal deflection plates when a decimal 4, decimal 8, decimal 10 or decimal 100 is included in the address must have assigned deflection weights of 2, 4, 5 and 10, respectively. In other words, the currents flowing through resistor 453 of DU2, resistor 472 of DU4, resistor 473 of DU8, resistor 474 of DU10, and resistor 475 of DU100 are related as 1, 2, 4, 5, and 10, respectively. Since these currents must be so related, it follows that the value of the resistors must be related in a like manner. Hence, resistor 453 may have a value of 50K, resistor 472 of 25K, resistor 473 of 12.5K, resistor 474 of 10K and resistor 475 of 5K.

It should be noted that each of the tubes 452L and 452R of switching unit DU100 is a twin triode connected in parallel. Such is necessitated by the high current flow through the 5K resistor 475.

In order for the address representations or deflection patterns (Figs. 12A–D) to be reproduced it is necessary that equal deflection of the electron beam be provided when it is shifted from any one spot position to the next. The total current flowing through resistors 464 and 470 is always a constant value. In order to shift the beam from one spot position to the next, the current flowing through one of the resistors, for example 470, is decreased by a predetermined amount, for example, 3 milliamperes, and the current flowing through resistor 464 is increased by the same amount.

Since a deflection weight value of one causes a shift or deflection of the electron beam one spot position, a change in current flow of three milliamperes may be said to represent a deflection weight of one. The total or maximum horizontal deflection weight is represented by the summation of 1, 2, 4, 5, and 10 or by 22. The total current flowing at all times is therefore 22×3 or 66 milliamperes. When the address is 0, the terminals S2, S4, S8, S10, and S100 are Up and all of the tubes 452L are conductive so that all current flows through the line 454 and resistor 470 (Fig. 16A). The terminal HR is connected to the right horizontal deflection plate of the cathode ray tubes CRT A–D and the electron beams are caused to be in the extreme left positions (Figs. 12A–D). Hence, the deflection circuits may be said to be in the zero or initial starting condition.

As stated when the electron beams are in spot position 0, the tubes 452L of the switching units DU2, DU4, DU8, DU10, and DU100 are conductive and the total current of 66 milliamperes flows through resistor 470. The actual operation of the horizontal deflection circuits of Figs. 16A and 16B to obtain the beam deflection positions indicated in Figs. 12A–D is more easily realized by conjoint reference to Figs. 12A–D, and Fig. 14.

When the electron beams are to be moved to spot position 1, the terminal S2 goes Down, and the terminal I2 goes Up (2's line, Fig. 15). The tube 452R of switching unit DU2 (Fig. 16B) is rendered conductive and the 3 milliamperes of current flowing through this tube also flow through tubes 462 and 463 and through resistor 464, thereby producing a drop in potential at terminal HL which is applied to the left-hand horizontal deflection plates of cathode ray tubes CRT A–D (Fig. 2B). Prior to the 2's line going Up these 3 milliamperes of current flowed through resistor 470 (Fig. 16A). Hence, when the electron beams are in spot position 1, 63 milliamperes of current flow through resistor 470 (Fig. 16A) and 3 milliamperes flow through resistor 464 (Fig. 16B).

When the electron beams are to be placed at spot position 2 (i.e., addresses 4, 5, 1004, and 1005) the 2's line goes Down and the 4's line goes Up (Fig. 14).

It follows that the tube 452R of switching unit DU2 becomes non-conductive and the tube 452L thereof becomes conducive. This means that the 3 milliamperes of current flowing through switching unit DU2 is again caused to flow through resistor 470 (Fig. 16A). Also the tube 452L of switching unit DU4 is rendered non-conductive and the tube 452R thereof is rendered conductive. Since the value of resistor 472 of switching unit DU4 is one-half that of resistor 453 of unit DU2, a total of 6 milliamperes now flow through tube 452R and thus through tubes 462 and 463 of stabilizing circuit 450 and hence through resistor 464 (Fig. 16B). A total of 60 milliamperes now flows through resistor 470 (Fig. 16A) and a total of 6 milliamperes flows through the resistor 464 (Fig. 16B). The electron beams of the cathode ray tubes CRT A–D are now placed at spot position 2.

When the electron beams are to be placed at spot position 3, tube 452L of switching unit DU2 becomes non-conductive and the tube 452R thereof becomes conductive. Hence, the 3 milliamperes of current through switching unit DU2 is again caused to flow through resistor 464 and is added to the 6 milliamperes of current already flowing through this resistor as a result of the conduction of tube 452R of switching unit DU4.

When the electron beams are to be placed at spot position 4, the tubes 452L of switching units DU2 and DU4 again become conductive to cause the 9 milliamperes of current from these units to again flow through resistor 470. At the same time the 8's line (Fig. 14) goes Up and the tube 452L of switching unit DU8 is rendered non-conductive while the tube 452R is rendered conductive. This causes the 12 milliamperes of current flowing through the switching unit DU8 to flow through resistor 464. The electron beams are now placed at spot position 4.

When the electron beams are to be placed at spot position 5, the 8's line goes Down (Fig. 14) causing the tube 452L of the switching unit to become conductive and the 12 milliamperes which were flowing through resistor 464 to now flow through resistor 470. At the same time the 10's line (Fig. 14) goes Up and the tube 452L is rendered non-conductive since the terminal S10 is Down and the terminal I10 is Up. The tube 452R is rendered conductive. The 15 milliamperes of current flowing through switching unit DU10 are now caused to flow through the resistor 464 and the electron beams are placed at spot position 5. Conduction of tube 452R of switching unit DU10 continues while the operation of switching units DU2, DU4, and DU8 is repeated. This causes the electron beams to be placed at the spot positions 6, 7, 8, and 10, respectively.

When the electron beam is to be placed at spot position 10, all of the switching units return to their initial position. The actual positioning to spot position 10 is determined by operation of the vertical deflection circuits described hereinbelow.

When the electron beams are to be placed at the spot positions corresponding to addresses 100, 101, 1100, and 1101, the switching units DU2, DU4, DU8, and DU10 are returned to their initial condition, i.e., tubes 452L conducting. The terminal S100 goes Down and the terminal I100 goes Up. This causes the tube 452L of switching unit DU100 to become non-conductive and the tube 452R thereof to become conductive. As a result the 30 milliamperes of current flowing through switching unit DU100 now flow through resistor 464 and the electron beams are at the addresses indicated above.

The tube 452R of switching unit DU100 remains conductive and subsequent horizontal deflection is effected in the manner described hereinbefore until the electron beams are to be placed at the spot position corresponding to addresses 118, 119, 1118, 1119. To effect such, the tube 452R of switching units DU8, DU10, and DU100 is caused to be conductive. This means that a total of 57 milliamperes flows through the resistor 464, and that the remaining current of 9 milliamperes flows through the resistor 470. The electron beams are now in their most extreme right-hand positions.

When the beams are at the opposite extremity of deflection, that is, in the 0 spot position, a total current of 66 milliamperes flows through the resistor 470 and zero current flows through resistor 464. This unbalance in the flow of current means that the deflection pattern will not be centered on the face of the cathode ray tubes.

Referring more particularly to Figs. 17A and 17B, the vertical deflection circuit comprises vertical switching units VSU20, VSU40, VSU80, VSU 200, VSU400, and VSU800, and the voltage stabilizing circuits 450 and 451. These switching units and the voltage stabilizing circuits are similar to those described in connection with the horizontal deflection circuits of Figs. 16A and 16B. The particular voltage and component values of the two circuits are not necessarily the same. A +367.5 volt line 480 is provided in the place of the +390 volt line 466 of Figs. 16A and 16B. In Fig. 17A the resistor 468 is connected between the potential point 467 and ground whereas in Fig. 16A it is connected between the same potential point and the +150 volt line 166. Variations in the particular component value as well as supply voltage lines are necessitated by the different current value employed in the vertical deflection circuits. The values of the resistors 464 and 470 of Figs. 17A and 17B will not necessarily be identical to those of Figs. 16A and 16B.

Connection of the S and I terminals to the tubes 460 and 461, respectively, of the vertical switching units corresponds to that shown in Fig. 2B. The cathode resistor 481 of switching unit VSU20 (Fig. 17B) has a value of 50K and corresponds to a vertical deflection weight of 1. The respective cathode resistors 482, 483, 484, 485, and 486 of switching units VSU40, VSU80, VSU200, VSU400 and VSU800 are of 25K, 12.5K, 10K, 5K, and 2.5K, respectively. Hence, in the order named these resistors represent vertical deflection weights of 2, 4, 5, 10, and 20. Again, the incremental current change required to effect deflection of the electron beams from one spot position to the next is 3 milliamperes. Since the total vertical deflection weight is the sum of 1, 2, 4, 5, 10, and 20 or 42, the total current flowing through the resistor 470 when the electron beams are in the 0 vertical spot position is 126 milliamperes and the current flowing through the resistor 464 is 0 milliampere.

An understanding of the actual circuit operation is facilitated by conjoint reference to Figs. 17A, 17B, Fig. 15, and Figs. 12A–D. As stated, when the electron beams are in the vertical spot position zero all of the tubes 452L of the vertical switching units are conductive and 126 milliamperes of current flow through resistor 470 while 0 milliampere flow through resistor 464. Accordingly all of the input terminals I to the vertical switching units are Down and all of the S input terminals to these units are Up. When the electron beams are to be placed at spot position 1, the 20's line (Fig. 15) goes Up. This means that terminal S20 goes Down and terminal I20 goes Up. As a result tube 452L of the switching unit VSU20 is rendered non-conductive and tube 452R thereof is rendered conductive. Hence, 3 milliamperes of current now flow through resistor 464 (Fig. 17B) and 123 milliamperes flow through resistor 470 (Fig. 17A). This places the electron beams in spot position 1.

Next, the electron beams are to be deflected to vertical spot position 2. The 20's line goes Down (Fig. 15) and the 40's line goes Up. As a result the switching unit VSU20 is returned to its initial condition, tube 452L of switching unit VSU40 is rendered non-conductive and the tube 452R thereof is rendered conductive. The total current flowing through switching unit VSU40 is 6 milliamperes, which now flow through resistor 464. The remaining current or 120 milliamperes flow through resistor 470. The electron beams are now in spot position 2.

When the electron beams are to be placed at spot position 3, the 20's line goes Up (Fig. 15). This causes the tube 452R of switching unit VSU20 to be rendered conductive and the 3 milliamperes of current flowing through this unit now flow through resistor 464 in addition to the 6 milliamperes flowing therethrough as a result of conduction through the switching unit VSU40. A total of 9 milliamperes of current now flows through resistor 464 and 117 milliamperes flow through resistor 470. This places the electron beams in spot position 3.

When the electron beams are to be placed in spot position 4, the 20's line (Fig. 15) and the 40's line go Down and the 80's line goes Up. Accordingly, switching units VSU20 and VSU40 are returned to their initial condition and the current flowing therethrough now flows through resistor 470 (Fig. 17A). The tube 452R of switching unit VSU80 is rendered conductive and the 12 milliamperes of current flowing through switching unit VSU80 now flow through resistor 464. The electron beams are now in spot position 4. While the electron beams are in this vertical spot position the addresses 80–99 (Figs. 12A and 12B) or the addresses 1080–1099 (Figs. 12C and 12D) may be visited by the electron beams in response to operation of the horizontal deflection circuits described hereinbefore. Next, it is necessary that the electron beams be placed at the spot position corresponding to the addresses 100, 101, 1100 and 1101. In order that such may be accomplished the electron beams must be under a vertical deflection of zero.

The 80's line (Fig. 15) therefore goes Down and the switching unit is returned to its initial condition. The electron beams are now at the vertical spot position zero. The cycle of operation described hereinbefore is repeated (Fig. 15). This causes addresses 100–199 (Figs. 12A and 12B) or addresses 1100–1199 (Figs. 12C and 12D) to be visited by the electron beams. Next, the electron beams must be placed at a vertical spot position such that they will visit the addresses 200, 201, 1200, and 1201. These addresses correspond to a vertical spot position of 5. In order to position the electron beams at spot position 5, the 80's line (Fig. 15) goes Down and the 200's line goes Up. The switching unit VSU80 is therefore returned to its initial condition, and the tube 452R of switching unit VSU200 is rendered conductive. This causes the 15 milliamperes of current flowing through switching unit VSU200 to flow through resistor 464. The electron beams are now at spot position 5.

The above described cycle of operation is now repeated; that is, the operation placing the electron beams at spot positions 1, 2, 3, 4, and 0, respectively, to place the beams at spot positions 6, 7, 8, 9, and 5 (Fig. 15).

The 200's line remains Up so that the tube 452R of switching unit VSU200 remains conductive, and the electron beams are again positioned in the step-by-step manner described hereinbefore through spot positions 5–9.

It is now necessary that the electron beams be placed in spot position 10 (not shown in Fig. 15) corresponding to addresses 400, 401, 1400, and 1401 (Figs. 12A, 12B, 12C, 12D). In order to position the electron beams at spot position 10 the 200's line goes Down so that the 15 milliamperes of current flowing through switching unit VSU20 now flow through resistor 470. At the same time the 400's line (not shown in Fig. 15) goes Up and the tube 452R thereof is rendered conductive so that the 30 milliamperes of current flowing through switching unit VSU400 now flow through the resistor 464. The total current flowing through resistor 464 is now 30 milliamperes and the total current flowing through 470 is 96 milliamperes. The operation described above is repeated twice to position the electron beams in a step-by-step manner through the vertical positions 10 to 14. This causes visitation of the electron beams to the addresses 400–599 (Figs. 12A and 12B) or 1400–1599 (Figs. 12C and 12D).

Next, the 200's line goes Up to cause the tube 452R of switching unit VSU200 to be rendered conductive so that the 15 milliamperes of current flowing through this unit now flow through the resistor 464. The tube 452R of switching unit VSU400 remains conductive so that the total current flowing through resistor 464 is 30 plus 15 or 45 milliamperes. The current flowing through resistor 470 is therefore 81 milliamperes. This causes the electron beams to be placed in spot position 15 corresponding to addresses 600, 601, 1600, and 1601 (Figs. 12A–D). The operation described above is twice repeated to twice position the electron beams through the vertical spot positions 15 through 19. This causes visitation of the electron beams to addresses 600–799 (Figs. 12A and 12B) or 1600–1799 (Figs. 12C and 12D).

Next, the electron beams are placed at spot position 20 corresponding to addresses 800, 801, 1800 and 1801. The 800's line goes Up so that the tube 452R of switching unit VSU800 is rendered conductive to cause the 60 milliamperes of current flowing through switching unit VSU800 to flow through the resistor 464, while the remaining current from the other switching units or 66 milliamperes flows through resistor 470. A repetition of the above described operation takes place until the beam is placed at the vertical spot position 24 corresponding to the addresses 800, 801, 1800, and 1801 (Figs. 12A–D). When the beams are in this vertical position, the greatest current which will flow through the resistor 464 flows when the tube 452R of switching units VSU800 and VSU80 are conductive. At this time the total vertical deflection weight is 20 plus 4 or 24 so that the greatest current flowing through the resistor 464 is 24×3 or 72 milliamperes. This means that the current flowing through the resistor 470 is 54 milliamperes. Hence, as in the horizontal deflection circuits an unbalance of current flow is present. The addresses are therefore not vertically centered on the face of the cathode ray tubes.

If at this time address 1999 has been visited, the entire beam deflection operation is completed and the electron beams returned to their initial positions. However, if at this time the last address visited is 999, the electron beams return to their initial positions, and the next address visited is 1000 (Fig. 12C). A similar deflection operation is then effected to visit addresses 1000 to 1999.

It is seen that the actual deflection effected to visit addresses 0–999 is identical with that which must be effected to visit addresses 1000–1999. This is clear from Figs. 12A–D, Figs. 13, 14, and 15, and Figs. 2B and 2C since no connection from the thousands order is associated with either the horizontal or vertical deflection circuits. Connection from the thousands order is made only to the tube selector circuit TS of Fig. 2B.

*Dash deflection generator*

The purpose of the dash deflection generator is to provide a preselected linear displacement of the cathode ray tube beam to thereby effect storage of a dash as distinguished from a dot which is stored without such deflection. In other words, the spot on the face of a cathode ray tube representing storage of a dash is physically larger than that representing the storage of a dot. As described herein, the linear displacement effected to store a dash is provided from N.46 to N.06 of each and every cycle.

The connections of the dash deflection generator are such that it is designed to produce a dash that is an incremental deflection of the electron beams during each and every cycle. However, whether or not a dash is to be written is controlled by circuits described hereinafter which control the potential applied to the control grid of the cathode ray tube. Thus, if a dot is to be written, the cathode ray tube would be rendered conductive during the time that the beam is located at the initial address location. If a dash were to be written, the cathode ray tube would remain conductive throughout the time that the dash deflection generator is operative.

If it is desired that the displacement of the beam in the horizontal plane alone is to represent a dash, then the voltage produced by the dash deflection generator is supplied to the horizontal deflection plates of the cathode ray tube and not to the vertical deflection plates. Such displacement is provided by a horizontal dash deflection generator. However, if displacement of the beam in a vertical plane alone is to represent a dash, then the voltage produced by the dash deflection generator is applied only to the vertical deflection plates. Such deflection is provided by a vertical dash deflection generator. If a dash is to be represented by an oblique displacement; that is, at an angle to the horizontal and vertical planes, then dash deflection voltages must be applied to both the horizontal and vertical deflection plates. In such a case, both a horizontal and a vertical dash deflection generator are required.

The horizontal dash deflection generator (Fig. 16B) includes a pulse stretcher 500, an inverter I501, inverter 502R, cathode follower tube 502L and the class A amplifier tubes 503L and 503R. The tubes 503L and 503R in conjunction with the stabilizing circuits 451 and 450, respectively, comprise cascode amplifiers.

Sync pulses (Fig. 18A) are applied to terminal SP of pulse stretcher 500 and the input terminal AR1 of the pulse stretcher is connected to terminal 384 (Fig. 10). An input pulse is therefore supplied from the terminal 384 of the octal counter of Fig. 10 from time N.40 to N.50 (Fig. 18A). A pull-up pulse is applied to terminal 368 of pulse stretcher 500 from the terminal 368 (Fig. 11 at N.06 time). Fig. 9 shows the circuit of the pulse stretcher 500.

As shown in Fig. 18A, the output terminal S1 of the pulse stretcher 500 goes Up at time N.06 and goes Down at N.46. The output terminal I1 of the inverter I501 therefore goes Down at N.06 and goes Up at N.46. The output terminal I1 of inverter I501 is connected through the grid limiting resistor 504 to the control grid of the inverter tube 502R, having its cathode connected to ground and its anode connected through load resistor 505 to the +150 volt terminal 166 and through parasitic suppressing resistor *ps* to the control grid of cathode follower 502L. The anode of inverter 502R therefore drives the cathode follower 502L.

Hence, when the control grid of the inverter 502R is Down from N.06 to N.46 time, its anode is Up and the control grid of cathode follower 502L is Up. Also, when the control grid of inverter 502R is Up, its anode is Down and the voltage at the cathode of cathode follower 502L tends to go Down or follow the voltage at its grid. However, the cathode of the tube is unable to follow its grid for the reason stated hereinbelow.

The cathode of cathode follower 502L is connected to ground through a capacitor 507 and a resistor 508 connected in parallel. Capacitors **509*a* and 509*b* are connected in series with each other and in parallel with capacitor 507. The anode of tube 502L is connected to the +390 volt line 466 and to ground through a decoupling network 510 comprising a decoupling resistor and decoupling capacitor connected as shown (Fig. 16B). Capacitors 509*a* and 509*b* serve as a voltage divider across capacitor 507. When the cathode of cathode follower tube 502L is Up from time N.06 to N.46, the capacitor 507 is charged to the cathode potential. When the control grid of cathode follower tube 502L is Down from N.46 to N+1.06 time, the cathode tends to follow the control grid but is unable to do so because of the charge on capacitor 507. During this time, the capacitor 507 discharges through resistor 508. The voltage waveform (Fig. 18A) representing the output cathode follower 502L shows the linear voltage produced as a result of the discharge of capacitor 507. Such a voltage is present at the juncture of capacitors 509***a* and 509*b* which juncture is connected to the control grid of the class A amplifier tube 503R through parasitic suppressing resistor *ps* and to the line G through bias resistor 511.

The anode of amplifier tube 503R is connected through line 455 to the voltage stabilizing circuit 450. The cathodes of the amplifier tubes 503R and 503L are connected through the common cathode resistor 512 to the −150 volt line 230. The anode of amplifier tube 503L is connected through line 454 to the voltage stabilizing circuit 451 (Fig. 16A). Hence, it is seen that the current flowing through amplifier tube 503R flows through the circuit 450 and appears at the terminal HL as a voltage change, while the current flowing through amplifier tube 503L flows through the circuit 451 and appears at the terminal HR as an incremental voltage change (Fig. 16A).

If the amplifier tubes 503L and 503R are electrically identical and their respective control grids at the same voltage, equal current will flow through the anodes of these tubes. If the voltage at the control grid of tube 503R is now decreased slightly while the voltage at the control grid of tube 503L is maintained at the same voltage, the anode current flowing through tube 503R will decrease while the anode current flowing through tube 503L will increase. The increase in the anode current of 503L is substantially equal to the decrease of the anode current through tube 503R so that the voltage drop across the cathode resistor 512 remains approximately constant. During time interval N.06 to N.46 the plate currents flowing through tubes 503L and 503R are substantially equal. However, during the time N.46 to N+1.06, the voltage at the juncture of capacitors 509*a* and 509*b*, which voltage is decreasing at a substantially linear rate, causes the voltage at the control grid of tube 503R to decrease at the same linear rate. This causes a decrease in the current flowing through the tube 503R and hence an increase in the potential appearing at terminal HL (Fig. 16B). Accordingly, the current flowing through tube 503L is increased by an amount substantially equal to the decrease through the tube 503R and appears as an incremental decrease in voltage at terminal HR (Fig. 16A). The decreased potential appearing at terminal HR and the increased potential appearing at terminal HL causes the electron beams to be shifted to the left a preselected amount controlled and determined by the incremental change of current. A linearly varying voltage is therefore applied to the horizontal deflection plates of the cathode ray tubes during the time interval N.46 to N+1.06 due to the push-pull action of the amplifier tubes 503L and 503R, having their anodes connected to the lines 454 and 455, respectively.

The dash deflection generator for effecting displacement of the electron beams in the vertical plane is identical with that described above for obtaining beam displacement in the horizontal plane. The vertical dash deflection generator 520 is shown in Fig. 17B. From the above description of the horizontal dash deflection generator it is seen that the current flowing toward the terminal VU (Fig. 17B) linearly decreases during time N.46 to N+1.06 and that the current flowing toward the terminal VL (Fig. 17A) linearly increases by substantially a similar amount during this time interval. Hence, the electron beams of the cathode ray tubes are deflected upward as a result of the operation of the vertical dash deflection generator. The actual deflection of the electron beams is therefore along the path which is the vector sum of the beam displacement in the vertical and horizontal planes, providing both the horizontal and the vertical dash deflection generators are operative. If, as described, the horizontal and vertical dash deflection generators are identical and both operative, the beam displacement will be along the line at 45 degrees with the horizontal.

*Read-in and read-out circuits*

A conventional cathode ray tube is a useful storage element if a pick-up plate in the form of a conducting material is placed next to the target surface of the face of the tube. Further, the target of the cathode ray tube must be composed of an insulating material with a secondary emission ratio greater than unity. Since the target material is an insulator it may be considered that a particular address location or spot is capacitively coupled to the pick-up plate. The pick-up plate is electrically connected to a video amplifier. The reading and writing circuits to be described can be used with either of two methods of writing or storing information on the face of a cathode ray tube.

*Focused dot-dash system.*—The conventional method of storing information such as a binary 1 on the face of a cathode ray tube involves first positioning the beam to a given address 1. The beam is then turned on so as to produce a particular potential configuration. While the beam is still on, it is moved to a nearby second location so as to destroy the original potential configuration and establish a new pattern. The beam is then shut off and the second configuration remains at the address. In this sysem the location of the two positions is generally very close. In order to read the information stored at this spot the beam is positioned to the first location where it is turned on and the original potential configuration is established, thereby destroying the previous one. If in re-establishing the first potential configuration a net change in charge is involved, this net change in charge will appear as a potential change which is capacitively coupled to the pick-up plate and thus to the video amplifier.

The first waveform of Fig. 18B illustrates a plot of voltage versus distance where the beam is focused at an initial position; i.e., a dot is stored. The left-hand vertical axis represents the center line of the electron beam when stationed at the initial position of the address. By turning the beam on the potential configuration illustrated is established. The beam is then moved to the right so as to attain a final position where the second vertical line illustrates the center line of the electron beam. If a dot is to be written, the beam will be turned off before leaving the first location. If a dash is to be stored the electron beam is allowed to remain on while it is moved to the final second position.

The beam is first positioned at the initial position and is turned on so as to cause the potential configuration of a dot (Fig. 18B) to be established. While the beam is still on it is moved to the second position, thereby establishing the potential gradient illustrated for a dash in Fig. 18B. The establishment of the potential gradient of the second waveform of Fig. 18B will cause the first gradient to be destroyed and thus a dash is stored.

In order to read out the information stored on the face of the tube the beam is initially positioned to the first location illustrated by the vertical line at the left in Fig. 18B. The beam is then turned on so as to re-establish the potential configuration of a dot. If a dot had previously been stored at this location, a change in potential or charge density will not be experienced since the value 568 of Fig. 18B and the area beneath the curve remain unchanged. However, if the dash configuration formerly existed at the address in question, the fact that the dot configuration is now re-established at this address involves a net change in charge and a net change in potential in a positive direction. In re-establishing the dot waveform where a dash previously existed, it is necessary that the waveform go from the negative point 569 (Fig. 18B) to a positive point 568. This net change in potential or net positive change in charge is capacitively coupled via the pick-up plate to the video amplifier.

*Defocus-dash system.*—The basic difference between the defocus-dash system and the dot-dash system described above is that in the defocus-dash system the beam is defocused while at its initial position. At the time that the beam is moved to its final position it is focused in the same manner as used in the system described above. However, due to the fact that the beam is defocused while at its initial position, the spacing between the initial and the final positions must be somewhat increased in order to obtain optimum results.

Fig. 18C illustrates the potential configuration which will exist when the beam is defocused and is placed at its initial position. It should be noted that due to the defocused beam the area beneath the curve of the defocused dot is greatly increased as compared with the focused dot of Fig. 18B. When a dot is to be stored, the beam is turned off before it is moved to the final position. However, when a dash is to be written, the beam when moved to its final position, remains on and is focused during the time it is being deflected.

When the information stored at a given address is to be read out, the beam will again be positioned at the initial position and turned on while defocused so as to determine whether or not a net change in charge will take place. A system of read out is thus the same as that described for the focused dot-dash system.

One advantage of the defocus-dash system over the focused dot-dash system is realized when a dash is read out at a given address. In such case, the net change in charge would be much greater in the defocus-dash system than in the focused dot-dash system. Reference to Fig. 18C also indicates that the potential level change is much greater than in Fig. 18B. Thus, since the net change in charge and the net change in potential is greater in the defocus-dash system, the signal which is capacitively coupled via the pick-up plate to the video amplifier will be of a much larger amplitude than is experienced for the dot-dash system. The defocus-dash system is employed by the circuits explained hereinafter for use with the binary-decimal storage system. The dot-dash system is employed in the binary storage system.

The circuits described hereinabove position the electron beams of the plurality of cathode ray tubes to a particular address according to the address information available from either the regeneration counter during a regeneration cycle, or from an external source during an action cycle. It is now necessary to provide circuits which will exhibit the information stored on a cathode ray tube as voltage pulses and to provide means for reading new information into the cathode ray tubes.

The circuits described below are provided with two modes of operation. The first mode involves reading information from a particular address on a cathode ray tube, converting the information to voltage pulses available at an external terminal, and at the same time rewriting or re-storing this information at the same location on the cathode ray tube. Thus, this mode of operation will be used during all regeneration cycles and whenever information is to be read out of a cathode ray tube so as to be available for external use during an action cycle. Thus, during read out or regeneration operations, the information stored at an address location is sensed and re-stored in the same location.

The second mode of operation is effected when new information is to be stored or read in to a selected address location on the face of a cathode ray tube during an action cycle. This involves reading out and destroying the information previously stored at a given address after which the new information is stored thereat.

*Read out circuits.*—The read in and read out circuits necessary for the storage of the binary 1 bits for 2000 addresses of the units decimal order or position 1 are shown in Figs. 19B–19F arranged as indicated in Fig. 19A. In a complete cathode ray tube storage system such circuits are provided for each group of 2000 addresses of a given binary order representing a portion of a given decimal digit, as described in connection with Figs. 2A–2E.

Referring more particularly to Fig. 19B, the circuit diagram of a four-stage video amplifier is shown. The grid of the pentode tube 530, operated as a class A amplifier, is connected through the parasitic suppressing resistor *ps* to the input terminal PU1 and through the grid bias resistor 532 to ground. The anode of tube 530 is connected through the load resistor 533, the peaking inductance 534, and the decoupling circuits 535 and 536 to the +250 volt terminal 537. The decoupling circuit 536 provides decoupling for the first and second stages of the video amplifier. The peaking inductance 534 when resonant from the stray capacity represented by C*s*, improves the high frequency response of the first stage (tube 530) of amplification. The suppressor grid of the tube 530 is connected to the cathode which is connected through the cathode resistor 539 to ground. Since the cathode resistor 539 is not shunted by a capacitor, a degenerative feed-back is provided. The screen grid of tube 530 is connected through a parasitic suppressing resistor *ps* and the voltage dropping resistor 540 to the juncture of the inductance 534 and the decoupling circuit 535 which is at a positive potential slightly below +250 volts. The screen grid is also connected through the resistor *ps* and the bypass capacitor 541 to the cathode.

The anode of tube 530 is capacitively coupled through capacitor 543 and the resistor *ps* to the control grid of tube 544, which operates as a class A amplifier. The second stage of the video amplifier containing tube 544 is identical to the first stage containing 530 except that the cathode bypass capacitor 545 is provided. The anode of tube 544 is connected through resistor 546 to the cathode of tube 530, thereby providing regenerative feedback between the second and first stages of the video amplifier. The purpose of the regenerative feedback is to produce a strengthening of the video signals applied to the input terminals PU1.

The anode of tube 544 is capacitively coupled through the capacitor 548 and the resistor *ps* to the control grid of the tube 549 operated as a class A amplifier. The cathode of tube 549 is connected through the cathode resistor 550 and the variable resistor 551 to ground. The screen bypass capacitor 552 and the grid bias resistor 553 are connected to the juncture of resistors 550 and 551. Since the resistors 550 and 551 are not shunted by a bypass capacitor, degenerative feedback occurs in the third stage of the video amplifier. The amount of degenerative feedback provided is controlled by the variable resistor 551 without changing the grid bias on tube 549. The operation of the variable resistor 551 as a video gain control is explained at page 95 in connection with Fig. 2.25 of Vacuum Tube Amplifiers, volume 18, Radiation Laboratory Series, McGraw-Hill, 1948.

The anode of tube 549 is capacitively coupled to the control grid of tube 555 via the capacitor 556 and the resistor *ps*. The anode of tube 555 is connected to ground through the stray shunting capacity C*s*, the peaking inductance 557 and the resistor 558. The values of inductance 557 and the resistor 558 are chosen so that when combined with the stray capacity C*s*, a critically damped circuit is formed. This critically damped circuit serves as the load impedance for the tube 555 thereby permitting the fourth stage of the video amplifier to be responsive only to high frequency voltage changes and to provide a fast recovery time. The effect, then, is to cause the anode potential of tube 555 to remain at a constant value except when the tube is amplifying voltage pulses. The cathode of tube 555 is connected through the cathode resistor 559 and the decoupling circuit 560 to the −150 volt terminal 230. The screen grid of this tube is connected through resistor *ps* to the juncture of the voltage dropping resistor 561 and the bypass capacitor 562. The lower plate of capacitor 562 and the grid bias resistor 563 are connected to the juncture of resistor 559 and the decoupling circuit 560. The anode of tube 555 is also connected to the −150 volt terminal 230 through the voltage dividing resistors 564 and 565. The juncture of resistors 564 and 565 is connected to the output terminal 566, which is normally at a negative potential. The signal voltage excursions appearing at the anode of tube 555 will appear at the output terminal 566. The output terminal 810 connected to the anode of tube 555 is utilized by a later embodiment of the CRT storage system. The anode of tube 549 is connected to output terminal 1140 which is also utilized by a later embodiment of the CRT storage system.

It was explained, in connection with Figs. 2C–D, that when information is read out of a particular address, a video signal representing a dot or a dash (dependent upon what was stored) is coupled to the pick-up plate (Fig. 2C) which is connected to the input terminal PU1 (Fig. 2D) of the video amplifier. The video signal is amplified by the circuit of Fig. 19B and will appear at the output terminal 566 thereof. The conductor 567 connects the pick-up plates of Fig. 19G to terminal PU1 of Fig. 19B.

Fig. 20 illustrates two successive cycles of operation; a dot is read from an address location during the first cycle, and a dash is read from another address location during the second cycle. The waveform representing a dot appears between N.40 and N.60 time of the first cycle and the waveform representing a dash appears between N.40 and N.0 time of the second cycle. It should be noted that the dot waveform has a negative polarity from N.40 to N.46 time and the dash signal is positive during this time. The waveforms of Fig. 20 are intended only to illustrate potentials existing when a dot or a dash is read from the face of a cathode ray tube and not necessarily the sequence they are read. In other words, a dot may follow a dot during successive cycles, or a dot may follow a dash, etc.

Referring to Fig. 19C, the terminal 566 is connected to the control grid of the pentode tube 570 connected to operate as a clipper-inverter. The voltage dividing resistors 564 and 565 of Fig. 19B maintain the steady state potential applied to the control grid of tube 570 (Fig. 19C) sufficiently below the cut-off potential thereof to prohibit it from responding to the waveform representing a dot (Fig. 20). However, since the signal representing a dash (Fig. 20) has an amplitude of approximately 30 volts it causes grid current to flow in the tube 570. This results in a waveform at the anode of tube 570 with a flattened top portion. The anode of tube 570 is connected through the load resistor 571 and the decoupling circuit 572 to the +150 volt terminal 166, and through the capacitor 573 and the resistor *ps* to the suppressor grid of tube 575.

The voltage pulse applied to the suppressor grid of tube 575 from the tube 570 is shown as the second waveform in Fig. 20. If a dot signal is received by the video amplifier (Fig. 19B), the suppressor grid of tube 575 remains at 0 volt; but, if a dash signal is received, this grid goes Down at N.46 time.

The cathode of the diode rectifier 576 is connected to ground and its anode is connected to the +150 volt terminal 166 through the resistor 577 and the decoupling circuit 578. The juncture between diode 576 and the resistor 577 is connected through the resistor *ps* to the suppressor grid of tube 575. Since the voltage drop across diode 576 is negligible if it is conducting, the suppressor grid of tube 575 will be at 0 volt when the tube 570 is non-conductive. Accordingly, when the tube 570 is amplifying a dash signal, the negative pulse coupled through the capacitor 573 will cause the anode of diode 576 to be negative with respect to its cathode, thereby rendering it non-conductive. Thus the negative pulse representing the dash will appear at the supressor grid of tube 575 so as to prevent this tube from being in a conductive state for the duration of the pulse.

The cathode of tube 575 is connected to ground and its anode is connected through the load resistor 579 and decoupling circuit 578 to the +150 volt terminal 166.

The control grid of tube 575 is direct coupled through resistor 583 and the high frequency compensating capacitor 584, in shunt therewith, to the terminal 585. The control grid is normally biased to a negative potential by connection of resistor 586 between the −82 volt terminal 174 and the resistor 583. The video sample pulse produced by the blocking oscillator 598 (Fig. 19C) and illustrated as the third waveform in Fig. 20 and appearing at terminal 585 is applied to the control grid of tube 575 at approximately N.46 time of every cycle. In order for the tube 575 to be in a conductive state its suppressor and control grids must simultaneously be at approximately 0 volt; in other words, tube 575 operates as an inverting AND circuit. Reference to Fig. 20 indicates that if a dot signal was received by the video amplifier (Fig. 19B) the tube 575 will be rendered conductive at N.46 time by the video sample pulse, and thus a negative pulse will appear at the anode thereof. However, if a dash signal was received, the suppressor grid of tube 575 will be at −20 volts because of conduction of tube 570 so that the video sample pulse cannot induce conduction therein.

The anode of tube 575 is capacitively coupled by capacitor 590 to the cathode of pull-down diode 591 which is normally held at approximately +5 volts by the voltage dividing resistors 592 and 593. The anode of pull-down diode 591 is connected to the cathode of pull-up diode 593, to the upper plate of the storage capacitor 594, and to the input terminal of cathode follower 595.

At approximately N.40 time of every cycle the On pulse shown in Fig. 20 and produced by the circuit of Fig. 19H is present on conductor 589 of Fig. 19C and is applied to the anode of pull-up diode 593. The On pulse causes the pull-up diode 593 to conduct, thereby charging the storage capacitor 594 to approximately +5 volts. Whenever the upper plate of capacitor 594 is so charged the cathode follower 595 will be fully conductive and its output will be Up.

As stated above, if a dot signal was received by the video amplifier (Fig. 19B) the clipper inverter tube 570 (Fig. 19C) will be non-conductive so that the suppressor grid of tube 575 will be Up or at 0 volt. Hence, the video sampling pulse applied to the control grid of tube 575 will cause conduction therein, so that at N.46 time a negative pulse will be applied to the cathode of pull-down diode 591. It should be noted that at N.46 time the On pulse (Fig. 20) is over and that the anode of pull-down diode is at +5 volts. The negative pulse (representing a dot) applied to the cathode of pull-down diode 591 (at N.46 time) causes conduction therein, thus placing its anode at −20 volts. The conduction through the pull-down diode 591 will cause the storage capacitor 594 to be charged in the opposite direction so that its upper plate is at −20 volts. This means that the output of cathode follower 595 is Down. Hence, when a dot signal is read from a cathode ray tube the output at terminal 596 of the pulse stretcher No. 1 is caused to go Up at N.40 time by the action of the On pulse, and is caused to go Down at N.46 time by reason of the video sample pulse being permitted to operate tube 575.

However, if a dash signal had been applied to the video-amplifier (Fig. 19B), the clipper inverter tube 570 (Fig. 19C) would become conductive at N.46 time so that the suppressor grid of tube 575 would be Down or at a negative potential and prevent the video-sampling pulse from rendering tube 575 conductive. Hence, the pull-down diode 591 would remain non-conductive and the storage capacitor 594 would remain charged to +5 volts. Thus, whenever a dash signal is read from a cathode ray tube, the output of cathode follower 595

(terminal 596) goes Up at N.40 time as shown in Fig. 20 and stays Up until pulled down during a later cycle by the receipt of a dot signal as described above. Accordingly, if several dash signals are successively presented to the video amplifier during successive cycles, the capacitor 594 and the output terminal 596 of pulse stretcher No. 1 (Fig. 19C) will remain Up until pulled Down due to the lack of a signal (presence of a dot) being applied to terminal 566 (Fig. 19C).

The positive video sample pulse is produced in response to the triggering of a blocking oscillator (Fig. 19C) at approximately N.46 time of every cycle. In Fig. 19C a N.40 pulse from terminal 384 of Fig. 10 is applied to terminal 19A, input of the AND circuit 597*a*. Synchronous pulses from the terminal SP (Fig. 4) are applied to the remaining input terminal (Fig. 19B) of the AND circuit 597*a* (Fig. 19C). The first two waveforms of Fig. 18A indicate that, beginning at N.46 time both of the waveforms applied to the input terminals of AND circuit 597*a* are Up. Hence, the output thereof goes Up and the blocking oscillator 598 is triggered. The blocking oscillator 598 produces a positive pulse of short duration at approximately N.46 time which is applied to the terminal 585.

The output terminal 596 of pulse stretcher No. 1 (Fig. 19C) is connected to the input of cathode follower 600. The output of this cathode follower, terminal 601, is labelled Aux Output and is used for testing purposes to determine whether the storage capacitor 594 (Fig. 19C) has stored a dot or a dash.

Referring to Fig. 19D, input terminal 19A of the AND circuit 602a is connected to terminal 596 and the other input terminal 19B is supplied with an N.50 pulse from terminal 385 (Fig. 10). The output of the AND circuit 602*a* is connected through cathode follower 603 to the data line terminal DL1–1. Thus, if the terminal 596 is Up from N.50 to N.60 time, the output terminal DL1–1 will also be Up (Fig. 20). Obviously, if terminal 596 is Down during this time, terminal DL1–1 is Down. The waveforms (Fig. 20) present at terminal 596 show that if a dot had been read from a cathode ray tube during a given cycle, terminal 596 is Down during the time interval N.50 to N.60; if a dash had been read, terminal 596 is Up during this time. Accordingly, output terminal DL1–1 will be Down from N.50 to N.60 time if a dot was read out, and will be Up if a dash had been read from a cathode ray tube.

Terminal DL1–1 also serves as an input terminal when information is to be read into the cathode ray tube, as will be described hereinbelow. It should be noted that the input and output terminal DL1–1 accommodates only a single binary bit of the information to be stored.

The circuits described above cause the information read out from a cathode ray tube to become available at the output terminal DL1–1. This information must now be restored in the same address location on a particular cathode ray tube during the same cycle that it was read therefrom.

The output of pulse stretcher No. 1 (terminal 596, Fig. 19C) is also connected to input terminal 43A of the OR circuit 605 of Fig. 19D. During a read-out cycle the input terminal 43B of OR circuit 605 will be Down as understood hereinafter since a read in control pulse is not present at terminal RIT (Fig. 19D) during a read out cycle. The output terminal 54 of OR circuit 605 is connected to input terminal 10A of the AND circuit 606*a*.

The input terminal 67 of inverter 607 (Fig. 19D) is connected to the terminal 380 (Fig. 10) upon which appears a positive pulse from N.00 to N.10 time. Hence, during the time N.00 to N.10 the output terminal of inverter 607 will be Down to provide a dash termination pulse and at all other times this terminal is Up. The output terminal 76 of inverter 607 is connected to the input terminal 10B of the AND circuit 606*a*. The input terminal 10C of this AND circuit is normally held Up (approximately +5 volts) by the voltage dividing resistors 608 and 609 and the decoupling circuit 610 which are in series between ground and the +150 volt terminal 166.

The conditions present at the input terminals of the AND circuit 606*a* during a read out cycle are that terminal 10C is always Up, terminal 10B is Down from N.00 to N.10 time and is Up from N.10 to N+1.00, and the terminal 10A is controlled by the dot or dash signals (Fig. 20) present at the terminal 596 (Fig. 19D).

Pulse stretcher No. 2 comprises the AND circuit 606*a*, pull-down diode 612, pull-up diode 613, storage capacitor 614, and cathode follower 615. At N.40 time the ON pulse present on conductor 589 is applied to the anode of pull-up diode 613 having its cathode connector to the upper plate of storage capacitor 614, to the anode of pull-down diode 612, and to the input of cathode follower 615. The ON pulse (Fig. 20) causes the storage capacitor 614 to be charged to +5 volts at N.40 time as explained in connection with the similar charging of capacitor 594 (Fig. 19C).

If the dot signal (Fig. 20) is present at the terminal 596 (Figs. 19C and 19D) the output of the OR circuit 605 goes Up at N.40 time, causing the AND circuit 606*a* to be operated and its output terminal 16 to go Up. The output terminal 16 of the AND circuit 606*a* is connected to the cathode of the pull-down diode 612. Since the cathode and the anode of the pull-down diode 612 are Up, it cannot conduct so that the capacitor 614 remains Up. At N.46 time the dot signal on terminal 596 goes Down so that the output terminals 54 and 16, respectively, of the OR circuit 605 and the AND circuit 606*a* go Down. Storage capacitor 614 is Up and holds anode of pull-down diode 612 Up. Hence, when the cathode of diode 612 goes Down at N.46 time the diode conducts and causes the storage capacitor 614 to go Down or have its upper plate charged to −20 volts. The upper plate of the storage capacitor 614 is connected through the cathode follower 615 to the output terminal 616 of pulse stretcher No. 2. Thus, when a dot signal is present on terminal 596 from N.40 to N.46 time, the output terminal 616 will go Up at N.40 time because of the ON pulse applied to diode 613 and will go Down at N.46 because the trailing edge of the dot signal present on terminal 596 causes capacitor 614 to be charged to −20 volts.

If a dash signal is present on terminal 596, the OR circuit 605 and the AND circuit 606*a* are operated so that the cathode of pull-down diode 612 is Up. As stated above, the ON pulse causes the storage capacitor 614 to go Up at N.40 time and stay Up until the pull-down diode 612 is caused to conduct current. At N+1.00 time the positive pulse appearing on terminal 380 (Fig. 19D) causes the inverter 607 to be rendered conductive, whereupon its output terminal 76 and the input terminal 10B of AND circuit 606*a* go Down in response to the dash termination pulse so applied. Hence, the AND circuit 606*a* becomes inoperative and its output terminal 16 and the cathode of pull down diode 612 go Down. The resulting potential drop across pull down diode 612 causes it to conduct so that the upper plate of the storage capacitor 614 is placed at −20 volts. Consequently, the output of cathode follower 615 and the output terminal 616 of pulse stretcher No. 2 go Down at N+1.00 time.

Briefly, then, the output terminal 616 (see Fig. 20) of pulse stretcher No. 2 will go Up at N.40 time, due to the action of the ON pulse and will go Down at N.46 time if a dot signal is present on terminal 596, but will not go Down until N+1.00 time if a dash signal is present on terminal 596.

The waveform present on terminal 616 (Fig. 19D) must now be used to store a dot or a dash at the address location on the cathode ray tube from which the information was obtained. As explained hereinabove, the electron beam of all of the cathode ray tubes CRT A, CRT B, CRT C, and CRT D (Fig. 2C) are positioned simultaneously to the same relative position with respect to the face of the tube. In order to store a dot or a dash at a given address, the cathode ray tube whose face includes the address must be rendered conductive. This is accomplished by applying the signal appearing on terminal 616 to the control grid of the proper cathode ray tube.

Referring to Fig. 19E, the terminal 616 is connected the the input terminals 10A of the AND circuits 620*a*–623*a*. The input terminals 10B of the AND circuits 620*a*–623*a*, respectively, are connected to the terminals TSA–TSD of the tube selector (Figs. 19F and 2B). If the signal present on terminal 616 is to be applied to cathode ray tube A, the terminal TSA must be Up. The potentials present on the terminals TSA–TSD are determined by the tube selector circuit TS of Fig. 2B.

The selector circuit receives address information from the I and S terminals (Figs. 19F and 2B) and then causes the appropriate one of the terminals TSA–TSD to be Up so as to select the proper cathode ray tubes. It has been noted that the terminal I1 is Up only when the address information includes the decimal digit 1, S1 is Up when the decimal digit 1 is not present, I1000 is Up only when 1000 is present, and S1000 is Up when 1000 is not present.

Referring to Fig. 19F, the tube selector circuit comprises the four AND circuits TS1, TS2, TS3, and TS4; the input terminals I1, S1, I1000, and S1000; and the output terminals TSA, TSB, TSC, and TSD. Terminals S1 and S1000 are connected to the input terminals of AND circuit TS1. The two input terminals of AND circuit TS1 are Up simultaneously only when 1000 is not present and when 1 is not present in the address information. If 1000 is not present, the address is less than 1000, and if 1 is not present the address is even-numbered. Therefore, output terminal TSA connected to the AND circuit TS1 is Up only when the address is even-numbered and less than 1000. This means that terminal TSA is Up for even numbered addresses 0–998 or the addresses (Fig. 12A) located on cathode ray tube CRT A.

Terminals I1 and S1000 art Up simultaneously only when 1000 is not present and when a 1 is present. In this case, the AND circuit TS2 is operated and the terminal TSB is Up. Terminal TSB is Up when the address is odd-numbered and between 1 and 999 (Fig. 12B); i.e., is located on cathode ray tube CRT B.

Terminals S1 and I1000 are connected to the input terminals of AND circuit TS3. The input terminals to the AND circuit TS3 are Up simultaneously only when a 1 is not present and when a 1000 is present. The output terminal TSC connected to the output of the AND circuit TS3 is therefore Up when the address is even-numbered and over 1000 (Fig. 12C) i.e., appears on cathode ray tube CRT C.

Terminals I1 and I1000 are connected to the inputs of the AND circuit TS4. These inputs are Up simultaneously only when a 1 is present and when a 1000 is present. The terminal TSD connected to AND circuit TS4 is therefore Up when the address is odd-numbered and over 1000 or for addresses 1001–1999 (Fig. 12D) which appear on cathode ray tube CRT D.

Returning to Fig. 19E only one of the terminals TSA, TSB, TSC, or TSD is Up from N.06 to N+1.00 time of each cycle.

Assuming that the information present at terminal 616 is to be written or stored on cathode ray tube CRT A, the coincidence of inputs at terminals 10A and 10B of the AND circuit 620*a* causes the output terminal 16 thereof to be Up. The output terminals 16 of the AND circuits 620*a*–623*a*, respectively, are connected to the inputs of the identical pulse shaping circuits 624–627. These pulse shapers are utilized to provide pulses of equal amplitude which are free of ragged leading and trailing edges.

The input terminal of the pulse shaper 624 is connected through the resistor *ps* to the grid of cathode follower tube 630R. The tube 630R is cathode coupled because of the common cathode resistor 631 to the cathode of tube 630L which operates as a grounded grid amplifier. The anode of tube 630L is connected through resistor 632 to the +250 volt terminal 537, through resistor 633 and diode rectifier 634, in parallel, to the +150 volt terminal 166, and to the output terminal 637. The output terminals 637–640, respectively, are associated with the cathode ray tubes CRT A–D. The control grid of tube 630L is connected through the resistor *ps* and resistor 641 in parallel with bypass capacitor 642 to ground, and through resistor *ps* and resistor 643 to the −82 volt terminal 174. The cathodes of tube 630L and 630R are connected through the common cathode resistor 631 to the −82 volt terminal 174. The anode of cathode follower tube 630R is connected through decoupling circuit 644 to the +150 volt terminal 166.

If the output terminal 16 of the AND circuit 620*a* is Down, the control grid of tube 630R is Down so that this tube is rendered non-conductive. The control grid of tube 630L is biased to a fixed potential by the voltage dividing resistors 641 and 643 so that the tube 630L is conductive when the tube 630R is non-conductive. When the tube 630L is conductive its anode is Down because of the voltage drop across the anode load resistors 633 and 632.

The fixed potential applied to the grid of tube 630L causes the current therethrough to be constant and determined by the value of the cathode resistor 631. Hence, the Down voltage at the anode of tube 630L is a constant value. Such is essential in establishing the appropriate D.C. voltage reference level of the pulses to be applied to the cathode ray tube CRT A.

When the output terminal 16 of the AND circuit 620*a* is Up, the control grid of tube 630R is Up so as to cause this tube to become fully conductive. Since tube 630R is operating as a cathode follower its cathode is Up, thereby decreasing the bias voltage existing between the grid and cathode of tube 630L. This causes the tube to be cut off and the voltage at its anode goes Up.

When the anode of tube 630L goes Up it tends to reach approximately 162 volts which would be the potential at the juncture of resistors 632 and 633, if the diode 634 was not present. While the anode of tube 630L is below +150 volts, the diode 634 cannot conduct since its anode is negative with respect to its cathode. However, as soon as the anode of tube 630L reaches a potential slightly greater than +150 volts, the diode 634 conducts and thereby clamps the anode of tube 630L at +150 volts. Thus, the anode of tube 630L can never become more positive than substantially +150 volts since diode 634 is conected so as to conduct current from the anode of tube 630L to the +150 volt terminal 166.

The resistor 633 is used to protect the diode 634 against the possibility of applying a voltage thereacross in a reverse direction which is in excess of its rated breakdown voltage. If the +250 volt terminal 632 is accidentally shorted to ground, and if the resistor 633 is removed, 150 volts would be applied in the reverse direction across diode 634 causing damage thereto.

Referring to Fig. 19G the terminal 637 is connected through the coupling capaictor 647 to the control grid of CRT A, to the cathode of diode 648, and through the grid resistor 649 to a negative bias potential supplied by a voltage dividing resistor which includes the Intensity Control 650. The D.C. operating potentials required by the cathode ray tubes CRT A–D are supplied by a voltage divider 651 comprising a series of resistors connected between the −2350 volt terminal 652 and ground. Terminal 653 is maintained at −2200 volts by an external power supply so that the potential difference between terminal 652 and 653 will be a constant value of approximately 150 volts. The cathodes of the cathode ray tubes CRT A–D are connected together and to terminal 653 of the voltage dividing network 651. Because the potential between terminals 652 and 653 is constant, the gfrid to cathode bias voltage applied to the cathode ray tubes is constant and is independent of the current flowing through the portion of the voltage divider connected between terminal 653 and ground.

The second or accelerating anode of cathode ray tube CRT A is connected through the decoupling circuit 654 to the terminal 657 which is maintained at a potential equal to the D.C. center of the deflection plates or approximately +290 volts. The focusing anode 658 of CRT A is connected through the series resistor 659 to the movable tap on the resistors 660 which serve as the Focus control. The focusing anode 658 is also connected through the coupling capacitor 661 to the conductor 662, upon which a defocus pulse (Fig. 19F) appears. The purpose of the defocus pulse has been described hereinbefore and suffice it to state that when the defocus pulse is Up the beam in the cathode ray tube will be focused, and when it is Down the beam will be defocused. Since the beam is defocused when a dot is written it is required that the defocus pulse be Down from N.40 to N.46 time.

The signal appearing on terminal 637 (representing either a dot or a dash) is delivered to the control grid of CRT A to cause conduction therein when that signal or the terminal 637 is Up. The diode rectifier 648 has its anode connected to the negative bias voltage obtained from resistor 650 and its cathode connected to the control grid of CRT A. It follows that this control grid cannot be more negative than the value of the negative bias voltage and when it attempts to exceed such the diode 648 conducts and returns the control grid to this bias voltage. It is seen, therefore, that the signal applied to the control grid of CRT A from terminal 637 is, in effect, superimposed upon the D.C. bias voltage. The clamping diode 648 is necessary because the signals applied to the control grid of the cathode ray tube are not periodic. This diode clamps the negative peaks of the pulses applied to the grid of the cathode ray tube at the bias potential determined by the resistor 650. The potential of the control grid of the cathode ray tube must be constant. When this control grid is Up the diode 648 provides the D.C. voltage reference level upon which the equal amplitude pulses produced by the pulse shaper 624 (Fig. 19E) are superimposed. The circuits associated with the CRT B, CRT C, and CRT D are operated in the same manner as that associated with CRT A.

The left-hand horizontal deflection plates of the cathode ray tubes CRT A–D (Fig. 19G) are connected together and to terminal HL, and the right-hand plates are connected together and to the terminal HR. Accordingly, the upper vertical deflection plates of these tubes are commonly connected to terminal VU, and the lower vertical deflection plates are commonly connected to terminal VL. The terminals HR, HL, VL, and VU (Fig. 19G) are connected respectively to the similarly labelled terminals of the deflection amplifiers (Figs. 16A, 16B, 17A, and 17B).

Referring more particularly to Fig. 19F, the circuit which produces the defocus pulse comprises the diode AND circuit 668, the pentode tube 669, the coupling capacitor 670 and the output terminal 671. The control grid of inverter tube 669 is connected to the output terminal 16 of AND circuit 668. The cathode of tube 669 is connected to ground through the variable cathode resistor 672 and the anode is connected through the load resistor 673 to the +220 volt terminal 674. The input terminal 667 is connected to the terminal S1 of the pulse stretcher 500 (Fig. 16B). The waveform applied to this terminal is illustrated as the fourth waveform in Fig. 18 and is Up from N.06 to N.46. The terminal 667 connects to the input terminal 10A of diode AND circuit 668. The input terminal 10B of this AND circuit is connected to ground. Thus, when terminal 667 is Up the AND circuit 668 is operated and its output terminal 16 is Up. The control grid of tube 669 is, therefore, Up and tube 669 is conductive so that its anode goes Down. The defocus pulse thus provided at the anode of this tube is capacitively coupled through the capacitor 670 to the terminal 671 and conductor 662 (Figs. 19E and 19G) which is capacitively coupled to the control grids of the cathode ray tubes CRT A–D of Fig. 19G as described above. Hence, it is seen that when the defocus pulse is Up the beams of the cathode ray tubes are focused and when the defocus pulse is Down the beams are defocused.

With respect to Figs. 19C and 20 it has been shown that the video sample pulse (N.46) is used in conjunction with the output of the video amplifier to determine whether a dash was read from the face of a cathode ray tube. It was also noted that the positive waveform (dash) appearing at terminal 566 (Fig. 20) was obtained by turning on the beam of the cathode ray tube while it is located at the initial point of a given address; i.e., before the bit sweep is operative to move the beam. Hence, for optimum results the beam of the cathode ray tube must be turned on at a time in the cycle such that the video-sample pulse will occur slightly before the crest of the waveform representing a dash. From the discussion of the circuits of Figs. 19C, 19D, 19E, and 19F, it is understood that the beam of the cathode ray tube is turned on when the outputs of the pulse stretchers No. 1 and No. 2 are Up. Further, outputs of the pulse stretchers No. 1 and No. 2 go Up when the On pulse (conductor 589 of Figs. 19C and 19D) goes Up. Therefore, if the time occurrence of the On pulse (which turns the beam on) is made slightly variable, the desired optimum result can be more easily achieved.

Referring to Fig. 19H a circuit suitable for producing the On pulse (Figs. 19C and 19D) is shown. The input terminals 19A and 19B of AND circuit **677*a* are connected respectively to terminal 382 (Fig. 10) and terminal SP (Fig. 4B). The N.20 pulse present on terminal 19A and the sync pulses present on terminal 19B of AND circuit 677*a* causes a coincidence to occur; i.e., both terminals Up at N.27 time, whereupon the output terminal 31 of AND circuit 677*a* goes Up. This Up signal is applied to input terminal 80 of blocking oscillator 678 causing a triggering thereof so that a positive direction pulse of short duration appears at its output terminal 82. The output terminal 82 of blocking oscillator 678 is connected through the coupling capacitor 680 and the parasitic suppressing resistor ps to the control grid of the inverter tube 681. The cathode of tube 681 is connected to the −150 volt terminal 230. The anode of tube 681 is connected through the load resistor 682 to the +150 volt terminal 166, to the upper plate of the variable storage capacitor 683, to the cathode of clamping diode 684, to the anode of clamping diode 685, and through the resistor ps to the control grid of the pentode inverter 686. The lower plate of the variable storage capacitor 683 is connected to ground. The anode of the clamping diode 684 is connected to the −82 volt terminal 174 and the cathode of clamping diode 685 is connected to ground. The function of clamping diode 684 is to prevent the anode of tube 681 from attaining a potential more negative than −82 volts, and the function of clamping diode 685 is to prevent the anode of tube 681** from becoming more positive than ground potential.

The positive voltage pulse supplied to the control grid of tube 681 drives the tube into heavy conduction, whereupon its anode goes Down to approximately −82 volts. Since the storage capacitor 683 is connected between ground and the anode of tube 681 it will be charged with its upper plate at −82 volts. Even though the pulse applied to the control grid of tube 681 is past; i.e., control grid is Down, the anode of tube 681 cannot return immediately to 0 volt due to the action of capacitor 683. The storage capacitor 683 then discharges through the load resistor 682. While the potential across capacitor 683 is below the cut-off potential of the inverter 686, this tube is non-conductive. Thus, when the capacitor 683 has discharged so that its upper plate is at the cut-off potential of tube 686, conduction through tube 686 occurs. The voltage waveform 683*w* (Fig. 19H) appearing at the upper plate of the storage capacitor 683 shows the cut-off voltage of tube 686 as V1. It is evident that a varying of the capacity of capacitor 683 causes a corresponding variation at the time tube 686 is cut off. The variation provided by capacitor 683 is utilized to vary the time at which the On pulse will occur. Experience has proved that the On pulse should occur at approximately N.40 time. However, variations in the stray capacity associated with individual cathode ray tubes may require that the On pulse be slightly before or after N.40 time.

The anode of inverter 686 is connected through the load resistor 688 to the +150 volt terminal 166, and through the coupling capacitor 689 and the resistor *ps* to the control grid of tube 690. When the anode of tube 681 goes Down the tube 686 is cut off and its anode goes Up. When the potential across capacitor 683 is such that tube 686 will commence conduction (N.40 time) the anode thereof goes Down. The waveform 686*w* (Fig. 19H) is produced at the anode of tube 686.

The plate of triode tube 690 is connected through the inductance 692 and the damping diode 693, in parallel, which is in series with decoupling circuit 694 connected to the +150 volt terminal 166. The Up signal applied to the control grid of tube 690 causes conduction of current therethrough and through the inductance 692. When the grid of tube 690 goes Down the tube is rendered non-conductive and current ceases to flow through the load inductance 692. Thereupon the change of current flow through inductance 692 causes the energy stored therein to set up a positive voltage pulse. The polarity of the damping diode 693 prevents the inductance 692 from ringing, or producing several cycles of polarity reversal. This damping or elimination of the negative portion of the waveform is effected beacuse diode 693 conducts when the voltage pulse at the anode of tube 690 attempts to go negative.

It is seen from waveform 690*w* (Fig. 19H) that the positive pulse produced at the anode of tube 690 starts at approximately N.40 time. This waveform is coupled through the capacitor 695 and the resistor *ps* to the grid of cathode follower tube 696. The cathode tube 696 is connected to the cathode of the grounded grid amplifier tube 697. The cathode resistor 698 is connected between the cathodes of tubes 696, 697, and the −82 volt terminal 174. The grid of tube 697 is held at the constant D.C. potential of the juncture of the voltage divider network comprising resistor 699 and 700. The anode of tube 697 is connected through the load resistor 701 to the +250 volt terminal 537 and through the coupling capacitor 702 to the input of the cathode follower 703.

The cathode follower tube 696 and the grounded grid amplifier tube 697 collectively serve as a pulse-shaping circuit. If the grid of tube 696 is Down the voltage drop across the cathode resistor 698 is such that the tube 697 is conducting and its anode is Down. However, if the grid of tube 696 is Up, the increased current through the cathode resistor 698 produces a voltage drop thereacross sufficient to cut off the tube 697 so that its anode is Up. The pulse appearing at the anode of tube 697 is fed through the cathode follower 703 to the output terminal 704. The juncture of resistor 705 and 706 is connected between ground and the +82 volt terminal 174 is connected through the grid bias resistor 707 to the input of the cathode follower 703.

The On pulse appearing at terminal 704 from N.40 to N.44 of every cycle is delivered through the cathode follower 708 (Fig. 19D) to the conductor 589 and utilized by the pulse stretchers No. 1 and 2 as described hereinbefore. Where a complete cathode ray tube storage system is used the On pulse at terminal 704 is delivered to a plurality of circuits similar to those of Figs. 19C and 19D.

Briefly, then, the circuit operation for effecting read out is as follows:

A particular address is applied from N.06 to N.10 time and the address pulse stretchers supply voltages having a full eight microsecond duration to effect the chosen positioning of the electron beams and cathode ray tube selection. The read out signal from the pickup plate is transferred through the video amplifier of Fig. 19B to cause its output terminal 566 to be Down if a dot is present.

At N.40 time the storage capacitors 594 and 614 of pulse stretchers No. 1 and No. 2 (Figs. 19C and 19D) are charged by the On pulse and the cathode ray tube beam is turned on.

At N.46 time the video sample pulse is present at terminal 585 (Fig. 19C). If a dot is read out the suppressor grid of tube 575 (Fig. 19C) is Up and the video sample pulse causes storage capacitors 594 and 614 to discharge. If a dash is read out the video sample pulse cannot cause conduction through tube 575 and the storage capacitor 594 remains charged and is discharged only when a dot is subsequently read in. If a dash is read out the storage capacitor 614 is discharged by the N.00 pulse applied at terminal 380 (Fig. 19D).

The N.50 pulse at terminal 385 (Fig. 19D) causes terminal DL1–1 to go Up from N.50 to N.60 if a dash is read out because terminal 19A of AND circuit 602*a* is then Up. Terminal DL1–1 remains Down if a dot is present.

The N.00 pulse at terminal 380 (Fig. 19D) causes terminal 10B of AND circuit 606*a* to be Down. Hence, there is no further circuit operation if a dot is present, for terminal 10A of AND circuit 606*a* would be Down.

If a dash is present the terminal 10A of AND circuit 606*a* is Up and terminal 10C of AND circuit 606*a* is Up. The output terminal of AND circuit 606*a* therefore goes Down at N+1.00 time, diode 612 conducts, capacitor 614 is discharged, and terminal 616 goes Down. The corresponding cathode ray tube grid is, therefore, cut off.

The circuit operation during read out is the same as the circuit operation during regeneration except that the address information is supplied by the computer during a read out cycle and is supplied by the regeneration counter during a regeneration cycle.

*Read-in.*—During a read in cycle the information stored at a given address is read out and new information is stored at the same address location. A control pulse (N.40—N.50) indicating that a read in cycle is to be performed is used to prevent the information read out from reaching the pulse stretcher No. 2 of Fig. 19D. The new information is then stored in pulse stretcher No. 2 and is written on the face of a cathode ray tube in the same manner described above for a read out or regeneration cycle.

Referring to Fig. 19D the control terminal RIT must be caused to be Up from N.40—N.50 time whenever new information is to be stored at a given address. The read in control terminal RIT is connected to the input terminal AR1 of the pulse stretcher 710 as shown by the circuit diagram of Fig. 9. The input terminal SP of pulse stretcher 710 is connected to ground. The pull-up pulse (Fig. 9A) will cause the output of the pulse stretcher 710 to be Up at approximately N.06 time. The presence of the read in control pulse (Fig 21) at terminal RIT of Fig. 19D causes the output terminal S1 of pulse stretcher 710 to go Down at N.40 time; the output thereof will then stay Down until N+1.06 time when the pull-up pulse causes it to go Up. The output terminal S1 of the pulse stretcher 710 is connected to the input of the inverter 711. The waveform (Fig. 21) present at the output of the inverter 711 is the inverse of that at the output of pulse stretcher 710. The output of the inverter 711 is connected to the input terminal 43B of OR circuit 605.

Referring to Fig. 21, since the waveform applied to the OR circuit 605 from the inverter 711 is Up from N.40 to N+1.00 time during the read in cycle, information appearing at terminal 596 as a voltage pulse representing a dot or dash read from an address cannot pass through the OR circuit 605 so as to be applied to the input of pulse stretcher No. 2. Thus, the OR circuit 605 acts as a switch in that when its input terminal 43B is Up, pulses presented to its input terminal 43A cannot pass therethrough. It will be noted that during read out and regeneration cycles terminal 43B of OR circuit 605 is Down so that the information read from an address and appearing on terminal 596 can be presented to the pulse stretcher No. 2 and thus be re-stored at the same address on a cathode ray tube.

Information to be read into an address position on a cathode ray tube must be applied to the data terminal DL1–1 (Fig. 19D) from N.40 to N.50 time of a read in cycle. It was pointed out hereinbefore that the output of the AND circuit 602$a$ (Fig. 19D) has a possibility of being Up only from N.50—N.60 time. Thus, this AND circuit, which is connected to the data line terminal DL1–1 through cathode follower 603, cannot affect the potential at terminal DL1–1 from N.40—N.50 time when terminal DL1–1 is used for reading information into the circuit of Fig. 19D.

The data line terminal DL1–1 is connected to the input terminal 10A of an AND circuit 712$a$, and the terminal 10B thereof is connected to a terminal 713. The terminal 713, labelled Aux Test, is Up throughout normal operation of the circuits of Fig. 19 and provides isolation of the terminal DL1–1 from the OR circuit 714. The output terminal 16 of AND circuit 712$a$ is connected to the input terminal 34A of an OR circuit 714.

The data line terminal DL1–1 is Up from N.40—N.50 if a dash is to be stored on the face of a cathode ray tube during a read in cycle. If a dot is to be read in to a given address terminal DL1–1 is Down from N.40—N.50 time. If terminal DL1–1 is Up (dash read in), the AND circuit 712$a$ is operated whereupon its output terminal 16 and the input terminal 34A of OR circuit 714 are Up.

The read in control terminal RIT is connected through the inverter 715 to the input terminal 34B of the OR circuit 714. Hence, when the terminal RIT is Up from N.40 to N.50 time of a read in cycle the input terminal 34B of OR circuit 714 is Down. During read out and regeneration cycles the terminal RIT must be Down so that the input terminal 34B of the OR circuit 714 is Up. This prevents information present on the data line terminal DL1–1 which is applied to the OR circuit 714 via the AND circuit 712A from passing through the OR circuit 714 during read out and regeneration cycles.

As explained above, the terminal 34A of the OR circuit 714 is Up (terminal DL1–1 is Up) when a dash is to be read in so that the output terminal 40 thereof is Up. The output terminal 40 of the OR circuit 714 is connected through the resistor $ps$ to the grid of tube 716 operated as an inverter. The cathode of tube 716 is connected to ground and its anode is connected through the load resistor 717 and the decoupling circuit 718 to the +150 volt terminal 166. The anode of tube 716 is direct coupled by the resistor 719 and the frequency compensating capacitor 720 in shunt therewith to the suppressor grid of tube 721. The suppressor grid of tube 721 is also connected to the −150 volt terminal 230 through resistor 722. When the output terminal 40 of the OR circuit 714 is Up (dash read in), the tube 716 is driven into full conduction so that its anode and consequently the suppressor grid of tube 721 go Down so that tube 721 cannnot be rendered conductive.

The control grid of tube 721 is direct coupled through the resistor 724 and the frequency compensating capacitor 725 in parallel to the conductor 726 which is connected to terminal 585 (Fig. 19C). The video sample pulse (Figs. 20 and 21) appears on conductor 726 at approximately N.46 time and hence is applied to the control grid of tube 721 (Fig. 19D) at this time of every cycle.

The tube 721 operates as an inverting AND circuit in that if both the suppressor grid and the control grid are Up, conduction will take place and its anode will go Down. However, if either of these grids is Down, tube 721 cannot become conductive so that its anode will be Up.

Therefore, since the suppressor grid of the tube 721 is Down due to the presence of a dash pulse on terminal DL1–1, the video-sample pulse applied to the control grid of tube 721 cannot cause conduction at its anode. The anode of tube 721 is connected through the load resistor 727 and the decoupling circuit 728 to the +150 volt terminal 166, and through the coupling capacitor 729 to input terminal 10C of the AND circuit 606$a$. Because a potential excursion does not occur at the anode of tube 721 when a dash is read in at terminal DL1–1, the terminal 10C of AND circuit 606$a$ is held Up by the voltage dividing resistors 608 and 609, whose juncture is connected to terminal 10C.

As explained above, the action of the pulse stretcher 710 and the inverter 711 (Fig. 19D) causes the terminal 43B of OR circuit 605 to be Up from N.40 to N+1.00 time during a read in cycle by virtue of the read in control pulse present on terminal RIT. Consequently, OR circuit 605 is operated so that terminal 10A of AND circuit 606$a$ is Up. Terminal 10B of AND circuit 606$a$ is Up from N.10 to N+1.00 time since the inverter 607 is non-conductive. Hence, all three inputs of AND circuit 606$a$ are Up, its output terminal 16 is Up as is the cathode of pull down diode 612. Thus, the On pulse present on terminal 704 at N.40 time is applied to the cathode follower 708 and pull up diode 613 to cause the storage capacitor 614 to go Up or be charged at N.40 time. The storage capacitor 614 stays Up until N+1.00 time when the inverter 607 becomes conductive, thereby rendering the AND circuit 606$a$ inoperative. The fact that the output terminal 16 of AND circuit 606$a$ goes Down at N+1.00 time causes the pull down diode 612 to conduct whereupon the storage capacitor 614 goes Down. The waveform present at the output terminal 616 of pulse stretcher No. 2 when a dash is to be read into a cathode ray tube is illustrated in Fig. 21. The manner in which the waveform appearing on terminal 616 is applied to the cathode ray tubes has been described hereinbefore.

Consider now that a dot is to be read in to an address on a cathode ray tube. The terminal DL1–1 is Down during the interval N.40 to N.50 and the AND circuit 712$a$ and the OR circuit 714 are not operated so that the output terminal 40 of OR circuit 714 is Down. The control grid of the inverter tube 716 is then Down and its anode is Up, thereby causing the suppressor grid of tube 721 to be Up. Hence, the application of the video sample pulse to the control grid of tube 721 at N.46 time causes conduction therein and a negative going pulse appears at its anode. This pulse is capacitively coupled to the input terminal 10C of the AND circuit 606$a$. This waveform is illustrated in Fig. 21.

As explained hereinbefore the On pulse (Fig. 20) present at terminal 704 at N.40 time effects the charging of storage capacitor 614 to −5 volts so that terminal 616 of pulse stretcher No. 2 is Up. At N.46 time the negative pulse received at terminal 10C of AND circuit 606$a$ (as a result of a dot being read in) causes the output terminal 16 thereof to go Down. This action causes the cathode of pull down diode 612 to go Down to render this tube conductive so as to discharge the storage capacitor 614. As a result the output terminal 616 of pulse stretcher No. 2 goes Down at N.46 time (Fig. 21).

The preceeding discussion has pointed out that in order to effectuate a read in cycle the terminal RIT (Fig. 19D) must be Up from N.40 to N.50 time (Fig. 21) of that cycle. A dot is read into an address on the face of a cathode ray tube by causing the data line terminal DL1–1 (Fig. 19D) to be Down during the period N.40 to N.50 time. Similarly, a dash is read in by causing terminal DL1–1 to be Up from N.40 to N.50 time (Fig. 21). If a dot is read in terminal 616 (Fig. 19D) goes Up at N.40 time and goes Down at N.46 time. When a dash is read in terminal 616 goes Up at N.40 time and goes Down at N+1.00 time. The manner in which the information appearing on terminal 616 is stored at an address on a cathode ray tube during a read-in cycle occurs in the same fashion as during a read-out or a regeneration cycle described hereinbefore.

Briefly then, the circuit operation for effecting read in is as follows:

The electron beams of the cathode ray tubes are positioned from N.00 to N.40. At N.40 the ON pulse turns on the beam of the proper cathode ray tube as in read out and charges the storage capacitors 594 and 614 of the pulse stretchers. At N.40–N.50 terminal RIT (Fig. 19D) is caused to go up by the application of a read in control pulse thereto.

Information to be read in is applied to data line terminal DL1–1 from N.40 to N.50.

If a dot is being read in the data line terminal DL1–1 is Down from N.40 to N.50. If a dash is being read in DL1–1 is caused to go Up from N.40 to N.50.

Read out is effected at terminal DL1–1 from N.50 to N.60. Since terminal RIT is Up from N.40 to N.50, the output of pulse stretcher 710 (Fig. 19D) is Down and remains Down from N.40 to N+1.00, terminal 43B of OR circuit 605 (Fig. 19D) is Up and information read out on terminal 596 can have no effect on pulse stretcher No. 2.

If a dot is being read in the video sample pulse occurring at N.46 and applied to the control grid of tube 721 (Fig. 19D) causes terminal 10C of AND circuit **606*a* to go Down. Diode 612 conducts and capacitor 614 discharges. Hence, terminal 616 goes Down and causes the cathode ray tube beam to be turned off at N.46**.

If a dash is being read in the data line terminal DL1–1 is Up and the suppressor grid of tube 721 is Down. The video sample pulse occurring at N.46 therefore cannot cause conduction through tube 721 and terminal 10C of AND circuit **606*a* stays Up. The capacitor 614 stays charged until the N+1.00 pulse at terminal 380 (Fig. 19D) causes capacitor 614 to discharge. Terminal 616** then goes Down and the beam of the cathode ray tube is turned off.

*Binary-storage system*

In the pure binary system of notation an address is specified by a series of binary digits or bits where the decimal digit 0 represents a binary 0, and the decimal digit 1 represents a binary 1. The digital positions or orders in the binary address, reading from right to left, correspond in value to $2^0$, $2^1$, $2^2$, $2^3$, $2^4$, $2^5$, $2^6$, etc. or decimal digits 1, 2, 4, 8, 16, 32, 64, etc., respectively. For example, the binary address 1110111111 represents the decimal digit 959, which is determined by the addition of the decimal digits 1, 2, 4, 8, 16, 32, 0, 128, 256, and 512. Hence, when the binary address 1110111111 is supplied to a cathode ray tube storage system the electron beam of the cathode ray tube will seek the spot location designated as address 959. By utilizing a ten binary digit address system a total of 1024 addresses (addresses 0–1023, inclusive) are available.

In a cathode ray tube storage system there must be a regeneration cycle and an action cycle. During the regeneration cycle the address locations on a tube will be regenerated so as to prevent loss of the stored information as a result of time decay; i.e., the information stored therein is read out and restored in the same location. During an action cycle the circuits associated with a cathode ray tube storage system must either permit the information stored on the face of the tube to be read therefrom, or to permit new information to be stored in the spot position visited by the beam of the tube.

During successive action cycles the beam of the tube may visit several mediate address locations since the information may be stored in random order on the face of the tube. However, the spot positions are sequentially visited during successive regeneration cycles. Hence, the positioning of the electron beam requires that the binary address information must be originated by two separate sources during action and regeneration cycles. If a series of action cycles are allowed to occur sequentially and successively, the binary address information source, active during regeneration, must remember the last address visited during the last regeneration cycle. If an excessive number of action cycles are performed the stored information will be lost for lack of regeneration. These difficulties are overcome in this embodiment of the invention by utilizing alternate regeneration and action cycles.

Each regeneration and action cycle includes eight successive time intervals of, for example, eight microseconds. During a first regeneration cycle the cathode ray tube storage system will regenerate the information stored at address 1, for example. During the next eight microsecond time interval an action cycle is executed by causing the beam of the cathode ray tube to visit any address specified by an external address source. During the next following eight microsecond time interval a regeneration cycle is performed and the beam of the tube visits address 2, thereby regenerating the information stored thereat. In a similar fashion alternate regeneration and action cycles occur until all of the spot positions on the tube have been visited, whereupon the procedure is repeated, so as to sequentially refresh the spot positions again. During the various action cycles the beam of the cathode ray tube can be caused to visit any address on the tube. It is not necessary that the addresses visited be adjacent to the last one visited as is the case when successive regeneration cycles are performed.

The individual time intervals are labelled T0, T1, T2, T3, etc., the time duration of each interval is, for example, one microsecond. In the embodiment shown a single regeneration cycle comprises the eight microsecond period T0–T8, and the period T8–T16 represents an action cycle of eight microseconds duration. It is seen then that after the system has been in operation for sixty-four microseconds, for example, the total elapsed time is indicated as T64. The time interval T64 is the beginning of a regeneration cycle and therefore corresponds to time T0 of the initial regeneration cycle (T0–T8). Similarly, the time T72, for example, corresponds to the beginning of an action cycle, or T8 of the initial action cycle (T8–T16).

Each regeneration cycle (T0–T8) is utilized to regenerate the information stored at an address. However, the time set aside for an action cycle (T8–T16) is not necessarily used either to read from or to write information on the cathode ray tube. If information is neither read from nor written on the tube during the interval T8–T16, this period is called an action-blank cycle. The period T8–T16 is termed an action-read cycle if information stored on the cathode ray tube is read therefrom during this time and is termed an action-write cycle if new information is stored on the tube.

Referring more particularly to Figs. 22A and 22B, an embodiment of the invention utilizing the pure binary address system is shown by arranging these figures as shown in Fig. 22C. In Fig. 22A the timer 760 provides voltage waveforms which sequentially represent each of the address locations 0–1023 inclusive on the cathode ray tube during successive regeneration cycles. The output terminals 761—770, 761–X—770–X of the timer 760 provide the binary address information necessary during a regeneration cycle. The waveforms generated by the timer 760 and present on the terminals 761—770 are illustrated in Fig. 23. For example, the waveform appearing on terminal 761 of Fig. 22A is designated in Fig. 23 as W761. The waveform appearing on terminal 761–X of Fig. 22A is the inversion of that appearing on terminal 761. Wherever the suffix X is used, it indicates that the waveform appearing thereon is the inversion of the waveform appearing on the similarly designated terminal except that no suffix is included in the designation. Hence, since terminal 761 is Up from T0–T16 and Down from T16–T32, terminal 761–X is Down from T0–T16 and Up from T16–T32, etc.

All of the waveforms of Fig. 23 are symmetrical and periodic; i.e., are alternately Up and Down for equal periods of time. For example, W766 is Up for 512 microseconds, after which it is Down for 512 microseconds. Each R at the top of Fig. 23 indicates a regeneration cycle and each A indicates an action cycle. Since 1024 regeneration cycles are required to regenerate all 1024 addresses on the cathode ray tube, a total of 16×1024 or 16,384 microseconds is required to regenerate all of these addresses. For ease of illustration a portion only of this 16,384 micorsecond period is shown in Fig. 23.

The terminals 761—770 (Fig. 22A) in conjunction with their corresponding inversion terminal 761–X—770–X, respectively, correspond to the ten binary digits used to specify an address on the cathode ray tube during a regeneration cycle. Terminal 761 corresponds to the extreme right-hand binary digit and terminal 770 corresponds to the extreme left-hand binary digit. If, for example, the extreme right-hand binary digit is a 0, terminal 761 is Up and terminal 761–X is Down. The opposite conditions exist if a binary 1 is represented. Hence, to represent the binary number 0000000000, the terminals 761—770 are Up and the terminals 761–X to 770–X are Down.

The pattern or raster of addresses on the cathode ray tube is in the form of a square 32×32 (Fig. 25); i.e., there are 32 addresses in both the vertical and horizontal direction. The first five binary digits from the right of a binary number have a total possible equivalent decimal value between 0 and 31. The total value represented by these digits will determine the horizontal position; i.e., the vertical column in which the beam of the cathode ray tube will be located. The second group of five binary digits of the binary number representing the address is used to determine the vertical position of the beam; i.e., the horizontal row in which the beam is located. After the beam is located in any particular row each binary 1 added causes the beam to be moved one position to the right until it has been positioned at the 32 addresses in that row.

The output terminals 761—765, 761–X—765–X (Fig. 22A) are connected to a first set of input terminal of the horizontal regeneration-action switch 772 which provided the horizontal address during regeneration cycles. Similarly, the terminals 766—770, 766–X—770–X are connected to a first set of input terminals of the vertical regeneration-action switch 773 which provides the vertical address during regeneration cycles.

The waveforms present on terminal 774 and 774–X are applied to the regeneration-action switches 772 and 773 during the first eight microseconds of the sixteen microsecond period (T0–T8) to permit the switches 772 and 773 to transfer their first set of inputs to their respective output terminals.

The terminals 781—785, 781–X—785–X are connected to a second set of input terminals of the horizontal regeneration-action switch 772. Similarly, the terminals 786—790, 786–X—790–X are connected to a second set of input terminals of the vertical regeneration action switch 773. The terminals 781—790, 781–X—790–X are used to supply external address information to the vertical and horizontal regeneration-action switches 773 and 772 during action cycles. The outputs of the horizontal regeneration-action switch 772 appear on the terminals 791—795, 791–X—795–X. The outputs of the vertical regeneration-action switch 773 appear on the output terminal 796—800, 796–X—800–X.

It is seen from the above during a regeneration cycle (T0–T8) the terminals 761—770, 761–X to 770–X supply the address information which appears at the output terminals 791—800, 791–X—800–X, respectively, of the switches 772 and 773. However, during an action cycle (T8–T16) the terminals 781—790, 781–X—790–X supply the information appearing at the output terminals 791—800, 791–X—800–X of the horizontal and vertical regeneration-action switches 772 and 773, respectively.

The output terminals 791—800, conjointly with the inversion terminals 791–X—800–X, respectively, represent the ten binary orders of the binary address. If, for example, terminals 791—800 are Up, terminals 791–X—800–X are Down, the binary address is 0000000000. Accordingly, when a binary 1 is present in the extreme right-hand or first binary order of the binary address, terminal 791 is Down and 791–X is Up.

The output terminals 791—795, 791–X—795–X and 796—800, 796–X—800–X are connected respectively to the inputs of the horizontal and vertical deflection circuits 802 and 803 (Fig. 22B). The beam of the cathode ray tube is positioned by these circuits to the address designated in accordance with the address information supplied to the horizontal and vertical deflection circuits 802 and 803.

The deflection weights provided by the respective deflection circuits when a binary 1 is present in a particular binary order of the binary address is shown within the blocks representing the horizontal and vertical deflection circuits 802 and 803. For example, if a binary 1 is present in the first binary order, the horizontal deflection circuit 802 provides a horizontal deflection weight of 1; i.e., the beam is moved one position to the right. If a binary 1 exists in the second binary order, the horizontal deflection circuit provides a horizontal deflection weight of 2. Similarly, if a binary 1 appears in the fifth binary order, the horizontal deflection circuit 802 provides a horizontal deflection weight of 16. When the horizontal deflection is 0 the beam is at the extreme left edge of the raster. If a binary 1 appears in the sixth binary order of the address, the vertical deflection circuit 803 provides a vertical deflection weight of 1 to move the beam downward one position. Likewise, if a binary 1 appears in the tenth binary digital position, the vertical deflection circuit 803 provides a vertical deflection weight of 16. Thus, if a binary 1 has appeared in all ten binary orders, the beam would be moved to the right 32 positions in the horizontal direction and would also be moved 32 positions in the vertical direction downwards. This would locate the beam in the lower right-hand corner of the raster. The output terminals 804HR and 804HL of the horizontal deflection circuit 802 are connected respectively to the right and left-hand deflection plates of the cathode ray tube CRT. The output terminals 805VL and 805VU of the vertical deflection circuit 803 are connected respectively to the lower and upper vertical deflection plates of the cathode ray tube CRT.

*Regeneration cycle.*—A binary bit of information stored on the face of the cathode ray tube is read therefrom by turning on the beam at time T3 of a regeneration cycle. This causes a video signal appearing at the pick-up plate of CRT to be connected via conductor 808 to the input terminal PU1 of the video amplifier 809. If a dash signal appears at the pick-up plate, the output terminal 810 of the video amplifier 809 is Up from T3–T4 of a regeneration cycle. The terminal 810 is connected to the input of the detector circuit 811 which senses the output of the video amplifier to determine whether a dash signal or a dot signal is present. Whenever detector 811 senses a dash signal, the output terminal 812 thereof is Down from T3–T6. When a dot signal is present, terminal 811 remains Up throughout the regeneration cycle.

The write-action terminal WA (controlled by external circuitry, not shown) is Up to render the detector circuit 811 operative. When terminal WA is Down detector 811 is inoperative and signals at its input terminal 810 are prevented from effecting the output terminal 812. Hence, during a regeneration cycle terminal WA must be Up to render the detector 811 operative.

The voltage pulse present on terimnal 812 is delivered to the intensifier circuit 813, which produces a one-microsecond pulse if a dot was read from the cathode ray tube CRT and a five-microsecond pulse if a dash was read therefrom. Output terminal 814 is capacitively coupled to the cathode of the cathode ray tube CRT so that a negative pulse on 814 will render the tube sufficiently conductive to cause information to be written on the face of the tube. If a dot is to be written terminal 814 will be Down from T3–T4, but if a dash is to be written, terminal 814 will be Down from T3–T8.

The information at terminal 814 is available at terminals 817 and 817–X for use by external circuits (not shown) such as, for example, arithmetic circuits of a digital calculator. The dash-write terminal DW and the action-cycling-blanking terminal ACB must both be Up throughout a regeneration cycle (T0–T8). Voltage pulses produced by timer 760 (Fig. 22A) and appearing at terminals 775, 776, 776–X, 777–X and 778 (Fig. 22B) are utilized by intensifier circuit 813 (Fig. 22B) to produce the pulses appearing at terminals 814, 817, and 817–X.

The detector pulse circuit 818 provides control pulses necessary to the operation of the detector circuit 811. The circuit 818 is operated by the timing pulses appearing at terminals 775, 775–X, 776, and 777 (Fig. 22B) of the timer 760.

*Action cycle.*—During an action-read cycle the video information circuits (Fig. 22B) operate in the manner described above for a regeneration cycle. That is, a dot or a dash signal is read from the face of the cathode ray tube CRT when the beam thereof is turned on by the intensifier circuit 813, amplified by the video amplifier 809, detected by detector circuit 811, and finally re-stored or regenerated by the action of the intensifier circuit 813 at the address from which it was obtained.

Whenever an action cycle is not to be utilized; i.e., information is neither read from nor written on the cathode ray tube, an action-blank cycle is executed. This is accomplished by causing the action-cycle-blanking terminal ACB to be Down during T8–T16. If terminal ACB is Down, the intensifier circuit 813 is rendered inoperative. The potential applied to terminal ACB to cause it to be Down is supplied by external control circuits (not shown). Such circuits may constitute an integral part of a digitalcalculator.

New information is stored on the cathode ray tube during an action-write cycle and is executed by causing the terminal WA to a be Down. The information previously stored at a particular address is amplified by video amplifier 809 but is prevented from activating the detector circuit 811. Consequently, the output terminal 812 of detector 811 remains Up through out an action-write cycle.

Terminal ACB is Up from time T8–T16 to permit the intensifier circuit 813 to be operative during an action-write cycle.

If the dash-write terminal DW is permitted to remain Up throughout an action-write cycle, the intensifier circuit 813 will cause a dot to be written on the cathode ray tube at the particular address selected (terminal 814 Down T11–T12). On the other hand, if it is desired to write a dash at the selected address, terminal DW must be caused to be Down during the first four time intervals (T8–T12) of an action-write cycle, thereby causing terminal 814 to be Down from T11–T16.

During an action-read or action-write cycle the information read or written appears at the terminal 817 in the form of voltage pulses. If a dot is present, terminal 817 is Up from T11–T12 and if a dash is present, terminal 817 is Up from T11–T16. The waveform present on terminal 817–X is the inversion of that on 817.

*Regeneration-action switch*

Referring more particularly to Figs. 24A and 24B, the circuit diagram of the horizontal regeneration-action switch 772 (Fig. 22A) comprises the switching units 821–825, the action control circuit 827, and the regeneration control circuit 828. The circuit diagram of the vertical regeneration-action switch 773 (Fig. 22A) is identical to the horizontal regeneration-action switch circuit shown in Figs. 24A and 24B.

The switching unit 821 is typical of those employed wherein the twin-triode tubes 829 and 830 are connected as inverters. The anode of tube 829L is connected to the anode of tube 830L, to the output terminal 791, and through the anode load resistor 831 to the conductor 833 connected to the +160 volt terminal 832. The cathode of 829L is connected to the cathode of 829R and to the conductor 834. The control grids of the tubes 829L and 829R are connected respectively through the isolation and parasitic suppressing resistors 835 to the input terminals 761–X and 761. The anode of tube 829R is connected to the anode of tube 830R, to the output terminal 791–X, and through the anode load resistor 836 to the +160 volt conductor 833. The cathodes of tubes 830L and 830R are connected together and to conductor 837. The control grids of tubes 830L and 830R are connected respectively through the isolation and parasitic suppressing resistors 835 to the input terminals 781–X and 781 (Fig. 24A) used during an action cycle as indicated hereinbefore.

It has been seen that a binary 0 is present in the first binary order of the binary address utilized during regeneration cycles if input terminal 761 is Up or at approximately 0 volt (terminal 761–X being Down or at approximately −20 volts). The control grid of tube 829R is then Up, while the control grid of 829L is Down. The waveform W834 (Fig. 24B) appearing on conductor 834 indicates that conductor 834 is at 0 volt during a regeneration cycle. No bias voltage appears between the gride and cathode of tube 829R because terminal 761 is Up. Therefore, tube 829R becomes fully conductive and its anode and terminal 791–X connected thereto are Down, or at approximately +130 volts. Tube 829L cannot conduct because its control grid is Down or at −20 volts, the voltage at terminal 761–X, while its cathode is at 0 volt. Hence, the anode of tube 829L and the output terminal 791 are Up, or at approximately +160 volts.

If a binary 1 is present in the first position of the ten binary digit address during a regeneration cycle, the terminal 761–X is Up, terminal 761 is Down, tube 829L is fully conducting, 829R is non-conductive causing the output terminal 791–X to be Up and terminal 791 to be Down. Hence, during a regeneration cycle, one half of the tube 829 will be fully conducting while the other half is non-conductive. Similar operation of switching units 821–825 permits the information present on the input terminals 761—765, 761–X—765–X to be delivered to the output terminals 791—795, 791–X—795–X, respectively.

If a binary 0 is present in the first binary order of the binary address during an action cycle, terminal 791 (Fig. 24A) is Up and the terminal 781–X is Down. This causes the control grid of tube 830R (Fig. 24B) to be Up and the grid of tube 830L to be Down. Waveform W837 (Fig. 24B) indicates that lead 837 is at 0 volt during an action cycle (T8–T16). Tube 830R is fully conductive since there is no bias voltage between its grid and cathode, tube 830L is non-conductive because its grid is at —20 volts, and its cathode is at 0 volt. Therefore, the anode 830R is Down as is the terminal 791–X connected thereto, the anode of 830L is Up as is the terminal 791 connected thereto.

If a binary 1 is present in the first binary column of of binary address during an action cycle, the terminal 781–X (Fig. 24A) is Up and the terminal 781 is Down. Tube 830L is fully conducting so that terminal 791 is Down, and tube 830R is non-conductive so that terminal 791–X is Up. Hence, during an action cycle the information present at the input terminals 781—785, 781–X—785–X (Fig. 24A) appears at the output terminals 791—795, 791–X—795–X, respectively.

The waveforms W834 and W837 (Fig. 24B), respectively show that during a regeneration cycle (T0–T8) conductor 834 is at 0 volt and conductor 837 is at +20 volts. It was stated hereinbefore that when conductor 834 is at 0 volt during a regeneration cycle, the tube 829 is conductive. However, tube 830 is non-conductive during a regeneration cycle because neither of its control grids can be at a potential greater than 0 volt and +20 volts is applied to its cathode. Similarly, during an action cycle, conductor 834 is at +20 volts while conductor 837 is at 0 volt. It follows that tube 829 is cut off and the tube 830 is conductive. Hence, the waveforms W834 and W837 determine the conductive condition of the tubes contained within a switching unit during a regeneration or action cycle.

The waveforms W834 and W837 are produced by the regeneration and action control circuits 828 and 827 respectively (Fig. 24A). The control circuits 827 and 828 are identical and operate in a similar manner.

The input terminal 774 of the action control circuit 827 is connected through the isolation and parasitic suppressing resistor 835 to the control grid of tube 840 operated as an inverter. The cathode of tube 840 is connected to ground. The anode of tube 840 is connected through the anode load resistor 841 to the +150 volt terminal 166, through the coupling capacitor 842 and through the parasitic suppressing resistors *ps* to the control grids of tube 843, and through capacitor 842 and resistor 844 to the —150 volt terminal tube 230.

The twin-triode tube 843 is operated as an inverter with its two halves connected in parallel. The control grids of tube 843 are connected through the parasitic suppressing resistors *ps* to a common point 846, which is connected through resistor 844 and diode 845 in parallel to the —150 volt terminal 230. The diode 845 is connected to conduct current to the −150 volt terminal 230 so that the juncture 846 is not allowed to float at a potential appreciably above −150 volts. The anodes of the twin-triode tube 843 are connected together and through the anode load resistor 847 to the +150 volt terminal 166, and through the resistor 848 to ground. The resistors 847 and 848 serve as a voltage divider to maintain conductor 837 at approximately +20 volts when the tube 843 is non-conductive. The cathodes of tube 843 are connected together and through the current limiting resistor 849 to the −150 volt terminal 230.

The input terminal 774 of the action control circuit 827 is connected to terminal 774 of the timer 760 (Fig. 22A) at which the waveform W774 (Fig. 23) appears. The terminal 774 (Fig. 24A) is therefore alternately Up and Down for time intervals of eight microseconds, it being Up throughout a regeneration cycle (T0–T8) and Down throughout an action cycle (T8–T16).

During a regeneration cycle when terminal 774 is Up triode 840 is rendered fully conductive and its anode goes Down. Consequently, the control grids of tube 843 go Down to render it non-conductive and its anode goes Up. Since tube 843 is non-conductive, conductor 837 is Up and the tubes 830 of the switching units 821–825 are rendered non-conductive as stated hereinbefore.

However, during an action cycle terminal 774 is Down, the anode of tube 840 and the control grids of tube 843 go Up, and the anode of tube 843 goes Down so that conductor 837 must go Down. As noted before, whenever conductor 837 is at 0 volt, the tubes 830 of the switching units 821—825 are conductive so that the information applied to the input terminals 781—785, 781–X—785–X, respectively, appears at the output terminals 791—795, 791–X—795–X.

The waveform applied to the input terminal 774–X of the regeneration control circuit 828 is the inversion of the waveform applied to terminal 774 of the action control circuit 827. Thus, the waveform appearing on conductor 834 is the inversion of that appearing on conductor 837.

Briefly, then, during a regeneration cycle the binary information appearing at the terminals 761—765, 761–X—765–X (Figs. 24A and 24B) is permitted to appear at the output terminal 771—795, 791–X—795–X, respectively; and during an action cycle the information appearing at the input terminals 781—785, 781–X—785–X appears at the output terminals 791—795, 791–X—795–X respectively. The circuit of the vertical regeneration-action switch 773 is identical to the horizontal regeneration-action switch 772 (Fig. 22A). However, when the circuit of the horizontal regeneration-action switch is used as the vertical regeneration-action switch 773 (Fig. 22A) the input terminals 761—765 (Figs. 24A and 24B) are replaced respectively by the terminals 766—770 (Fig. 22A) and the terminals 761–X—765–X are replaced by the terminals 766–X—770–X (Fig. 22A), respectively. The terminals 781—785, 781–X—785–X (Fig. 24A) are replaced by the input terminals 786—790, 786–X—790–X (Fig. 22A), respectively. Similarly, when the circuit of the horizontal regeneration-action switch (Figs. 24A and 24B) is used as the vertical regeneration-action switch 773 (Fig. 22A), the output terminals 791—795, 791–X—795–X replaced respectively by the output terminals 796—800, 796–X—800–X of Fig. 22A.

*Deflection circuits*

Knowledge of the physical location of the addresses within the raster on the face of a cathode ray tube facilitates understanding of the deflection circuits.

Referring to Fig. 25, the raster on the face of a tube includes a total of 1024 address locations, each circle representing a separate address location. The raster comprises a square arrangement 32×32; i.e., a total of 32 positions of horizontal deflection and 32 units of vertical deflection. The upper left position of the raster is designated the zero beam position or address 0. The next beam position to the immediate right is address 1, next address 2, and so on until the 31st address is found at the extreme right end of the first horizontal row. The second horizontal row contains the address positions 32 through 63, and similarly the third horizontal row contains the positions 64 through 95. Accordingly, each horizontal row contains 32 address positions which are designated by decimal numbers. If the beam of the cathode ray tube is to be located in the uppermost horizontal row, it will be provided with a vertical deflection of 0 corresponding to the vertical deflection weight of 0. A horizontal deflection weight of 1 is required to move the beam to the address 1; a horizontal deflection weight of 2 is required to position the beam at address 2; and so on until a total horizontal deflection weight of 31 is required in order to position the beam at address 31.

It will be shown presently that the individual horizontal deflection weights are proportioned as 1, 2, 4, 8, and 16. Hence, to provide a horizontal deflection weight of 7, for example, the quantities 1, 2, and 4 are used. Accordingly, if a total horizontal deflection weight of 31 is desired, the quantities 1, 2, 4, 8, and 16 are used.

The vertical deflection weights are also proportioned as 1, 2, 4, 8, and 16. Thus, to position the beam in the fourth horizontal row of the first vertical column (address 96, Fig. 25), the vertical deflection weights of 1 and 2 are used to provide a total vertical deflection of 3. The total horizontal deflection weight in this case is 0. Accordingly, if the beam is to be placed at address 124, a total horizontal deflection weight of 28 is used (horizontal deflection weights 4, 8, and 16), and a total vertical deflection weight of 3 is provided (vertical deflection weight quantities 1 and 2).

The information stored at the 1024 address locations is regenerated by sequentially moving the electron beam in step-by-step fashion from the lowest numbered address to the highest to completely refresh all the information stored thereon. The regeneration of the information at a single address is accomplished during a single regeneration cycle of eight microseconds. The sequential regeneration of the information on all of the 1024 addresses is accomplished during 1024 regeneration cycle; an action cycle is interposed between successive regeneration cycles. If, for example, regeneration of the information at address 0 is to be done initially the beam is placed at address 0 and regeneration is accomplished during the first eight microseconds or time T0–T8. During the time T8–T16 (action cycle) the beam of the cathode ray tube may be positioned to any one of the addresses located within the raster. During the subsequent eight microseconds (T16–T24), address 1 is regenerated. Again, during the time T24–T32 (action cycle) the beam may be located at any of the addresses within the raster. This procedure continues until 512 microseconds have elapsed, whereupon the beam is moved to the second horizontal row and address 32 is regenerated. The addresses 32 through 63 are then regenerated and the beam is moved to the third horizontal row, and the regeneration process continues until it has finally visited all of the addresses of the raster. Thus it is seen that during the time intervals in which the beam is located in a given horizontal row during the individual regeneration cycles, the total vertical deflection weight is maintained at a constant value. To move the beam to the next lower horizontal row an additional vertical deflection weight of 1 is added. During the next 32 individual regeneration cycles the vertical deflection weight again remains constant and the addresses in this row are regenerated.

Referring more particularly to Figs. 26A and 26B, the horizontal deflection circuit comprises five current increment switching units 850—854 and the voltage stabilizing circuits 855 and 856.

The current increment switching unit 850 is typical of those employed herein and includes twin-triode tubes 858L and 858R connected to cause a given increment of current to be added to that flowing through either voltage stabilizing circuits 855 or 856. The anode of tube 858L is connected to conductor 859 and the anode of tube 858R is connected to conductor 860. The cathodes of tube 858 are commonly connected through the load resistor 861 to ground. The control grids of tubes 858L and 858R are connected respectively through the parasitic suppressing resistors *ps* and through the resistors 862 and 863 to the +150 volt line connected through decoupling circuit 857 to terminal 166. The control grids of tubes 858L and 858R are also connected respectively through the parasitic suppressing resistors *ps* to the anodes of diodes 864 and 865. The cathodes of diodes 864 and 865 are connected to the input terminals 791 and 791–X, respectively.

In a similar manner the cathodes of diodes 864 and 865 of the switching units 851—854 are connected respectively to the terminals 792, 792–X; 793, 793–X; 794, 794–X; 795, 795–X. The input terminals 791—795, 791–X—795–X of Figs. 26A and 26B are respectively connected to similarly labelled terminals of Figs. 24A and 24B as illustrated in Figs. 22A and 22B. As noted hereinbefore, when a binary 0 is located in the first binary order of the binary address, the terminal 791 (Fig. 26B) is Up or at approximately +160 volts and terminal 791–X is Down or at approximately +130 volts. Similarly, when binary 0's are located in the second, third, fourth and fifth binary orders of the binary address, the terminals 792—795 are Up and terminals 792–X, 795–X are Down. The incremental switching circuits 850—854 provide the horizontal deflection weights 1, 2, 4, 8, and 16 respectively.

Thus, when binary 0's are located in all orders of the binary address, the switching circuits 850—854 provide a total horizontal deflection weight of 0. If a binary 1 is located in the first order of the binary address, terminal 791 is Down and terminal 791–X Up so that switching circuit 850 provides a horizontal deflection weight of 1. If a binary 1 is located in the second binary order of the binary address, terminal 792–X is Up, terminal 792 is Down and switching circuit 851 provides a horizontal deflection weight of 2. Accordingly, when the terminals 793–X—795–X are Up, the switching circuits 852—854, respectively, provide horizontal deflection weights of 4, 8 and 16. A total horizontal deflection weight of 17, for example, is provided by causing the terminals 791–X and 795–X to be Up, while terminals 791 and 795 are caused to be Down.

The switching units 850—854 of Figs. 26A and 26B operate in a manner similar to the switching units DU2, DU4, DU8, DU10, and DU100 of Figs. 16A and 16B. The tubes 858L and 858R respectively of Figs. 26A and 26B correspond to tubes 452L and 452R of Figs. 16A and 16B. Similarly, the voltage stabilizing circuits 855 and 856, respectively of Figs. 26A and 26B correspond to voltage stabilizing circuits 451 and 450, respectively, of Figs. 16A and 16B.

When a binary 0 is present in the first binary order of the binary address, the terminal 791 is Up, and terminal 791–X is Down. When terminal 791 is Up, the diode 864 is non-conductive because its cathode is at +160 volts and its anode is at at +150 volts. It follows that the control grid of tube 858L is Up and causes 858L to be rendered fully conductive, the current flowing through tube 858L flows through conductor 859, the voltage stabilizing circuit 855, resistor 866, and decoupling circuit 869 to the +480 volt terminal 867. At the same time, the diode 865 is rendered fully conductive since its cathode is Down or at +130 volts, and its anode was at +150 volts. Conduction through diode 865 causes the control grid of tube 858R to go Down (+130 volts) and the tube is rendered non-conductive because of the voltage drop across the cathode resistor 861 provided by the current flowing through tube 858L. Since tube 858R is non-conductive, no current is flowing therethrough and through the voltage stabilizing unit 856 due to the switching action of the switching unit 850.

If a binary 1 is present in the first binary order of the binary address, terminal 791 is Down and terminal 791–X is Up. Diode 865 is rendered non-conductive because terminal 791–X is Up. This causes the control grid of tube 858R to be placed at +150 volts and as a result the tube is rendered fully conductive. The current flowing through the tube 858R flows through the conductor 860, the voltage stabilizing circuit 856, the resistor 868, and the decoupling circuit 869 to the +480 volt terminal 867. The current flowing through resistor 868 causes a voltage drop thereacross which corresponds to a deflection weight of 1. During the presence of the binary 1 in the first column of the binary address, diode 864 is rendered conductive, causing tube 858L to be rendered non-conductive so that no current flows through voltage stabilizing circuits 855 from the switching unit 850.

The voltage stabilizing circuit 856 (similar to 450, Fig. 16B) serves as a load impedance for the various tubes 858R and the voltage stabilizing circuit 855 (similar to 851, Fig. 16A) serves as a load impedance for the various tubes 858L. The stabilizing circuit 856 (Fig. 26B) includes two twin-triode tubes 870 and 871 having their anodes commonly connected to terminal 804HL and through the load resistor 868 to the +480 volt terminal 867. The control grids of tubes 870 and 871 are connected through parasitic suppressing resistors *ps* to the conductor 872 maintained at +270 volts by the voltage dividing resistors 873 and 874 (Fig. 26A). The voltage dividing resistors 873 and 874 are connected in series between the +480 volt line 867 and the +150 volt line 166. The control grids of tubes 870 and 871 are connected to ground through the by-pass capacitor 875 and the cathodes are commonly connected to conductor 860. The tubes 870 and 871 of the voltage stabilizing circuit 855 (Fig. 26A) are similarly connected except that their anodes are commonly connected to terminal 804HR and their cathodes are commonly connected to conductor 859.

If all of the tubes 858L of the switching units 850–854 are conductive, all of the current will flow through the voltage stabilizing circuit 855. Hence, no current will flow through the stabilizing circuit 856 and the resistor 877 (Fig. 26B) serves as the cathode load impedance for the voltage stabilizing circuit 856. A corresponding resistor 876 (Fig. 26B) is provided between conductor 859 and ground.

Since the switching units 850 through 854, respectively, provide deflection weights of 1, 2, 4, 8, and 16, the currents flowing through resistor 861 of circuit 850, resistor 879 of circuit 851, resistor 880 of circuit 852, resistor 881 of circuit 853 and resistor 882 of circuit 854 must be directly related as 1, 2, 4, 8, and 16 and the values of the resistors must be inversely related. Hence, the value of resistor 882 providing a deflection weight of 16 is equal to R; resistor 881 providing a deflection weight of 8 is equal to 2R; resistor 880 providing a deflection weight of 4 is equal to 4R; resistor 879 providing a deflection weight of 2, is equal to 8R; and resistor 861 providing a deflection weight of 1 is equal to 16R.

The tubes 858L and 858R of switching unit 854 are each a twin triode whose sections are connected in parallel. Such is necessitated by the high current flow through the resistor 882.

The resistors 866 and 868 of Figs. 26A and 26B are identical, and the total current flowing through both will always be a constant value. Since the address locations (Fig. 25) are equally spaced, the deflection of the electron beam of the cathode ray tube must be equal when it is shifted from one spot position to the next. It is now understood that if all of the binary digits of the binary address are 0's, the tubes 858L of the switching circuits 850—854 are conductive and all of the current is flowing through the tubes 870 and 871 of the voltage stabilizing circuit 855 and hence through the resistor 866. If the unit deflection weight current is represented by 3 milliamperes, a total of 3×32 or 96 milliamperes of current is flowing through resistor 866 (0 through resistor 868).

When the total current is flowing through resistor 866, terminal 804HR (connected to right-hand deflection plate) is at its lowest voltage of approximately +430 volts. At the same time, since no current is flowing through resistor 868 of the voltage stabilizing circuit 856 (Fig. 26B), terminal 804HL (connected to left-hand deflection plate) is at the potential of conductor 867 or approximately +480 volts. Since terminal 804HL is more positive than 804HR, the beam of the cathode ray tube is in its most extreme left-hand position.

If a binary 1 is now caused to appear in the first binary order of the binary address, tube 858R of switching unit 850 is rendered fully conductive and tube 858L is rendered non-conductive, 3 milliamperes of current are subtracted from that flowing through resistor 866 and caused to flow through resistor 868. Since only 93 milliamperes of current are now flowing through resistor 866, the voltage drop thereacross decreases so that the potential on terminal 804HR moves in a positive direction. The 3 milliamperes of current flowing through resistor 868 cause a voltage to appear thereacross and the potential on terminal 804HL moves in a negative direction. The beam of the cathode ray tube is, therefore, caused to move one address position to the right.

If the beam is to be placed at address 2 (Fig. 25), a binary 1 will appear in the second binary order of the binary address and binary 0's appear in all other positions. The presence of this binary 1, as explained hereinbefore, causes terminal 792–X (Fig. 26B) to be Up, whereupon tube 858R of switching unit 851 is rendered fully conductive so that the 6 milliamperes of current formerly flowing through 858L of unit 851 and hence through resistor 866 are now transferred to flow through resistor 868. The total current flowing through resistor 866 is now 90 milliamperes, whereas the total current flowing through resistor 868 is 6 milliamperes. The decreased current flowing through resistor 866 causes terminal 804HR to make a voltage excursion in a positive direction. Similarly, the increased current flowing through resistor 868 causes terminal 804HL to make a voltage excursion in the negative direction. This causes the beam of the cathode ray tube to be moved to address 2.

Accordingly, if the beam of the cathode ray tube is to be placed at address 3, binary 1's will appear in the first and second orders of the binary address. Since terminal 792–X is still Up, the 6 milliamperes of current flowing through switching units 851 will continue to flow through the voltage stabilizing circuit 856 and the resistor 868. Since terminal 791–X is again Up, the 3 milliamperes of current flowing through switching circuit 850, which were flowing through resistor 866, are now transferred to flow through resistor 868. The total current flowing through resistor 868 is now 9 milliamperes and the total current flowing through resistor 866 is 87 milliamperes.

If the beam is to be placed at address 4 the tube 858R of switching unit 852 is caused to be conductive and switching units 850 and 851 are caused to return to their initial condition with the tubes 858L conducting. Hence, 12 milliamperes of current flow through resistor 868 and 84 milliamperes of current flow through resistor 866.

If the beam of the cathode ray tube is to be moved to address 5 tube 858R of the switching unit 850 is caused to become conductive and 3 milliamperes of current are thereby added to that flowing through resistor 868, making a total of 15 milliamperes flowing through resistor 868. The remaining current of 81 milliamperes is flowing through resistor 866.

Each time the beam of the cathode ray tube is advanced one address to the right 3 milliamperes of current are added to that flowing through resistor 868 and 3 milliamperes are subtracted from the current flowing through resistor 866. Thus, when the beam is at address 31, all of the current; i.e., 96 milliamperes, is flowing through resistor 868 and no current is flowing through resistor 866. This condition is caused by rendering the tubes 858R of the switching units 850–854 fully conductive, while the tubes 858L thereof are nonconductive.

From inspection of Fig. 25 it is understood that when the beam of the cathode ray tube is subjected to a vertical deflection weight at the same time that any of the horizontal deflection weights 0–31, inclusive, are provided, the beam can be located at any desired address in the raster.

The vertical deflection circuit 803 of Fig. 22B is identical to the horizontal deflection circuit 802 and thus would also be represented by the circuit diagram of Figs. 26A and 26B. When the circuit of Figs. 26A and 26B is used to represent the vertical deflection circuit, the terminals 791 through 795 of Figs. 26A and 26B are respectively replaced by terminals 796—800 of the vertical deflection circuit 803 of Fig. 22B, and terminals 791-X—795-X are replaced by terminals 796-X—800-X, respectively. The switching units 850—854 (Figs. 26A and 26B), respectively, when used as the vertical deflection circuit, supply deflection weights of 1, 2, 4, 8 and 16. However, in this case the deflection weight provided by switching circuit 850 corresponds to the sixth binary digit from the extreme right or sixth binary order of the binary address. Similarly, switching units 851—854, respectively, correspond to the binary digits 7–10 of the binary address. Where all of the binary digits of the binary address are 0, the switching circuits 850—854 are in their initial condition with tubes 858L conducting, and all of the current flowing through resistor 866. Again, the current flowing through resistor 866 causes a voltage drop thereacross which places the terminal 804HR, corresponding to terminal 805VL of Fig. 22B, at its most negative voltage. At the same time, no current is flowing through resistor 868 and terminal 804HL corresponding to terminal 805VU of Fig. 22B, is at its most positive voltage. These voltage conditions locate the beam in the first horizontal row (Fig. 25). Accordingly, if switching unit 850 provides a vertical deflection weight of 1, the current flowing through resistor 866 is 93 milliamperes, that flowing through resistor 868 is 3 milliamperes, and the beam of the cathode ray tube is located in the second horizontal row (Fig. 25). When all of the tubes 858R (Figs. 26A and 26B) of the vertical deflection circuit are conducting fully (tubes 858L are non-conductive), all of the 96 milliamperes of current is flowing through resistor 868 to thereby provide a total vertical deflection weight of 31. This places the beam of the cathode ray tube in the row containing the addresses 992–1023 inclusive (Fig. 25).

A dot is stored at a given address by causing the beam to be conductive when it is first positioned thereat. The spot representing the storage of a dash is physically larger than that representing the storage of a dot. Hence, a dash is stored at a given address by causing the electron beam of the cathode ray tube to traverse a linear displacement after it is positioned at that address.

The dash deflection generator of Fig. 26B effects this linear displacement and comprises inverter 884R, cathode follower 884L, and the deflection amplifier tube 885. The operation of this dash deflection generator (Fig. 26B) is similar to that of the horizontal dash deflection generator of Fig. 16B. In Fig. 26B the dash deflection generator operates such that the beam of the cathode ray tube is caused to make a linear displacement during the last four microseconds of each and every regeneration and action cycle. Circuits described hereinafter control the turning on and turning off of the beam of the cathode ray tube so as to determine when a dot and when a dash is to be written.

The inverse of the waveform W775 (Fig. 23) is applied to the input terminal 775-X, Fig. 26B, connected through the isolation and parasitic suppressing resistor 886 to the control grid of tube 884R. The anode of tube 884R is connected through the anode load resistor 887 to the +150 volt line and to the control grid of cathode follower tube 884L. The cathode of 884R is connected to ground and the cathode of 884L is connected to ground through capacitor 888 and resistor 889 in parallel. When terminal 775-X and thus the control grid of tube 884R are Down during the first four microseconds of either an action or regeneration cycle, the anode of 884R is Up. This causes the cathode of cathode follower 884L to go Up which in turn causes the capacitor 888 to be fully charged. During the last four microseconds of an action or a regeneration cycle the control grid of tube 884R is Up and its anode Down, causing the cathode of the cathode follower 884L to go Down. When the cathode of cathode follower 884L goes Down the capacitor 888 discharges through the shunting resistor 889. This action causes a sloping wave form to appear across the capacitor 888 during the last four microseconds of each eight microsecond cycle.

Voltage dividing capacitors 890 and 891 are connected in series between the cathode of tube 884L and ground. The juncture of these capacitors is connected to the control grid of amplifier tube 885R and through resistor 892 to the +150 volt line. Hence, a portion of the voltage waveform appearing at the cathode of tube 884L is applied to the control grid of tube 885R.

The anodes of amplifier tubes 885L and 885R are connected respectively to conductors 859 and 860. The control grid of 885L is connected through the parasitic suppressing resistor *ps* to the +150 volt line, and the cathodes of tubes 885L and 885R are commonly connected through the cathode resistor 893 to ground.

During the intervals T4–T8 and T12–T16 the decreasing potential present on the control grid of tube 885R causes less conduction therein whereby less current flows through the voltage stabilizing circuit 856 and resistor 868. The decreased current through the tube 885R allows the tube 885L to conduct more current in order to maintain the potential drop across cathode resistor 893 at a constant value. The increased current through 885L causes an increased current to flow through resistor 866. Since the current flowing through resistor 868 is decreased by an incremental amount, the beam of the cathode ray tube is deflected slightly to the left.

The dash deflection generator associated with the vertical deflection circuit causes a deflection of the beam in the upward direction. The dash deflection generator associated with the horizontal deflection circuit when combined with the vertical dash deflection generator provides a deflection along a line at an angle of 45 degrees to the horizontal.

*Video information circuits*

The video information circuits (Fig. 22B) control the reading out of information stored and the writing or reading in of information to be stored on the face of the cathode ray tube. During regeneration cycles, and also during action cycles, when information is read out from the cathode ray tube, the operation of the video information circuits follows a first pattern of operation. During action-write cycles when information received from an external source is to be stored on the cathode ray tube, the video information circuits perform a different or second pattern of operation. If an action-blank cycle is executed, the video circuits are rendered inoperative.

The first pattern of operation, utilized during regeneration and action-read cycles, consists of reading out the information stored at an address at which the beam of the cathode ray tube has been positioned, manifesting this information in the form of voltage pulses which become available to external circuits, and simultaneously re-storing the same information at the address from which it was read out.

The second pattern of operation is utilized when new information is to be stored at a particular address on the face of the cathode ray tube or during an action-write cycle. The information previously stored at the selected address is read out and destroyed, and new information is written thereat.

Referring more particularly to Fig. 27E, the placement of Figs. 19B, 27A, 27B, 27C, and 27D to realize a complete circuit diagram of the video information circuits is shown. The video information circuits shown provide storage capacity for 1024 binary bits of information. If a plurality of binary orders or bits are required to represent a word of information, an additional video information circuit is provided for each binary order to be stored. If used in this manner, the information stored in the various binary orders can be made available simultaneously as illustrated for the binary-decimal embodiment described hereinbefore.

It is now understood that if a dash is stored at a particular address, the positioning of a beam of a cathode ray tube to this address causes a net change in potential distribution which manifests itself as a positive video pulse. This video pulse is capacitively coupled to the pick-up plate, which in turn is connected to the input of the video amplifier of Fig. 19B. It is also clear that the video signal applied to the video amplifier when a dot is read from the cathode ray tube is negative and of smaller amplitude than the positive video signal representing a dash.

The video signals presented to the video amplifier 809 (Fig. 22B) are amplified therein and appear at the output terminal 810 of the video amplifier as shown in Figs. 19B and 22B. The waveforms appearing at terminal 810 under various exemplary conditions are illustrated in Figs. 28A and 28B. The means to control the beam of the cathode ray tube to cause video information signals to appear at the pick-up plate is described hereinafter with respect to the intensifier circuit of Fig. 27B.

Various waveforms present throughout the video information circuits of Figs. 27A and 27B are shown in Figs. 28A–28D, arranged as indicated in Fig. 28E to facilitate understanding. Figs. 28A–28D illustrate two typical cycles of operation, where cycle 1 includes a regeneration cycle during which a stored dash is regenerated and an action-write cycle during which a new dash is stored, and cycle 2 includes a regeneration cycle during which a stored dot is regenerated and an action-write cycle during which a new dot is stored. The waveforms present during an action-read cycle are not illustrated, since they are identical to those shown during a regeneration cycle.

Referring more particularly to Fig. 27A, the circuit diagram of the detector circuit 811 of Fig. 22B is shown. The input terminal 810 which is the output terminal of the video amplifier (Fig. 19B) is connected through the coupling capacitor 900 to the input terminal 58 of the cathode follower 901 and to ground through the grid resistor 902. The output terminal 63 of cathode follower 901 is connected through the coupling capacitor 904 to the juncture 905 which is connected to the control grid of cathode follower tube 906L. Thus, when a dash signal is received at terminal 810; i.e., terminal 810 is Up between T3 and T4 or T11 and T12 (Fig. 28A), this signal causes cathode follower 901 to be rendered fully conductive, whereupon its output and juncture 905 are Up.

The juncture 905 is connected through resistor 907 to the −150 volt terminal 230. Hence, during time intervals when the cathode follower 901 is inoperative, the juncture 905 will be at approximately −150 volts. Juncture 905 is connected to the anode and the cathode respectively of tubes 908R and 908L. The anode of tube 908L and the cathode of tube 908R are connected respectively to the terminals 909 and 910. The diodes 908L and 908R are provided to return the juncture 905 to −150 volts immediately after the occurrence of a positive signal thereon representing a dash.

The waveforms applied to the terminals 909 and 910 are illustrated in Figs. 28A and 28B. During the time intervals T0–T4 and T8–T12, terminal 909 is at approximately −170 volts and terminal 910 is at approximately −130 volts. During these time intervals the diodes 908L and 908R are non-conductive and juncture 905 is free to follow the potential excursions of the cathode of tube 901. However, if juncture 905 is caused to be more positive than −130 volts due to the presence of a dash signal, diode 908R will conduct, thereby retaining juncture 905 at −130 volts.

If a dash is read from the face of the cathode ray tube during a regeneration cycle, the waveform illustrated for the first regeneration cycle of Fig. 28A appears at terminal 810 of Fig. 27A. During the time T3–T4 terminal 810 is positive, thereby causing cathode follower 901 to conduct fully so that the juncture 905 (Fig. 27A) is Up. The dash signal at terminal 810 terminates at approximately T4 and conduction of the diodes 908L and 908R returns the juncture 905 to −150 volts. At time T4 the potential at terminal 909 rises to −150 volts (Fig. 28A) and the potential at terminal 910 decreases to −150 volts (Fig. 28A). If at this time juncture 905 is more negative than −150 volts, the diode 908L conducts and returns juncture 905 to the −150 volt level; if juncture 905 is more positive than −150 volts, diode 908R conducts, thereby returning the juncture to this potential. This action causes the coupling capacitor 904 to be completely discharged and therefore prepared for the subsequent receipt of a new dash signal.

The tubes 906L and 906R operate as a cathode coupled shaping circuit. Tube 906L operates as a cathode follower and tube 906R operates as a grounded grid amplifier. The anode of tube 906L is connected to ground, and its cathode is connected to the cathode of tube 906R and through the common load resistor 911 to the −220 volt terminal 912. The anode of tube 906R is connected to ground through anode load resistor 913 and to the input terminal 10A and the AND circuit **916*a*. Variable resistor 914 and resistor 915 comprise a voltage divider connected between ground and the −150 volt terminal 230. The control grid of tube 906R is connected to the tap of variable resistor 914**.

When a dash signal is not present, juncture 905 is at −150 volts, and the cathode follower 906L is conducting sufficient current to maintain its cathode at approximately this potential. The control grid of tube 906R is at approximately −140 volts so that it is fully conducting with the anode thereof approximately −120 volts. However, when a dash signal appears and juncture 905 is Up, cathode follower 906L becomes fully conductive and the increased current flowing through resistor 911 produces a voltage drop thereacross causing tube 906R to be rendered non-conductive. The anode of tube 906R then goes Up to approximately 0 volt. Thus, whenever the anode of tube 906R and consequently terminal 10A of the AND circuit **916*a*** are Up, a dash signal has been read from the face of the cathode ray tube.

The input terminals 10B and 10C of the AND circuit **916*a* are respectively connected to the terminals 917 and WA and the output terminal 16 thereof is connected to the input terminal 58 of cathode follower 919. The waveforms applied to the terminals 917 and WA during a regeneration cycle are illustrated in Figs. 28A and 28B and occur between times T0 and T8. The waveform applied to terminal 917** is periodic; i.e., will always be Up from T3–T4 and T11–T12. Terminal WA is Up during every regeneration cycle and during action-read cycles.

If, during a regeneration cycle, a dash is read from the cathode ray tube so that terminal 10A of the AND circuit **916*a* is Up, the AND circuit will be rendered operative during T3–T4 since its input terminals 10B and 10C are also Up at this time (Figs. 28A–28B). The operation of AND circuit 916*a* renders cathode follower 919 fully conductive and causes its output terminal 63 to go Up. The waveform applied to terminal 917 and thus 10B of AND circuit 916*a* goes Down at T4 and causes the output terminal 16** thereof to go Down.

The output terminal 63 of cathode follower 919 is connected to the anode of diode rectifier 922. The cathode of diode 922 is connected to the anode of clamping diode 923, through the storage capacitor 924 to ground, and through the isolation and parasitic suppressing resistor 835 to the control grid of the inverter 925L. The cathode of clamping diode 923 is connected to terminal 926.

When the output terminal 63 of cathode follower 919 is Up (dash signal present, Fig. 28A), diode 922 conducts and causes the juncture 927 to be Up and thereby charges capacitor 924 to approximately 0 volt. When juncture 927 is Up or at 0 volt, the inverter 925L is rendered fully conductive. Fig. 28A indicates that the waveform applied to terminal 926 is Up from T0–T6, which includes the time that a dash signal might be received (T3–T4). At time T6 terminal 926 goes Down (Fig. 28A) and renders clamping diode 923 conductive to discharge the storage capacitor 924. The storage capacitor 924 is then charged with its upper plate at −20 volts. Whenever the juncture 927 is Down (capacitor 924 charged to −20 volts), the inverter 925L is non-conductive. It is now apparent from the above description that when a dash signal is received by the circuit of Fig. 27A, the inverter 925L is rendered fully conductive from the time T3–T6.

The cathode of inverter 925L is connected to ground, and its anode is connected through the anode load resistor 928 to the +150 volt terminal 166. The anode of inverter 925L is also direct coupled through the resistor 929 and the capacitor 930 in parallel and through the parasitic suppressing resistor *ps* to the control grid of tube 925R. The control grid of cathode follower tube 925R is connected through the parasitic suppressing resistor and diode 932 to ground, and through the parasitic resistor and resistor 933 to the −150 volt terminal 230. The diode 932 is connected to conduct current from the anode of tube 925L through the resistor 929 to ground. The cathode of cathode follower 925R is connected through the cathode load resistor 934 to the −150 volt terminal 230, and to the output terminal 812.

When a dash is read from the cathode ray tube, the inverter 925L is rendered conductive from time T3–T6. As a result the anode of tube 925L is Down, and the grid and cathode of cathode follower tube 925R are Down. This causes the output terminal 812 (see waveform, Fig. 28A) to be Down from T3–T6. However, when inverter 925L is non-conductive its anode is Up so that the grid and cathode of cathode follower tube 925R are Up. This occurs at T6 (Fig. 28A) when terminal 926 goes Down. The purpose of the diode 932 is to prevent the control grid of cathode follower 925R and hence its cathode from becoming more positive than ground during the time that inverter 925L is non-conductive. It is seen that if terminal 812 is Down from time T3–T6, a dash signal was applied to the input terminal of the circuit of Fig. 27A.

When a dot is read from an address on the face of the cathode ray tube, the signal (waveform Fig. 28B) will appear at terminal 810 of Fig. 27A.

Tube 906R is never cut off by a dot signal and terminal 10A of the AND circuit 916 therefore remains Down. Hence, the AND circuit **916*a* cannot be operated, the input and output of cathode follower 919 remain Down, and the diode 922 cannot be rendered conductive. Hence, the storage capacitor 924 remains Down; i.e., its upper plate remains at −20 volts to cause the inverter 925L to remain non-conductive. Since inverter tube 925L remains non-conductive the output terminal 812** remains Up.

Hence, when a signal representing a dot appears at the input terminal 810 (Fig. 27A) the output terminal 812 remains Up for the entire cycle. In Fig. 28B the terminal 812 is represented as Up from the time T0–T8. It will also be noted from Figs. 28A and 28B that terminal 812 is Up for each entire sixteen microsecond period except when a dash is regenerated.

Referring to Fig. 27B the circuit diagram of the intensifier circuit 813 (Fig. 22B) is shown. This circuit provides either a one-microsecond or five-microsecond pulse at the output terminal 817 and to the cathode of the cathode ray tube in order to store information at a desired address. The output pulse is a one-microsecond pulse if it is desired to store a dot and a five-microsecond pulse if it is desired to store a dash.

Terminal 778 (Fig. 27B) is connected to the input terminal 80 of the blocking oscillator 938 whose output terminal 82 is connected through the coupling capacitor 939 to juncture 940. A one megacycle sine wave is supplied to terminal 778 and triggers the blocking oscillator 938. The blocking oscillator produces a series of equally spaced positive pulses of short duration, each corresponding to a positive crest of the one megacycle sine wave. The juncture 940, at which these positive pulses appear, is connected to the control grid of the AND-inverter tube 942 through the resistor 943 and capacitor 944, in parallel, and to the control grid of AND-inverter tube 945 through the resistor 946 and capacitor 947 in parallel. Juncture 940 is maintained at approximately −10 volts by the voltage divider action resistors 948 and 949 connected between the −150 volt terminal 230 and ground. Both self and fixed bias potential is supplied to the control grid of the tubes 942 and 945. A fixed bias of approximately −10 volts is provided by the voltage dividing resistors 948 and 949. A self bias for the tube 942 is supplied by the action of the time constant of the resistor 943 and capacitor 944, and for the tube 945 by the action of the time constant of the resistor 946 and capacitor 947. These time constants are sufficiently long to maintain the self bias between the positive voltage pulses appearing at the juncture 940 from the blocking oscillator 938.

The anode of tube 942 is connected through anode load resistor 950 to the +150 volt terminal 166, its screen grid is connected directly to the +150 volt terminal, and its cathode is connected to ground. The suppressor grid of tube 942 is connected to ground through capacitor 952, and through resistor 953 to the output terminal 16 of the AND circuit **954*a***.

The input terminals 10A–10D of AND circuit **954*a* are connected, respectively, to the terminals 777–X, 776, 775, and ACB. The waveforms supplied to these terminals are produced by the timer 760** (Fig. 22A) and are shown in Fig. 28C. Terminal ACB must be Up at all times except when an action-blank cycle is desired.

It is apparent from inspection of Fig. 28C that during the time T0–T8 the waveforms W776, W777–X and W775 are all Up only between T2 and T3. Thus beginning at time T2 the output terminal 16 of AND circuit **954*a* goes Up. However, the time constant of the resistor 953 and capacitor 952 (Fig. 27B) prevents the suppressor grid of tube 942 from going Up as rapidly as does the output terminal 16 of AND circuit 954*a*. The time constant of the resistor 953 and capacitor 952 is sufficiently long to prevent the voltage pulse present at juncture 940 at time T2 from rendering the tube 942 fully conductive. However, at time T3 the suppressor grid of tube 942 will be Up such that this voltage pulse applied to the control grid of tube 942 causes conduction therein. Thus a negative (Fig. 28C) voltage pulse of short duration appears at the anode of tube 942 at time T3. At time T3 the waveform W776 applied to AND circuit 954*a* goes Down causing the output terminal 16 thereof to also go Down. Thus subsequent voltage pulses present at juncture 940 cannot cause conduction in tube 942**.

The negative voltage pulse produced at the anode of tube 942 will be used to transfer conduction in the tubes 955L and 955R or switch the Eccles-Jordan trigger circuit 956 from one stable condition to the other. The trigger circuit 956 is conventional and will not be described in detail. The trigger circuit 956 is used to produce a one or five microsecond pulse which is delivered to the cathode of the cathode ray tube in order to write information thereon.

The cathode of diode rectifier 957 is connected to the anode of tube 942 and its anode is connected to the anode of tube 955L. The anode of tube 955L is also connected through the anode load resistor 958 and through the decoupling circuit 959 to the +150 volt terminal 166. The anode of tube 955L is connected through resistor 960 and capacitor 961 in parallel to the control grid of tube 955R connected through resistor 962 to the −220 volt terminal 913. The anode of tube 955R is connected through the anode load resistor 963 and the decoupling circuit 959 to the +150 volt terminal 166, and through the resistor 964 and capacitor 965 in parallel to the control grid of tube 955L. The control grid of 955L is connected through the resistor 966 to the −220 volt terminal 913. The control grids of tubes 955R and 955L are connected respectively to the cathodes of diodes 967 and 968 having their anodes connected to the juncture of the voltage dividing resistors 969 and 970 connected between ground and the −150 volt terminal 230, respectively, so that the juncture is at approximately −20 volts. The diodes 967 and 968 prevent the control grids of tubes 955R and 955L from becoming more negative than −20 volts. If one of these control grids attempts to become more negative than −20 volts, the appropriate diode 967 or 968 will conduct and thereby return the grid to −20 volts. The control grids of tubes 955R and 955L are connected respectively through parasitic suppressing resistors to the control grids of cathode follower tubes 971R and 971L.

The normal or starting condition of trigger 956 is with tube 955R conducting, as indicated by the X to the right thereof and tube 955L is cut off. When trigger 956 is in its normal condition the anode of tube 955L is Up so that the control grids of tube 955R and tube 971R are Up. Consequently, the cathode follower tube 971R is fully conducting so that the output terminal 817–X is Up. The anode of tube 955R is Down and the control grids of tube 955L and cathode follower tube 971L are Down. Since the control grid of cathode follower tube 971L is Down its cathode and the output terminal 817 are also Down.

The negative voltage pulse appearing at time T3 at the anode of tube 942 is applied to the cathode of the diode rectifier 957. This voltage pulse causes rectifier 957 to conduct and the anode of tube 955L to go Down. As a result the potential applied to the control grid of 955R goes Down and causes a switching of the trigger 956 so that tube 955L is rendered conductive and tube 955R is cut off. In this stable condition the cathode of cathode follower tube 971L is Up, thus causing the output terminal 817 to be Up commencing at time T3. Accordingly, the anode of tube 955L will be Down so that the control grids of tubes 955R and 971R will be Down and the cathode follower 971R will be less conductive to cause the terminal 817–X to go Down.

The anode of the diode rectifier 974 is connected to the anode of tube 955R and its cathode is connected to the anode of the AND-inverter tube 945. The anode of tube 945 is connected through the anode load resistor 975 to the +150 volt terminal 166, the screen grid thereof is also connected to the +150 volt terminal and its cathode is connected to ground. The suppressor grid of tube 945 is connected to ground through capacitor 976 and through resistor 977 to the output terminal 16 of AND circuit **978*a***.

The input terminals 10A–10D of the AND circuit **978*a* are connected, respectively, to the terminals 812, 776–X, 777–X and the dash-write terminal DW. The waveform at terminal 812 (Figs. 27A and 27B) is illustrated in Fig. 28A and the waveforms at terminals 776–X and 777–X (Fig. 27B) are illustrated in Figs. 28C and 28D. The dash-write terminal DW is used during an action cycle when it is desired to write a dash at a desired address. The dash-write terminal DW is normally held Up (Figs. 28C and 28D) by external circuits (not shown) and is caused to be Down from time T8 to T12** of an action-write cycle when it is desired to write a dash.

During a regeneration cycle or an action-read cycle where a dash is being read out from the face of the tube, as, for example, during the time T0–T8 (Figs. 28A and 28C) it is apparent that the only time that all of the input terminals 10A–10D of the AND circuit **978*a* (Fig. 27B) are all Up is from T7 to T8. Thus, from time T7 to T8 the output terminal 16 of the AND circuit 978*a* is Up and attempting to cause the suppressor grid of tube 945 to be Up. However, the time constant of the capacitor 976 and resistor 977 is sufficiently long to prevent the voltage pulse appearing at juncture 940 and the control grid of tube 945 at time T7 from causing conduction in this tube. Shortly after occurrence of the voltage pulse applied to the control grid of tube 945 at time T7, the suppressor grid thereof will be Up. This permits the voltage pulse appearing at juncture 940 and applied to the control grid of tube 945 at time T8 to cause conduction therein so as to produce a negative voltage (Fig. 28C) pulse at the anode of tube 945. This negative pulse at the anode of tube 945 is applied to the cathode of diode 974 and causes conduction therethrough. This conduction causes the anode of tube 955R to go Down. The fact that the anode potential of tube 955R is Down will cause a switching of the trigger 956 to its initial stable condition so that at the end of time T8 tube 955R will be conductive, and tube 955L will be nonconductive. Hence, the cathode follower 971L is less conductive, cathode follower 971R is fully conductive, the output terminal 817 is Down, and terminal 817–X is Up. The waveform present at the output terminal 817 is indicated in Fig. 28C. The fact that terminal 817 was Up from the time T3–T8** of a regeneration or action-read cycle indicates that a dash signal was read from the face of the cathode ray tube and that a dash signal will be rewritten at the address from which it was read.

Hence, as above described, the operation of the circuit of Fig. 27B during an action cycle, in response to information read out from a particular address on the cathode ray tube, produces a voltage pulse at the output terminal 817 from time T3 to T8. This pulse can be utilized by external circuits as an indication that a dash was stored at the address from which the information was obtained.

The inversion of this pulse appearing at terminal 817 may be utilized to provide a like indication. The tube 981 having its control grid connected through the parasitic suppressing resistor *ps* to the cathode of tube 971L provides such an inversion. The anode of tube 981 is connected to the output terminal 814 and through the peaking coil 982 and anode load resistor 983 to the +150 volt terminal 166, the screen grid is connected directly to terminal 166, and the suppressor grid and cathode are connected together and through cathode resistor 984 to ground. Since tube 981 is operated as an inverter, when the control grid thereof is Up the anode is Down so that the waveform appearing at the output terminal 814 will be the inversion of that appearing at terminal 817.

Now consider the operation of the circuit of Fig. 27B when a dot signal is read from the face of the cathode ray tube during a regeneration cycle or during an action cycle. When a dot signal is involved, the operation of the circuit of Fig. 27B is always the same regardless whether an action cycle or a regeneration cycle is in progress.

Waveforms typical of those presented to the circuit of Fig. 27B when a dot signal is involved are illustrated in Fig. 28D during the time T0 to T16 of cycle 2. Commencing at time T2, the input terminals 10A—10D of the AND circuit **954*a* are Up since terminal ACB and the waveforms W776–X, W776 and W775 (Fig. 28D) are Up. AND circuit 954*a* is then operated such that its output terminal 16 will be Up from time T2–T3. However, the capacitor 952 and resistor 953 will prevent the suppressor grid of tube 942 from going Up at time T2 and the voltage pulse applied to its control grid at time T2 cannot cause conduction therein. However, the next voltage pulse applied to the control grid of tube 942 will cause momentary conduction therein at time T3 so as to cause the trigger 956 to transfer conduction (tube 955L is rendered conducting and tube 955R is cut off). Thus, commencing at T3, the output terminal 817** goes Up.

An examination of the waveforms applied to the terminals 812, 776–X, 777–X, and DW (Fig. 28D) indicates that beginning at time T3 the AND circuit 978 will be operated so that its output terminal 16 will be Up from T3–T4. Here again the capacitor 976 and resistor 977 prevent the suppressor grid of tube 945 from going Up at time T3 and the voltage pulse applied to the control grid of tube 945 at time T3 cannot cause conduction therein. At the time T4 the suppressor grid of tube 945 is Up and the voltage pulse applied to the control grid thereof causes conduction therein. As a result the trigger 956 is returned to its initial stable condition. Thus, at time T4 the output terminal 817 goes Down.

The fact that terminal 817 of Fig. 27B is Up from time T3–T4 (corresponding to the fourth time interval of any action of regeneration cycle) indicates that a dot signal was applied to the circuit of Fig. 27B. Accordingly, terminal 814 is Down from T3–T4 and a dot again written upon the face of the cathode ray tube.

At time T8 (corresponding to the end of an action or regeneration cycle) the AND circuit **978*a* of Fig. 27B will be operative so as to allow a negative voltage pulse to be applied via tube 945 to the anode of tube 955R. This negative voltage pulse merely insures that the trigger circuit 956 has been returned to its initial stable condition with tube 955R conducting and tube 955L** non-conducting.

Referring more particularly to Fig. 27C, the terminal 814 is connected through the coupling capacitor 986 to the cathode of the cathode ray tube and to the cathodes of the twin diode tube 987. The cathode of the cathode ray tube is connected through resistor 988 and by-passes capacitor 989 to ground, and through cathode resistor 988 to a constant potential juncture 990.

The D.C. potentials necessary for the operation of the cathode ray tube are obtained from the voltage divider connected between the −800 volt terminal 991 and ground. The voltage divider comprises the decoupling circuit 992 and resistors 993–996, inclusive. The cold cathode gaseous discharge voltage regulator tube 997 maintains juncture 990 at a constant potential with respect to the −800 volt terminal 991. The control grid of the cathode ray tube is connected to the adjustable tap on resistor 993; the potential at this tap determines the brightness of the cathode ray tube beam. The bypass capacitor 998 connected between the movable tap on resistor 993 and juncture 990 maintains the tap and juncture 990 at the same A.C. potential. The focusing control for the focusing electrode of the cathode ray tube is provided by the movable tap on resistor 995. The focusing electrode is also connected through bypass capacitor 999 to the juncture 990 so that the focusing electrode and juncture 990 are maintained at the same A.C. potential. The second anode 1000 of the cathode ray tube is connected to the movable tap on resistor 1001. Resistor 1001 is part of a voltage divider connected between ground and the +480 volt terminal 867 and comprises the resistor 1001, resistor 1002 and decoupling circuit 1003. The movable tape on resistor 1001 is placed at a potential which is approximately equal to the average potential of the deflection plates of the cathode ray tube so as to reduce astigmatism.

It was noted hereinbefore that when a dot is to be written on the face of the cathode ray tube, terminal 814 of Fig. 27B is Down from time T3 to T4 and when a dash is to be written terminal 814 is Down from time T3 to T8.

The negative going leading edge of the dot or dash pulse applied to terminal 814 (Figs. 27B and 27C) causes the coupling capacitor 986 to be discharged. The discharging current flowing through resistor 988 causes a voltage drop to appear thereacross. This voltage drop is positive at the top of the resistor 988 and negative at the bottom thereof and reduces the bias voltage appearing between the cathode and grid of the cathode ray tube. The twin diode tube 987 is provided to prevent the cathode of the cathode ray tube from going more negative than juncture 990 connected to its plate. The voltage drop across diode 987 is negligible when it is conducting. Hence, if the cathode of the cathode ray tube is more negative than juncture 990, the diode 987 conducts, thereby causing the cathode of the cathode ray tube to assume the potential of juncture 990.

The positive trailing edge of the signal applied to terminal 814 causes the coupling capacitor 986 to be charged in the opposite direction and thereby cause a voltage drop across the resistor 988 opposite to that caused by the negative leading edge. This in effect provides a bias potential which causes the cathode ray tube to be rendered non-conductive.

The time constant of the capacitor 986 and the resistor 988 is sufficiently long to cause the cathode ray tube to remain conductive during the time that terminal 814 is Down and thereby cause a dot or a dash to be written upon its face. During the time that terminal 814 is Up this time constant causes the cathode ray tube to be non-conductive.

Briefly, information is read out of the binary storage system as follows:

If a dash is being read out terminal 810 (Fig. 27A) is Up, the control grid of tube 906L is Up and causes tube 906R to be cut off. This causes terminal 10A of AND circuit **906*a* to go Up and the output terminal thereof to go Up. Diode 922 conducts to charge capacitor 924. Inverter 925L is, therefore, fully conducting and terminal 812 is Down. The pulse applied to terminal 926 causes capacitor 924** to be discharged at the end of a dash (T6).

In Fig. 27B the blocking oscillator 938 produces a negative pulse during each time interval or during each microsecond. AND circuit **954*a* permits each T3 and T11 pulse from blocking oscillator 938 to render tube 942 conductive. This negative pulse from tube 942 causes trigger circuit 956 to be switched from its initial stable condition. Terminal 812 is Down from T3–T6 when a dash is read out and the output of AND circuit 978*a* is Down until T7 so that tube 945 is non-conductive and causes the tube 955L of trigger 956** to remain conductive until time T8.

The terminal 812 goes Up at T6 and the output of AND circuit **978*a* goes Up at T7. However, the timing constant of capacitor 976 and resistor 977 connected to the suppressor grid of tube 945 prevents the T7 pulse from the blocking oscillator 938 from rendering tube 945 conductive. The T8 pulse renders tube 945 conductive and switches trigger circuit 956 back to its initial stable condition. This causes terminal 814** (Fig. 27B) to go Up. Accordingly, at T8 the cathode of the cathode ray tube goes Up to turn off the beam.

If a dot is to be read out terminal 810 is Down and accordingly causes no circuit operation. Terminal 812 stays Up, output terminal 16 of AND circuit **978*a* goes Up and the time constant of capacitor 976 and resistor 977 permits tube 945 to conduct in response to the T4 pulse from the blocking oscillator 938. Hence, trigger circuit 956 is switched to its initial stable condition, and terminal 814** goes Up and turns off the beam of the cathode ray tube.

*Action-write cycle.*—During every action-write cycle where new information is to be stored on the face of the cathode ray tube the detector circuit (Fig. 27A) is disabled by causing the terminal WA to be Down.

If terminal WA is Down the AND circuit **916*a* (Fig. 27A) is disabled and its output terminal 16 is Down. This causes the remaining circuitry to be inoperative and terminal 812 remains Up. Since the output terminal 16 of AND circuit 916*a* is Down the output of cathode follower 919 is Down and diode 922 cannot be rendered conductive. Thus, storage capacitor 924 is charged to −20 volts so that inverter 925L is non-conductive. Hence, the anode of inverter 925L will be Up to cause the cathode follower 925R to be operated so that terminal 812 is Up. These conditions are illustrated by the waveforms of Fig. 28A existing between the time T8 and T16** of cycles 1 and 2.

Referring to Fig. 27B at time T11 the AND circuit 954a is operative and causes tube 942 to produce a negative pulse at its anode which effects a switching of trigger 956 to cause the output terminal 817 to go Up and terminal 814 to go Down.

To write a new dash on the face of a cathode ray tube the terminal DW (Fig. 27B) must be Down during the first four time intervals of an action-write cycle. The fact that terminal DW is Down from T8 through T12 (Figs. 28A and 28C) prevents the AND circuit 978a (Fig. 28B) from operating so that tube 945 cannot effect a switching of trigger 956 at time T12. However, at time T16 the waveforms applied to the input terminals 812, 776–X, 777–X, and DW (Figs. 28A and 28C) are Up so that AND circuit 978a is operated. A negative voltage pulse is therefore developed at the anode of tube 945 and causes the trigger 956 to be returned to its initial stable condition with tube 955R conducting. As a result the output terminal 817 goes Down and terminal 814 goes Up.

Since terminal 814 is Down from time T11 to time T16, a dash will be written on the cathode ray tube as described hereinbefore.

As stated hereinbefore, the operation of the circuits of Figs. 27B and 27C when a dot is to be written on the face of the cathode ray tube is the same whether an action or a regeneration cycle is being executed and is shown by the waveforms of Figs. 28B and 28D. It is recalled that terminal WA of Fig. 27A must be Up throughout a regeneration or action-read cycle, and must be Down during an action-write cycle.

The waveforms applied to terminals 909, 910, 917 and 926 of Fig. 27A, illustrated in Figs. 28A, 28B, 28C, and 28D, are produced by the circuit of Fig. 27D.

The waveform appearing on terminal 909 (Figs. 27A and 27D) is produced by inverting and shifting the level of the waveform W775 (Figs. 28C and 28D) applied to terminal 775. Terminal 775 (Fig. 27D) is connected through coupling capacitor 1007 to the control grid of tube 1008. The control grid of tube 1008 is also connected through resistor 1009 to the cathode and to the −220 volt terminal 913. The anode of tube 1008 is connected through resistor 1010 to ground, resistor 1011 to the −150 volt terminal 230, to the anode of diode rectifier 1012, and directly to terminal 909. The diode rectifier 1012 having its cathode connected to the −150 volt terminal 230 prevents the anode of tube 1008 from becoming more positive than −150 volts.

When terminal 775 is Up the inverter tube 1008 is rendered fully conductive so that its anode goes Down or assumes approximately −170 volts as illustrated for terminal 909 (Figs. 28A and 28B). However, when terminal 775 is Down, tube 1008 is rendered non-conductive and its anode and hence terminal 909 go Up or assume approximately −150 volts. From Fig. 23 and Figs. 28C and 28D, it is noted that waveform W775 is Up for the first four microseconds of each action or regeneration cycle and is Down for the second four microseconds thereof. Hence, terminal 909 is Down during the first four microseconds and is Up during the second four microseconds of each regeneration or action cycle.

Terminal 775–X (Fig. 27D) is connected through coupling capacitor 1013 to the control grid of tube 1014, and through the capacitor 1013 and resistor 1015 in series to the cathode of tube 1014 connected to the −220 volt terminal 913. The anode of tube 1014 is connected through resistor 1016 to ground and through resistor 1017 to the −150 volt terminal 230. The diode rectifier 1018 is connected in parallel with resistor 1017, its anode being connected to the −150 volt terminal 230 and its cathode being connected to the anode of tube 1014. The anode of tube 1014 is also connected to the output terminal 910. It follows that the diode rectifier 1018 prevents the anode of tube 1014 from becoming more negative than −150 volts.

Accordingly, when terminal 775–X is Up tube 1014 is rendered fully conductive and its anode goes Down to approximately −150 volts. When terminal 775–X is Down, tube 1014 is rendered non-conductive and its anode goes Up to approximately −130 volts.

The waveform appearing at terminal 917 (Fig. 27D) is produced by combining the waveforms W775–X, W776, and W777 in a diode OR circuit 1021, the output of which is inverted and delivered to terminal 917.

The input terminals 34A–34C of OR circuit 1021 are connected, respectively, to the input terminals 775–X, 776, and 777. The output terminal 40 of OR circuit 1021 is connected through the parasitic suppressing resistor 835 and through coupling capacitor 1022 to the control grid of the inverter tube 1023, and through resistor 835 and diode rectifier 1024 to ground. The cathode of diode rectifier 1024 is connected to ground and its anode is connected to the juncture of capacitor 1022 and resistor 835 to prevent this juncture from becoming more positive than ground. The control grid and cathode of tube 1023 are connected, respectively, through resistors 1025 and 1026 to the −150 volt terminal 230. The anode of inverter 1023 is connected through the anode load resistor 1027 to the +150 volt terminal 166; through resistor 1028 and diode rectifier 1029, in parallel, to ground, and directly to terminal 917.

If any one of the input terminals 34A–34C of OR circuit 1021 is Up, the output terminal 40 thereof will be Up and a positive pulse delivered to the control grid of tube 1023. When the control grid of tube 1023 is Up, conduction takes place and the anode thereof and hence terminal 917 connected thereto go Down. If, on the other hand, all of the input terminals of OR circuit 1021 are Down, the control grid of tube 1023 is Down and the tube 1023 is non-conductive. It follows that the anode of tube 1023 and terminal 917 are Up and maintained at ground potential by the conduction through diode rectifier 1029. It may be deduced by reference to the waveforms of Figs. 28C and 28D that the terminal 917 shown in Figs. 27A and 27D is Up during the fourth time interval (T3–T4) of every eight microsecond period.

The waveforms W775 and W777 (Fig. 23) are combined in a diode AND circuit 1031a (Fig. 27D) to produce the waveform (Figs. 28A and 28B) which appears on terminal 926 (Fig. 27A).

The input terminals 10A and 10B of AND circuit 1031a (Fig. 27D) are connected, respectively, to the terminals 775 and 777. The output terminal 16 of this AND circuit is connected to the input terminal 58 of cathode follower 1032. The output terminal 63 of cathode follower 1032 is connected to terminal 926. Thus, in order for the output terminal 926 to be Up, both of the input terminals of AND circuit 1031a must be Up.

Reference to the waveforms W775 and W777 of Fig. 23 indicates that one of them will always be Up except during the time T6–T8 and T14–T16 (i.e., the seventh and eighth time intervals of an action or regeneration cycle). Accordingly, the OR circuit 1031 is operated and output terminal 917 is Up throughout an action or regeneration cycle except during the seventh and eighth time intervals thereof. During the seventh and eighth time intervals of an action or regeneration cycle, AND circuit 1031a will be inoperative and the output terminal 926 will be Down.

Briefly, information is read in to the binary storage system as follows:

The terminal WA (Fig. 27A) is Down. Hence, the output of the video amplifier cannot effect AND circuit 916a. Capacitor 924 remains Down and terminal 812 remains Up throughout the cycle.

If a dash is to be read in terminal DW (Fig. 27B) is Down from T8–T12. AND circuit 954a goes Up at T10. This causes a negative pulse at the anode of tube 942 to occur at T11 and to switch the trigger 956 from its initial stable condition. Terminal 817 therefore goes Up at T11 and 814 goes Down. AND circuit 954a goes Down at T11 because terminal 776 goes Down. Terminal 777–X goes Down at T12 and keeps AND circuit 978a Down. Terminal 776–X goes Down at T13 and keeps circuit 978a Down. At T15 the output of AND circuit 978a is Up and at T16 the output from tube 945 switches the trigger circuit 956 to its initial stable condition. Therefore, terminal 817 goes Down and terminal 814 goes Up. This applies a voltage to the cathode of the cathode ray tube to turn off the beam.

If a dot is to be read in the terminal DW (Fig. 27B) is Up. AND circuit 954a goes Up at T10. The resulting negative pulse from the anode of tube 942, occurring at T11, switches the trigger 956 from its initial stable condition. Hence, terminal 817 goes Up and terminal 814 goes Down at T11. The output of AND circuit 978a is Up at T11 and at T12 the negative pulse from the anode of tube 945 switches the trigger circuit 956 to its initial stable condition to cause terminal 817 to go Down and terminal 814 to go Up. This applies a voltage to the cathode of the cathode ray tube to turn off the beam.

*Transfer gate generator*

The transfer gate generator (Fig. 29) provides means for producing a positive and a negative voltage pulse accurately synchronized with respect to input timing pulses. These output pulses are initiated by means of a relatively slow acting mechanical switch not necessarily synchronized with the input pulses. The transfer gate generator is essentially a "1-shot" device in that each actuation of the mechanical switch produces a single synchronized output voltage pulse.

A continuous series of one microsecond pulses spaced sixteen microseconds apart are applied to the input of the transfer gate generator. The first input or synchronizing pulse following the closing of the mechanical switch causes a first output terminal of the generator to go Up and a second output terminal to go Down. The next succeeding input or synchronizing pulse occurring sixteen microseconds later causes the first and second output terminals to go Down and Up, respectively, to thereby restore the transfer gate generator to its initial operating condition. If the mechanical switch is once closed and at least one synchronizing pulse received, the operation of the transfer gate generator takes place irrespective of whether the switch remains closed or is opened.

The transfer gate generator can be utilized to write a single dash during the next action cycle following actuation of a mechanical switch. Previously, it was stated that when a new dash is to be written at a selected address, the dash-write terminal DW (Fig. 27B) must be Down from T8–T12 (Fig. 28C), for example, of an action-write cycle. Therefore, when the negative output of a first generator (write transfer gate generator) is connected through additional circuitry to terminal DW, the actuation of the associated switch must cause a negative pulse to be produced during the first four time intervals (corresponding to T8–T12) of the next action cycle.

The negative output of the write transfer gate generator No. 1 can be connected through appropriate circuitry to cause the write-action terminal WA (Fig. 27A) to be Down from T8–T16, as required during an action-write cycle.

It was also stated hereinbefore that in order to read-in or read-out information from the cathode ray tube during an action cycle that the action cycle blanking terminal ACB (Fig. 27B) must be Up during this time (corresponding to T8–T16). Accordingly, during an action-write cycle, the positive output of the write transfer gate generator No. 1 is utilized to provide the positive unblanking pulse which is applied to terminal ACB to render the action cycle effective.

A second generator (read transfer gate generator) is provided so that the actuation of the mechanical switch associated therewith causes an action-read cycle to be executed. The positive output pulse from this transfer gate generator is connected through additional circuitry to the action cycle blanking terminal ACB (Fig. 27B) so as to permit the execution of the action-read cycle.

Referring more particularly to Fig. 29 sync pulses (Fig. 23) are applied to the input terminal 1051 of a typical transfer gate generator and a ten megacycle sine wave is applied to terminal 778. The input terminals 1051 and terminal 778 are connected to the blocking oscillator circuit 1052.

Terminal 1051 is connected to the suppressor grid of the AND-inverter tube 1053, and terminal 778 is connected through coupling capacitor 1054 to the control grid of tube 1053. The AND-inverter tube 1053 operates in a manner similar to tubes 945 and 942 of Fig. 27B. The tube 1053 is rendered fully conductive and its anode goes Down when the waveform at terminal 778 is at its crest and terminal 1051 is Up. The anode of tube 1053 is connected through the inductance 1055, which is the primary winding of a pulse transformer, and through resistance 1056 to the +150 volt terminal 166. The anode of tube 1053 is also connected to the anodes of the blocking oscillator tube 1057. The control grids of tube 1057 are connected through parasitic suppressing resistors *ps* to a common point which is connected through the inductance 1058 to the juncture between resistors 1059 and 1060. The inductance 1058 is the secondary winding of the blocking oscillator pulse transformer comprising windings 1055 and 1058. The resistors 1059 and 1060 provide the bias potential for the blocking oscillator tube 1057. The cathode of the blocking oscillator tube 1057 is connected through the cathode resistor 1062 to ground and directly to the output terminal 1063 of the blocking oscillator 1052.

When the AND-inverter tube 1053 is rendered fully conductive, its anode is Down causing the anode of tube 1057 to be Down. This action renders tube 1057 conductive. The coupling between the windings 1055 and 1058 provides an increasing positive signal to the control grids of tube 1057 whereby the tube is caused to enter plate saturation. The heavy current drawn through tube 1057 causes a voltage pulse of short duration to appear at the output terminal 1063. Thus, the voltage pulses appearing at terminal 1063 occur at the same time that the sync pulses applied to terminal 1051 occur.

The AND-inverter tubes 1065 and 1066 are provided with a combination of self and fixed bias. The control grid of tube 1065 is connected through the parasitic suppressing resistor *ps* and through capacitor 1067 and resistor 1068 in parallel to the juncture 1069 which is held at approximately −20 volts by the resistors 1070 and 1071. The voltage dividing resistors 1070 and 1071 are connected between ground and the −150 volt terminal 230. The fixed bias for tube 1065 is provided by the potential at juncture 1069 of the resistors 1070 and 1071 and the self-bias is provided by the resistor capacitor 1067 and resistor 1068. Similarly, the control grid of tube 1066 is connected through the resistor 1073 and capacitor 1074 in parallel to the juncture of 1069. Thus, the voltage pulses which appear at terminal 1063 prior to the beginning of each sixteen microsecond period are applied to the control grids of tubes 1065 and 1066.

The tubes 1065 and 1066 are provided to effect a switching of trigger circuit 1075 from each stable condition to the other. Trigger 1075 is similar to trigger 956 (Fig.

27B). The normal condition of trigger 1075 (Fig. 29) is with tube 995R conducting as indicated by the X. The anode of tube 1065 is connected through the anode load resistor 1076 to the +150 volt terminal 166, and to the cathode of diode rectifier 1077 having its anode connected to the anode of tube 995R. The anode of tube 1066 is connected through the anode load resistor 1078 to the +150 volt terminal 166 and to the cathode of diode rectifier 1079 having its anode connected to the anode of tube 995L. Thus when tube 1066 is rendered conductive, its anode will go Down, thereby causing the anode of tube 995L to go Down and causing a switching of trigger circuit 1075 from its initial stable condition. Now, if tube 1065 is rendered fully conductive it will cause a switching of the trigger circuit to its initial stable condition.

The suppressor grid of tube 1066 is connected through the filter circuit 1081 and through the isolation resistor 1082 to juncture 1083. The voltage dividing resistors 1084 and 1085 are connected between the −150 volt terminal 230 and ground and maintain juncture 1083 at approximately −10 volts. Since the suppressor grid of the AND-inverter tube 1066 is at −10 volts, anode to cathode conduction cannot occur.

The juncture of resistors 960 and 962 of the trigger circuit 1075 is connected through the parasitic suppressing resistor *ps* to the control grid of cathode follower tube 1086L. The cathode of tube 1086 is common to 1086L and 1086R and provides the coupling therebetween. The control grid and anode of tube 1086R are commonly connected so that the tube operates as a diode rectifier. The anode of tube 1086R is connected to the upper plate of storage capacitor 1087 and to the arm of the mechanical switch 1088. The normally closed contact NC of the switch 1088 is connected to the juncture of resistors 1089 and 1090 connected between the +150 volt terminal 166 and ground. The juncture of resistors 1089 and 1090 is normally maintained as a potential of approximately +3 volts. Thus, when the mechanical switch 1088 is in the position shown in Fig. 29 the storage capacitor 1087 will be charged to approximately +3 volts.

Prior to the operation of the transfer gate generator (Fig. 29), the trigger circuit 1075 is in its initial stable condition with tube 995R conducting. Hence, tube 995L is non-conducting. As a result the anode of tube 995L is Up and the juncture of resistors 960 and 962 is Up. Since this juncture is Up the control grid of cathode follower 1086L is Up. Since the cathode of rectifier tube 1086R is also Up it cannot be rendered conductive and storage capacitor 1087 remains charged.

If the mechanical switch 1088 is now actuated so that the arm thereof makes contact with the normally open contact NO, the storage capacitor 1087 is connected to the juncture of the filter circuit 1081 and the isolation resistor 1082. This causes the +3 volts appearing across storage capacitor 1087 to be applied to the suppressor grid of the AND-inverter tube 1066. If the arm of the mechanical switch is held against the terminal NO sufficiently long such that a voltage pulse appearing on juncture 1069 is applied to the control grid of tube 1066, this tube is rendered fully conductive since its suppressor grid and control grid are Up. The conduction through AND-inverter tube 1066 causes its anode to go Down to render the diode rectifier 1079 conductive. As noted hereinbefore, the conduction through diode rectifier 1079 will cause the trigger circuit 1075 to switch from its initial stable condition so that the tube 995L becomes conductive. Since the anode of tube 995L is now Down, the juncture between resistors 960 and 962 is Down and the cathode of cathode follower 1086L is Down. The diode rectifier 1086R is therefore rendered conductive and the storage capacitor 1087 is discharged.

The juncture of resistors 960 and 962 is also connected through parasitic suppressor resistors *ps* to the control grids of cathode follower 1092 comprising two triode tubes connected in parallel. The anodes of tube 1092 are connected together and to the +150 volt terminal 166 and the cathodes are connected through the cathode load resistor 1093 to the −150 volt terminal 230, and to the output terminal 1094. If the control grids of cathode follower 1092 are Down, the output terminal 1094 is Down. The output terminal 1094 is normally Up. However, at the time that tube 1066 caused a switching of the trigger circuit 1075 from its initial stable condition the cathode follower 1092 is rendered less conductive and the terminal 1094 caused to go Down.

The juncture of resistors 964 and 966 of the trigger circuit 1075 is connected through parasitic suppressing resistors *ps* to the control grids of cathode follower 1095 having its anodes connected together and to the +150 volt terminal 166. The cathodes of 1095 are connected through the cathode load resistor 1096 to the −150 volt terminal 230, to the output terminal 1097 and through resistor 1098 to the suppressor grid of the AND inverter tube 1065.

When the trigger circuit 1075 is in its initial stable condition with the tube 995R conducting, the anode of tube 995R and hence the juncture between resistors 964 and 966 is Down. Hence, the control grids and cathode of cathode follower 1095 are Down and the output terminal 1097 is Down. Since the cathode of cathode follower 1095 is Down, the suppressor grid of tube 1065 will be Down so that the positive voltage pulses appearing at juncture 1069 cannot cause conduction in the AND-inverter tube 1065.

As stated above, the actuation of the mechanical switch 1088 causes the trigger circuit 1075 to switch from its initial stable condition so that the tube 995L becomes conductive. This switching of trigger circuit 1075 occurs upon the receipt of the first voltage pulse appearing on juncture 1069 after the actuation of the mechanical switch 1088. Under these conditions, the cathode of cathode follower 1092 and the output terminal 1094 go Down. At the same time the cathode follower 1095 and the output terminal 1097 go Up.

The fact that the cathode of cathode follower 1095 is now Up causes the suppressor grid of the AND-inverter tube 1065 to go Up. Since the suppressor grid of tube 1065 is now Up, the next succeeding voltage pulse to appear at juncture 1069 causes conduction therein and its anode goes Down. When the anode of tube 1065 goes Down the resulting potential difference appearing across the diode rectifier 1077 causes conduction therethrough. This conduction causes a switching of the trigger circuit 1075 to its initial condition with tube 995R conducting.

This switching of trigger circuit 1075 causes the juncture of resistors 960 and 962 to go Up, the control grids of cathode follower 1092 to go Up, and hence the cathode and output terminal 1094 to go Up. At the same time the juncture of resistors 964 and 966 goes Down, the control grids and cathode of cathode follower 1095 go Down, output 1097 goes Down, and the suppressor grid of tube 1065 goes Down.

When the arm of switch 1088 is placed in contact with terminal NC the circuit of Fig. 29 is in its initial state and is ready to become operative a second time upon the actuation of the mechanical switch 1088; i.e. movement of the arm of switch 1088 to contact terminal NO.

Referring more particularly to Fig. 30A, two transfer gate generators are connected as utilized during action-write and action-read cycles. Numerous waveforms including those present at the terminal WA (Fig. 27A), and terminals DW and ACB (Fig. 27B) are shown in Fig. 30B.

If it is desired to execute an action-write cycle the mechanical switch 1088 (Fig. 29) associated with the transfer gate generator #1 is actuated and consequently the output terminals 1097 and 1094, respectively, will be Up and Down during the subsequent 16 microsecond interval, as illustrated in Fig. 30B. The output terminals 1097 and 1094 of the transfer gate generator #1 (Fig. 30A) are connected to the gate shaping circuits 1102 wherein the waveforms appearing at terminals 1097 and 1094 are combined with those appearing on terminals 774, 774–X, and 775–X so as to generate the proper output pulses. The output terminals of the gate shaping circuits 1102 are connected respectively to the write-action terminal WA, the dash-write pulse terminal DWP connected through switch 1103 to the dash-write terminal DW (Fig. 27B), and the action cycle blanking terminal ACB.

When the mechanical switch 1088 (Fig. 29) associated with the transfer gate generator #1 is actuated the waveforms illustrated in Fig. 30B will appear at the output terminals of the gate shaping circuits. If the switch 1103 is closed, the actuation of the mechanical switch 1088 associated with transfer gate generator #1 causes a dash to be written on the face of the cathode ray tube since the terminal DWP is Down during the time T8–T12 of the action-write cycle illustrated in Fig. 30B. However, if the switch 1103 is open, the actuation of the mechanical switch 1088 causes a dot to be written.

The transfer gate generator #2 is used to cause the cathode ray tube storage system described hereinbefore to execute an action-read cycle. By actuating the mechanical switch 1088 associated with transfer gate generator #2, the output terminal ACB of the gate shaping circuit 1102 is to be Up during the next successive action cycle following the actuation. The waveform appearing at output terminal ACB is illustrated in Fig. 30B.

Referring to Fig. 31, the circuit diagram of the gate shaping circuits 1102 of Fig. 30A is illustrated. The negative write terminal 1094 of the transfer gate generator #1 is connected to the input terminal 34A of the OR circuit 1104. The input terminal 34B of this OR circuit is connected to the terminal 774 at which appears the waveform W774 (Fig. 23). The output terminal 40 of the OR circuit 1104 is connected to the input terminal 58 of cathode follower 1105. The output terminal 63 of cathode follower 1105 is connected to the output terminal WA and to the input terminal 34B of the OR circuit 1107. The input terminal 34A of the OR circuit 1107 is connected to the terminal 775–X. The output terminal 40 of the OR circuit 1107 is connected to the input terminal 58 of the cathode follower 1108 having its output connected to the terminal DWP and to the arm of the dash-write switch 1103. The other terminal of the switch 1103 is connected to the dash-write terminal DW.

If either or both of the input terminals 34A and 34B of the OR circuit 1104 are Up, the OR circuit is operative and the output terminal 40 thereof is Up. It follows that the output of cathode follower 1105 is Up. This causes the output terminal WA and the input terminal 34B of OR circuit 1107 to go Up. The waveforms applied to the terminals 1094 and 774 are illustrated in Fig. 30B. Since the terminal 774 is Up during every regeneration cycle, the output of the cathode follower 1105 must be Up during this time. However, during an action-writer cycle the terminals 774 and 1094 are both Down and the output of the cathode follower 1105 is therefore Down the entire time T8–T16 of this cycle. As seen from Fig. 30A and noted previously, during this time the write-action terminal WA is Down. Hence, the OR circuit 1104 is operated as a negative AND circuit; i.e., if both inputs are negative a negative output is obtained.

The waveform appearing at the output of cathode follower 1105 and the waveform applied to terminal 775–X serve as the inputs to the OR circuit 1107. If either or both of the input terminals 34A or 34B of the OR circuit 1107 are Up, the output terminal 63 of the cathode follower 1108 is Up.

Referring to Fig. 30B, it is apparent that the output terminal DWP is Up at all times except time T8–T12 of an action-write cycle when it is Down. In Fig. 31, the dash-write switch 1103 is closed and the waveform appearing at terminal DWP appears at the dash-write terminal DW.

It was previously indicated in connection with Figs. 27B and 28C that the dash-write terminal DW must be Down during the entire time T8–T12 of an action-write cycle if a dash is to be written on the face of the cathode ray tube.

As stated hereinbefore, whenever, the writer transfer gate generator #1 or the read transfer gate generator #2 are operated, the action cycle blanking terminal ACB will be caused to be Up during the next succeeding action cycle so as to render the cycle useable or blank. In Fig. 31, the positive terminal 1097 from the transfer gate generator #1 is connected to the input terminal 10A of the AND circuit **1111*a*. The input terminal 10B of this AND circuit is connected to terminal 774–X upon which appears the waveform W774–X (Fig. 30B). The output terminal 16 of AND circuit 1111*a* is connected to the input terminal 58 of cathode follower 1112. The output of cathode follower 112 is connected to the input terminal 34A of the OR circuit 1114**.

Referring to Fig. 30B, it is apparent that the only time the positive terminal 1097 of the transfer gate generator #1 and the terminal 774–X are Up simultaneously is during the time T8–T16 of the action-write cycle. It follows that during this time the output terminal 16 of the AND circuit **1111*a* is Up and the output terminal 63 of the cathode follower 1112 is Up. Consequently, the input terminal 34A of the OR circuit 114 is Up and its output terminal 40** is Up.

The output terminal 40 of OR circuit 1114 is connected to the input of the cathode follower 1115. The output of cathode follower 1115 is connected to the output terminal ACB. Thus, when the input terminal 34A of the OR circuit 1114 is Up its output terminal 40 is Up and the output terminal ACB connected to the output terminal 63 of the cathode follower 1115 is Up.

If neither the transfer gate generator #1 nor generator #2 (Fig. 30A) was operated the output terminal ACB would be Down during the time T8–T16 as shown for the action-blank cycle (Fig. 30B). During all regeneration cycles, the terminal ACB must be Up so as to permit the intensifier circuit of Fig. 27B to be operative. W774 renders OR circuit 1114 operable and causes terminal ACB to be Up during regeneration cycles.

As noted hereinbefore, if the transfer gate generator #2 (Fig. 30A) is operated the positive output terminal 1097 (Fig. 30B) thereof is Up during the action-read cycle. In Fig. 31 the positive terminal 1097 of transfer gate generator #2 is connected to the input terminal 10A of the AND circuit **1121*a* and the input terminal 10B of this AND circuit is connected to the terminal 774–X. The wave-form appearing on terminal 774–X is illustrated in Fig. 30B. The output terminal 16 of AND circuit 1121*a* is connected to the input of cathode follower 1122. The output terminal 63 of cathode follower 1122 is connected to the input terminal 34B of the OR circuit 1114**.

Fig. 30B indicates that the input terminals 10A and 10B of AND circuit **1121*a* are both Up only during the entire time T8–T16 of an action-read cycle. Thus during this time, the output terminal 16 of AND circuit 1121*a* is Up causing the output terminal 63 of cathode follower 1122 to go Up and hence the input terminal 34B of OR circuit 1114 to be Up. The output terminal 40 of the OR circuit 1114 goes Up and the output terminal 63 of the cathode follower 1115 goes Up and causes the output terminal ACB to go Up. Thus, it is apparent that if either the positive terminal 1097 of transfer gate generator #2 or the positive terminal 1097 of transfer gate generator #1 is Up, the terminal ACB (Fig. 31) is Up during the time T8–T16** so as to permit the action cycle to be effective or blank.

It was stated hereinbefore in connection with Fig. 27B, that the action cycle blanking terminal ACB must be Up during every regeneration cycle so as to allow this circuit to be operative. In Fig. 31, the input terminal 34C of the OR circuit 1114 is connected to the terminal 774 upon which appears the waveform W774 (Figs. 23 and 30B). Since terminal 774 is Up during the time T0–T8 (regeneration) of each cycle the output terminal 40 of OR circuit 1114 is Up during this time. Because terminal 40 of OR circuit 1114 is Up the cathode follower 1115 becomes operative and the output terminal ACB goes Up.

The circuits of Figs. 29, 30 and 31 are utilized only when it is desired to manually control the operation of the cathode ray tube storage system by the actuation of mechanical switches. Whenever the cathode ray tube storage system is operated in its normal fashion as, for example, in conjunction with a digital computer, the circuits of Figs. 29, 30A, and 31 would not be required.

*Video circuits*

The video information circuits shown in Figs. 2D and 22B can be replaced by an embodiment comprising Figs. 19B and 32A arranged as shown in Fig. 32B. Description of the operation of Fig. 32A is clarified by the waveforms therefor shown in Fig. 33. Fig. 32A is used to supply video information to one or more cathode ray tubes depending on the arrangement of address locations on the faces of various cathode ray tubes.

Video information present at the pick-up plate abutting the face of a cathode ray tube is applied to the input terminal of the video amplifier of Fig. 19B as described hereinbefore.

Terminal 1140 (Figs. 19A and 32A) is connected through the coupling capacitor 1141 to the juncture 1142 which is connected to ground through the resistor 1143. Juncture 1142 is connected to the anode of diode rectifier 1144 and to the cathodes of rectifiers 1145 and 1146. The cathode of diode 1144 is connected to terminal 1147, the anode of diode 1145 is connected to terminal 1148 and the anode of diode 1146 is connected through resistor 1149 to ground and to the control grid of the AND-inverter tube 1150.

In Fig. 33 the first eight microseconds (N.00–N+1.00) illustrated represent either a regeneration or an action-read cycle. The second eight microseconds (N+1.00–N+2.00) illustrate an action-write cycle where a dash is stored, and the third eight microseconds (N+2.00–N+3.00) illustrate an action-write cycle where a dot is stored.

During a typical regeneration or action-read cycle, the waveforms present at juncture 1142 of Fig. 32A are illustrated during the first eight microseconds of Fig. 33. If a dash signal is applied to terminal 1140 juncture 1142 is negative at time N.40 (Fig. 33). If a dot signal is applied to terminal 1140 juncture 1142 is positive at N.40 time.

It is seen from Fig. 33 that the terminals 1147 and 1148 are at 0 volt during the time interval N.00–N.20. Thus, during this time if juncture 1142 were more positive than ground potential diode 1144 would conduct to return this juncture 1142 to 0 volt or ground potential. On the other hand, if juncture 1142 is more negative than ground during N.00–N.20 the diode 1145 conducts to return juncture 1142 to 0 volt or ground potential.

During the time N.20–N+1.0 of every cycle, the terminals 1147 and 1148 are, respectively, at +20 volts and −20 volts. These voltages cause the diodes 1144 and 1145 (Fig. 32A) to be cut off so that juncture 1142 is permitted to follow the potential applied to terminal 1140. However, during these last six microseconds of each cycle the potentials present on terminals 1147 and 1148 (+20 volts and −20 volts, respectively) prevent juncture 1142 from being more positive than +20 volts or more negative than −20 volts.

The control grid of tube 1150 is normally a 0 volt. Diode 1146 is connected so that conduction therethrough occurs if juncture 1142 is at a negative potential. Juncture 1142 is negative only if a dash signal is present. Hence, control grid of tube 1150 is Down only when a dash signal has been applied to the input terminal 1140.

The cathode of tube 1150 is connected to ground and the anode thereof is connected through the anode load resistor 1153 to the juncture of voltage dividing resistors 1154 and 1155 connected between the +220 volt terminal 674 and ground. This juncture is connected to ground through by-pass capacitor 1156. The screen grid of tube 1150 is connected through the resistors 1157 and 1158 to the +220 volt terminal 674 and the juncture of these resistors is connected to ground through by-pass capacitor 1159. The anode of tube 1150 is also connected through coupling capacitor 1162 to the cathode of pull-down diode 1163 and to the anode of diode rectifier 1164.

The suppressor grid of tube 1150 is connected to the output terminal 31 of AND circuit **1151*a*. The video sensing pulse (Fig. 33) is applied to terminal 1165 at .40 time of each cycle. The video blanking pulse (Fig. 33) is applied to terminal 1166. If the control and suppressor grids of tube 1150 (Fig. 32A) are Up, the positive video sensing pulse at terminal 1165 causes tube 1150 to conduct. The conduction of the AND-inverter tube 1150 causes a negative pulse to appear at its anode. This pulse is applied through the coupling capacitor 1162 to the cathode of pull-down diode 1163**.

The anode of pull-down diode 1163 is connected to the common point 1167 connected to the anodes of diodes 1168 and 1169, to the cathode of pull-up diode 1170, to the upper plate of storage capacitor 1173, and to the input terminal 58 of cathode follower 1174.

The anode of pull-up diode 1170 is connected to terminal 1175 at which the ON pulse appears (Fig. 33). The ON pulse is a positive pulse of short duration appearing at N.30 time of every cycle. The presence of the ON pulse at terminal 1175 (Fig. 32A) causes the pull-up diode 1170 to conduct so as to charge the storage capacitor 1173 to approximately +5 volts. This charging places the upper plate of capacitor 1173 and hence juncture 1167 connected thereto Up or at +5 volts. The fact that juncture 1167 is Up causes the output terminal 1176 of the cathode follower 1174 to go Up.

It has been shown that when a dot signal is applied to the input terminal 1140 (Fig. 32A) the control grid of tube 1150 goes Up so that the video sensing pulse applied via terminal 1165 to the suppressor grid of this tube at N.40 time causes tube 1150 to conduct. The conduction of tube 1150 causes capacitor 1162 to apply a negative pulse to the cathode of pull-down diode 1163. Since the cathode of pull-down diode 1163 is Down at N.40 time it conducts and causes the storage capacitor 1173 to be discharged or go Down.

When the storage capacitor 1173 is Down or discharged the output terminal 1176 connected to the cathode follower 1174 goes Down.

The fact that terminal 1176 is Up from N.30–N.40 time indicates that a dot signal was applied to the input terminal 1140 of Fig. 32A.

In order to be certain that the negative pulse appearing at the anode of the AND-inverter tube 1150 will cause pull-down 1163 to conduct, the cathode of 1163 is prevented, by the presence of diode 1164, from going more positive than +5 volts. The cathode of diode 1164 is connected to the juncture of voltage dividing resistors 1177 and 1178 which juncture is maintained at approximately +5 volts. The voltage dividing resistors 1177 and 1178 are connected between the +150 volt terminal 166 and ground and the juncture of these resistors is connected to ground through a by-pass capacitor 1179.

It follows that if the anode of diode 1164, connected to the cathode of pull-down diode 1163, becomes more positive than +5 volts, the diode 1164 conducts and thereby pulls the cathode of pull-down diode 1163 down to +5 volts.

The cathode of diode 1168 is connected to terminal 1182 at which the dash-termination pulse (Fig. 33) appears. At N.00 time of each cycle, the dash-termination pulse at terminal 1182 causes the potential thereof to go negative. The negative pulse at terminal 1182 causes diode 1168 to conduct if the anode thereof is Up. Thus, if the storage capacitor 1173 is Up at the time that the dash-termination pulse appears at terminal 1182, conduction through diode 1168 causes the storage capacitor 1173 to be discharged or go Down.

Briefly, the ON pulse at terminal 1175 at N.30 time causes pull-up diode 1170 to conduct thereby charging storage capacitor 1173 to approximately +5 volts. This action beginning at N.30 time causes the output terminal 1176 of cathode follower 1174 to go Up. If a dash signal is applied to the input terminal 1140, juncture 1142 will be Down at N.40 time causing the control grid of tube 1150 to be Down. Thus the positive pulse applied to terminal 1165 cannot cause tube 1150 to conduct. The cathode of pull down diode 1163 will remain Up and the diode does not conduct. Therefore, juncture 1167 and storage capacitor 1173 remain Up until N.00 time of the next cycle. The dash termination pulse appearing at terminal 1182 at N+1.00 time causes the storage capacitor 1173 to be discharged because of the conduction through diode 1168. Accordingly, when a dash signal is applied to the input terminal 1140 (Fig. 32A) the output of cathode follower 1174 and the output terminal 1176 are Up during the interval N.30–N+1.00 (Fig. 33) of a regeneration or action-read cycle.

If a dot signal is applied the output terminal 1176 is Up from N.30–N.40. If a dash signal is applied the output terminal 1176 is Up from N.30–N.00. Since the information present at terminal 1176 represents that which was read from an address location on the face of a cathode ray tube, this potential can be applied via terminal 1176 to external circuitry designed to utilize the information stored in a cathode ray tube storage system.

During an action-read cycle or regeneration cycle, diode 1169 is rendered non-conductive so that it cannot cause the storage capacitor 1173 to be discharged. The input terminals 1183 and 1184 (Fig. 32A) are connected, respectively, to the input terminals 34A and 34B of diode OR circuit 1185 having its output terminal 40 connected to the input of cathode follower 1186. The output terminal 63 of cathode follower 1186 is connected to the cathode of diode 1169. A negative pulse is applied to terminal 1183 at N.46 time of every cycle. At all other times the terminal 1183 is Up or at approximately 0 volt. The dot-write terminal 1184 (Fig. 33) is Up during a regeneration or action-read cycle. Since one of the input terminals 1184 of OR circuit 1185 is always Up throughout a regeneration or action-read cycle, the output terminal 40 thereof is Up. Hence, the output terminal 63 of cathode follower 1186 is Up and the cathode of diode 1169 connected thereto is Up. Accordingly, the diode 1169 is conductive throughout a regeneration or action-read cycle.

The input terminals 10A of the AND circuits 1190_a_—1193_a_ are commonly connected to the output of cathode follower 1174, each AND circuit 1190_a_—1193_a_ being associated with an individual cathode ray tube. In operation the input terminals 10B of the AND circuits 1190_a_—1193_a_ are connected to respective output terminals of a suitable tube selector circuit such as illustrated in Fig. 2B. Accordingly, if it is desired to write the information present at terminal 1176 on the cathode ray tube associated with AND circuit 1192_a_, the input terminal 10B of this AND circuit is Up throughout a complete eight microsecond cycle.

Consider, for example, that the information present at terminal 1176 is to be stored on the cathode ray tube associated with AND circuit 1190_a_. It is required that the terminal 10B of AND circuit 1190_a_ be Up throughout an action or regeneration cycle so that the dot or dash signal (Fig. 33) appearing at terminal 1176 will appear at the output terminal 16 of AND circuit 1190_a_.

The outputs of AND circuits 1190_a_—1193_a_ are connected respectively to the inputs of the similar inverting circuits 1195—1198. The output terminal 16 of AND circuit 1190_a_ is connected through parasitic suppressor resistor _ps_ to the control grid of tube 1199 which is operated as an inverter. The cathode of tube 1199 is connected to ground and the anode is connected through the anode load resistor 1200 to the +150 volt terminal 166 and to the output terminal 1201. Thus, when the input terminals 10A and 10B of AND circuit 1190_a_ are Up the control grid of tube 1199 is Up and the anode thereof is Down. Accordingly, if a dot signal is applied to the input terminal 1140 the output terminal 1201, for example, is Down during the interval N.30–N.40. Also, if a dash signal is applied to terminal 1140, the output terminal 1201 is Down during the interval N.30–N+1.00.

The terminal 1201 (Fig. 32A) is connected to terminal 814 (Fig. 27C) coupled to the cathode of the related cathode ray tube. Each of the terminals 1201—1204 is similarly connected to its related cathode ray tube. If this embodiment is to be employed with only a single cathode ray tube as illustrated in Fig. 22B, the AND circuits 1191_a_—1193_a_ and their respective inverting circuits 1196—1198 (Fig. 32A) would not be used.

During an action-write cycle, the waveforms illustrated in Fig. 33 during the latter two cycles (N+1.00–N+3.00)

of eight microseconds each apply to the circuit of Fig. 32A. Information previously stored at an address on a cathode ray tube which is amplified by the video amplifier (Fig. 19B) and applied to terminal 1140 (Fig. 32A) is prevented from effecting the pulse stretcher (Fig. 32A) during an action-write cycle because the video blanking pulse (Fig. 33) applied to terminal 1166 is Down. Since terminal 1166 is Down during an action-write cycle, the video sensing pulse applied to terminal 1165 at N+1.40 and N+2.40 time is ineffective and the supressor grid of AND-inverter tube 1150 is Down. The pull-down diode 1163 is therefore not rendered conductive.

As noted hereinbefore a negative pulse of short duration is applied to terminal 1183 (Fig. 32) at N.45 time of every cycle. If the dot-write terminal 1184 is Up, the output terminal 40 of OR circuit 1185 is Up. Thus, when terminal 1184 is Up the negative pulse appearing at terminal 1183 cannot effect the operation of the OR circuit 1185.

If during an action-write cycle a new dash is to be written on the face of a cathode ray tube, terminal 1184 is caused to go Up. This causes the output terminal 40 of OR circuit 1185 and the output of cathode follower 1186 to go Up and prevents the diode 1169 from conducting. The On pulse applied to terminal 1175 at N+1.30 time causes pull-up diode 1170 to conduct and storage capacitor 1173 to be charged to approximately +5 volts. The output terminal 63 of the cathode follower 1174 therefore goes Up. The output terminal of cathode follower 1174 remains Up until N+2.00 time when the dash termination pulse appears at terminal 1182 and renders diode 1168 conductive to effect discharge of the storage capacitor 1173. This causes the voltage to be decreased at the input terminal 58 of the cathode follower 1174 and causes the output terminal 63 to go Down.

If, on the other hand, a dot is to be written on the face of a cathode ray tube during an action-write cycle, the dot-write terminal 1184 (Fig. 32A) is Down throughout the entire eight microsecond cycle (N+2.00–N+3.00)

Since terminal 1184 is Down the negative pulse appearing at terminal 1183 at N+2.46 time causes the output terminal 40 of OR circuit 1185 to go Down and thereby apply a negative pulse to the input of cathode follower 1186. Cathode follower 1186 therefore transfers a negative pulse to the cathode of diode 1169 to render it conductive and discharge storage capacitor 1173. Previously, at N+2.30 time the On pulse at terminal 1175 rendered diode 1170 conductive and caused the storage capacitor 1173 to become fully charged. Thus, when a new dot is to be written on the face of a cathode ray tube, the output terminal of cathode follower 1174 is Up for the time interval N+2.30–N+2.46. The manner in which information present at the terminal 1176 (waveform, Fig. 33) is written on the face of a cathode ray tube has been explained hereinbefore.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A system for storing information on the face of cathode ray tubes wherein read in and read out of information is effected during an action cycle and regeneration of information stored is effected during a regeneration cycle comprising; a regeneration counter for consecutively producing voltages representing each address at which information is storable and stepping from one address to the next in numerical order and in synchronism with successive regeneration cycles; a source of action address voltages, switch means operable in response to said address voltages from said regeneration counter during each regeneration cycle and in response to said action address voltages during each action cycle to provide voltages representing a predetermined one of said addresses; first circuit means coupling preselected ones of said voltages representing said predetermined one of said addresses to the deflection plates of said cathode ray tubes to locate the electron beams of each of said cathode ray tubes at the position corresponding to said predetermined address; and second circuit means coupling preselected ones of said voltages representing said addresses and the grids of the ones of said cathode ray tubes containing said predetermined address to cause a turning on of the electron beam of those cathode ray tubes.

2. The system set forth in claim 1 wherein said second circuit means includes tube selectors of the coincidence circuit type for supplying an increased voltage to the grids of the cathode ray tubes containing said addresses.

3. The system as set forth in claim 1 in which each regeneration cycle address location is in a cathode ray tube different from any cathode ray tube specified by the preceding regeneration cycle address.

4. In a cathode ray tube storage system for effecting storage in the binary notation; first means for selectively positioning and turning on electron beams at a predetermined address to read out and read in information thereat; an amplifier for amplifying information read out from said address; detecting circuit means for determining and storing binary representations of information amplified; storage circuit means coupling said detecting circuit means to said first means to effect read in in response to each output from said detecting circuit means; and information read in circuit means coupled to the output of said detecting circuit means for effecting read in of information to be stored through control of said first means when the information being read in is a certain predetermined binary representation different from that read out.

5. In a cathode ray tube storage system having means for selectively positioning and controlling the turning on and off of electron beams at a predetermined address to read out and read in information thereat, amplifying and detecting circuits for storing read out signals and providing at the output terminal thereof signals representative of the binary representation read out, storage circuit means coupling said read out signals to a control electrode of at least one cathode ray tube to control the turning on and off of the electron beam thereof to effect read in of said read out signals, and read in circuit means connected to transfer a read in signal to said output terminal, whereby the read in effected by said storage circuit means is destroyed and read in in response to said read in signal effected when the binary representations thereof are different.

6. The system according to claim 5 in which said binary representations are in dot and dash form and in which said storage circuit means includes intensifier circuit means connected to be time responsive to said read in signals at said output terminal, and capacitive means for coupling said intensifier circuit means to said cathode ray tube to control the turning on and the turning off of the beam thereof.

7. In a storage system for effecting storage and read out therefrom in the binary notation; video amplifying means for providing a positive read out signal to indicate the storage of one binary representation and a negative read out signal to indicate storage of the other binary representation; inverting and gating means for receiving said read out signals; sample pulse means connected to said gating means to transfer a sample pulse thereto, said gating means being operative to transmit said sample pulse only upon the occurrence of a negative read out signal; a pull-up diode and a pull-down diode; a storage capacitor having one plate connected to the cathode and anode respectively of said pull-up and pull-down diodes; an output terminal coupled to said capacitor; means for rendering said pull-up diode conductive to positively charge said storage capacitor prior to said transfer of said sample pulse; and means coupling the output of said gating means to the cathode of said pull-down diode so that said pulldown diode is rendered conductive to negatively charge said storage capacitor when said gating means operates to transmit said sample pulse; whereby said output terminal is positive during the elapsed time between occurrence of conduction in said pull-up diode and operation of said gating means when a negative read out signal is present and is positive a longer time when a positive read out signal is present: and a storage circuit having an input terminal and coupled to said output terminal and being selectively operable for storing the information at said output terminal or new information applied to said input terminal.

8. In a cathode ray tube storage system for storing dot and dash manifestations; amplifying means for producing a negative pulse in response to read out of a dot and a positive pulse in response to read out of a dash; pulse conversion means connected to receive the output of said amplifying means to provide an output of short preselected duration to manifest a dot and of long preselected duration to manifest a dash; read out means connected to receive the output of said pulse conversion means; means operable after the period of said short preselected duration to cause operation of said read out means in response to read out of a dash; storage circuit means coupling the output of said pulse conversion means to each of a plurality of cathode ray tubes; and cathode ray tube selection means for permitting said storage circuit means coupling each of said cathode ray tubes to be responsive, one at a time, to transfer a voltage to that cathode ray tube to cause regeneration of the manifestations read out.

9. In a cathode ray tube storage system for effecting detection of information stored on the face of cathode ray tubes and generation of information to be stored thereon; amplifying means connected to amplify the information to be detected and to manifest bits thereof as voltage pulses of first and second time duration corresponding to the value represented thereby at an output terminal, each bit being manifested by a single voltage pulse; means coupling said amplifying means to a single data terminal for exhibiting detected information for read out and for receiving information to be read in; storage circuit means arranged for coupling the output terminal of said amplifying means to the cathode ray tubes to effect regeneration of said information to be detected; and control circuit means connected to said storage circuit means for receiving control pulses to render said storage circuit means selectively non-responsive to said information to be detected and selectively responsive to new information to be read in during a cycle of storage system operation.

10. The storage system set forth in claim 9 wherein said control circuit means includes a read in control terminal for receiving a timed voltage pulse and is coupled to said storage circuit means for rendering said storage circuit means nonresponsive to said information to be detected.

11. The storage system set forth in claim 10 wherein said control circuit means includes circuits coupled to said read in control terminal and said data terminal to render said control circuit non-responsive to information to be read out and responsive to information to be read in from said data terminal to provide an information pulse of like duration to that at the output terminal of said amplifying means representing that value.

12. The storage system set forth in claim 11 wherein said storage circuit means includes a storage capacitor and circuits for producing a timed pulse and coupling that pulse to said storage capacitor to cause a charging of said capacitor and subsequently operable circuits coupled to said storage capacitor for receiving said information pulses and effecting a discharge of said capacitor if said information is representative of one preselected value.

13. The storage system set forth in claim 12 including cathode ray tube selection circuits selectively operable in response to voltages representing the address at which information is to be stored to condition said circuit means so that the output of said storage capacitor effects operation of the cathode ray tube containing said address to effect storage thereat.

14. In a storage system for storing information on the faces of cathode ray tubes, regenerating the information stored, reading out the information stored, and reading in and effecting storage of new information; read in and regeneration circuit means having a common intermediate storage means for information to be transmitted to the cathode ray tubes for storage; switching means conjointly controlled by said read in and regeneration circuit means to operate said intermediate storage means only during regeneration and read out operation; and coincidence circuit means under control of said read in and regeneration circuit means for operating said intermediate storage means.

15. The invention set forth in claim 14 including termination circuit means coupled to said coincidence circuit means for terminating the control thereof by said read in and regeneration circuit means; a data terminal for providing read out information and receiving read in information; and circuits coupling said data terminal to said regeneration means, and control means rendering said circuits operable to permit read out at said data terminal.

16. The invention set forth in claim 15 including coupling circuits joining said read in circuits and said data terminal; and pulse controlled storage circuits for rendering said storage system operable to provide read out of information stored and effect storage of new information during a single cycle of operation.

17. In a circuit for reading information in to cathode ray tube storage in response to information read out therefrom; circuit means for producing a Down voltage representing a dash and an Up voltage representing a dot and the absence of a dash; and circuits for coupling said circuit means to said cathode ray tube storage for effecting read in of the information read out including first and second circuits operable in response to the coincidence of two pulses thereat, means for applying a train of periodic pulses to said first and second circuits, means connected to detect pulse coincidence at said first circuit, an electronic switch connected for operation in response to detection of said pulse coincidence at said first circuit to provide an output, means under control of said Down voltage for producing a pulse, pulse delay means coupling said last-mentioned pulse to said second circuit for effecting preselected pulse coincidence thereat, and a coupling between said second circuit and said electronic switch to permit operation of said switch from pulse coincidence at said second circuit whereby the time of pulse coincidence at said second circuit determines the duration of said output.

18. In a cathode ray tube electrostatic storage system for storing information on discrete areas of the face of a cathode ray tube wherein an action cycle is performed for effecting read in of information to be stored and read out of information stored and a regeneration cycle is performed for refreshing the information stored; deflection circuit means for providing voltage changes to position the electron beam of the cathode ray tube in coincidence with said discrete areas, one at a time; a regeneration counter for producing a plurality of voltages utilized singly and in combination to specify said areas for regeneration in response to counter advance pulses; switching means connected to receive said voltages from said regeneration counter at one group of input terminals and arranged to receive similar voltages corresponding to discrete areas to be reached for action cycles at another group of input terminals; said switching means being operative to transmit the voltages from said regeneration counter during a regeneration cycle and operative in response to a switching voltage to alternatively transmit said voltages from said other group of input terminals during an action cycle; circuit means connected to receive the output voltages from said switching means and to provide output voltages corresponding to each during substantially the entire action or regeneration cycle; an inverter circuit for inverting the output voltages from said last named circuit means; and connections from said inverter circuit and said last named circuit means to said deflection circuit means for rendering said deflection circuit means operative.

19. The invention set forth in claim 18 wherein the deflection plates of a plurality of cathode ray tubes are connected in parallel; including cathode ray tube selecting means having output connections coupled to each cathode ray tube and having input connections for respose to preselected output voltages from said circuit means and from said inverter circuit to render said cathode ray tubes selectively responsive one at a time.

20. The invention set forth in claim 18 wherein said circuit means includes a pulse stretcher corresponding to each individual output voltage and includes; a grid controlled inverter tube for receiving said individual output voltage and a timed voltage pulse, a pull down diode connected to be energized from said inverter tube; a pull up diode connected to receive a pull up pulse at its plate, an output condenser having one terminal connected to a fixed potential; and an output connection commonly joining the cathode of said pull up diode, the plate of said pull down diode, and the other plate of said condenser.

21. In a cathode ray tube storage system for storing information at a plurality of addresses represented by discrete areas on the face of the tube wherein information is read in to any single address and read out from any single address during an action cycle and refreshed at any single address during a regeneration cycle including; a regeneration counter for supplying an output voltage representing a predetermined address during a portion of each regeneration cycle; a first group of terminals for receiving a voltage representing a predetermined address during a portion of each action cycle; switching means connected to said first group of terminals and connected to receive the output voltage from said regeneration counter; voltage means permitting said switching means to be responsive to the voltage from said regeneration counter during a portion of a regeneration cycle and from said first group of terminals during a portion of said action cycle to provide an output voltage at said switching means corresponding to a predetermined address during a portion of each action and regeneration cycle; means coupling said switching means to the deflection plates of said cathode ray tube and responsive to the output voltage of said switching means to selectively deflect the electron beam of said cathode ray tube into coincidence with predetermined discrete areas; said means including, a pulse stretcher connected to receive each voltage from said switching means to provide an output voltage occurring during substantially the entire action or regeneration cycle, an inverter circuit, for each pulse stretcher, connected to invert the output voltage from that pulse stretcher, a deflection circuit switch for each pulse stretcher having two grid controlled tubes with their cathodes commonly connected through a load impedance to provide a constant current flow through said impedance, voltage stabilizing means connected in the anode circuit of each tube of the deflection circuit switch, a connection from each voltage stabilizing means to a deflection plate of said cathode ray tube, and means coupling the output of each pulse stretcher and the output of the corresponding inverter to the control grid of one tube of the corresponding deflection circuit switch to apply voltage changes to the control grid of said tubes to cause a preselected constant current to alternately flow from the anodes of the grid controlled tubes of said deflection circuit switch.

22. The invention set forth in claim 21 including a dash deflection generator for effecting a predetermined movement of the electron beam during an action cycle and including a grid controlled cathode follower tube circuit having capacitive voltage divider means connected in its cathode circuit; input means for rendering said cathode follower tube circuit responsive during an action cycle; and coupling means joining said voltage divider means to said voltage stabilizing means so that the voltage at said deflection plates is changed when said cathode follower tube circuit is rendered responsive to cause a predetermined movement of said electron beam.

23. In a system wherein first, second, third and fourth storage means are selectively operated in parallel, one at a time, to manipulate information at even numbered addresses from 0–998 inclusive, odd numbered addresses from 1–999 inclusive, even numbered addresses from 1000–1998 inclusive, and odd numbered addresses from 1001–1999 inclusive and timed voltages corresponding to the binary-decimal code and the inversion of those voltages are utilized individually and in combination to effect selective visitation of said addresses and having storage selection means including a first AND circuit connected to receive the timed voltages corresponding to the decimal numbers 1 and 1000 and coupled to said first storage means to render it operable when an even numbered address from 0–998 inclusive is to be visited; a second AND circuit connected to receive the timed voltage corresponding to the decimal number 1000 and the inversion of the timed voltage corresponding to the decimal number 1 and coupled to said second storage means to render it operable when an odd numbered address from 1–999 inclusive is to be visited; a third AND circuit connected to receive the timed voltage corresponding to the decimal number 1 and the inversion of the timed voltage corresponding to the decimal number 1000 and coupled to said third storage means to render it operable when an even numbered address from 1000–1998 inclusive is to be visited; and a fourth AND circuit connected to receive the timed voltage corresponding to the decimal number 1000 and the inversion of the timed voltage corresponding to the decimal number 1 and coupled to said fourth storage means to render it operable when an odd numbered address from 1001–1999 is to be visited.

24. In a cathode ray tube storage system wherein information corresponding to different addresses is stored by different cathode ray tubes; a tube selector circuit rendered responsive to produce an output corresponding to the cathode ray tube containing the address at which certain information is to be stored; a two-input AND circuit corresponding to each cathode ray tube and connected to receive, at one input, the output of said tube selector circuit corresponding to that cathode ray tube; a common connection joining the other input terminal of each said AND circuit for receiving an input when information is to be stored; and circuit means coupling the output of each of said AND circuits to the corresponding cathode ray tube to cause information to be stored by each cathode ray tube, one at a time, when the AND circuit corresponding thereto receives two inputs simultaneously.

25. A system for storing information on the face of cathode ray tubes wherein read in and read out of information is effected during an action cycle and regeneration of information stored is effected during a regeneration cycle including; a regeneration counter for consecutively producing voltages representing each address at which information is storable and stepping from one address to the next in numerical order and in synchronism with successive regeneration cycles; switch means operable in response to said voltages from said regeneration counter and selectively operable alternatively in response to action address voltages to provide voltages representing a predetermined one of said addresses and including two grid controlled tubes having their cathodes commonly connected through a load resistor for providing a constant current flow through said resistor; voltage stabilizing means connected in the anode circuit of each of said tubes; and conjointly controlled means connected to apply electrical changes to the control grids of said tubes to cause a preselected constant current to alternately flow to the individual anodes of said tubes; first circuit means coupling preselected ones of said voltages representing a predetermined one of said addresses to the deflection plates of said cathode ray tubes to locate the electron beams of each of said tubes at the position of said predetermined address; and second circuit means coupling preselected ones of said voltages representing said addresses and the grids of said cathode ray tubes to adjust the voltage at the grid of the cathode ray tube containing said predetermined address to cause a turning on of the electron beam thereat.

26. A cyclically operable computer data storage system which is adapted for operation in response to discontinuous demands for action cycles during which information is to be read into and out of storage, and in which stored information is refreshed during regeneration cycles comprising; an address switch for supplying one set of output voltages during each storage system cycle corresponding to information storage addresses to be reached in accordance with input address voltages supplied thereto during that cycle; a regeneration counter connected to said address switch and normally operable during every cycle of said storage system to provide different input voltage values thereto for each successive cycle representing successive addresses where information is to be refreshed; said address switch including action address input terminals for receiving action address voltages; said address switch being normally operable during each successive storage system cycle to receive said regeneration address voltages and to supply output address voltages corresponding thereto; said system including means operable when an action cycle is demanded to interrupt the normal succession of regeneration cycles and to insert an action cycle as the next system cycle, said last named action cycle means including means incorporated with said address switch and operable in response to an action cycle switching voltage to cause said address switch to receive action address voltages at said action address input terminals and to supply output address voltages corresponding thereto, and said action cycle means including means incorporated with said regeneration counter and operable in response to an action cycle switching voltage to cause said regeneration counter to interrupt the counting operation thereof during an action cycle.

27. In a binary type cathode ray tube storage system; amplifying means for producing a positive output pulse when a first binary manifestation is read out and a negative output pulse when a second manifestation is read out; first control means, circuits conjointly responsive to said first control means and the output pulses produced by read out of said binary manifestations to provide an Up voltage in response to read out of said first binary manifestation and a Down voltage in response to read out of said second binary manifestation, coincidence circuit means operable to produce an output in response to said Up voltage; first circuit means connected to cause a capacitor to be charged in response to the output of said coincidence circuit means; second control means selectively operable to effect a discharge of said capacitor; second circuit means connected to an output terminal and said capacitor and under control of the charging and discharging of said capacitor whereby a Down voltage of predetermined duration is provided at said output terminal in response to read out of said first manifestation and an Up voltage is provided in response to read out of said second manifestation; a pulse storage means coupled to said second circuit means for storing a voltage indicative of the information to be stored in said cathode ray tube storage system, whereby said first circuit means stores an indication of the information read out from said cathode ray tube storage system and said pulse storage means stores a representation of the information to be read in thereto; and circuits interconnecting said pulse storage means and a cathode ray tube for delivering an Up voltage of predetermined duration to said cathode ray tube in response to said Down voltage at said output terminal and delivering an Up voltage of a predetermined less duration in response to the Up voltage at said output terminal comprising first and second plural grid tubes; means for applying a train of periodic pulses to a grid of said first and second tubes to render them conductive; an electronic switch coupling said first and second tubes to said cathode ray tubes; first means for providing a voltage, in coincidence with a preselected one of said pulses, at a second grid of said first tube, and means connected to said second grid for delaying response of said second tube to said pulses; second means interconnecting said output terminal and a second grid of said second tube for providing a voltage, subsequent to the voltage provided by said first means and in coincidence with a preselected one of said pulses; and means connected to said second grid of said second tube for disabling response of said second tube to the preselected pulse in coincidence with said voltage and enabling response thereof to the next pulse of said train to operate said electronic switch.

28. A cathode ray tube storage system wherein information is read in and read out of storage during an action cycle and the information stored is refreshed during a regeneration cycle including; a regeneration counter for providing a first group of successively occurring voltage output values to successively represent each value of a predetermined range of values representing addresses at which said information is storable; an address switch coupled to receive said first group of voltage output values from said regeneration counter and having input terminals for receiving a second group of voltage values representing said addresses and being arranged to provide one group of said voltage values at the output thereof; circuits interconnecting the output of said address switch and the deflection plates of said cathode ray tube to position the electron beam thereof at the address corresponding to the voltage at the output of said output switch; switching voltage responsive means rendering said switch operative in response to said first group of voltage values to effect performance of a regeneration cycle and selectively operative to said second group of voltage values to effect performance of an action cycle; means connected to effect timed read-out of the information stored during a regeneration cycle and an action cycle; control means coupled to said cathode ray tube and operable during an action cycle to remove from storage the information read out and substitute new information therefor and read in and store that new information whereby read out of information stored and read in of new information is effected during a single action cycle; said interconnecting circuits including a deflection generator having first and second deflection paths and comprising; a grid controlled cathode follower tube having a first condenser connected in parallel with the load impedance and chargeable when the cathode voltage is above a predetermined value and dischargeable when the cathode voltage is below a predetermined value to prevent the cathode voltage from following the voltage at the control grid thereof; second and third serially connected condensers connected in parallel with said first condenser to form a voltage divider; a cathode follower switching circuit for providing a constant current switchable from the first deflection path to the second and vice versa; and a connection from the common juncture of said second and third condensers to said cathode follower switching circuit whereby said connection permits transfer of a substantially linear voltage to said cathode follower switching circuit to switch said constant current from said first path to said second path as a result of the discharge of said first condenser.

References Cited in the file of this patent

UNITED STATES PATENTS

| | | |
|---|---|---|
| 2,345,668 | Hallmark | Apr. 4, 1944 |
| 2,419,340 | Easton | Apr. 22, 1947 |
| 2,441,296 | Snyder et al. | May 11, 1948 |
| 2,489,312 | Pacini | Nov. 29, 1949 |
| 2,527,632 | Graham | Oct. 31, 1950 |
| 2,548,789 | Hergenrother | Apr. 10, 1951 |
| 2,570,875 | Sink | Oct. 9, 1951 |
| 2,572,080 | Wallace | Oct. 23, 1951 |
| 2,612,621 | Shepherd et al. | Sept. 30, 1952 |
| 2,615,127 | Edwards | Oct. 21, 1952 |
| 2,617,963 | Arditi | Nov. 11, 1952 |
| 2,623,196 | Toulon | Dec. 23, 1952 |
| 2,639,379 | Blancher | May 19, 1953 |
| 2,641,696 | Woolard | June 9, 1953 |
| 2,653,274 | Babcock | Sept. 22, 1953 |
| 2,660,669 | West | Nov. 24, 1953 |
| 2,662,175 | Staal | Dec. 8, 1953 |
| 2,681,424 | Hergenrother | June 15, 1954 |
| 2,688,697 | Lawson | Sept. 7, 1954 |
| 2,693,534 | Bertram | Nov. 2, 1954 |

(Other references on following page)

UNITED STATES PATENTS

| | | |
|---|---|---|
| 2,706,247 | Jacobs | Apr. 12, 1955 |
| 2,706,811 | Steele | Apr. 19, 1955 |
| 2,709,230 | Williams et al. | May 24, 1955 |
| 2,749,439 | Williams et al. | June 5, 1956 |
| 2,755,994 | Williams et al. | July 24, 1956 |
| 2,767,908 | Thomas | Oct. 23, 1956 |
| 2,769,935 | Williams et al. | Nov. 6, 1956 |
| 2,770,756 | Klein | Nov. 13, 1956 |
| 2,777,971 | Williams et al. | Jan. 15, 1957 |
| 2,785,855 | Williams et al. | Mar. 19, 1957 |
| 2,790,931 | Shuman | Apr. 30, 1957 |
| 2,810,092 | Williams et al. | Oct. 15, 1957 |
| 2,862,139 | Williams et al. | Nov. 25, 1958 |